United States Patent

Nanba et al.

[11] Patent Number: 5,999,311
[45] Date of Patent: Dec. 7, 1999

[54] SMALL-SIZED VARIABLE MAGNIFICATION OPTICAL SYSTEM

[75] Inventors: Norihiro Nanba, Kawasaki; Keisuke Araki, Yokohama, both of Japan

[73] Assignee: Canon Kabushiki Kaisha, Tokyo, Japan

[21] Appl. No.: 08/828,835

[22] Filed: Mar. 24, 1997

[30] Foreign Application Priority Data

Mar. 26, 1996 [JP] Japan .................................. 8-095988
Mar. 26, 1996 [JP] Japan .................................. 8-095991

[51] Int. Cl.$^6$ .......................... G02B 27/00; G02B 23/06
[52] U.S. Cl. ......................... 359/365; 359/431; 359/432; 359/433; 359/435; 359/731
[58] Field of Search .................... 359/364, 365, 359/422, 423, 431, 432, 433, 434, 435, 679, 730, 731, 858, 859

[56] References Cited

U.S. PATENT DOCUMENTS

| | | | |
|---|---|---|---|
| 3,674,334 | 7/1972 | Offner | 350/55 |
| 3,914,011 | 10/1975 | Mallinson et al. | 359/431 |
| 4,265,510 | 5/1981 | Cook | 350/55 |
| 4,477,156 | 10/1984 | Gebelein et al. | 350/503 |
| 4,571,036 | 2/1986 | Gebelein et al. | 350/503 |
| 4,737,021 | 4/1988 | Korsch | 350/505 |
| 4,775,217 | 10/1988 | Ellis | 350/538 |
| 4,812,030 | 3/1989 | Pinson | 350/620 |
| 4,993,818 | 2/1991 | Cook | 350/505 |
| 5,063,586 | 11/1991 | Jewell et al. | 378/34 |
| 5,453,877 | 9/1995 | Gerbe et al. | 359/633 |

FOREIGN PATENT DOCUMENTS

| | | |
|---|---|---|
| 0 730 180 | 9/1996 | European Pat. Off. . |
| 0 790 513 | 8/1997 | European Pat. Off. . |
| 2-297516 | 12/1990 | Japan . |
| 5-12704 | 1/1993 | Japan . |
| 6-139612 | 5/1994 | Japan . |

Primary Examiner—Jon Henry
Attorney, Agent, or Firm—Fitzpatrick, Cella, Harper & Scinto

[57] ABSTRACT

A variable magnification optical system comprises at least three optical units which are a first moving optical unit, a fixed optical unit and a second moving optical unit. The three optical units are arranged in that order in a propagation direction of light, and a variation of magnification is effected by a relative movement between the first moving optical unit and the second moving optical unit. If a ray which exits from an object and enters the variable magnification optical system, and passes through a center of a stop of the variable magnification optical system and reaches a center of a final image plane is represented as a reference axis ray, the second moving optical unit has a cross-sectional shape which is asymmetrical in a plane which contains the reference axis, and a curved reflecting surface which is inclined with respect to the reference axis, and the direction of the entering reference axis and the direction of the exiting reference axis of the second moving optical unit are parallel to each other and differ from each other by 180°, the variable magnification optical system being arranged in such a manner that a final image is formed after an intermediate image is formed at least twice.

16 Claims, 50 Drawing Sheets (VERTICAL ANGLE OF VIEW, HORIZONTAL ANGLE OF VIEW)

(VERTICAL ANGLE OF VIEW, HORIZONTAL ANGLE OF VIEW)

(VERTICAL ANGLE OF VIEW, HORIZONTAL ANGLE OF VIEW)

FIG. 33

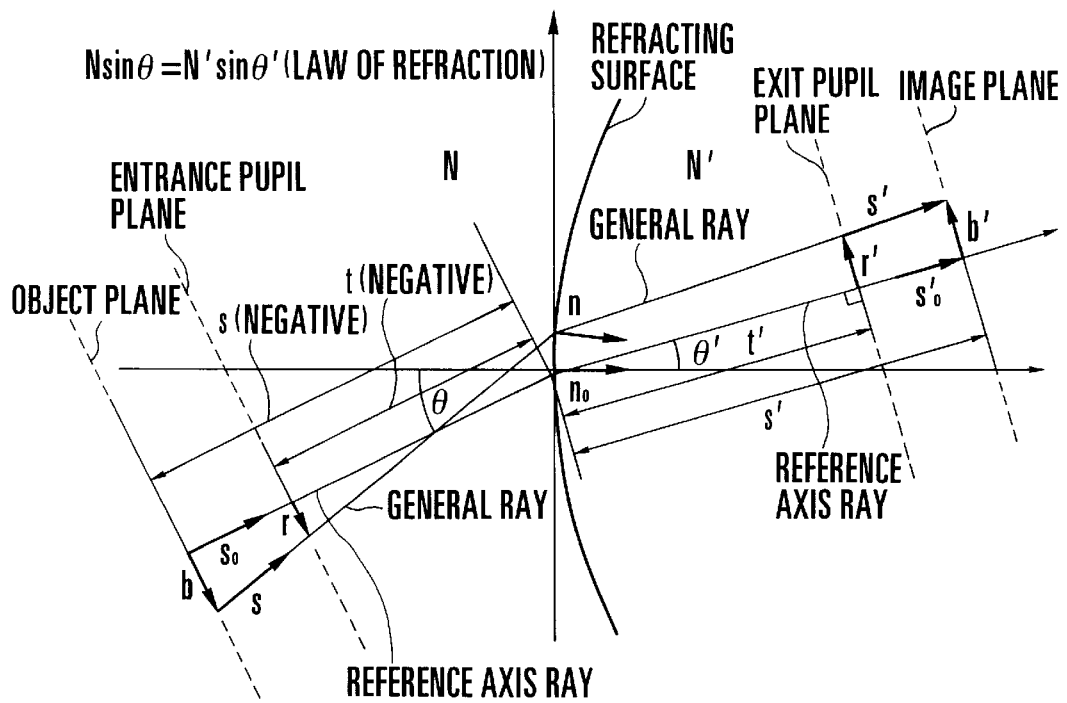

N REFRACTIVE INDEX ON ENTRANCE SIDE
$S_0$ UNIT VECTOR OF INCIDENT REFERENCE AXIS RAY
$n_0$ NORMAL VECTOR AT POSITION WHERE REFERENCE AXIS RAY IS INCIDENT
s UNIT VECTOR OF INCIDENT GENERAL RAY
b VECTOR REPRESENTATIVE OF OBJECT LINE
r HEIGHT VECTOR ON ENTRANCE PUPIL
s POSITION OF OBJECT PLANE
t POSITION OF ENTRANCE PUPIL PLANE

N' REFRACTIVE INDEX ON EXIT SIDE
$s'_0$ UNIT VECTOR OF REFRACTED REFERENCE AXIS RAY
n NORMAL VECTOR AT POSITION WHERE GENERAL RAY IS INCIDENT
s' UNIT VECTOR OF REFRACTED GENERAL RAY
b' VECTOR REPRESENTATIVE OF IMAGE LINE
r' HEIGHT VECTOR ON EXIT PUPIL
s' POSITION OF IMAGE PLANE
t' POSITION OF EXIT PUPIL PLANE

PRINCIPAL POINT, FOCUS AND FOCAL LENGTH OF OPTICAL SYSTEM (VERTICAL ANGLE OF VIEW, HORIZONTAL ANGLE OF VIEW)

(VERTICAL ANGLE OF VIEW, HORIZONTAL ANGLE OF VIEW)

(VERTICAL ANGLE OF VIEW, HORIZONTAL ANGLE OF VIEW)

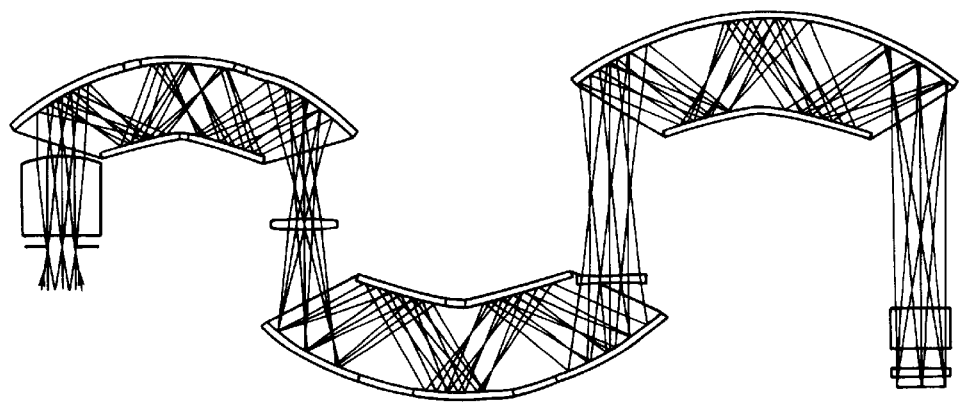
FIG. 68
FIG. 67
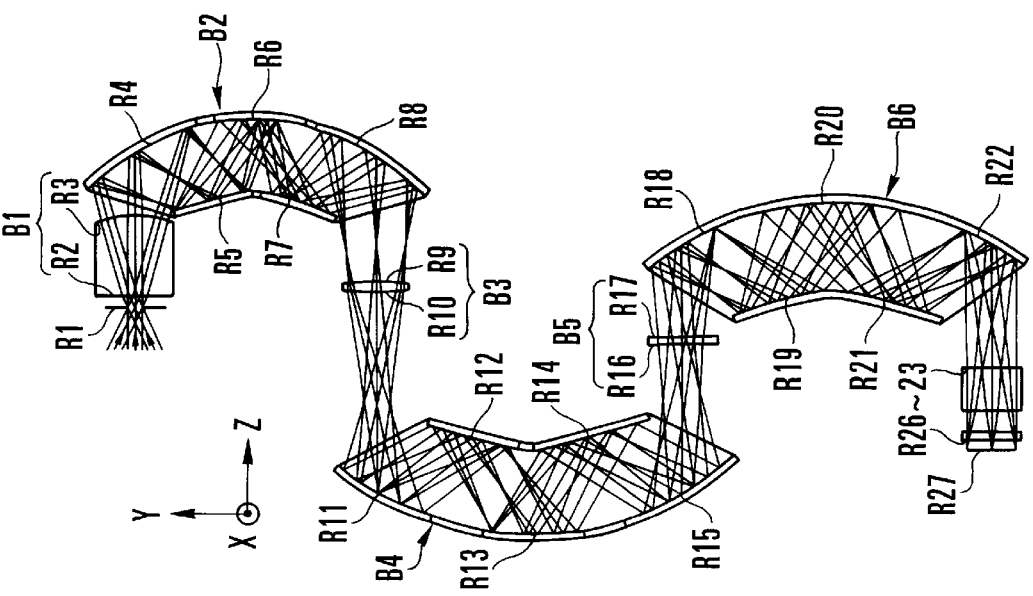
FIG. 66

SMALL-SIZED VARIABLE MAGNIFICATION OPTICAL SYSTEM

BACKGROUND OF THE INVENTION

1. Field of the Invention

The present invention relates to a variable magnification optical system and an image pickup apparatus using the same and, more specifically, to an optical arrangement suitable for use in a video camera, a still video camera, a copying machine and the like which are arranged to realize variation of magnification by using an optical unit having decentered reflecting surfaces, as a magnification varying optical unit.

2. Description of Related Art

It is known that an optical system of the type which is composed of only refracting lenses has been provided as a variable magnification optical system. In such a conventional optical system, refracting lenses each having a spheric surface or aspheric surface of rotational symmetry are rotationally symmetrically arranged with respect to the optical axis.

In addition, various photographing optical systems using reflecting surfaces such as concave mirrors or convex mirrors have heretofore been proposed, and an optical system using both a reflecting system and a refracting system is also well known as a catadioptric system.

FIG. 37 is a schematic view of a so-called mirror optical system which is composed of one concave mirror and one convex mirror. In the mirror optical system shown in FIG. 37, an object light beam 104 from an object is reflected by a concave mirror 101 and travels toward an object side while being converged, and after having been reflected by a convex mirror 102 and having been refracted by a lens 110, the object light beam 104 forms an image of the object on an image plane 103.

This mirror optical system is based on the construction of a so-called Cassegrainian reflecting telescope, and is intended to reduce the entire length of the optical system by bending, by using the two opposed reflecting mirrors, the optical path of a telephoto lens system which is composed of refracting lenses and has an entire large length.

For similar reasons, in the field of an objective lens system which constitutes part of a telescope as well, in addition to the Cassegrainian type, various other types which are arranged to reduce the entire length of an optical system by using a plurality of reflecting mirrors have been known.

As is apparent from the above description, it has heretofore been proposed to provide a compact mirror optical system by efficiently bending an optical path by using reflecting mirrors in place of lenses which are commonly used in a photographing lens whose entire length is large.

However, in general, the mirror optical system, such as the Cassegrainian reflecting telescope, has the problem that part of an object ray is blocked by the convex mirror 102. This problem is due to the fact that the convex mirror 102 is placed in the area through which the object light beam 104 passes.

To solve the problem, it has been proposed to provide a mirror optical system which employs decentered reflecting mirrors to prevent a portion of the optical system from blocking the area through which the object light beam 104 passes, i.e., to separate a principal ray of the object light beam 104 from an optical axis 105.

FIG. 38 is a schematic view of the mirror optical system disclosed in U.S. Pat. No. 3,674,334. This mirror optical system solves the above-described blocking problem by using part of reflecting mirrors which are rotationally symmetrical about the optical axis.

In the mirror optical system shown in FIG. 38, a concave mirror 111, a convex mirror 113 and a concave mirror 112 are arranged in the order of passage of the light beam, and these mirrors 111, 113 and 112 are reflecting mirrors which are rotationally symmetrical about an optical axis 114, as shown by two-dot chain lines in FIG. 38. In the shown mirror optical system, a principal ray 116 of an object light beam 115 is separated from the optical axis 114 to prevent shading of the object light beam 115, by using only the upper portion of the concave mirror 111 which is above the optical axis 114 as viewed in FIG. 38, only the lower portion of the convex mirror 113 which is below the optical axis 114 as viewed in FIG. 38, and only the lower portion of the concave mirror 112 which is below the optical axis 114 as viewed in FIG. 38.

FIG. 39 is a schematic view of the mirror optical system disclosed in U.S. Pat. No. 5,063,586. The shown mirror optical system solves the above-described problem by decentering the central axis of each reflecting mirror from an optical axis and separating the principal ray of an object light beam from the optical axis. As shown in FIG. 39 in which an axis perpendicular to an object plane 121 is defined as an optical axis 127, a convex mirror 122, a concave mirror 123, a convex mirror 124 and a concave mirror 125 are arranged in the order of passage of the light beam, and the central coordinates and central axes 122a, 123a, 124a and 125a (axes which respectively connect the centers of reflecting surfaces and the centers of curvature thereof) of the reflecting surfaces of the respective mirrors 122 to 125 are decentered from the optical axis 127. In the shown mirror optical system, by appropriately setting the amount of decentering and the radius of curvature of each of the surfaces, each of the reflecting mirrors is prevented from shading an object light beam 128, so that an object image is efficiently formed on an image plane 126.

In addition, U.S. Pat. Nos. 4,737,021 and 4,265,510 also disclose an arrangement for preventing the shading problem by using part of a reflecting mirror which is rotationally symmetrical about an optical axis, or an arrangement for preventing the shading problem by decentering the central axis of the reflecting mirror from the optical axis.

One example of a catadioptric optical system which uses both a reflecting mirror and a refracting lens and has a magnification varying function is a deep-sky telescope such as that disclosed in each of U.S. Pat. Nos. 4,477,156 and 4,571,036. The deep-sky telescope uses a parabolic reflecting mirror as a primary mirror and has a magnification varying function using an Erfle eyepiece.

Another variable magnification optical system is known which varies the image forming magnification (focal length) of a photographing optical system by relatively moving a plurality of reflecting mirrors which constitute part of the aforesaid type of mirror optical system.

For example, U.S. Pat. No. 4,812,030 discloses an art for performing variation of the magnification of the photographing optical system by relatively varying the distance between the concave mirror 101 and the convex mirror 102 and the distance between the convex mirror 102 and the image plane 103 in the construction of the Cassegrainian reflecting telescope shown in FIG. 37.

FIG. 40 is a schematic view of another embodiment disclosed in U.S. Pat. No. 4,812,030. In the shown embodiment, an object light beam 138 from an object is made incident on and reflected by a first concave mirror 131, and travels toward an object side as a converging light beam and is made incident on a first convex mirror 132. The light beam is reflected toward an image forming plane by the first convex mirror 132 and is made incident on a second convex mirror 134 as an approximately parallel light beam. The light beam is reflected by the second convex mirror 134 and is made incident on a second concave mirror 135 as a diverging light beam. The light beam is reflected by the second concave mirror 135 as a converging light beam and forms an image of the object on an image plane 137. In this arrangement, by varying the distance between the first concave mirror 131 and the first convex mirror 132 and the distance between the second convex mirror 134 and the second concave mirror 135, zooming is performed and the focal length of the entire mirror optical system is varied.

In the arrangement disclosed in U.S. Pat. No. 4,993,818, an image formed by the Cassegrainian reflecting telescope shown in FIG. 37 is secondarily formed by another mirror optical system provided in a rear stage, and the magnification of the entire photographing optical system is varied by varying the image forming magnification of that secondary image forming mirror optical system.

In any of the above-described reflecting types of photographing optical systems, a large number of constituent components are needed and individual optical components need to be assembled with high accuracy to obtain the required optical performance. Particularly since the relative position accuracy of each of the reflecting mirrors is strict, it is indispensable to adjust the position and the angle of each of the reflecting mirrors.

One proposed approach to solving this problem is to eliminate the incorporation error of optical components which occurs during assembly, as by forming a mirror system as one block.

A conventional example in which a multiplicity of reflecting surfaces are formed as one block is an optical prism, such as a pentagonal roof prism or a Porro prism, which is used in, for example, a viewfinder optical system. In the case of such a prism, since a plurality of reflecting surfaces are integrally formed, the relative positional relationships between the respective reflecting surfaces are set with high accuracy, so that adjustment of the relative positions between the respective reflecting surfaces is not needed. Incidentally, the primary function of the prism is to reverse an image by varying the direction in which a ray travels, and each of the reflecting surfaces consists of a plane surface.

Another type of optical system, such as a prism having reflecting surfaces with curvatures, is also known.

FIG. 41 is a schematic view of the essential portion of the observing optical system which is disclosed in U.S. Pat. No. 4,775,217. This observing optical system is an optical system which not only allows an observer to observe a scene of the outside but also allows the observer to observe a display image displayed on an information display part, in the form of an image which overlaps the scene.

In this observing optical system, a display light beam 145 which exits from the display image displayed on an information display part 141 is reflected by a surface 142 and travels toward an object side and is made incident on a half-mirror surface 143 consisting of a concave surface. After having been reflected by the half-mirror surface 143, the display light beam 145 is formed into an approximately parallel light beam by the refractive power of the half-mirror surface 143. This approximately parallel light beam is refracted by and passes through a surface 142, and forms a magnified virtual image of the display image and enters a pupil 144 of an observer so that the observer recognizes the display image.

In the meantime, an object light beam 146 from an object is incidence on a surface 147 which is approximately parallel to the reflecting surface 142, and is then refracted by the surface 147 and reaches the half-mirror surface 143 which is a concave surface. Since the concave surface 143 is coated with an evaporated semi-transparent film, part of the object light beam 146 passes through the concave surface 143, is refracted by and passes through the surface 142, and enters the pupil 144 of the observer. Thus, the observer can visually recognize the display image as an image which overlaps the scene of the outside.

FIG. 42 is a schematic view of the essential portion of the observing optical system disclosed in Japanese Laid-Open Patent Application No. Hei 2-297516. This observing optical system is also an optical system which not only allows an observer to observe a scene of the outside but also allows the observer to observe a display image displayed on an information display part, as an image which overlaps the scene.

In this observing optical system, a display light beam 154 which exits from an information display part 150 passes through a plane surface 157 which constitutes part of a prism Pa, and is made incident on a parabolic reflecting surface 151. The display light beam 154 is reflected by the reflecting surface 151 as a converging light beam, and forms an image on a focal plane 156. At this time, the display light beam 154 reflected by the reflecting surface 151 reaches the focal plane 156 while being totally reflected between two parallel plane surfaces 157 and 158 which constitute part of the prism Pa. Thus, the thinning of the entire optical system is achieved.

Then, the display light beam 154 which exits from the focal plane 156 as a diverging light beam is totally reflected between the plane surface 157 and the plane surface 158, and is made incident on a half-mirror surface 152 which consists of a parabolic surface. The display light beam 154 is reflected by the half-mirror surface 152 and, at the same time, not only is a magnified virtual image of a display image formed but also the display light beam 154 is formed into an approximately parallel light beam by the refractive power of the half-mirror surface 152. The obtained light beam passes through the surface 157 and enters a pupil 153 of the observer, so that the observer can recognize the display image.

In the meantime, an object light beam 155 from the outside passes through a surface 158b which constitutes part of a prism Pb, then through the half-mirror surface 152 which consists of a parabolic surface, then through the surface 157, and is then made incident on the pupil 153 of the observer. Thus, the observer visually recognizes the display image as an image which overlaps the scene of the outside.

As another example which uses an optical element on a reflecting surface of a prism, optical heads for optical pickups are disclosed in, for example, Japanese Laid-Open Patent Application Nos. Hei 5-12704 and Hei 6-139612. In these optical heads, after the light outputted from a semiconductor laser has been reflected by a Fresnel surface or a hologram surface, the reflected light is focused on a surface of a disk and the light reflected from the disk is conducted to a detector.

However, in any of the aforesaid optical systems composed of conventional refracting optical elements only, a stop is disposed in the inside of the optical system, and an entrance pupil is in many cases formed at a position deep in the optical system. This leads to the problem that the larger the distance to a pupil plane lying at a position which is the closest to the object side as viewed from the stop, the effective ray diameter of the entrance pupil becomes the larger with the enlargement of the angle of view.

In any of the above-described mirror optical systems having the decentered mirrors, which are disclosed in U.S. Pat. Nos. 3,674,334, 5,063,586 and 4,265,510, since the individual reflecting mirrors are disposed with different amounts of decentering, the mounting structure of each of the reflecting mirrors is very complicated and the mounting accuracy of the reflecting mirrors is very difficult to ensure.

In either of the above-described photographing optical systems having the magnification varying functions, which are disclosed in U.S. Pat. Nos. 4,812,030 and 4,993,818, since a large number of constituent components, such as a reflecting mirror or an image forming lens, are needed, it is necessary to assemble each optical part with high accuracy to realize the required optical performance.

In particular, since the relative position accuracy of the reflecting mirrors is strict, it is necessary to adjust the position and the angle of each of the reflecting mirrors.

As is known, conventional reflecting types of photographing optical systems have constructions which are suited to a so-called telephoto lens using an optical system having an entire large length and a small angle of view. However, if a photographing optical system which needs fields of view from a standard angle of view to a wide angle of view is to be obtained, the number of reflecting surfaces which are required for aberration correction must be increased, so that a far higher component accuracy and assembly accuracy are needed and the cost and the entire size of the optical system tend to increase.

The above-described observing optical system disclosed in U.S. Pat. No. 4,775,217 is realized as a small-sized observing optical system which is composed of a plane refracting surface and a concave half-mirror surface. However, the exit surface 142 for the respective light beams 145 and 146 from the information display part 141 and the outside needs to be used as a total reflecting surface for the light beam 145 exiting from the information display part 141, so that it is difficult to give a curvature to the surface 142 and no aberration correction is effected at the exit surface 142

The above-described observing optical system disclosed in Japanese Laid-Open Patent Application No. Hei 2-297516 is realized as a small-sized observing optical system which is composed of a plane refracting surface, a parabolic reflecting surface and a half-mirror consisting of a parabolic surface. In this observing optical system, the entrance surface 158 and the exit surface 157 for the object light beam 155 from the outside are formed to extend so that their respective extending surfaces can be used as total reflecting surfaces for guiding the light beam 154 which exits from the information display part 150. For this reason, it is difficult to give curvatures to the respective surfaces 158 and 157 and no aberration correction is effected at either of the entrance surface 158 and the exit surface 157

The range of applications of either of the optical systems for optical pickups which are disclosed in, for example, Japanese Laid-Open Patent Application Nos. Hei 5-12704 and Hei 6-139612 is limited to the field of a detecting optical system, and neither of them satisfies the image forming performance required for, particularly, an image pickup apparatus which uses an area type of image pickup device, such as a CCD.

BRIEF SUMMARY OF THE INVENTION

An object of the present invention is to provide a high-performance variable magnification optical system which includes a plurality of optical units two of which move relative to each other to realize variation of the magnification of the variable magnification optical system, the variable magnification optical system being capable of varying the magnification while varying the optical path length from an object to a final image plane with the final image forming plane spatially fixed, so that the thickness of the variable magnification optical system is small in spite of its wide angle of view and its entire length is short in a predetermined direction as well as its decentering aberration is fully corrected over the entire range of variation of magnification.

Another object of the present invention is to provide an image pickup apparatus using the aforesaid high-performance variable magnification optical system.

Another object of the present invention is to provide a variable magnification optical system having at least one of the following effects and advantages, and an image pickup apparatus employing such a variable magnification optical system.

Since a stop is arranged on the object side of the variable magnification optical system or in the vicinity of the first surface and an object image is formed by a plurality of times in the variable magnification optical system, the effective diameter and the thickness of the variable magnification optical system can be made small in spite of its wide angle of view.

Since each optical unit employs an optical element having a plurality of reflecting surfaces having appropriate refractive powers and the reflecting surfaces are arranged in a decentered manner, the optical path in the variable magnification optical system can be bent into a desired shape to reduce the entire length of the variable magnification optical system in a predetermined direction.

A plurality of optical elements which constitute the variable magnification optical system are each formed as a transparent body on which two refracting surfaces and a plurality of reflecting surfaces are integrally formed in such a manner that each of the reflecting surfaces is arranged in a decentered manner and is given an appropriate refractive power. Accordingly, the decentering aberration of the variable magnification optical system can be fully corrected over the entire range of variation of magnification.

Since each magnification varying optical unit employs an optical element which is formed as a transparent body on which two refracting surfaces and a plurality of curved or plane reflecting surfaces are integrally formed, not only is it possible to reduce the entire size of the variable magnification optical system, but it is also possible to solve the problem of excessively strict arrangement accuracy (assembly accuracy) which would have often been experienced with reflecting surfaces.

A variator optical unit which shows a largest amount of variation of magnification during a magnification varying operation is fixed, and an optical unit lying on the object side of the variator optical unit is moved to vary the magnification of the variable magnification optical system, so that an exit pupil on its telephoto side can be formed at a position more distant from an image plane than that on its wide-angle side. Accordingly, by appropriately setting the position of the exit pupil at the wide-angle end, it is possible to restrain occurrence of shading over the entire range of variation of magnification in an image pickup apparatus employing a solid-state image pickup device.

A variator optical unit which shows a largest amount of variation of magnification during a magnification varying operation is composed of an optical element having an entering reference axis and an exiting reference axis which differ from each other by 180° in direction. The variator optical unit is fixed, and an optical unit lying on the object side of the variator optical unit is moved to vary the magnification of the variable magnification optical system, so that the distance of movement of a moving optical unit positioned on the image-plane side of the variator optical unit can be reduced.

To achieve the above objects, in accordance with one aspect of the present invention, there is provided a variable magnification optical system which comprises at least three optical units, the three optical units being a first moving optical unit, a fixed optical unit and a second moving optical unit which are arranged in that order in a propagation direction of light, a variation of magnification being effected by a relative movement between the first moving optical unit and the second moving optical unit, wherein if a ray which exits from an object and enters the variable magnification optical system, and passes through a center of a stop of the variable magnification optical system and reaches a center of a final image plane is represented as a reference axis ray; a reference axis ray which is incident on any surface of the variable magnification optical system or enters any of the optical units is represented as an entering reference axis of the aforesaid any surface or the aforesaid any optical unit; a reference axis ray which exits from the aforesaid any surface or the aforesaid any optical unit is represented as an exiting reference axis of the aforesaid any surface or the aforesaid any optical unit; a point at which the entering reference axis intersects with the aforesaid any surface is represented as a reference point; a direction in which the reference axis ray travels from an object side toward an image plane along the entering reference axis is represented as a direction of the entering reference axis; and a direction in which the reference axis ray travels from the object side toward the image plane along the exiting reference axis is represented as a direction of the exiting reference axis, the second moving optical unit has a cross-sectional shape which is asymmetrical in a plane which contains the reference axis, and a curved reflecting surface which is inclined with respect to the reference axis, and the direction of the entering reference axis and the direction of the exiting reference axis of the second moving optical unit are parallel to each other and differ from each other by 180°, the variable magnification optical system being arranged in such a manner that a final image is formed after an intermediate image is formed at least twice.

In the variable magnification optical system, the fixed optical unit is an optical unit having the largest ratio of (a lateral magnification at a wide-angle end) to (a lateral magnification at a telephoto end) of all the optical units.

In the variable magnification optical system, the first moving optical unit moves toward the fixed optical unit during a variation of magnification from a wide-angle end toward a telephoto end.

In the variable magnification optical system, the second moving optical unit includes an optical element which is formed as one transparent body on which two refracting surfaces and a plurality of internal curved reflecting surfaces are formed.

In the variable magnification optical system, the first moving optical unit includes an optical element which is formed as one transparent body on which two refracting surfaces and a plurality of internal curved reflecting surfaces inclined with respect to the reference axis are formed, the direction of the entering reference axis and the direction of the exiting reference axis of the optical element being parallel to and the same as each other.

In the variable magnification optical system, the first moving optical unit includes an optical element which is formed as one transparent body on which two refracting surfaces and a plurality of internal curved reflecting surfaces inclined with respect to the reference axis are formed, the direction of the entering reference axis and the direction of the exiting reference axis of the optical element being parallel to each other and different from each A other by 180°.

In the variable magnification optical system, the first moving optical unit forms an intermediate image in its inside.

In the variable magnification optical system, the fixed optical unit includes an optical element which is formed as one transparent body on which two refracting surfaces and a plurality of internal curved reflecting surfaces inclined with respect to the reference axis are formed, the direction of the entering reference axis and the direction of the exiting reference axis of the optical element being parallel to and the same as each other.

A In the variable magnification optical system, the fixed optical unit includes an optical element which is formed as one transparent body on which two refracting surfaces and a plurality of internal curved reflecting surfaces inclined with respect to the reference axis are formed, the direction of the entering reference axis and the direction of the exiting reference axis of the optical element being parallel to each other and different from each other by 180°.

In the variable magnification optical system, the fixed optical unit includes an optical element which is formed as one transparent body on which two refracting surfaces and a plurality of internal curved reflecting surfaces inclined with respect to the reference axis are formed, the exiting reference axis of the optical element being inclined with respect to the entering reference axis thereof.

In the variable magnification optical system, the stop is located on the object side of the first moving optical unit, the stop being fixed during the variation of magnification.

In accordance with another aspect of the present invention, there is provided a variable magnification optical system which comprises a fixed optical unit and a plurality of magnification varying optical units which are arranged in that order in a propagation direction of light, a variation of magnification being effected by a relative movement between the plurality of magnification varying optical units, wherein letting $f_i$ be a focal length of any magnification varying optical unit i and letting k be a number of times by which an on-axial light beam forms an intermediate image in the aforesaid any magnification varying optical unit i, the aforesaid any magnification varying optical unit i satisfies:

$$f_i \cdot (-1)^k > 0$$

(k is an integer not less than 0), and wherein if a ray which exits from an object and enters the variable magnification optical system, and passes through a center of a stop of the variable magnification optical system and reaches a center of a final image plane is represented as a reference axis ray; a reference axis ray which is incident on any surface of the variable magnification optical system or enters any of the optical units is represented as an entering reference axis of the aforesaid any surface or the aforesaid any optical unit; a reference axis ray which exits from the aforesaid any surface or the aforesaid any optical unit is represented as an exiting reference axis of the aforesaid any surface or the aforesaid any optical unit; a point at which the entering reference axis intersects with the aforesaid any surface is represented as a reference point; a direction in which the reference axis ray travels from an object side toward an image plane along the entering reference axis is represented as a direction of the entering reference axis; and a direction in which the reference axis ray travels from the object side toward the image plane along the exiting reference axis is represented as a direction of the entering reference axis, any of the magnification varying optical units includes at least one concave reflecting surface the entering and exiting reference axes of which are inclined with respect to a normal to the concave reflecting surface at the reference point thereof, the concave reflecting surface having a cross-sectional shape which is asymmetrical in a plane which contains the entering reference axis and the exiting reference axis.

The above and other objects, features and advantages of the present invention will become apparent from the following detailed description of preferred embodiments as well as numerical examples, taken in conjunction with the accompanying drawings.

BRIEF DESCRIPTION OF THE SEVERAL VIEWS OF THE DRAWING

FIG. 33 is a view showing a coordinate system for a paraxial expansion to be performed along a bent reference axis, and various quantities for use in the paraxial expansion;

FIG. 66 is an optical cross-sectional view of Numerical Example 6 of the variable magnification optical system of the present invention with respect to its wide-angle end;

FIG. 67 is an optical cross-sectional view of Numerical Example 6 relative to its middle position;

FIG. 68 is an optical cross-sectional view of Numerical Example 6 relative to its telephoto end;

DETAILED DESCRIPTION OF THE INVENTION

The variable magnification optical system according to the present invention is a so-called decentered optical system (off-axial optical system) which employs decentered reflecting surfaces. Such a decentered optical system does not have an optical axis common to each of the reflecting surfaces, and this leads to the problem that no general paraxial calculations can be used. For this reason, the present invention introduces the concept of a reference axis which is equivalent to the optical axis of a coaxial optical system, and is intended to design the decentered optical system by developing a paraxial theory with respect to such reference axis. The paraxial theory of the decentered optical system (herein referred to also as the off-axial optical system) will be described below.

Paraxial Theory of the Off-axial Optical System

1. Method of Representing the Off-axial Optical System and its Constituent Surfaces 1-1. Off-axial Optical System The off-axial optical system and the reference axis which constitutes the skeleton of the off-axial optical system will be defined hereinbelow in contrast with a conventional coaxial optical system which has been widely used.

a) Definition of the Reference Axis

In general, the "reference axis" in an optical system is defined as an optical path along which a particular reference ray having a reference wavelength travels from an object plane to an image plane. Since the reference ray is not yet determined in this definition, a reference axis ray is determined normally in accordance with either of the following two principles.

(1) If an axis having symmetry which is even partial is present in an optical system and correction of aberration can be effected with sufficient symmetry, a ray which passes along the axis having symmetry is determined as the reference axis ray.

(2) If an axis is generally absent in an optical system or if a symmetrical axis is partly present but correction of aberration can not be effected with sufficient symmetry, a ray which comes from the center of an object plane (the center of the area of a scene being observed photographed) and passes through the center of the stop provided in the optical system after having sequentially passed through specified surfaces in the optical system, or a ray which passes through the center of the stop provided in the optical system and reaches the center of a final image plane is determined as the reference axis ray, and the optical path of the reference axis ray is determined as the reference axis.

The reference axis defined in the above-described manner generally has a bent shape.

Figure 31:
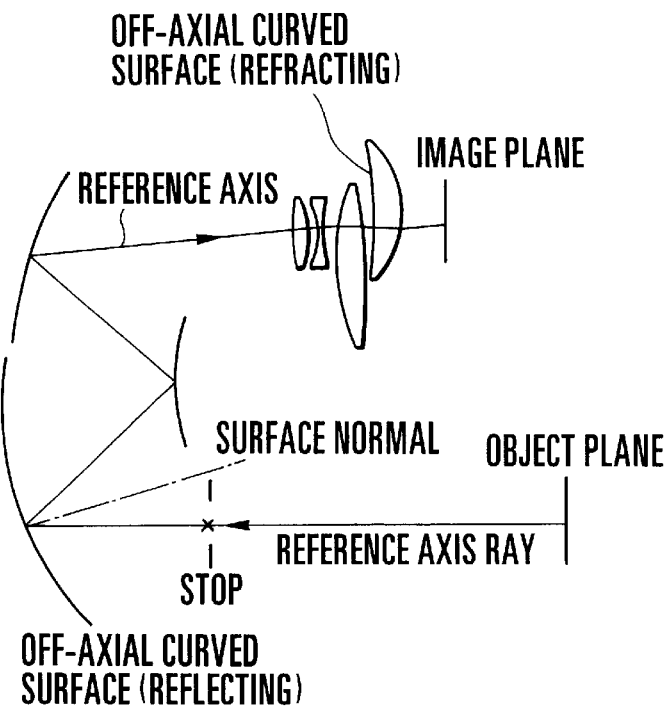
FIG. 31 is a view showing one example of an off-axial optical system.

Refer to FIG. 31.

In FIG. 31, it is assumed that each surface has a reference point which is the intersection of the surface and a reference axis ray, and that the reference axis rays located on the object and image sides of each surface are called an entering reference axis and an exiting reference axis, respectively. In addition, the reference axis has a direction, and the direction is a direction in which the reference axis ray travels to form an image. Therefore, the direction of the entering reference axis and the direction of the exiting reference axis are present on the entrance and exit sides of each surface, respectively. The reference axis is refracted by individual surfaces in a predetermined order thereof, or changes its direction in accordance with the law of reflection, and finally reaches an image plane.

If an optical element (optical system) includes a plurality of surfaces, a reference axis ray which is made incident on a surface closest to the object side is defined as the entering reference axis of the optical element (optical system), and a reference axis ray which exits from a surface closest to the image side is defined as the exiting reference axis of the optical element (optical system).

b) Definition of Off-axial Optical System

The off-axial optical system is defined as an optical system which includes a curved surface (off-axial curved surface) whose surface normal does not coincide with the above-defined reference axis at a point where the reference axis intersects with the curved surface. FIG. 31 shows one example of the off-axial optical system. (If the reference axis is simply bent by a plane reflecting surface, the reference axis does not coincide with its surface normal, but since the plane reflecting surface does not impair the symmetry of aberration, this case is excluded from the definition of the off-axial optical system.)

This definition also includes an optical system having a coaxial optical system which is partly decentered to a great extent. However, a dot or a line which has symmetry representative of the "center" of "decentering" is in general absent in an optical system composed of asymmetrical aspheric surfaces. For this reason, the present paraxial theory avoids using the term "decentering", and uses the term "off-axial".

1-2. Shape-of-surface Representing Method Suited to the Constituent Surfaces of the Off-axial Optical System In general, surfaces which constitute the off-axial optical system do not have symmetry. The most general method of representing a surface having no symmetry is an expansion into power series in two variables relative to the center of the expansion. The center of the expansion is herein defined as the intersection of a surface and a reference axis, and the z axis of a local coordinate system which expresses the shape of the surface corresponds to the surface normal thereof. An equation which represents the shape is expressed in the form of z=f(x, y). Expansion of the equation is started at degree 2 in the following manner so that the surface normal at that intersection point does not vary with a variation in the shape of the surface:

$$z(x, y) = C_{20}x^2 + 2C_{11}xy + C_{02}y^2 + D_{30}x^3 +$$
$$3D_{21}x^2y + 3D_{12}xy^2 + D_{03}y^3 + E_{40}x^4 +$$
$$4E_{31}x^3y + 6E_{22}x^2y^2 + 4E_{13}xy^3 + E_{04}y^4 + \ldots$$

(Equation 1)

Figure 32:
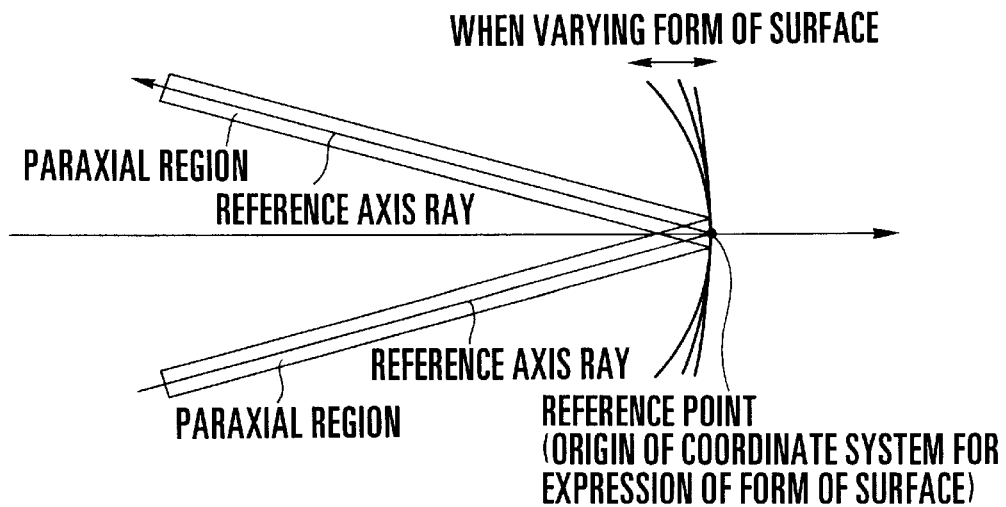
FIG. 32 is a view showing a representation method used in the present invention, with its origin at the intersection of a surface and a reference axis of the off-axial optical system.

By defining each constituent surface by using the method of performing an expansion with a surface normal fixed at a reference point in the above-described manner, it is possible to vary the shape of each surface without changing the skeleton of the entire optical arrangement (the layout of the reference axis), as shown in FIG. 32, unlike a conventional method of designing an off-axial optical system. Furthermore, if the first- and second-degree coefficients are fixed and the third-degree coefficient as well as coefficients of degrees higher than the third degree are varied, it is possible to effect only correction of aberration without changing a paraxial quantity for each azimuth (refer to the results of Equations (8) to (11) which will be described later).

2. Method of Performing a Paraxial Expansion Along a Bent Reference Axis

FIG. 33 shows a coordinate system for a paraxial expansion to be performed along a bent reference axis, and various quantities for use in an analysis which uses the coordinate system. Since reflection can be generalized as refraction of negative refractive index, the expansion is assumed to be performed on the basis of a refracting optical system. In FIG. 33, local coordinate systems are defined along the reference axis at the portions of an object and an image, and an object plane, an image plane, an entrance pupil plane and an exit pupil plane are defined perpendicularly to the reference axis as shown in FIG. 33. The shape of a surface is represented by a local coordinate system whose z axis corresponds to its surface normal, as described previously. It is assumed here that a ray passes through an object-line vector b and a height vector r in an entrance pupil, and the law of refraction is expanded into power series on the condition that the object-line vector b and the height vector r have infinitesimal quantities. The procedure is as follows.

i) A direction vector s of the ray is expressed by using the distance s shown in FIG. 33, an absolute value b of the object-line vector b, an azimuth $\xi$ of the object-line vector b ($\xi=0$ at a refracting surface which refracts the reference axis), a distance t, an absolute value r of the height vector r, and $\xi_r=\xi+\phi$ (the azimuth of the height vector r; $\phi$ is a relative azimuth).

ii) An intersection at the refracting surface is obtained by using the starting-point vector and the direction vector obtained in i) as well as the equation which expresses the shape of the surface.

iii) A surface-normal vector n at the intersection obtained in ii) is obtained by a vector analysis method.

iv) A direction vector s' of the ray refracted at the intersection is obtained by using the result of iii) and the law of refraction.

v) Since the position of the intersection at the refracting surface and the direction vector s' of the refracted ray are obtained, if distances s' and t' are given, an image-line vector b' and a height vector r' in an exit pupil are obtained.

The results of the first-degree expansion of the distance b' of the image-line vector b' and the absolute value r of the height vector r are expressed as Equations 2 and 3. Incidentally, $\xi'$ is an ideal azimuth of the image line in the image plane and is taken as $\xi'=\xi$.

$$\Delta_{11} = r \begin{pmatrix} s(\cos\theta'\cos\xi'\cos(\xi + \phi) + \cos\theta\sin\xi'\sin(\xi + \theta))/ \\ (\cos\theta(s - t)) - s'N(\cos\theta'\sin\xi'\sin(\xi + \phi) + \\ \cos\theta\cos\xi'\cos(\xi + \phi))/(N'\cos\theta'(s - t)) - \\ 2ss'(N'\cos\theta' - N\cos\theta)\{\cos\xi'\cos(\xi + \phi)C_{02} + \\ (\cos\theta'\sin\xi'\cos(\xi + \phi) + \\ \cos\theta\cos\xi'\sin(\xi + \phi))C_{11} + \\ \cos\theta\cos\theta'\sin\xi'\sin(\xi + \phi)C_{20}\}/ \\ (N'\cos\theta\cos\theta'(s - t)) \end{pmatrix} -$$

(Equation 2)

-continued $$b \begin{pmatrix} \beta + t(\cos\theta'\cos\xi'\cos\xi + \cos\theta\sin\xi'\sin\xi)/ \\ (\cos\theta(s-t)) - s'N(\cos\theta'\sin\xi'\sin\xi + \\ \cos\theta\cos\xi'\cos\xi)/(N'\cos\theta'(s-t)) - \\ 2ts'(N'\cos\theta' - N\cos\theta)\{\cos\xi'\cos\xi C_{02} + \\ (\cos\theta'\sin\xi'\cos\xi + \cos\theta\cos\xi'\sin\xi)C_{11} + \\ \cos\theta\cos\theta'\sin\xi'\sin\xi C_{20}\}/(N'\cos\theta\cos\theta'(s-t)) \end{pmatrix}$$

$$\Delta\perp = \partial\Delta\| /\partial\xi' = \qquad\text{(Equation 3)}$$

$$r \begin{pmatrix} s(-\cos\theta'\sin\xi'\cos(\xi+\phi) + \\ \cos\theta\cos\xi'\sin(\xi+\theta))/ \\ (\cos\theta(s-t)) - s'N(\cos\theta'\cos\xi'\sin(\xi+\phi) - \\ \cos\theta\sin\xi'\cos(\xi+\phi))/(N'\cos\theta'(s-t)) - \\ 2ss'(N'\cos\theta' - N\cos\theta) \\ \{-\sin\xi'\cos(\xi+\phi)C_{02} + \\ (\cos\theta'\cos\xi'\cos(\xi+\phi) - \\ \cos\theta\sin\xi'\sin(\xi+\phi))C_{11} + \\ \cos\theta\cos\theta'\cos\xi\sin(\xi+\phi)C_{20}\}/ \\ (N'\cos\theta\cos\theta'(s-t)) \end{pmatrix} -$$

$$b \begin{pmatrix} t(-\cos\theta'\sin\xi'\cos\xi + \cos\theta\cos\xi'\sin\xi)/ \\ (\cos\theta(s-t)) - s'N(\cos\theta'\cos\xi'\sin\xi - \\ \cos\theta\sin\xi'\cos\xi)/(N'\cos\theta'(s-t)) - \\ 2ts'(N'\cos\theta' - N\cos\theta)\{-\sin\xi'\cos\xi C_{02} + \\ (\cos\theta'\cos\xi'\cos\xi - \cos\theta\sin\xi'\sin\xi)C_{11} + \\ \cos\theta\cos\theta'\cos\xi'\sin\xi C_{20}\}/(N'\cos\theta\cos\theta'(s-t)) \end{pmatrix}$$

Figure 34:
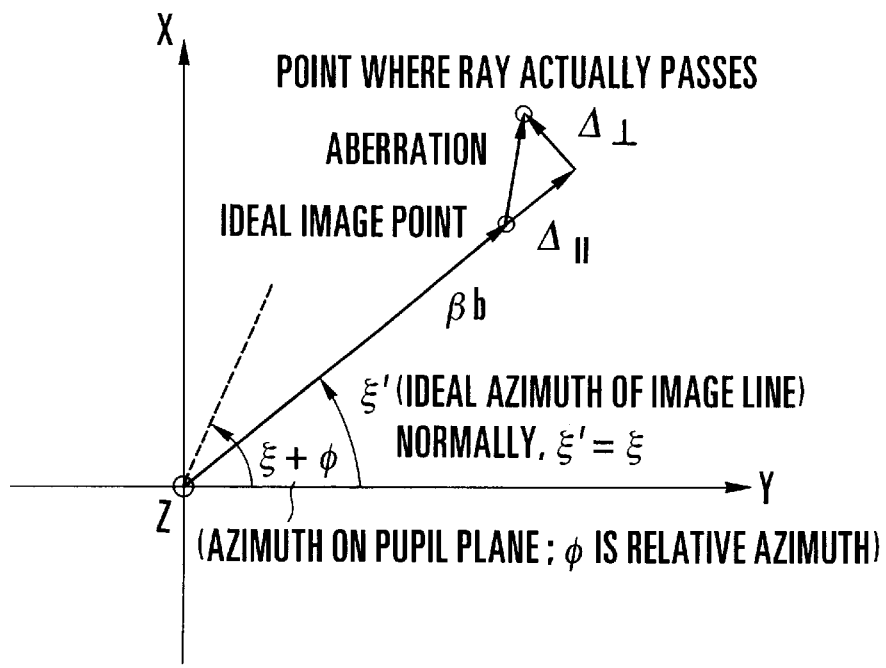
FIG. 34 is a view showing the decomposition of an image point vector into components.

In this result, the image-line vector b' is decomposed into components, as shown in FIG. 34, in the form expressed as:

$$b'=\beta b+\Delta\|+\Delta\perp, \qquad\text{(Equation 4)}$$

where βb+Δ∥ represents a parallel-component vector relative to the azimuth ξ (β is a lateral magnification of a projection determined by Equation 11 which will be described later), and Δ⊥ represents a vertical-component vector.

3. Derivation of an Image Forming Equation for the Off-axial Optical System and Paraxial Quantities for Refraction 3-1 Derivation of an Image Forming Equation for the Off-axial Optical System If a paraxial relation is to be obtained by using the results of Equations 2 and 3, the object height b="0" may be put. Accordingly, the first-degree proportional coefficients of r of Δ∥ and Δ⊥ may be examined. However, since the paraxial ray lies at a skew position with respect to the reference axis owing to the rotational asymmetry of the optical system, those two coefficients depend on the azimuth ξ and, in general, the two coefficients cannot be made "0" at the same time. In general, in the case of an anamorphic optical system in which a paraxial ray lies at a skew position with respect to a reference axis, an image forming conjugate relation and paraxial quantities are defined from the coefficient of Δ∥=0 of an optical path projected on an azimuth cross section, and the image forming conjugate relation is obtained from the equation of (the coefficient of Δ∥=0) with respect to Δ⊥. However, the equation of this coefficient indicates that, in general, a ray of relative azimuth φ=0 (which corresponds to a meridional ray) and a ray of φ=π/2 (which corresponds to a sagittal ray) differ from each other in image forming position (the optical system has a so-called astigmatism).

Regarding this astigmatism on the reference axis, the present theory defines an image forming plane for the relative azimuth φ=0 as a paraxial image plane, and is constructed on the assumption that an on-axial astigmatism remains in the case of φ≠0. The following image forming relation projected on the basis of the definition of such image plane is obtained:

$$N'(\cos\theta'\cos\xi'\cos\xi + \cos\theta\sin\xi'\sin\xi)/(s'\cos\theta) - \qquad\text{(Equation 5)}$$
$$N(\cos\theta'\sin\xi'\sin\xi + \cos\theta\cos\xi'\cos\xi)/(s\cos\theta') -$$
$$2(N'\cos\theta' - N\cos\theta)\{\cos\xi'\cos\xi C_{02} +$$
$$(\cos\theta'\sin\xi'\cos\xi + \cos\theta\cos\xi'\sin\xi)C_{11} +$$
$$\cos\theta\cos\theta'\sin\xi'\sin\xi C_{20}\}/(\cos\theta\cos\theta') = 0.$$

Equation 5 can be changed into an image forming equation for a pupil plane by replacing s and s' with t and t'. Accordingly, it is apparent that the above image forming equation is a rational definition which is the generalization of a conventional coaxial optical system.

3-2 Derivation of Paraxial Quantities of a Refracting Surface and the Expression of an Equation for Refraction Using Gaussian Brackets The projected image forming relation is compared with the following image forming equation for a conventional coaxial optical system:

$$(N'A)s'-(ND)/S-\Phi=0, \qquad\text{(Equation 6)}$$

where A and D represent the diagonal elements of Gaussian brackets for refraction, which are expressed as:

$$\begin{bmatrix} h' \\ \alpha' \end{bmatrix} = \begin{bmatrix} A & 0 \\ \Phi & D \end{bmatrix}\begin{bmatrix} h \\ \alpha \end{bmatrix}, \qquad\text{(Equation 7)}$$

and Φ represents power (in the case of a component B=0 and AD=1).

As is readily understood, since the equations 5 and 6 have completely the same form, it is possible to determine the paraxial quantities of an off-axial refracting surface which corresponds to the image forming equation 6 by comparing Equations 5 and 6. Specifically, with a projection of a paraxial ray, it is possible to calculate a paraxial quantity for each azimuth similarly to that in the coaxial optical system. The results of A, D and Φ are shown as Equations 8 to 10.

$$A = \sqrt{\frac{\cos\theta'(\cos\theta'\cos\xi'\cos\xi + \cos\theta\sin\xi'\sin\xi)}{\cos\theta(\cos\theta'\sin\xi'\sin\xi + \cos\theta\cos\xi'\cos\xi)}} \qquad\text{(Equation 8)}$$

$$D = 1/A = \sqrt{\frac{\cos\theta(\cos\theta'\sin\xi'\sin\xi + \cos\theta\cos\xi'\cos\xi)}{\cos\theta'(\cos\theta'\cos\xi'\cos\xi + \cos\theta\sin\xi'\sin\xi)}} \qquad\text{(Equation 9)}$$

$$\Phi = \frac{2(N'\cos\theta' - N\cos\theta)\{\cos\xi'\cos\xi C_{02} + (\cos\theta'\sin\xi'\cos\xi + \cos\theta\cos\xi'\sin\xi)C_{11} + \cos\theta\cos\theta'\sin\xi'\sin\xi C_{20}\}}{\sqrt{\cos\theta\cos\theta'(\cos\theta'\cos\xi'\cos\xi + \cos\theta\sin\xi'\sin\xi)(\cos\theta'\sin\xi'\sin\xi + \cos\theta\cos\xi'\cos\xi)}} \qquad\text{(Equation 10)}$$

The lateral magnification of projection at the refracting surface may also be given by:

$$\beta = \alpha/\alpha' = Ns'D/(N's). \qquad\text{(Equation 11)}$$

It is to be noted that the paraxial quantities shown by Equations 8 to 11 are a generalization of the paraxial quantities of the conventional coaxial optical system. This can readily be confirmed from the fact that Equations for the coaxial optical system can be obtained by substituting conditions for coaxial rotational symmetry, i.e. $\theta=\theta'=0$, $C_{11}=0$, $C_{20}=C_{02}=1/(2R)$ (R: radius of curvature), for Equations 8 to 11.

4. Paraxial Tracing 4-1 Guassian Brackets for Transfer

Although the paraxial quantities for refraction can be defined by the method employing the Gaussian brackets with respect to each surface of the off-axial optical system in the above-described manner, it is necessary to define a surface-to-surface transfer term for an optical system composed of a plurality of surfaces. As is apparent from a simple geometrical consideration, if a length d' is defined along the reference axis of the off-axial optical system, the off-axial optical system can be expressed in the form of the following Gaussian brackets by using the converted surface-to-surface distance e'=d'/N', similarly to the conventional coaxial optical system:

$$\begin{bmatrix} 1 & -e' \\ 0 & 1 \end{bmatrix}. \tag{Equation 12}$$

Accordingly, even in the case of an optical system including a plurality of off-axial surfaces, paraxial tracing for each azimuth can be performed similarly to that in the conventional coaxial optical system. In other words, the skeleton of the entire off-axial optical system can be paraxially analyzed similarly to that of the coaxial optical system.

4-2 Method of Paraxial Tracing

Paraxial tracing similar to that for the coaxial optical system can be performed by using the equations for refraction obtained in 3-2:

$$h_i' = A_i \cdot h_i, \tag{Equation 13}$$

$$\alpha_i' = \Phi_i \cdot h_i + D_i \cdot \alpha_i, \tag{Equation 14}$$

and the equations for transfer obtained in 4-1:

$$h_{i+1} = h_i' - e_i' \cdot \alpha_i', \tag{Equation 15}$$

$$\alpha_{i+1} = \alpha_i'. \tag{Equation 16}$$

The off-axial optical system differs from the coaxial optical system in that, in the equations for refraction, $A_i$ and $D_i$ generally are not "1" and $A_i$, $D_i$ and $\Phi_i$ have azimuth dependence. Accordingly, if a paraxial quantity for each azimuth is calculated, the azimuth dependence of the paraxial quantity can be examined.

The flow of performing calculations on paraxial tracing relative to a given azimuth $\xi$ is shown below.

i) Initial values $h_1$ and $\alpha_1$ ($\alpha_1 = N_1 h_1/s_1$) for paraxial tracing are set with respect to given data for an optical system, such as $s_1$.

ii) The paraxial quantities $A_1$, $\Phi_i$ and $D_i$ of a refracting surface are obtained.

iii) The equations for refraction are used to obtain $h_i'$ and $\alpha_i'$.

If necessary, $s_i$ and $s_i'$ and a lateral magnification $\beta_i$ at the refracting surface are obtained by using the following equations:

$$s_i = N_i \cdot h_i/\alpha_i, \tag{Equation 17}$$

$$s_i' = N_i' \cdot h_i'/\alpha_i', \tag{Equation 18}$$

$$\beta_i = \alpha_i/\alpha_i'. \tag{Equation 19}$$

iv) If the surface number i is not that of a final surface, the equations for transfer are used to obtain $h_{i+1}$ and $\alpha_{i+1}$.

v) Steps ii) to iv) are repeated until the number i reaches a number k of the final surface.

vi) The components A, B, $\Phi$ and D of the Guassian brackets for the entire optical system are obtained so that $h_k'$ and $\alpha_k'$ obtained from the above equations when the surface number i is the final surface number k can satisfy the following equations at all times:

$$h_k' = Ah_1 + B\alpha_1, \tag{Equation 20}$$

$$\alpha_k' = \Phi h_1 + D\alpha_1. \tag{Equation 21}$$

vii) The obtained components A, B, $\Phi$ and D for the entire optical system are employed to obtain a focal length f, the positions of principal points H and H' and a back focus $s_k'$ by using equations similar to those used for the coaxial optical system:

$$f = 1/\Phi, \tag{Equation 22}$$

$$\Delta_1 = (1-D)/\Phi, H = N_1 \Delta_1, \tag{Equation 23}$$

$$\Delta_k' = (A-1)/\Phi, H' = N_k' \Delta_k', \tag{Equation 24}$$

$$s_k' = N_k'(f + \Delta_k'). \tag{Equation 25}$$

Figure 35:
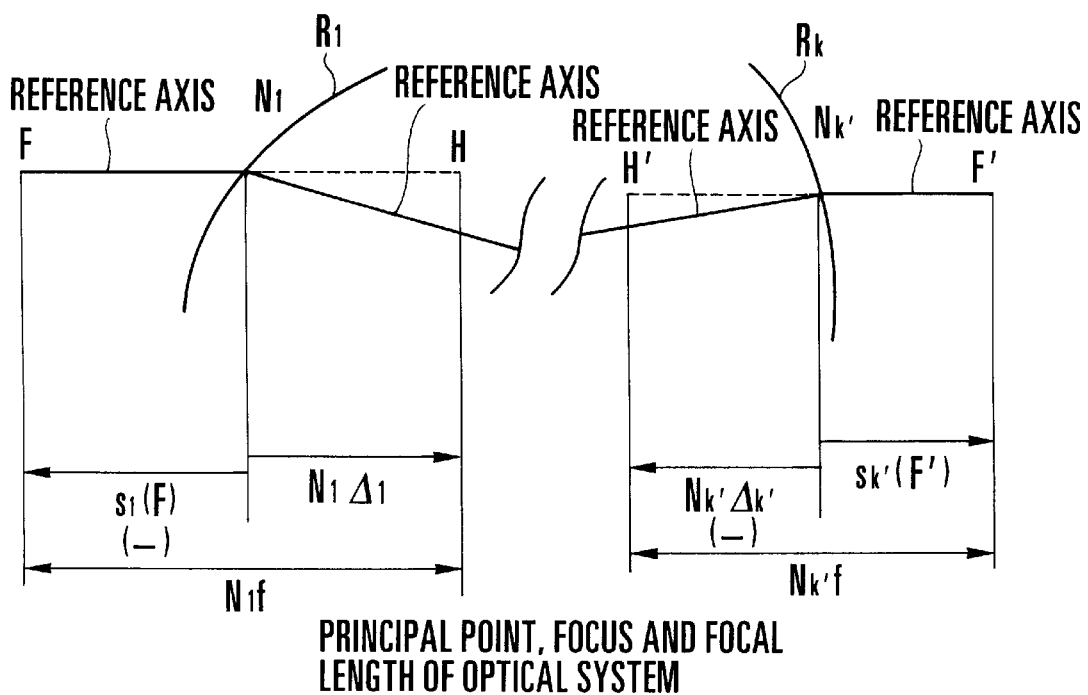
FIG. 35 is a view showing the principal point, the focus and the focal length of the off-axial optical system.

(Refer to FIG. 35. In FIG. 35, F represents a focus on an object side, H represents a principal point on the object side, F' represents a focus on an image side, and H' represents a principal point on the image side.)

viii) The lateral magnification $\beta$ of the entire optical system is obtained by:

$$\beta = \alpha_1/\alpha_k'. \tag{Equation 26}$$

5. Analysis and Confirmation Using Simple Surfaces

The method of applying the obtained paraxial theory to simple surfaces will be described below.

a) Off-axial Reflecting Surface

Since $\theta = -\theta'$ in the off-axial reflecting system, each of A and D of the Gaussian brackets is "1", i.e., the same as those of the coaxial optical system. In this case, the off-axial reflecting surface has an anamorphic power which depends on a curvature, the angle of incidence $\theta$, and the azimuth $\xi$. Furthermore, if the coefficients $C_{20}$, $C_{11}$ and $C_{02}$ of the shape of the surface, which are proportional to the curvature, are selected to satisfy:

$$C_{11}=0, C_{02}=C_{20} \cos^2 \theta, \tag{Equation 27}$$

the power of the reflecting surface does not depend on the azimuth $\xi$.

In other words, if the coefficients of the shape of the surface relative to the x and y directions are selected so that $C_{11}=0$ and $C_{02}=C_{20} \cos^2 \theta$ can be satisfied, the off-axial reflecting surface can be paraxially handled similarly to the coaxial rotationally symmetrical optical system.

Figure 36:
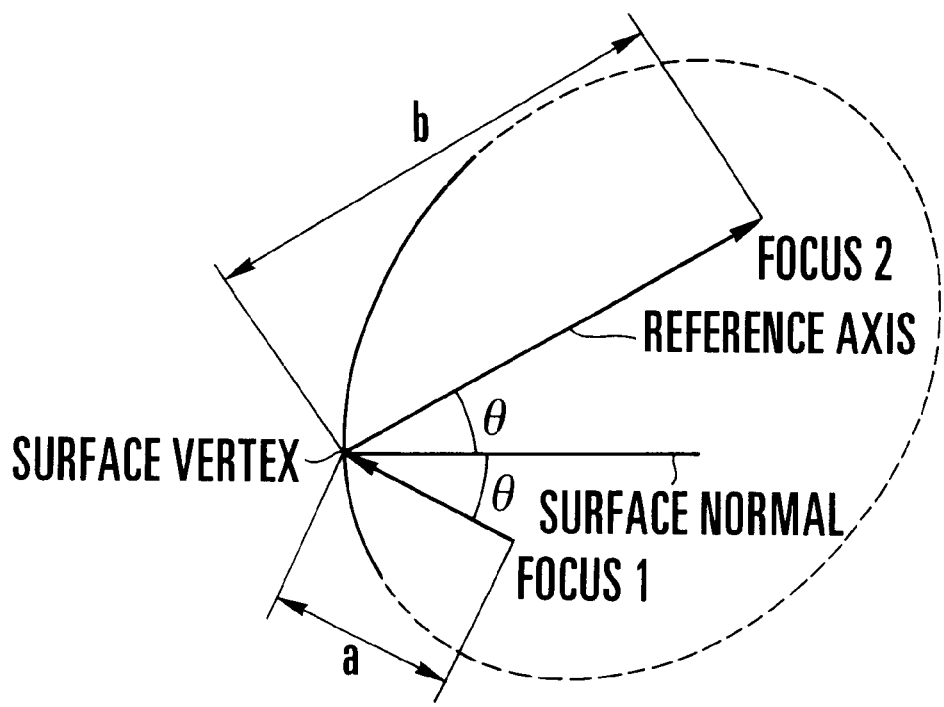
FIG. 36 is a view showing an off-axial reflecting quadratic curved surface having two focal points through which the reference axis passes.
Figure 37:
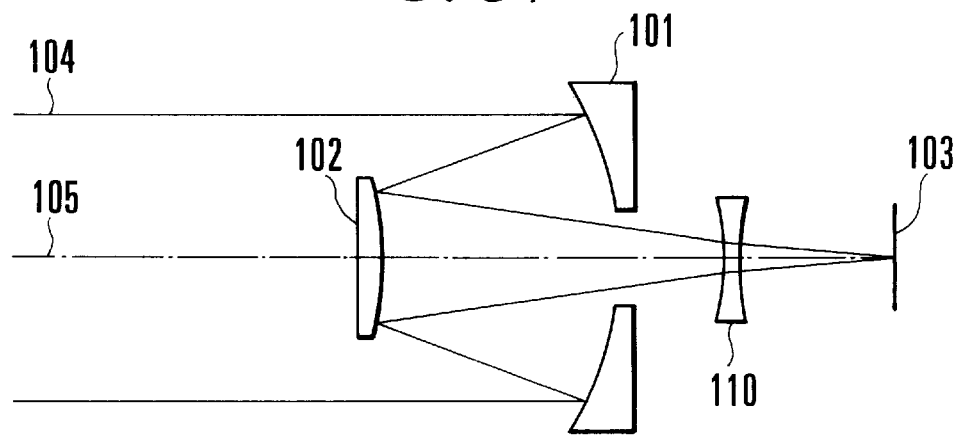
FIG. 37 is a view of the basic arrangement of a Cassegrainian reflecting telescope.
Figure 38:
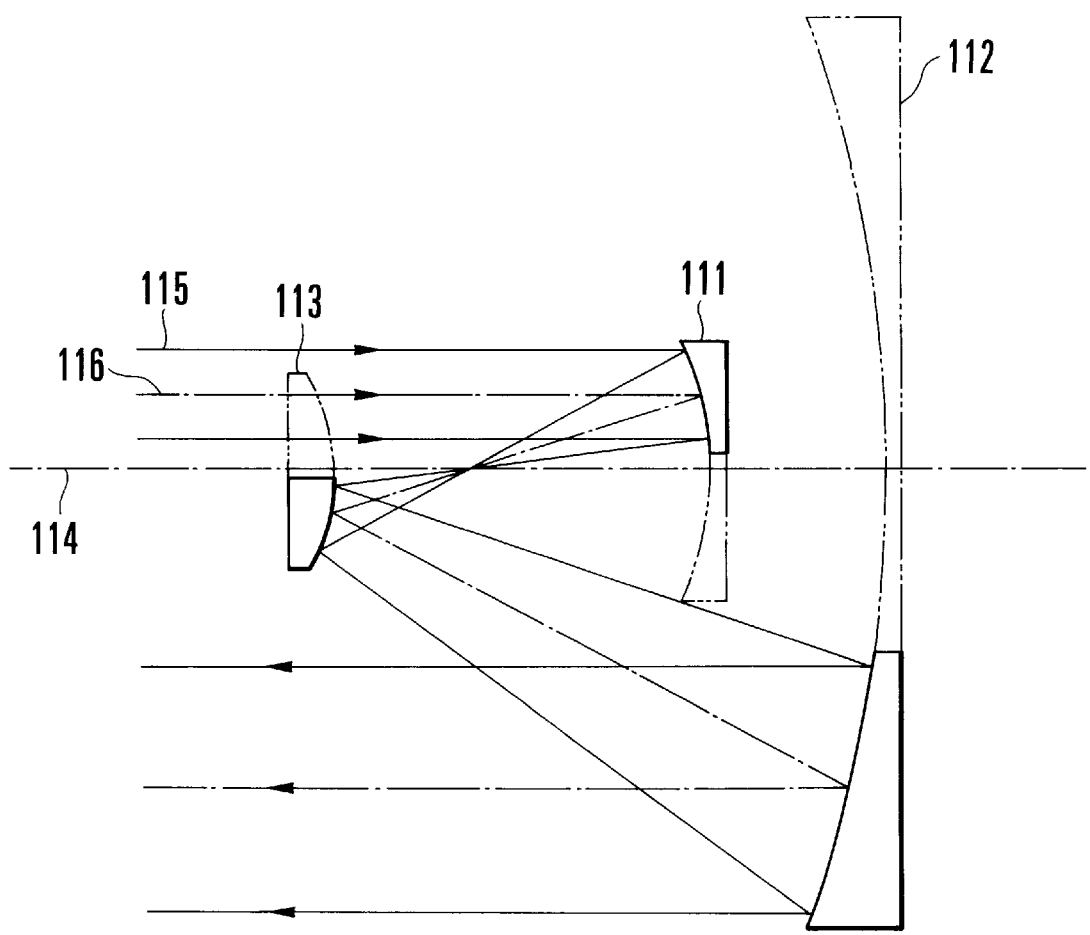
FIG. 38 is an explanatory view showing a first method of preventing shading by shifting a principal ray from the optical axis of a mirror optical system.
Figure 39:
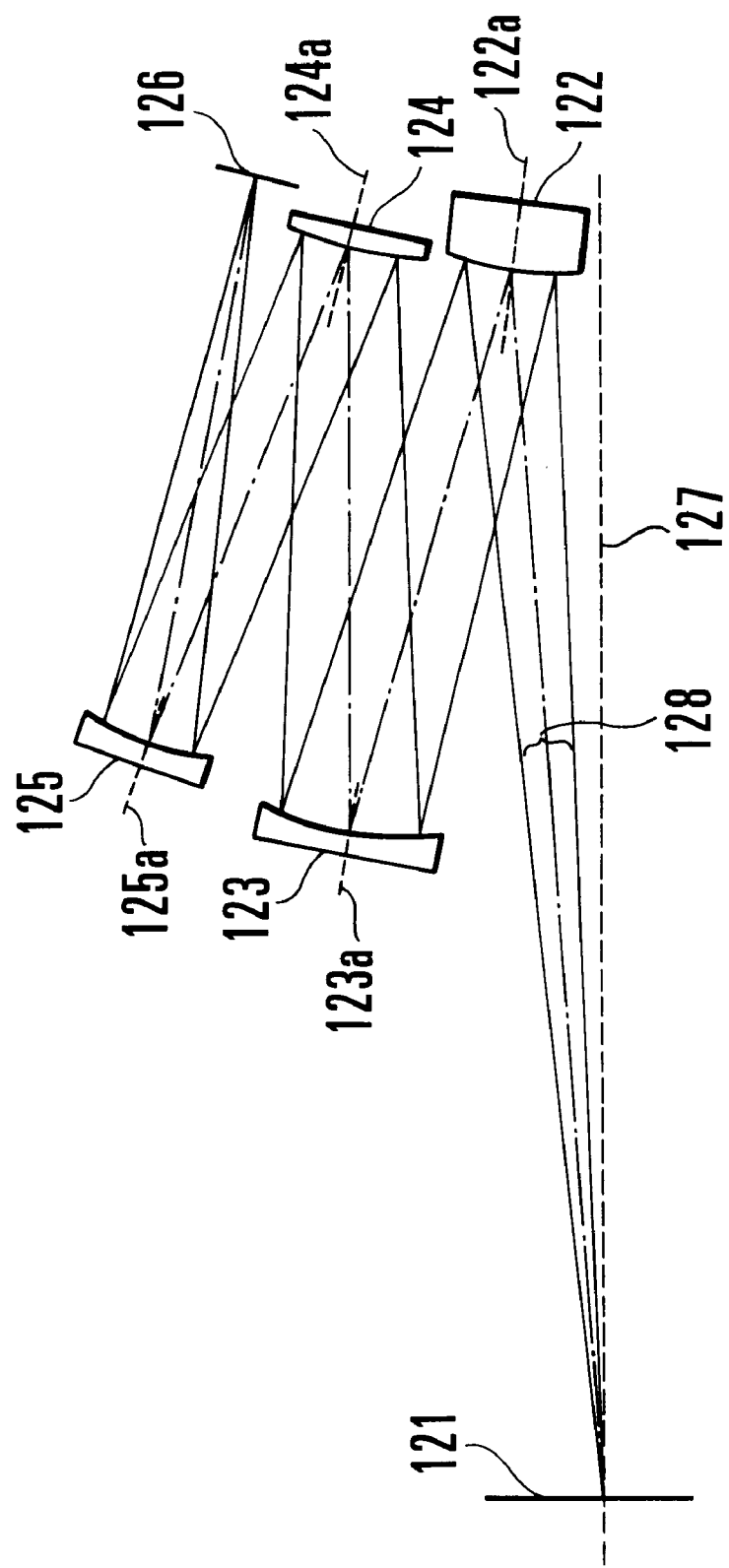
FIG. 39 is an explanatory view showing a second method of preventing shading by shifting a principal ray from the optical axis of a mirror optical system.
Figure 40:
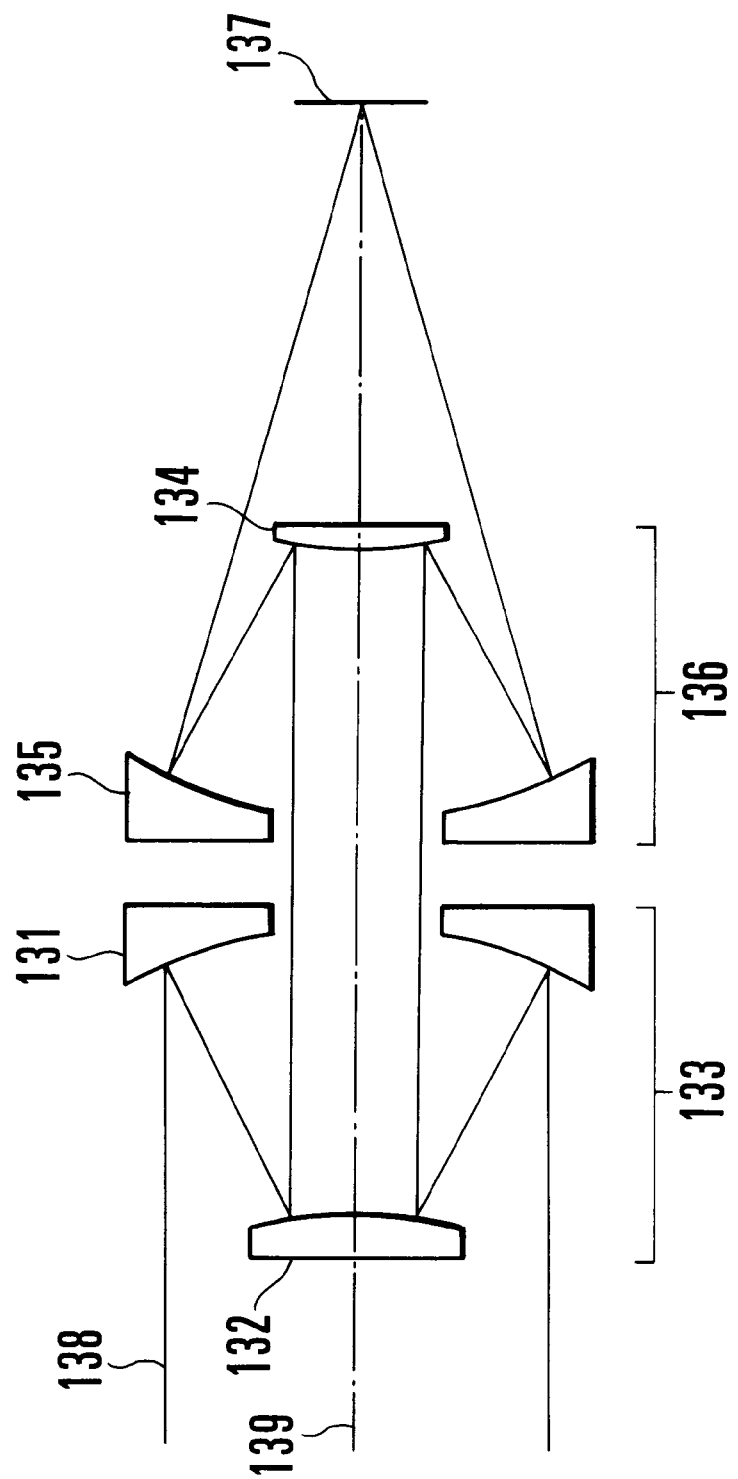
FIG. 40 is an conceptual diagram of a zoom optical system employing conventional reflecting mirrors.
Figure 41:
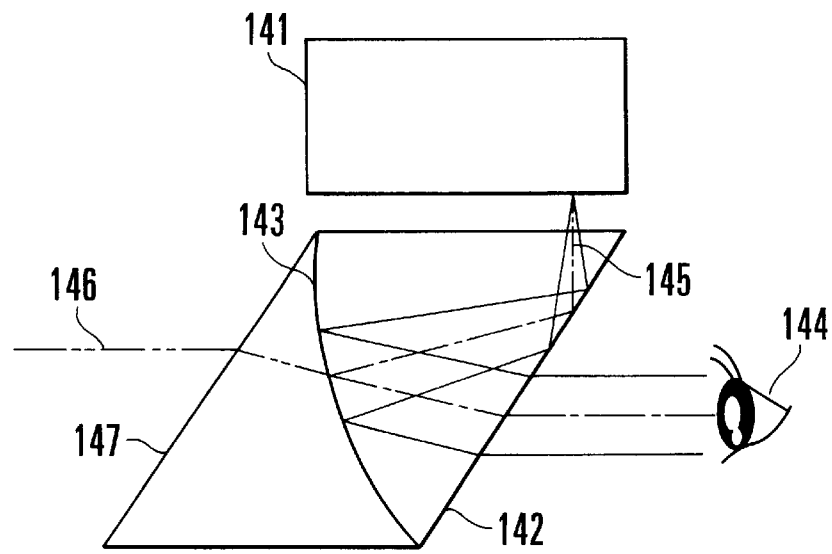
FIG. 41 is an conceptual diagram of an observing optical system whose prism has a reflecting surface having a curvature.
Figure 42:
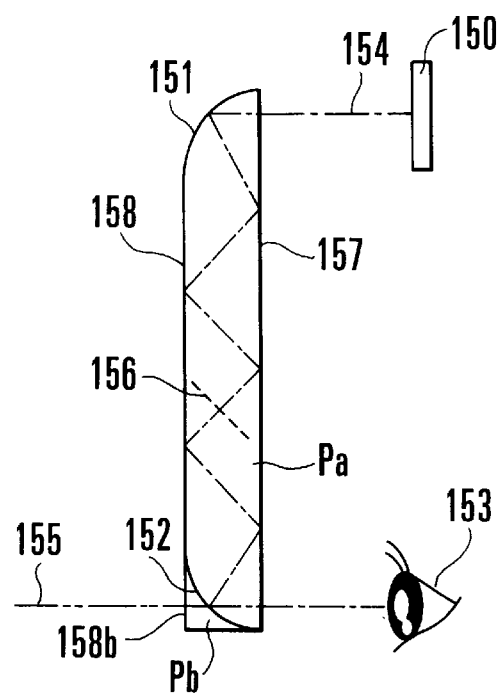
FIG. 42 is an conceptual diagram of another observing optical system whose prism has a reflecting surface having a curvature.

An off-axial quadratic reflecting surface, such as that shown in FIG. 36, at which the reference axis passes through two focuses, generally satisfies the aforesaid relation. This fact can readily be confirmed by obtaining the curvature at the surface vertex of the optical system shown in FIG. 36, or because, if a general formula of the off-axial quadratic reflecting surface at which the reference axis passes through two focuses is expanded into power series in the form of Equation 1 and the coefficients are compared with each other, the following results can be obtained:

$C_{02}=(1/a+1/b)\cos\theta/4$, $C_{20}=(1/a+1/b)/(4\cos\theta)$, $C_{11}=0$.

In FIG. 36, letting a and b be the distances between the two focuses and the surface vertex, it is intuitively understood that the power of the reflecting surface is $1/a+1/b$. This fact can also be confirmed by a calculation using Equation 10.

Incidentally, if a general spherical-surface formula is expanded into power series, the coefficient of the second-degree term is expressed as $1/(2R)$ (R: radius of curvature). Accordingly, in the coordinate system of Equation 1, letting $R_x$ be the radius of curvature of a paraxial region in the X, Z plane and letting $R_y$ be the radius of curvature of the paraxial region in the Y, Z plane, the following expressions are obtained:

$C_{20}=1/(2R_x)$, $C_{02}=1/(2R_y)$.

Therefore, from Equation 27, if the following relation is satisfied:

$(R_x/R_y)\cdot(1/\cos^2 q)=1$, (Equation 28)

the focal lengths at all azimuths at a decentered reflecting surface become coincident with each other.

b) Off-axial Refracting Surface

The off-axial refracting surface is not so simple as the off-axial reflecting surface. This is because the diagonal elements A and D of the Gaussian brackets are not "1" (a reciprocal relation of $A=1/D\neq 1$). However, this can be understood if a refracting surface is regarded as a plane surface. If an optical system includes a plane refracting surface, the optical system has an angular magnification having azimuth dependence owing to the prism effect of the plane refracting surface, and the angular magnification is in general represented as D of the Gaussian brackets. If this fact is borne in mind, it can be understood that each component of the Gaussian brackets of a general off-axial reflecting surface is represented by a term in which a prism effect due to off-axial refraction is combined with a variation in power due to a curved surface.

6. Application to Design

The paraxial theory of the off-axial optical system constructed in the above-described manner and the paraxial tracing method can be applied to the design of off-axial optical systems. In the case of isotropic image formation whose magnification generally does not depend on the azimuth, all paraxial quantities are considered to be free of azimuth dependence over the entire optical system. Accordingly, designing may be carried out in the following procedure.

i) An optical system is arranged along a bent reference axis so as to take account of the interference of an optical path and the like.

ii) Then, the method of Gaussian brackets is used to perform paraxial tracing for each azimuth, thereby determining the curvature of each surface so that the paraxial quantities and the image-plane positions of the entire optical system do not have azimuth dependence.

Such designing method which is based on the azimuth dependence of a paraxial quantity is an idea which has never been thought of and which can offer extremely useful suggestions to the designing of the off-axial optical system.

The above description has been made in connection with the paraxial theory for the off-axial optical system and the method of designing the skeleton of an optical system on the basis of the paraxial theory.

Embodiments and numerical examples of the present invention will be described below by using the definitions of the paraxial theory of the off-axial optical system.

Figure 1:
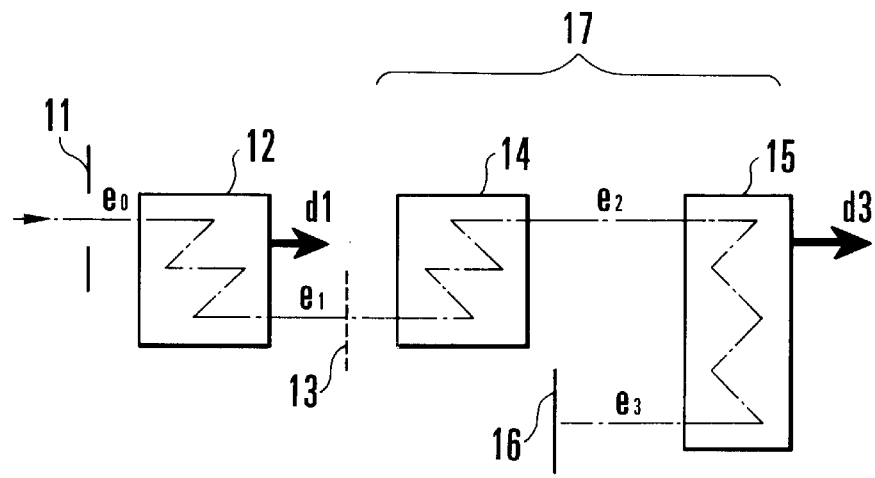
FIG. 1 is a view of the optical arrangement of a first embodiment of the variable magnification optical system according to the present invention.

FIG. 1 is a view of the optical arrangement of a first embodiment of the variable magnification optical system according to the present invention. The optical arrangement shown in FIG. 1 includes a stop 11 and a first optical unit (a first moving optical unit) 12 which serves as an objective system for forming an object image, and an intermediate image forming plane 13 is formed by the first optical unit 12. The shown optical arrangement also includes a second optical unit (a fixed optical unit) 14 and a third optical unit (a second moving optical unit) 15, and a combined system 17 consisting of the second optical unit 14 and the third optical unit 15 serves as a relay optical system for again forming the image of the intermediate image forming plane 13 on a final image forming plane 16. The entire arrangement is such that the first optical unit 12 of the front stop type is followed by the relay optical system 17. Incidentally, in FIG. 1, each of the optical units is diagrammatically shown.

In FIG. 1, a dot-dashed line represents a principal ray passing through the center of the angle of view. The principal ray passes through the optical units while being repeatedly reflected by off-axial reflecting surfaces (not shown) in each of the optical units, and reaches the final image forming plane 16. As is apparent from the above description, the variable magnification optical system according to the present invention is an off-axial reflecting optical system in which an optical axis similar to that of the coaxial optical system does not definitely exist.

For this reason, as described previously, a ray which passes from the center of an object plane through the center of the stop 11 of the variable magnification optical system and reaches the center of the final image forming plane 16 is determined as a reference axis ray, and the reference axis ray is defined as a reference axis. In other words, in FIG. 1, the dot-dashed line corresponds to the reference axis ray.

Each of the first optical unit 12, the second optical unit 14 and the third optical unit 15 is composed of two refracting surfaces and a plurality of curved reflecting surfaces which are inclined with respect to the reference axis. The third optical unit 15 has an entering reference axis and an exiting reference axis which differ from each other by 180° in direction.

In the arrangement of FIG. 1, if the stop 11 and the second optical unit 14 are fixed and the first optical unit 12 and the third optical unit 15 are made appropriately movable in the directions of the corresponding arrows shown in FIG. 1, a variable magnification optical system with the final image forming plane 16 fixed can be realized. Incidentally, the respective arrows indicate the directions in which the first optical unit 12 and the third optical unit 15 move from a wide-angle end toward a telephoto end.

In the first embodiment, since an optical element having an entering reference axis and an exiting reference axis which differ from each other by 180° in direction is introduced as the third optical unit 15, the final image forming plane 16 can be fixed, although the optical path length from a reference point on the object side of the variable magnification optical system to the final image forming plane 16 varies during the variation of the magnification of the variable magnification optical system.

In the variable magnification optical system according to the present invention, the second optical unit 14 disposed in front of the relay optical system 17 is made to function as an optical unit which exhibits a largest variation in lateral magnification during the variation of the magnification, i.e., an optical unit whose ratio of (the lateral magnification at the telephoto end) to (the lateral magnification at the wide-angle end) is largest, i.e., a variator having a so-called magnification varying action.

If the lateral magnification of the second optical unit 14 is to be varied, the distance between the intermediate image forming plane 13 which is the object point of the second optical unit 14 and the second optical unit 14 may be varied. In the variable magnification optical system of the first embodiment, the magnification varying action is obtained by relatively moving the intermediate image forming plane 13 with respect to the second optical unit 14 by moving the first optical unit 12 with the second optical unit 14 fixed. During the variation of the magnification, the first optical unit 12 moves toward the second optical unit 14 from the wide-angle end toward the telephoto end so that the distance between the intermediate image forming plane 13 and the second optical unit 14 is reduced. The movement of the final image forming plane 16 which results from the magnification varying action is controlled by moving the third optical unit 15 away from the second optical unit 14

Figure 2:
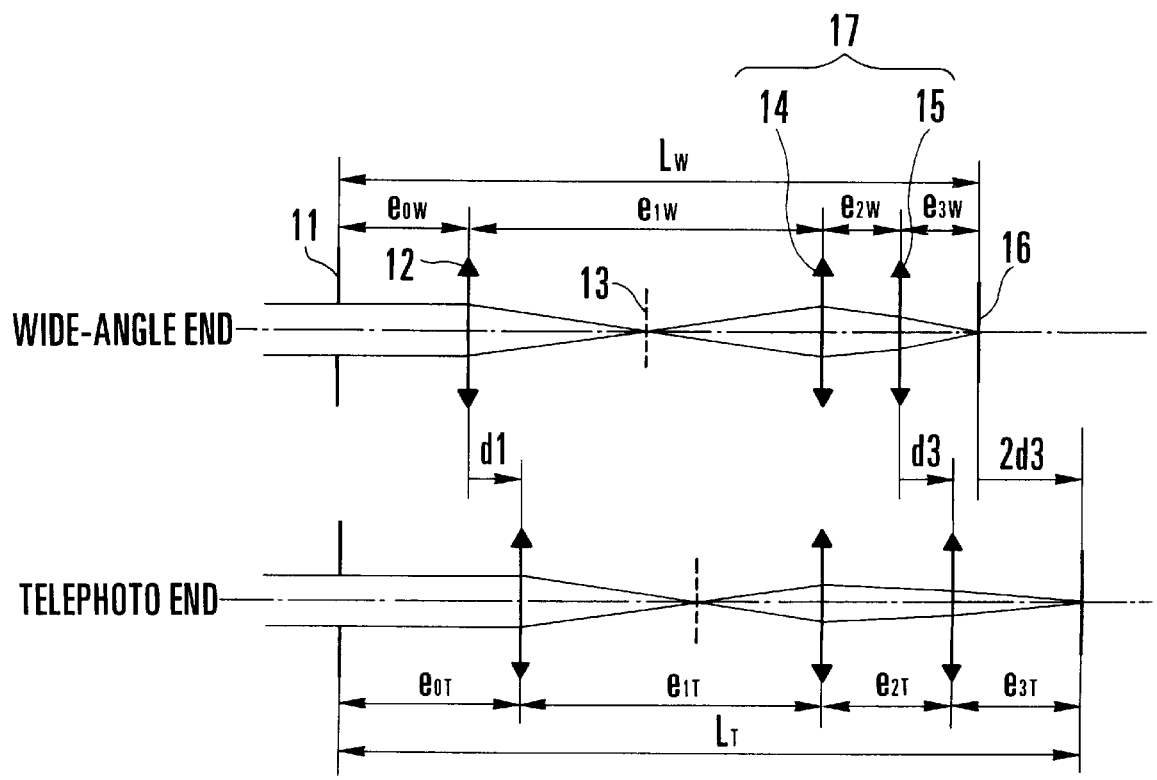
FIG. 2 is an explanatory view showing the first embodiment in the form of a coaxial system.

The variation of the optical path length during this time will be described below. FIG. 2 is an explanatory view showing the first embodiment in the form of a coaxial system. As shown in FIG. 2, the variable magnification optical system of the first embodiment is arranged in such a manner that the stop 11 and the second optical unit 14 are fixed, while the first optical unit 12 and the third optical unit 15 are movable.

If the distance between the second optical unit 14 and the third optical unit 15 which constitute the relay optical system 17 is varied to vary the focal length of the relay optical system 17 and hence the image forming magnification, then the magnification variation ratio of the entire variable magnification optical system of FIG. 2 is determined by the magnification variation ratio of the relay optical system 17 relative to the object-side angle of view of the first optical unit 12.

In the case of a coaxial refracting optical system, if an image forming plane is to be fixed during the variation of its magnification,, it is general practice to make constant the optical path length from the object-side reference point of the optical system (for example, the stop 11 in FIG. 11) to the image forming plane. In contrast, in the variable magnification optical system according to the present invention, since the optical element having the entering reference axis and the exiting reference axis which differ from each other by 180° in direction is employed as the third optical unit 15, the optical path length from the object-side reference point of the optical system to the final image plane, i.e., the final image forming plane 16 moves, during the variation of the magnification, as represented by FIG. 2. However, the optical arrangement of the first embodiment of FIG. 1 is such that the final image forming plane 16 is physically fixed. This optical arrangement will be described below.

When the focal length of the first embodiment is set to the wide-angle end, the entire optical path length varies as shown by distances $e_{0W}$, $e_{1W}$, $e_{2W}$ and $e_{3W}$. The distance $e_{0W}$ is the distance from the stop 11 to the front principal point of the first optical unit 12, the distance $e_{1W}$ is the distance from the rear principal point of the first optical unit 12 to the front principal point of the second optical unit 14, the distance $e_{2W}$ is the distance from the rear principal point of the second optical unit 14 to the front principal point of the third optical unit 15, and the distance $e_{3W}$ is the distance from the rear principal point of the third optical unit 15 to the final image forming plane 16. Similarly, when the focal length is set to the telephoto end, the entire optical path length varies as shown by distances $e_{0T}$, $e_{1T}$, $e_{2T}$ and $e_{3T}$. Symbols d1 and d3 denote the respective amounts of movements of the first optical unit 12 and the third optical unit 15 during the variation of the magnification. The variation of the entire optical path length during the variation of the magnification is calculated in the following manner.

According to the optical arrangement shown FIG. 1, the respective distances $e_{0T}$, $e_{1T}$, $e_{2T}$ and $e_{3T}$ for the telephoto end are expressed by the following equations:

$$\left.\begin{array}{l} e_{0T} = e_{0W} + d1, \\ e_{1T} = e_{1W} - d1, \\ e_{2T} = e_{2W} + d3, \\ e_{3T} = e_{3W} + d3. \end{array}\right\} \quad (1)$$

Specifically, as the focal length of the first embodiment is varied from the wide-angle end toward the telephoto end, the optical path length between the stop 11 and the first optical unit 12 becomes longer, the optical path length between the first optical unit 12 and the second optical unit 14 becomes shorter, the optical path length between the second optical unit 14 and the third optical unit 15 becomes longer, and the optical path length between the third optical unit 15 and the image plane 16 becomes longer.

When the focal length is at the telephoto end, the entire optical path length $L_T$ is:

$$L_T = e_{0T} + e_{1T} + e_{2T} + e_{3T}.$$

By substituting this $L_T$ for Equation (1), from $$L_W = e_{0W} + e_{1W} + e_{2W} + e_{3W},$$

the relation expressed by the following equation is obtained:

$$L_T = L_W + 2d3. \quad (2)$$

Accordingly, in the first embodiment, although the final image forming plane 16 is fixed, as the focal length is varied from the wide-angle end toward the telephoto end, the entire optical path length becomes longer by 2d3.

In the first embodiment, since the second optical unit 14 which serves as the variator is a fixed optical unit and the magnification is varied by moving the first optical unit 12 disposed in front of the second optical unit 14, it is possible to obtain the effect of increasing the distance from the image plane on the telephoto side to an exit pupil. This effect will be described below with reference to FIGS. 3(A) and 3(B) which are explanatory views of an exit pupil distance.

Figures 3A, 3B:
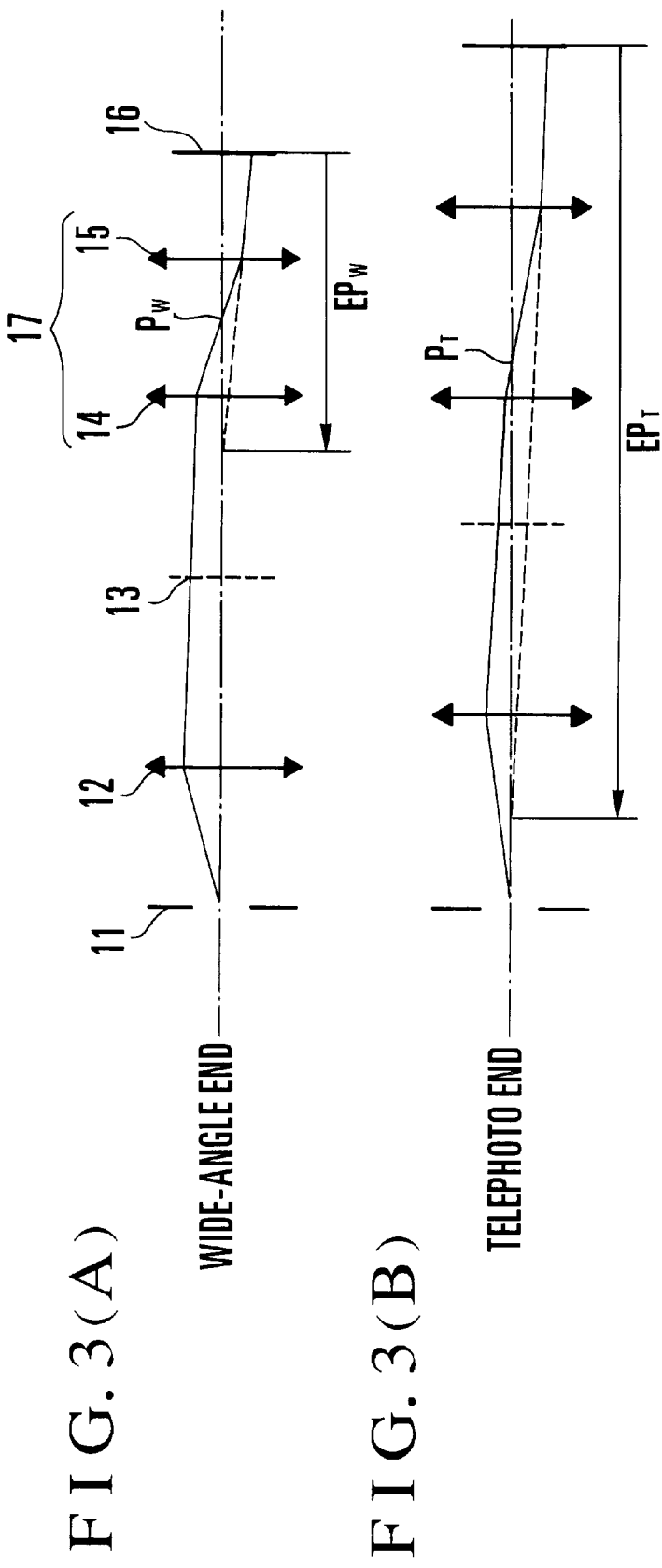
FIGS. 3(A) and 3(B) are explanatory views of an exit pupil distance of the first embodiment.

The arrangement shown in FIGS. 3(A) and 3(B) is identical to that shown in FIG. 2, but the ray shown in FIGS. 3(A) and 3(B) is an off-axial principal ray which passes through the center of the stop 11. In FIGS. 3(A) and 3(B), the respective intersections of the off-axial principal ray and the optical axis shown by a dot-dashed line are pupils $P_W$ and $P_T$ conjugate to the stop 11. The respective exit pupils lie at positions where the virtual images of the pupils $P_W$ and $P_T$ are formed by the third optical unit 15. In FIGS. 3(A) and 3(B), symbols $EP_W$ and $EP_T$ denote the exit pupil distances from the image plane to the respective exit pupils.

Referring to FIG. 3(B), since the image forming magnification of the first optical unit 12 is greater than 1 (the stop 11 is located immediately before the first optical unit 12), a position at which an image of the stop 11 is formed by the first optical unit 12 is displaced toward the first optical unit 12 by an amount not less than the amount of movement of the first optical unit 12. Accordingly, the position of the pupil $P_T$ moves closer to the object side than the pupil $P_W$.

The pupil $P_T$ at the telephoto end is more distant from the third optical unit 15 than the pupil $P_W$ at the wide-angle end, and the distance from the third optical unit 15 to the final image forming plane 16 is also longer at the telephoto end than at the wide-angle end, so that an exit pupil distance $EP_T$ at the telephoto end becomes longer than an exit pupil distance $EP_W$ at the wide-angle end. Accordingly, by appropriately setting the position of the exit pupil at the wide-angle end, it is possible to increase the exit pupil distance over the entire range of variation of magnification.

Accordingly, the first embodiment has the advantage that its optical arrangement can be made closer to a telecentric state by increasing the distance from the image plane to the exit pupil on the telephoto side. Accordingly, if an object image is formed on a solid-state image pickup device such as a CCD by using the first embodiment, it is possible to prevent occurrence of shading over the entire range of variation magnification, so that the quality of an image to be picked up can be improved.

In the first embodiment, the stop 11 is disposed on the object side of the first optical unit 12 and reflecting surfaces are used in the first optical unit 12 so as to collect a light beam, so that the first optical unit 12 which serves as an objective optical system can be made a thin optical system in spite of its wide angle of view. Although FIGS. 1 and 2 show that the light beam from the object forms one intermediate image before reaching the final image forming plane 16, the light beam actually forms at least one more intermediate image between the intermediate image forming plane 13 and the final image forming plane 16, thereby relaying an image. This construction prevents not only an increase in the thickness of the first optical unit 12 but also increases in the thicknesses of the second optical unit 14 and the third optical unit 15 which follow the intermediate image forming plane 13. Incidentally, the "thickness of an optical system" referred to herein means the thickness taken in a direction perpendicular to the surface of the sheet of FIG. 1, and the term "thin" or similar expressions used herein mean that such thickness is small.

In the first embodiment, the third optical unit 15 is arranged so that the entering reference axis and the exiting reference axis differ from each other by 180° in direction. This arrangement reduces the overall length in a horizontal direction parallel to the sheet surface of FIG. 1.

The variable magnification optical system according to the present invention has decentered reflecting surfaces and, therefore, suffer various decentering aberrations. To correct these decentering aberrations over the entire range of variation of magnification, it is necessary to correct the decentering aberrations in the respective optical units or to make the decentering aberrations cancel one another among the optical units. Although the object point of the third optical unit 15 of the first embodiment moves during a magnification varying operation, it is generally difficult to correct a decentering aberration in the corresponding optical unit itself irrespective of the movement of the object point. For this reason, the third optical unit 15 (a moving optical unit B) of the variable magnification optical system according to the present invention has curved reflecting surfaces having cross-sectional shapes which are asymmetrical, for example, in a plane containing the reference axis and are inclined with respect to the reference axis, so that the decentering aberration is corrected as fully as possible in the third optical unit 15 with respect to a particular object point. In addition, decentering aberration variations due to the movement of the object point are made to cancel one another among the optical units. Thus, the variable magnification optical system is capable of correcting the decentering aberrations over the entire range of variation of magnification.

Figure 4:
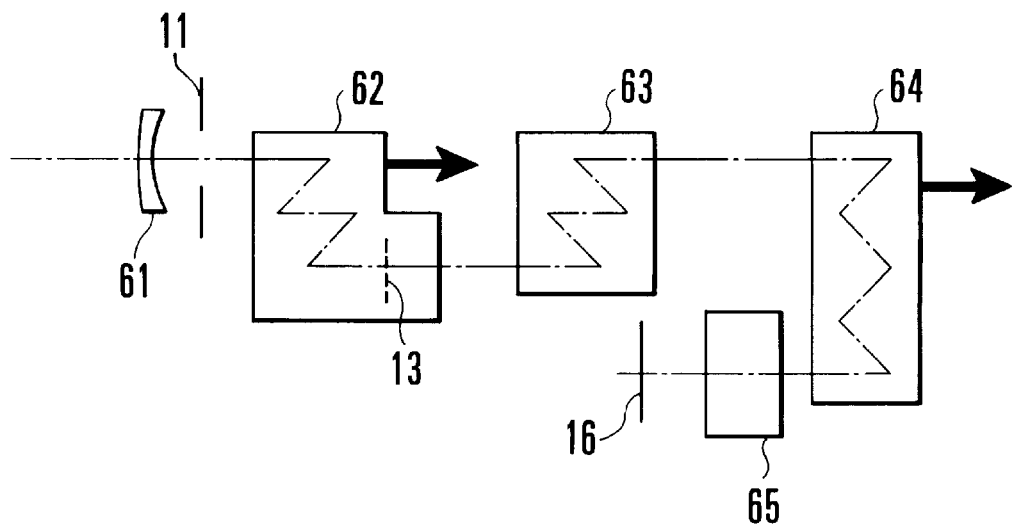
FIG. 4 is a view of the optical arrangement of a second embodiment of the variable magnification optical system according to the present invention.

FIG. 4 is a view of the optical arrangement of a second embodiment of the variable magnification optical system according to the present invention. The second embodiment has an arrangement in which, in addition to the arrangement of the first embodiment, a first optical unit consisting of a negative lens 61 is disposed in front of the stop 11 and a block 65 having the shape of a plane parallel plate is disposed in front of the final image forming plane 16.

In FIG. 4, optical units 62, 63 and 64 respectively correspond to the first optical unit 12, the second optical unit 14 and the third optical unit 15 of the first embodiment. Since the block 65 does not have a refractive power, the second embodiment is a variable magnification optical system which is basically composed of four optical units, and as its focal length is varied from the wide-angle end to the telephoto end, the second optical unit 62 and the fourth optical unit 64 move in the directions of the corresponding arrows. The first optical unit 61 and the third optical unit 63 are fixed optical units.

By adding the negative lens 61 to the first embodiment in this manner, it is possible to effectively correct chromatic aberrations which occur at the refracting surfaces of the second optical unit 62, the third optical unit 63 and the fourth optical unit 64.

In addition, in the second embodiment, if an optical system having a lateral magnification whose absolute value is greater than "1" is disposed between the fourth optical unit 64 and the block 65, it is possible to achieve the effect of reducing the amounts of movements of the second optical unit 62 and the fourth optical unit 64 both of which are moving optical units.

Figure 5:
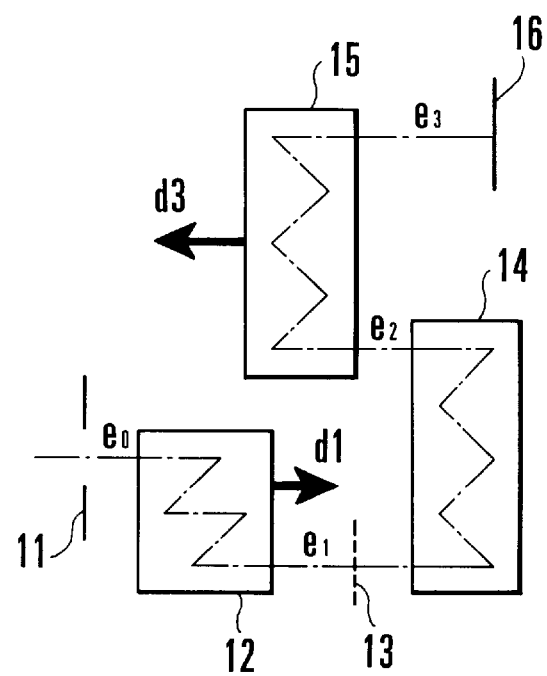
FIG. 5 is a view of the optical arrangement of a third embodiment of the variable magnification optical system according to the present invention.

FIG. 5 is a view of the optical arrangement of a third embodiment of the variable magnification optical system according to the present invention. The third embodiment differs from the first embodiment in that the second optical unit 14 is replaced with an optical unit having an entering reference axis and an exiting reference axis which differ from each other by 180° in direction. In the optical arrangement shown in FIG. 5, if the focal length is to be from the wide-angle end toward the telephoto end, the first optical unit 12 and the third optical unit 15 are moved in the directions of the corresponding arrows, with the stop 11 and the second optical unit 14 fixed. During the variation of the magnification, the final image forming plane 16 is fixed.

The coaxial system of the third embodiment is shown in FIG. 2, and the first embodiment and the third embodiment are basically identical to each other.

However, with the arrangement of the third embodiment, it is possible to reduce the size of the optical arrangement to a further extent in the direction in which the reference axis ray from an object enters.

Incidentally, if the second optical unit 14 which serves as the variator is replaced with the optical element having the entering reference axis and the exiting reference axis which differ from each other by 180° in direction, as in the case of the third embodiment, the amount of movement of the third optical unit 15 can be made smaller by the arrangement of the third embodiment in which the first optical unit 12 is moved with the second optical unit 14 fixed, than by an arrangement in which the second optical unit 14 is moved with the first optical unit 12 fixed. This is because, in the optical arrangement of FIG. 5, when the focal length is to be varied the wide-angle end toward the telephoto end, the third optical unit 15 must be moved away from the second optical unit 14, but if the second optical unit 14 is moved toward the first optical unit 12, the second optical unit 14 moves toward the third optical unit 15 as well, so that the third optical unit 15 must be moved by an amount equivalent to the amount of movement of the second optical unit 14. With the arrangement of the third embodiment, it is possible to reduce the amount of movement of the third optical unit 15 and hence the required volume to be occupied by the variable magnification optical system, whereby the entire apparatus can be miniaturized to a further extent.

In the third embodiment as well, if a fixed negative lens is provided on the object side of the stop 11, it is possible to effectively correct chromatic aberration.

Figure 6:
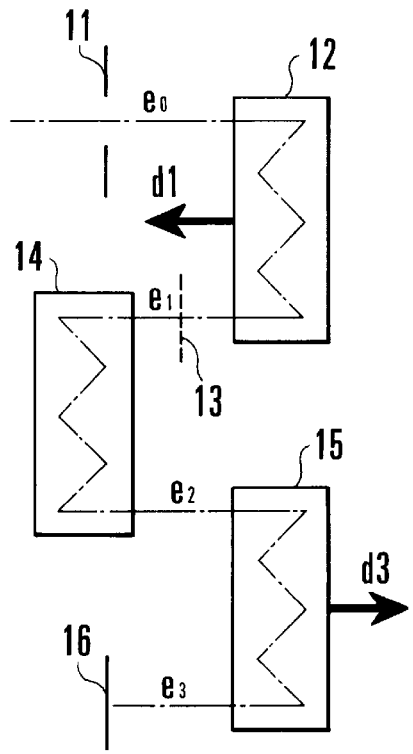
FIG. 6 is a view of the optical arrangement of a fourth embodiment of the variable magnification optical system according to the present invention.

FIG. 6 is a view of the optical arrangement of a fourth embodiment of the variable magnification optical system according to the present invention. The fourth embodiment differs from the third embodiment in that the first optical unit 12 is replaced with an optical unit having an entering reference axis and an exiting reference axis which differ from each other by 180° in direction. Similarly to each of the first and third embodiments, the fourth embodiment is composed of the first optical unit 12, the second optical unit 14 and the third optical unit 15, and each of the optical units 12, 14 and 15 is composed of two refracting surfaces and a plurality of curved reflecting surfaces which are inclined with respect to the reference axis.

In the fourth embodiment, each of the three optical units has an entering reference axis and an exiting reference axis which differ from each other by 180° in direction. The optical units 12, 14 and 15 are diagrammatically shown in FIG. 6 (in which none of their reflecting surfaces is shown).

In the fourth embodiment of the variable 1,magnification optical system, as the focal length is varied from the wide-angle end toward the telephoto end, the first optical unit 12 and the third optical unit 15 are moved in the directions of the corresponding arrows with the stop 11 and the second optical unit 14 fixed, while the entire optical path length is being varied with the final image forming plane 16 fixed.

The variation of the entire optical path length during the variation of the magnification is calculated in the following manner, by using the distances $e_{0W}$, $e_{1W}$, $e_{2W}$ and $e_{3W}$ for the wide-angle end, the distances $e_{0T}$, $e_{1T}$, $e_{2T}$ and $e_{3T}$ for the telephoto end, and the amounts of movements, d1 and d3, of the respective optical units 12 and 15 relative to the wide-angle end.

Figure 7:
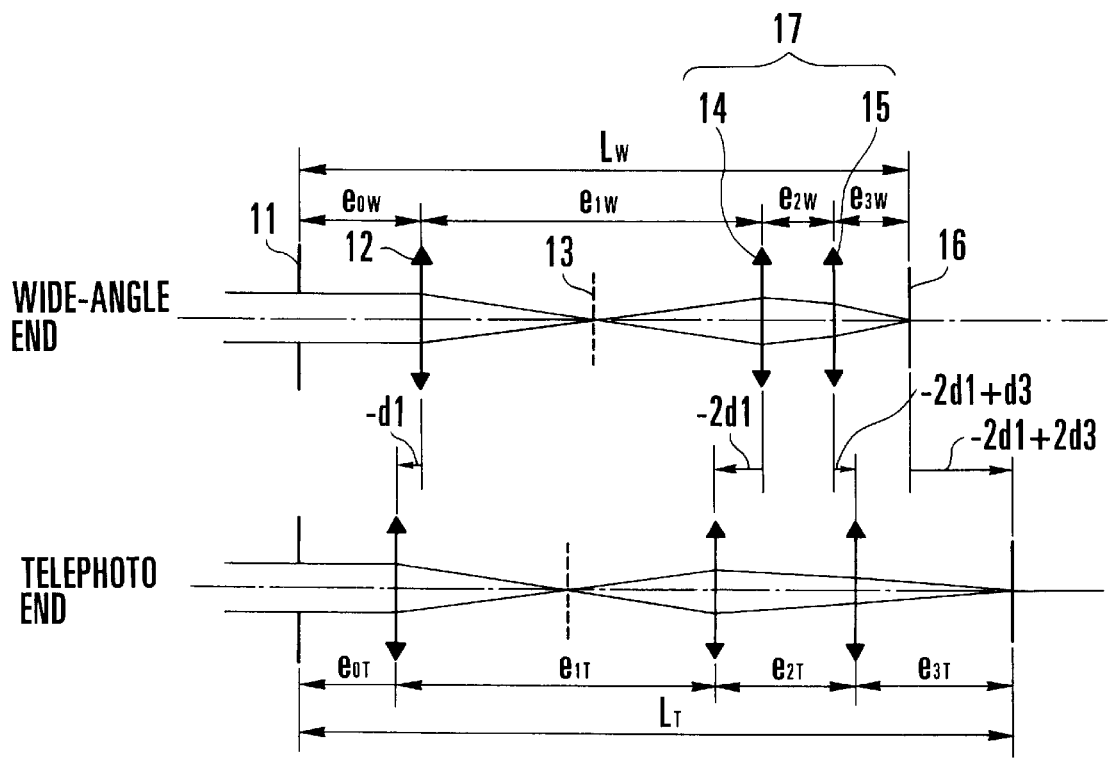
FIG. 7 is an explanatory view showing the fourth embodiment in the form of a coaxial system.

FIG. 7 is an explanatory view showing the fourth embodiment in the form of a coaxial system. According to the optical arrangement shown in FIG. 6, the respective distances $e_{0T}$, $e_{1T}$, $e_{2T}$ and $e_{3T}$ for the telephoto end are expressed by the following equations:

$$\left.\begin{array}{l}e_{0T} = e_{0W} - d1, \\ e_{1T} = e_{1W} - d1, \\ e_{2T} = e_{2W} + d3, \\ e_{3T} = e_{3W} + d3.\end{array}\right\} \quad (3)$$

Specifically, as the focal length of the fourth embodiment is varied from the wide-angle end toward the telephoto end, the optical path length between the stop 11 and the first optical unit 12 becomes shorter, the optical path length between the first optical unit 12 and the second optical unit 14 becomes shorter, the optical path length between the second optical unit 14 and the third optical unit 15 becomes longer, and the optical path length between the third optical unit 15 and the image plane 16 becomes longer.

When the focal length is at the telephoto end, the entire optical path length $L_T$ is:

$$L_T = e_{0T} + e_{1T} + e_{2T} + e_{3T}.$$

By substituting this $L_T$ for Equation (3), from $$L_W = e_{0W} + e_{1W} + e_{2W} + e_{3W},$$

the relation expressed by the following equation is obtained:

$$L_T = L_{W-2}d1 + 2d3. \quad (4)$$

Since the amount of movement, d1, of the first optical unit 12 and the amount of movement, d3, of the third optical unit 15 in general differ from each other, the entire optical path length in the fourth embodiment varies by (−2d1+2d3) as the focal length is varied from the wide-angle end toward the telephoto end.

In the fourth embodiment, the second optical unit 14 and the final image forming plane 16 are fixed, whereas two optical units, i.e., the first optical unit 12 and the third optical unit 15, are physically movable. However, each of the first optical unit 12 and the third optical unit 15 has the entering reference axis and the exiting reference axis which differ from each other by 180° in direction, so that three optical units are movable as viewed from the coaxial system shown in FIG. 7 and the entire optical path length can be varied with the image plane actually fixed.

Figure 8:
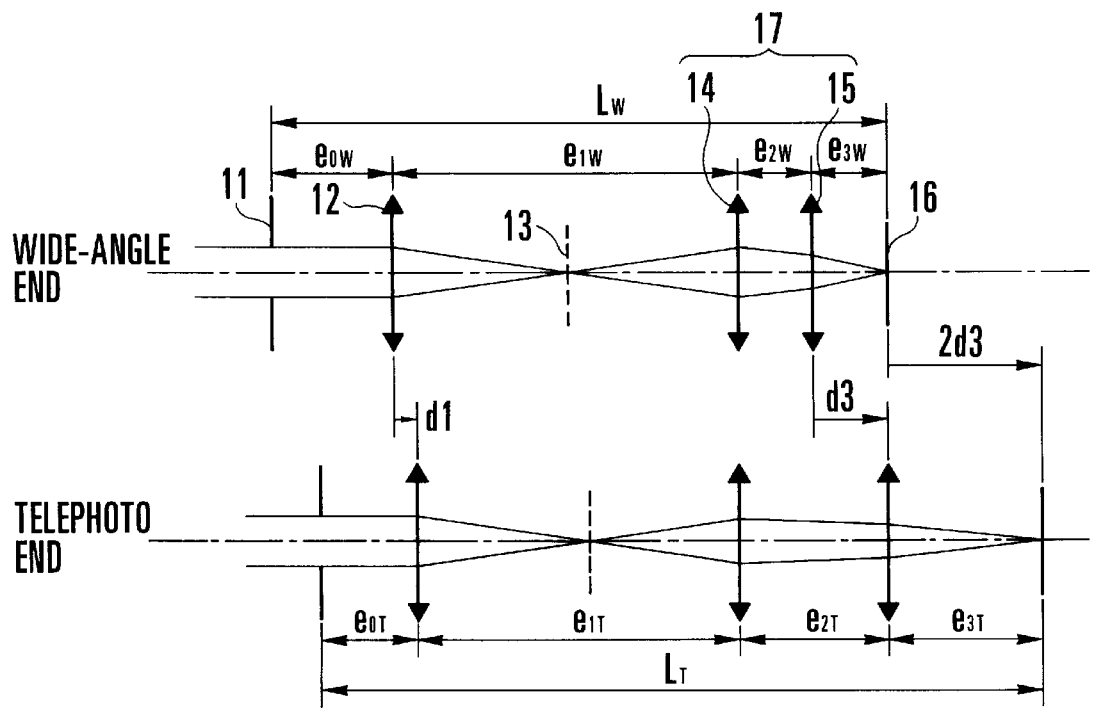
FIG. 8 is a view of the optical arrangement of the variable magnification optical system according to the present invention.

FIG. 8 shows a coaxial system in which the second optical unit 14 of the arrangement of FIG. 7 is fixed. FIG. 8 differs from FIG. 7 in that the coaxial system for the telephoto end is shown at a position shifted toward the right by 2d1 as a whole. It can be seen from this illustration that the basic arrangement of the fourth embodiment is identical to that of the first embodiment shown in FIG. 2, except for the position of the stop 11.

Incidentally, in the fourth embodiment as well, the second optical unit 14 which serves as the variator is replaced with the optical element having the entering reference axis and the exiting reference axis which differ from each other by 180° in direction, as in the case of the third embodiment, so that it is possible to reduce the amount of movement of the third optical unit 15 and hence the required volume to be occupied by the variable magnification optical system, whereby the entire apparatus can be miniaturized to a further extent.

In each of the first to fourth embodiments, the stop 11 is disposed on the object side of the first optical unit 12 and the reflecting surfaces are used in the first optical unit 12 so as to collect a light beam, so that the first optical unit 12 which serves as an objective optical system can be realized as a thin optical system in spite of its wide angle of view.

In addition, each of the second optical unit 14 and the third optical unit 15 is composed of curved reflecting surfaces which are inclined with respect to the reference axis, so that the intermediate image formed by the first optical unit 12 is relayed by a compact arrangement. Specifically, each of the first to fourth embodiments is arranged to relay an image not only through the intermediate image forming plane 13 of the first optical unit 12 but also by forming intermediate images in some of the optical units.

Figure 9:
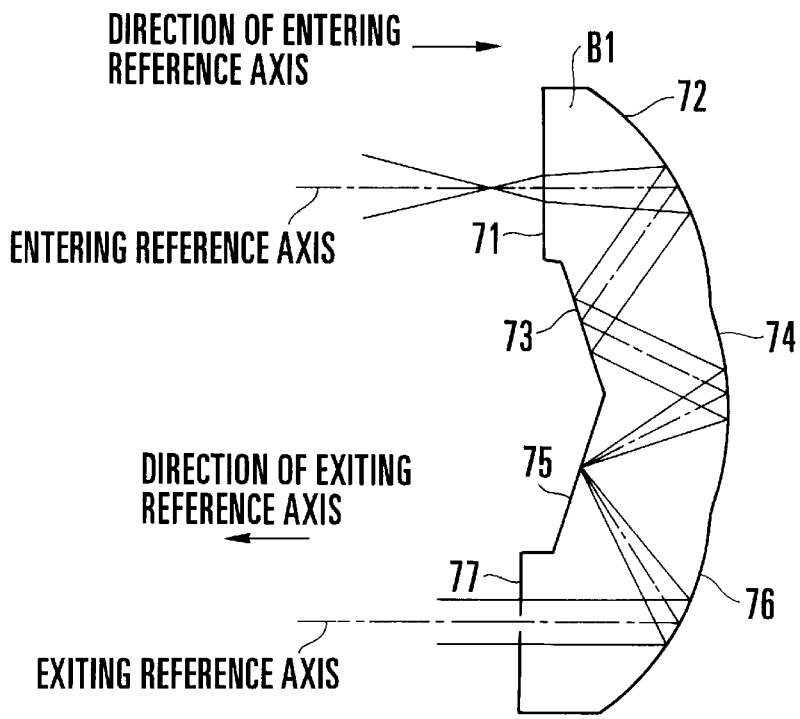
FIG. 9 is a view of an example of the arrangement of an optical unit which constitutes part of the variable magnification optical system according to the present invention.

FIG. 9 is a view showing an example of the construction of one of the optical units used in each of the above-described embodiments. An optical element B1 is formed as a transparent body on which two refracting surfaces and a plurality of internal reflecting surfaces are formed, the plurality of internal reflecting surfaces being inclined with respect to a reference axis. The optical element B1 includes a refracting surface 71 lying on an entrance side, curved reflecting surfaces 72, 73, 74, 75 and 76, and a refracting surface 77 lying on an exit side. Each of the reflecting surfaces 72, 73, 74, 75 and 76 is an internal reflecting surface coated with an evaporated reflecting film.

If one optical unit is integrally constructed in the above-described manner, the positional accuracy of each surface becomes high compared to an arrangement in which individual surfaces are independently arranged, so that adjustment of the positions, inclinations or the like of the respective surfaces can be omitted.

In addition, since members for supporting the reflecting surfaces are not needed, the required number of constituent components is reduced.

In FIG. 9, the reference axis is represented by a dot-dashed line, and the entering reference axis enters the optical element B1 through the refracting surface 71, while the exiting reference axis exits from the optical element B1 through the refracting surface 77. The entering and exiting reference axes are parallel to each other and their directions are 180° differ from each other. Accordingly, if the optical element B1 is made to move parallel to the entering and exiting reference axes, the amount of movement of the optical element B1 and the optical path length thereof can be increased or decreased with respect to either of the optical units anterior and posterior to the optical element B1.

Figure 10:
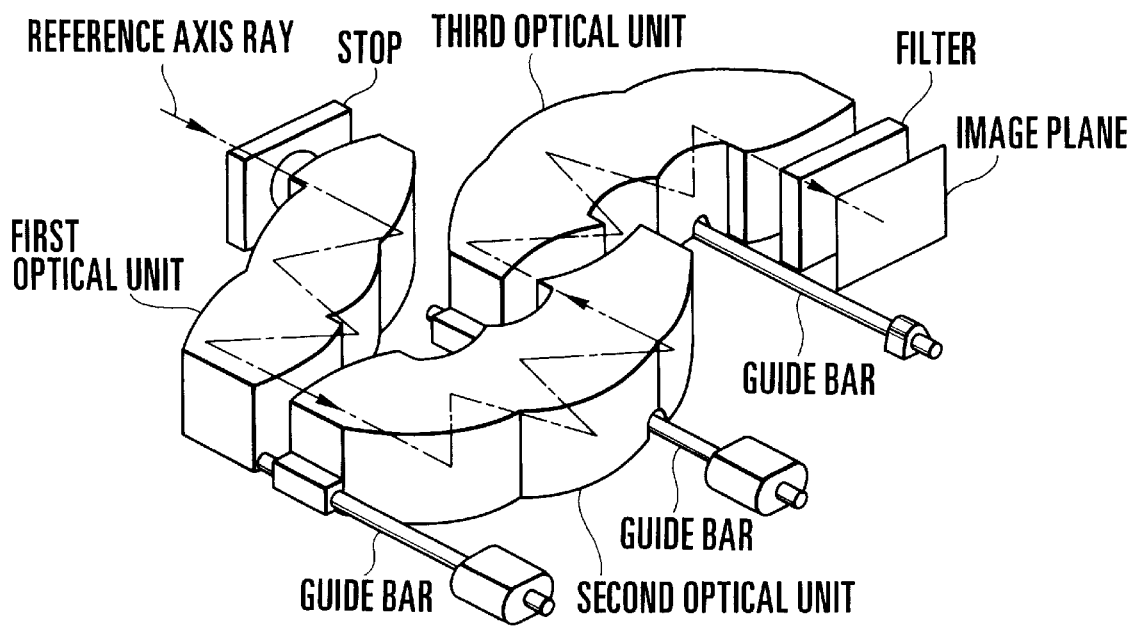
FIG. 10 is a perspective view showing one example of the variable magnification optical system according to the present invention.

In addition, holes or the like each of which receives a guide bar for guiding the magnification varying movement of an optical unit may be formed in predetermined transparent bodies of the type shown in FIG. 9 in the manner shown in FIG. 10. With this arrangement, since the variable magnification optical system can be composed of such transparent bodies alone, a member such as a barrel for holding normal lenses is not needed, so that the required number of constituent components can be reduced to a further extent.

Figure 11:
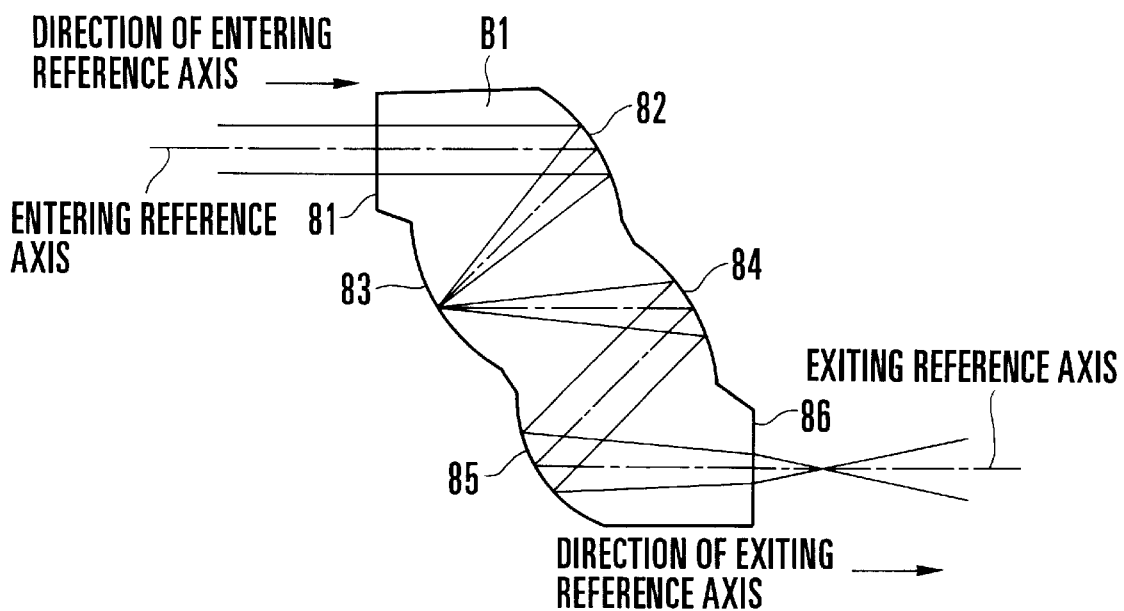
FIG. 11 is a view of one example of the arrangement of another optical unit which constitutes part of the variable magnification optical system according to the present invention.

FIG. 11 is a view showing another example of the construction of the optical unit. The optical element B1 is formed as a transparent body on which two refracting surfaces and a plurality of internal reflecting surfaces are formed, the plurality of internal reflecting surfaces being inclined with respect to a reference axis. The optical element B1 includes a refracting surface 81 lying on an entrance side, curved reflecting surfaces 82, 83, 84 and 85, and a refracting surface 86 lying on an exit side. Each of the reflecting surfaces 82, 83, 84 and 85 is an internal reflecting surface coated with an evaporated reflecting film.

The optical element B1 shown in FIG. 11 differs from the example shown in FIG. 9 in that the entering and exiting reference axes are parallel to each other and their directions coincide with each other. Accordingly, as in the case of normal lenses, if the optical element B1 shown in FIG. 11 is made to move parallel to the entering and exiting reference axes, the optical path length between the optical element B1 and either one of the optical units anterior and posterior to the optical element B1 is increased by the amount of movement of the optical element B1, whereas the optical path length between the optical element B1 and the other optical unit is decreased by the same amount of movement.

The variable magnification optical system according to the present invention is formed as a thin variable magnification optical system by appropriately using the aforesaid type of optical element for each of the optical units. Specifically, each of the optical elements B1 shown in FIGS. 9 and 11 is realized as a thin optical element having a construction in which an intermediate image is formed in its inside and concave reflecting surfaces are actively employed to relay an image in a compact body while preventing divergence of a light beam.

Accordingly, the variable magnification optical system according to the present invention includes not only the intermediate image forming plane 13 formed by the first optical unit 12 but also another intermediate image forming plane formed in a particular one of the optical units each of which is composed of an optical element such as that shown in FIG. 9 or 11. Incidentally, if such an optical element is employed as the first optical unit, the first intermediate image forming plane numbered from the object plane is present in the first optical unit.

The variable magnification optical system according to the present invention is not limited to the arrangement of any of the above-described embodiments. For example, as described previously in connection with the second embodiment, a single lens, a lens system or the like may also be added.

Prior to the detailed description of individual numerical examples, reference will be made to terms which are herein used to express various constituent elements of the numerical examples, and matters common to all the numerical examples.

Figure 12:
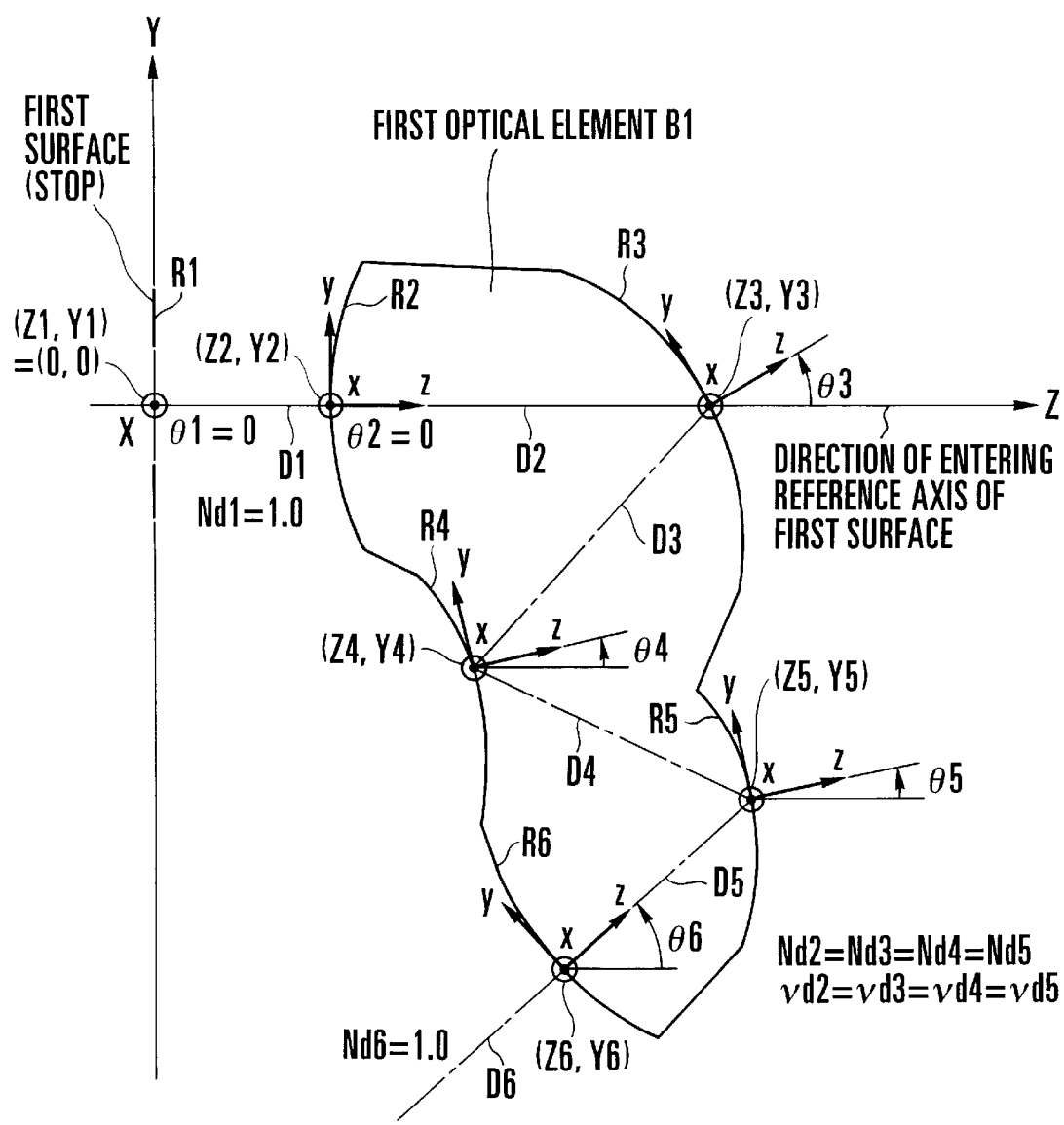
FIG. 12 is an explanatory view of a coordinate system for Numerical Examples 1 to 3 of the present invention.

FIG. 12 is an explanatory view of a coordinate system which defines the constituent data of an optical system according to the present invention. In each of the numerical examples of the present invention, the i-th surface is a surface which lies at the i-th position numbered from an object side from which a ray travels toward an image plane (the ray is shown by dot-dashed lines in FIG. 12 and is hereinafter referred to as the reference axis ray).

In FIG. 12, a first surface R1 is a stop, a second surface R2 is a refracting surface coaxial with the first surface R1, a third surface R3 is a reflecting surface which is tilted with respect to the second surface R2, a fourth surface R4 is a reflecting surface which is shifted and tilted with respect to the third surface R3, a fifth surface R5 is a reflecting surface which is shifted and tilted with respect to the fourth surface R4, and a sixth surface R6 is a refracting surface which is shifted and tilted with respect to the fifth surface R5. All of the second surface R2 to the sixth surface R6 are arranged on one optical element composed of a medium such as glass or plastics. In FIG. 12, such optical element is shown as a first optical element B1.

Accordingly, in the arrangement shown in FIG. 12, the medium between an object plane (not shown) and the second surface R2 is air, the second surface R2 to the sixth surface R6 are arranged on a certain common medium, and the medium between the sixth surface R6 and a seventh surface R7 (not shown) is air.

Since the optical system according to the present invention is an off-axial optical system, the surfaces which constitute part of the optical system do not have a common optical axis. For this reason, in each of the numerical examples of the present invention, an absolute coordinate system is set, the origin of which is the central point of an effective ray diameter at the first surface which is the stop. In the present invention, each axis of the absolute coordinate system is defined as follows:

Z axis: reference axis which passes through the origin and extends to the second surface R2;

Y axis: straight line which passes through the origin and makes an angle of 90° with the z axis in the counter-clockwise direction in a tilting plane (on the surface of the sheet of FIG. 12); and X axis: straight line which passes through the origin and is perpendicular to each of the Z and Y axes (perpendicular to the surface of the sheet of FIG. 12).

If the surface shape of the i-th surface which constitutes part of the optical system is to be expressed, it is possible to more readily understand and recognize such surface shape by setting a local coordinate system the origin of which is a point at which the reference axis intersects with the i-th surface, and expressing the surface shape of the i-th surface by using the local coordinate system than by expressing the surface shape of the i-th surface by using the absolute coordinate system. Accordingly, in some numerical examples of the present invention the constituent data of which are shown herein, the surface shape of the i-th surface is expressed by its local coordinate system.

The tilting angle of the i-th surface in the Y, Z plane is expressed by an angle θi (unit: degree) which shows a positive value in the counterclockwise direction with respect to the Z axis of the absolute coordinate system. Accordingly, in each of the numerical examples of the present invention, the origins of the local coordinate systems of the respective surfaces are located on the Y, Z plane, as shown in FIG. 12. The tilting or shifting of the surfaces is absent in the X-Z plane or the X-Y plane. In addition, the y and z axes of the local coordinates (x, y, z) of the i-th surface are inclined by the angle θi in the Y, Z plane with respect to the absolute coordinate system (X, Y, Z). Specifically, the x, y and z axes of the local coordinates (x, y, z) are set in the follow manner:

z axis: straight line which passes through the origin of the local coordinates and makes the angle θi with the Z direction of the absolute coordinate system in the counterclockwise direction in the Y, Z plane;

y axis: straight line which passes through the origin of the local coordinates and makes an angle of 90° with the z direction of the local coordinates in the counterclockwise direction in the Y, Z plane; and x axis: straight line which passes through the origin of the local coordinates and is perpendicular to the Y, Z plane.

Symbol Di indicates a scalar which represents the distance between the origin of the local coordinates of the i-th surface and that of the (i+1)-st surface. Symbols Ndi and vdi respectively indicate the refractive index and the Abbe number of the medium between the i-th surface and the (i+1)-st surface. In FIG. 12, each of the stop and the final image forming plane is shown as one plane surface.

The optical system of each of the numerical examples of the present invention varies its entire focal length (magnification) by the movement of a plurality of optical elements. Regarding each of the numerical examples which have the numerical data shown herein, the cross section of its optical system and the numerical data are shown with respect to three positions, i.e., a wide-angle end (W), a telephoto end (T) and a middle position (M).

If the optical element shown in FIG. 12 moves in the Y, Z plane, the origin (Yi, Zi) of each of the local coordinate systems which represent the positions of the respective surfaces takes on a different value for each varied magnification position. However, in the case of the numerical examples shown herein, since the optical element is assumed to move in only the Z direction for the purpose of variation of magnification, the coordinate value Zi is expressed by Zi(W), Zi(M) and Zi(T) in the order of the wide-angle end, the middle position and the telephoto end which respectively correspond to three states to be taken by the optical system.

Incidentally, the coordinate values of each of the surfaces represent those obtained at the wide-angle end, and each of the middle position and the telephoto end is expressed as a difference between the coordinate values obtained at the wide-angle end and the coordinate values obtained at the respective one of the middle position and the telephoto end. Specifically, letting "a" and "b" be the respective amounts of movements of the optical element at the middle position (M) and the telephoto end (T) with respect to the wide-angle end (W), these amounts of movements are expressed by the following equations:

$$Zi(M)=Zi(W)+a,$$

$$Zi(T)=Zi(W)+b.$$

If all the surfaces move in their Z plus directions, the signs of "a" and "b" are positive, whereas if they move in their Z minus directions, the signs of "a" and "b" are negative. The surface-to-surface distance Di which varies with these movements is a variable, and the values of the variable at the respective varied magnification positions are collectively shown on tables which will be referred to later.

Each of the numerical examples of the present invention has spheric surfaces and aspheric surfaces of rotational asymmetry. Each of the spheric surfaces has a spherical shape expressed by a radius of curvature $R_i$. The sign of the radius of curvature $R_i$ is plus if the center of curvature is located in the z-axis plus direction of the local coordinates, whereas if the center of curvature is located in the z-axis minus direction of the local coordinates, the sign of the radius of curvature $R_i$ is minus.

Each of the spheric surfaces is a shape expressed by the following equation:

$$z = \frac{(x^2+y^2)/R_i}{1+\{1-(x^2+y^2)/R_i^2\}^{1/2}}.$$

In addition, the optical system according to the present invention has at least one aspheric surface of rotational asymmetry, and its shape is expressed by the following equation in which all the terms that contain the variable x having an odd exponent are omitted from Equation 1 and such binomial coefficient is put in the coefficient term of each of the remaining terms of Equation 1:

$$z=C_{02}y^2+C_{20}x^2+C_{03}y^3+C_{21}x^2y+C_{04}y^4+C_{22}x^2y^2+C_{40}x^4+C_{05}y^5+C_{23}x^2y^3+C_{41}x^4y+C_{06}y^6+C_{24}x^2y^4+C_{42}x^4y^2+C_{60}x^6.$$

Since the above curved-surface equation has only even-exponent terms regarding x, the curved surface expressed by the above curved-surface equation has a shape symmetrical with respect to the y, z plane. Further, if the following condition is satisfied, a shape symmetrical with respect to the x-z plane is obtained:

$$C_{03}=C_{21}=C_{05}=C_{23}=C_{41}=0.$$

Further, if the following equations are satisfied, a shape of rotational symmetry is obtained:

$$C_{02}=C_{20}, C_{04}=C_{40}=C_{22}/2, C_{06}=C_{60}=C_{24}/3=C_{42}/3.$$

If the above conditions are not satisfied, a shape of rotational asymmetry is obtained.

A horizontal half-angle of view $u_Y$ is the maximum angle of view of a light beam incident on the first surface R1 in the Y, Z plane of FIG. 12, while a vertical half-angle of view $u_X$ is the maximum angle of view of a light beam incident on the first surface R1 in the X, Z plane of FIG. 12.

The brightness of the optical system is represented by an entrance pupil diameter which is the diameter of an entrance pupil. The effective image area in the image plane is represented by an image size. The image size is represented by a rectangular region having a horizontal size taken in the y direction of the local coordinate system and a vertical size taken in the x direction of the local coordinate system.

Regarding the numerical examples which are illustrated together with the constituent data, their respective lateral aberration charts are shown. Each of the lateral aberration charts shows the lateral aberrations of a light beam for the wide-angle end (W), the middle position (M) and the telephoto end (T), and the lateral aberrations are those of the light beam which is incident on the stop R1 at an angle of incidence which is defined by a horizontal angle of incidence and a vertical angle of incidence which are $(u_Y, u_X)$, $(0, u_X)$, $(-u_Y, u_X)$, $(u_Y, 0)$, $(0, 0)$ and $(-u_Y, 0)$, respectively. In each of the lateral aberration charts, the horizontal axis represents the height of incidence on the pupil, and the vertical axis represents the amount of aberration. In any of the numerical examples, since each of the surfaces basically has a shape symmetrical with respect to the Y, Z plane, the plus and minus directions of a vertical angle of view are the same in the lateral aberration chart. For this reason, the lateral aberration chart relative to the minus direction is omitted for the sake of simplicity.

The numerical examples are described below.

NUMERICAL EXAMPLE 1

Figure 13:
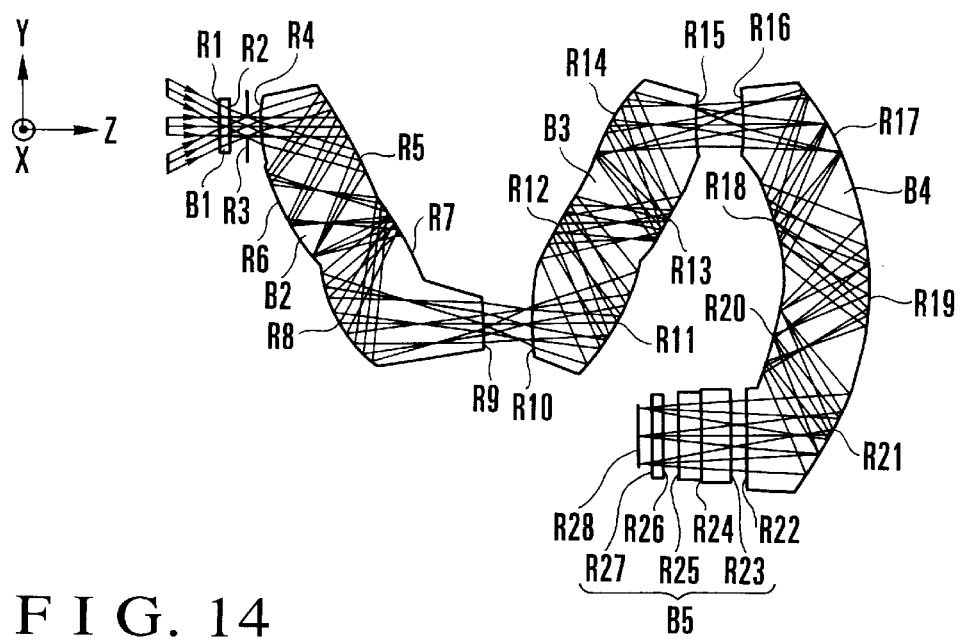
FIG. 13 is an optical cross-sectional view of Numerical Example 1 relative to its wide-angle end.
Figure 14:
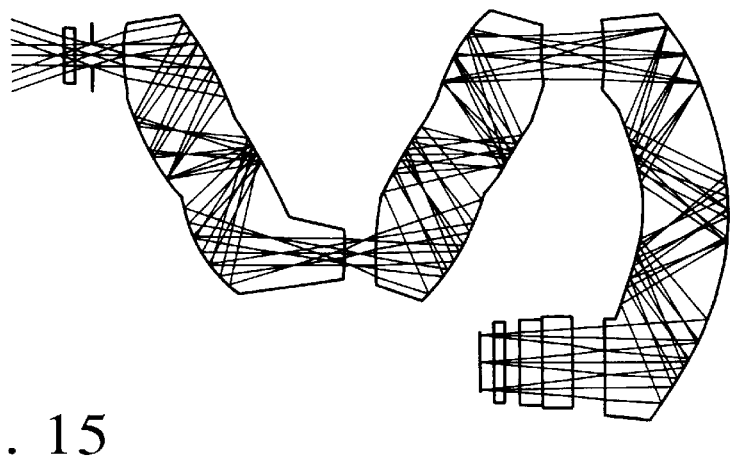
FIG. 14 is an optical cross-sectional view of Numerical Example 1 relative to its middle position.
Figure 15:
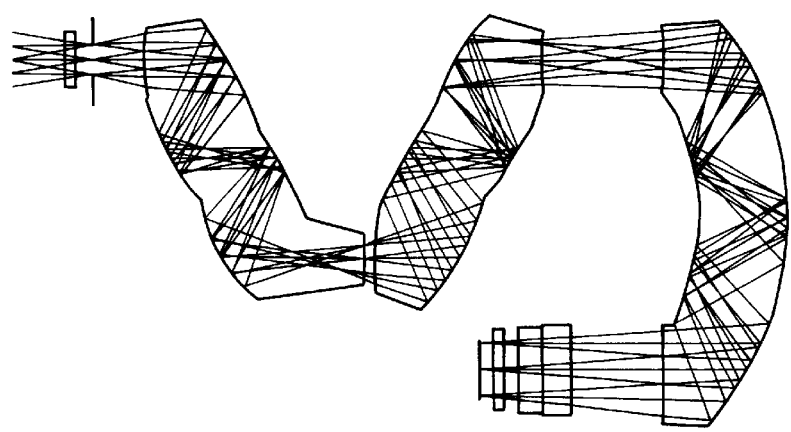
FIG. 15 is an optical cross-sectional view of Numerical Example 1 relative to its telephoto end.

Numerical Example 1 is a variable magnification optical system having a magnification variation ratio of approximately 2.8×. FIGS. 13, 14 and 15 are cross-sectional views taken in the Y, Z plane, showing the respective optical paths of Numerical Example 1 relative to the wide-angle end (W), the middle position (M) and the telephoto end (T). Constituent data for Numerical Example 1 are shown below.

|  | WIDE-ANGLE END | MIDDLE POSITION | TELEPHOTO END |
| --- | --- | --- | --- |
| HORIZONTAL HALF-ANGLE OF VIEW | 27.3 | 19.0 | 9.8 |
| VERTICAL HALF-ANGLE OF VIEW | 21.2 | 14.5 | 7.4 |
| APERTURE DIAMETER | 1.30 | 1.40 | 2.00 |

| i | Yi | Zi(W) | θi | Di | Ndi | vdi |  |
| --- | --- | --- | --- | --- | --- | --- | --- |

FIRST OPTICAL ELEMENT B1 (NEGATIVE LENS)

| 1 | 0.00 | 0.00 | 0.00 | 0.70 | 1.51633 | 64.15 |  |
| 2 | 0.00 | 0.70 | 0.00 | 1.33 | 1 |  |  |
| 3 | 0.00 | 2.03 | 0.00 | VARIABLE |  |  | STOP |

SECOND OPTICAL ELEMENT B2

| 4 | 0.00 | 3.03 | 0.00 | 6.00 | 1.49171 | 57.40 | REFRACTING SURFACE |
| 5 | 0.00 | 9.03 | 30.00 | 8.00 | 1.49171 | 57.40 | REFLECTING SURFACE |
| 6 | −6.93 | 5.03 | 30.00 | 7.60 | 1.49171 | 57.40 | REFLECTING SURFACE |
| 7 | −6.93 | 12.63 | 30.00 | 8.00 | 1.49171 | 57.40 | REFLECTING SURFACE |
| 8 | −13.86 | 8.63 | 30.00 | 10.00 | 1.49171 | 57.40 | REFLECTING SURFACE |
| 9 | −13.86 | 18.63 | 0.00 | VARIABLE | 1 |  | REFRACTING SURFACE |

THIRD OPTICAL ELEMENT B3

| 10 | −13.86 | 22.04 | 0.00 | 6.00 | 1.49171 | 57.40 | REFRACTING SURFACE |
| 11 | −13.86 | 28.04 | −30.00 | 8.00 | 1.49171 | 57.40 | REFLECTING SURFACE |
| 12 | −6.93 | 24.04 | −30.00 | 7.60 | 1.49171 | 57.40 | REFLECTING SURFACE |
| 13 | −6.93 | 31.64 | −30.00 | 8.00 | 1.49171 | 57.40 | REFLECTING SURFACE |
| 14 | 0.00 | 27.64 | −30.00 | 6.00 | 1.49171 | 57.40 | REFLECTING SURFACE |
| 15 | 0.00 | 33.64 | 0.00 | VARIABLE | 1 |  | REFRACTING SURFACE |

FOURTH OPTICAL ELEMENT B4

| 16 | 0.00 | 36.97 | 0.00 | 6.00 | 1.49171 | 57.40 | REFRACTING SURFACE |
| 17 | 0.00 | 42.97 | 30.00 | 8.00 | 1.49171 | 57.40 | REFLECTING SURFACE |
| 18 | −6.93 | 38.97 | 15.00 | 8.00 | 1.49171 | 57.40 | REFLECTING SURFACE |
| 19 | −10.93 | 45.90 | 0.00 | 8.00 | 1.49171 | 57.40 | REFLECTING SURFACE |
| 20 | −14.93 | 38.97 | −15.00 | 8.00 | 1.49171 | 57.40 | REFLECTING SURFACE |
| 21 | −21.86 | 42.97 | −30.00 | 6.00 | 1.49171 | 57.40 | REFLECTING SURFACE |

-continued

| | | | | | | |
|---|---|---|---|---|---|---|
| 22 | −21.86 | 36.97 | 0.00 | VARIABLE | 1 | REFRACTING SURFACE |

BLOCK B5

| | | | | | | |
|---|---|---|---|---|---|---|
| 23 | −21.86 | 35.86 | 0.00 | 2.08 | 1.51400 | 70.00 FILTER |
| 24 | −21.86 | 33.78 | 0.00 | 1.60 | 1.52000 | 74.00 FILTER |
| 25 | −21.86 | 32.18 | 0.00 | 1.00 | 1 | |
| 26 | −21.86 | 31.18 | 0.00 | 0.80 | 1.51633 | 64.15 COVER GLASS |
| 27 | −21.86 | 30.38 | 0.00 | 0.91 | 1 | |
| 28 | −21.86 | 29.47 | −0.00 | | 1 | IMAGE PLANE |

| | WIDE-ANGLE END | MIDDLE POSITION | TELE-PHOTO END |
|---|---|---|---|
| D3 | 1.00 | 2.28 | 3.67 |
| D9 | 3.41 | 2.12 | 0.73 |
| D15 | 3.33 | 4.47 | 8.73 |
| D22 | 1.11 | 2.25 | 6.51 |
| R1–R3 | Zi(M) = Zi(W) | Zi(T) = Zi(W) | |
| R4–R9 | Zi(M) = Zi(W) + 1.28 | Zi(T) = Zi(W) + 2.67 | |
| R10–R15 | Zi(M) = Zi(W) | Zi(T) = Zi(W) | |
| R16–R22 | Zi(M) = Zi(W) + 1.14 | Zi(T) = Zi(W) + 5.40 | |
| R23 | Zi(M) = Zi(W) | Zi(T) = Zi(W) | |

SPHERICAL SHAPE

| | |
|---|---|
| R1 | $R_1 = \infty$ |
| R2 | $R_2 = 10.000$ |
| R4 | $R_4 = 10.000$ |
| R9 | $R_9 = -11.861$ |
| R10 | $R_{10} = \infty$ |
| R15 | $R_{15} = 12.685$ |
| R16 | $R_{16} = -14.922$ |
| R22 | $R_{22} = \infty$ |
| R23 | $R_{23} = \infty$ |
| R24 | $R_{24} = \infty$ |
| R25 | $R_{25} = \infty$ |
| R26 | $R_{26} = \infty$ |
| R27 | $R_{27} = \infty$ |

ASPHERICAL SHAPE

| | | | |
|---|---|---|---|
| R5 | $C_{02} = -1.65555e-02$ | $C_{20} = -8.41274e-02$ | |
| | $C_{03} = 6.41210e-04$ | $C_{21} = 1.62616e-03$ | |
| | $C_{04} = -1.02358e-04$ | $C_{22} = -5.23593e-04$ | $C_{40} = -6.43577e-04$ |
| R6 | $C_{02} = 2.82163e-02$ | $C_{20} = 4.34750e-02$ | |
| | $C_{03} = -8.94216e-04$ | $C_{21} = 4.23580e-03$ | |
| | $C_{04} = 9.62013e-05$ | $C_{22} = 3.79828e-04$ | $C_{40} = -9.32251e-05$ |
| R7 | $C_{02} = -2.42076e-02$ | $C_{20} = -2.27382e-02$ | |
| | $C_{03} = -8.96687e-06$ | $C_{21} = -3.94882e-03$ | |
| | $C_{04} = -1.22983e-04$ | $C_{22} = 4.29189e-04$ | $C_{40} = -2.34035e-06$ |
| R8 | $C_{02} = 4.99288e-02$ | $C_{20} = 2.18880e-02$ | |
| | $C_{03} = -1.42024e-04$ | $C_{21} = 1.03926e-04$ | |
| | $C_{04} = 2.94885e-05$ | $C_{22} = 1.05768e-04$ | $C_{40} = -2.67713e-06$ |
| R11 | $C_{02} = -2.95501e-02$ | $C_{20} = -4.64999e-02$ | |
| | $C_{03} = -2.10262e-04$ | $C_{21} = -1.56787e-03$ | |
| | $C_{04} = -1.77594e-05$ | $C_{22} = -7.95819e-05$ | $C_{40} = -1.28737e-04$ |
| R12 | $C_{02} = 1.08367e-02$ | $C_{20} = 2.83473e-02$ | |
| | $C_{03} = -2.31601e-05$ | $C_{21} = 4.61247e-03$ | |
| | $C_{04} = -1.00779e-04$ | $C_{22} = 3.15656e-05$ | $C_{40} = 1.27232e-03$ |
| R13 | $C_{02} = -2.00837e-03$ | $C_{20} = 1.09453e-03$ | |
| | $C_{03} = 3.22996e-04$ | $C_{21} = 1.80481e-02$ | |
| | $C_{04} = -3.43826e-04$ | $C_{22} = -1.84712e-03$ | $C_{40} = -2.12165e-03$ |
| R14 | $C_{02} = 3.49622e-02$ | $C_{20} = 4.06364e-02$ | |
| | $C_{03} = -2.73508e-04$ | $C_{21} = -4.35486e-04$ | |
| | $C_{04} = 6.53193e-05$ | $C_{22} = 7.60790e-05$ | $C_{40} = 1.00004e-04$ |
| R17 | $C_{02} = -2.96485e-02$ | $C_{20} = -1.49820e-02$ | |
| | $C_{03} = -6.10223e-04$ | $C_{21} = 1.73005e-03$ | |
| | $C_{04} = -1.42283e-05$ | $C_{22} = -2.04680e-04$ | $C_{40} = 2.11087e-04$ |
| R18 | $C_{02} = -1.30697e-02$ | $C_{20} = 1.07759e-02$ | |
| | $C_{03} = -1.85268e-03$ | $C_{21} = -4.38486e-04$ | |
| | $C_{04} = -2.73769e-04$ | $C_{22} = 5.82505e-04$ | $C_{40} = 1.49662e-04$ |
| R19 | $C_{02} = -2.46857e-02$ | $C_{20} = -2.64590e-02$ | |
| | $C_{03} = -2.12109e-04$ | $C_{21} = 2.28021e-03$ | |
| | $C_{04} = -3.40220e-05$ | $C_{22} = 1.34011e-05$ | $C_{40} = 3.64311e-05$ |
| R20 | $C_{02} = -1.16345e-02$ | $C_{20} = -2.36411e-02$ | |
| | $C_{03} = -3.60785e-04$ | $C_{21} = -1.68595e-03$ | |
| | $C_{04} = -4.16485e-05$ | $C_{22} = -2.72511e-04$ | $C_{40} = -7.28477e-04$ |
| R21 | $C_{02} = -1.62057e-02$ | $C_{20} = -2.99524e-02$ | |
| | $C_{03} = -3.74880e-04$ | $C_{21} = 9.01456e-04$ | |
| | $C_{04} = 2.18196e-06$ | $C_{22} = -7.11991e-05$ | $C_{40} = 2.44047e-05$ |

The construction of Numerical Example 1 will be described below. The first optical element B1 is a negative lens which has the first surface R1 and the second surface R2, and the third surface R3 is an aperture plane. The second optical element B2 is formed as one transparent body on which the fourth surface R4 (entrance refracting surface), the fifth to eighth surfaces R5 to R8 each of which is a decentered curved internal reflecting surface, and the ninth surface R9 (exit refracting surface) are formed. The third optical element B3 is formed as one transparent body on which the tenth surface R10 (entrance refracting surface), the eleventh to fourteenth surfaces R11 to R14 each of which is a decentered curved internal reflecting surface, and the fifteenth surface R15 (exit refracting surface) are formed. The fourth optical element B4 is formed as one transparent body on which the sixteenth surface R16 (entrance refracting surface), the seventeenth to twenty-first surfaces R17 to R21 each of which is a decentered curved internal reflecting surface, and the twenty-second surface R22 (exit refracting surface) are formed.

The twenty-third to twenty-seventh surfaces R23 to R27 are those of plane parallel plates such as a filter and a cover glass. The surfaces R23 to R27 constitute the block B5. The twenty-eighth surface R28 is a final image plane in which the image pickup surface of an image pickup device such as a CCD is positioned.

The optical elements of Numerical Example 1 are grouped into four optical units which constitute a variable magnification optical system. Specifically, the first optical element B1 and the stop R3 constitute the first optical unit, the second optical element B2 constitutes the second optical unit, the third optical element B3 constitutes the third optical unit, and the fourth optical element B4 constitutes the fourth optical unit. The second and fourth optical units are magnification varying optical units which vary the relative position therebetween to vary the magnification of the variable magnification optical system.

An image forming operation for an object lying at infinity will be described below. First, a light beam which has passed through the first optical element B1 and the stop R3 in that order enters the second optical element B2. In the second optical element B2, the light beam is refracted by the fourth surface R4, then reflected from surface to surface by the fifth surface R5 to the eighth surface R8, then refracted by the ninth surface R9, and then exits from the second optical element B2. During this time, a primary image is formed in the vicinity of the sixth surface R6, and a secondary image is formed between the eighth surface R8 and the ninth surface R9. A pupil is formed in the vicinity of the seventh surface R7.

Then, the light beam enters the third optical element B3. In the third optical element B3, the light beam is refracted by the tenth surface R10, then reflected from surface to surface by the eleventh surface R11 to the fourteenth surface R14, then refracted by the fifteenth surface R15, and then exits from the third optical element B3. During this time, a tertiary image forming plane is formed between the twelfth surface R12 and the thirteenth surface R13 when the focal length is at the wide-angle end, or in the vicinity of the thirteenth surface R13 when the focal length is at the telephoto end. Another pupil is formed between the fourteenth surface R14 and the fifteenth surface R15 at any focal length from the wide-angle end to the telephoto end.

Then, the light beam enters the fourth optical element B4. In the fourth optical element B4, the light beam is refracted by the sixteenth surface R16, then reflected from surface to surface by the seventeenth surface R17 to the twenty-first surface R21, then refracted by the twenty-second surface R22, and then exits from the fourth optical element B4. During this time, a quaternary image forming plane is formed in the vicinity of the seventeenth surface R17 when the focal length is at the wide-angle end, or between the seventeenth surface R17 and the eighteenth surface R18 when the focal length is at the telephoto end. A pupil is formed in the vicinity of the twentieth surface R20 when the focal length is at the wide-angle end, or between the eighteenth surface R18 and the nineteenth surface R19 when the focal length is at the telephoto end.

The light beam which has exited from the fourth optical element B4 passes through the twenty-third to twenty-seventh surfaces R23 to R27, and finally forms an object image on the twenty-eighth surface R28 which is a quinary image forming plane.

In Numerical Example 1, the entering reference axis and the exiting reference axis of each of the second optical element B2 and the third optical element B3 are parallel to and the same as each other in direction. The entering reference axis and the exiting reference axis of the fourth optical element B4 are parallel to each other, but differ from each other by 180° in direction.

The movements of the respective optical elements during a magnification varying operation will be described below. During the magnification varying operation, the first optical element B1 and the stop R3 which constitute the first optical unit, the third optical element B3 which constitutes the third optical unit, and the block B5 are fixed and do not move. As the focal length varies from the wide-angle end toward the telephoto end, the second optical element B2 which constitutes the second optical unit moves in the Z plus direction in parallel with the entering reference axis of the second optical element B2. In the meantime, the fourth optical element B4 which constitutes the fourth optical unit moves in the Z plus direction in parallel with the entering reference axis of the fourth optical element B4.

During the magnification varying operation, the filter, the cover glass and the twenty-eighth surface R28 which is the final image plane do not move.

Thus, as the focal length varies from the wide-angle end toward the telephoto end, the distance between the second optical element B2 and the third optical element B3 is decreased, the distance between the third optical element B3 and the fourth optical element B4 is increased, and the distance between the fourth optical element B4 and the twenty-third surface R23 is increased.

In addition, as the focal length varies from the wide-angle end toward the telephoto end, the entire optical path length which extends from the first surface R1 to the final image plane R28 becomes longer.

Figure 16:
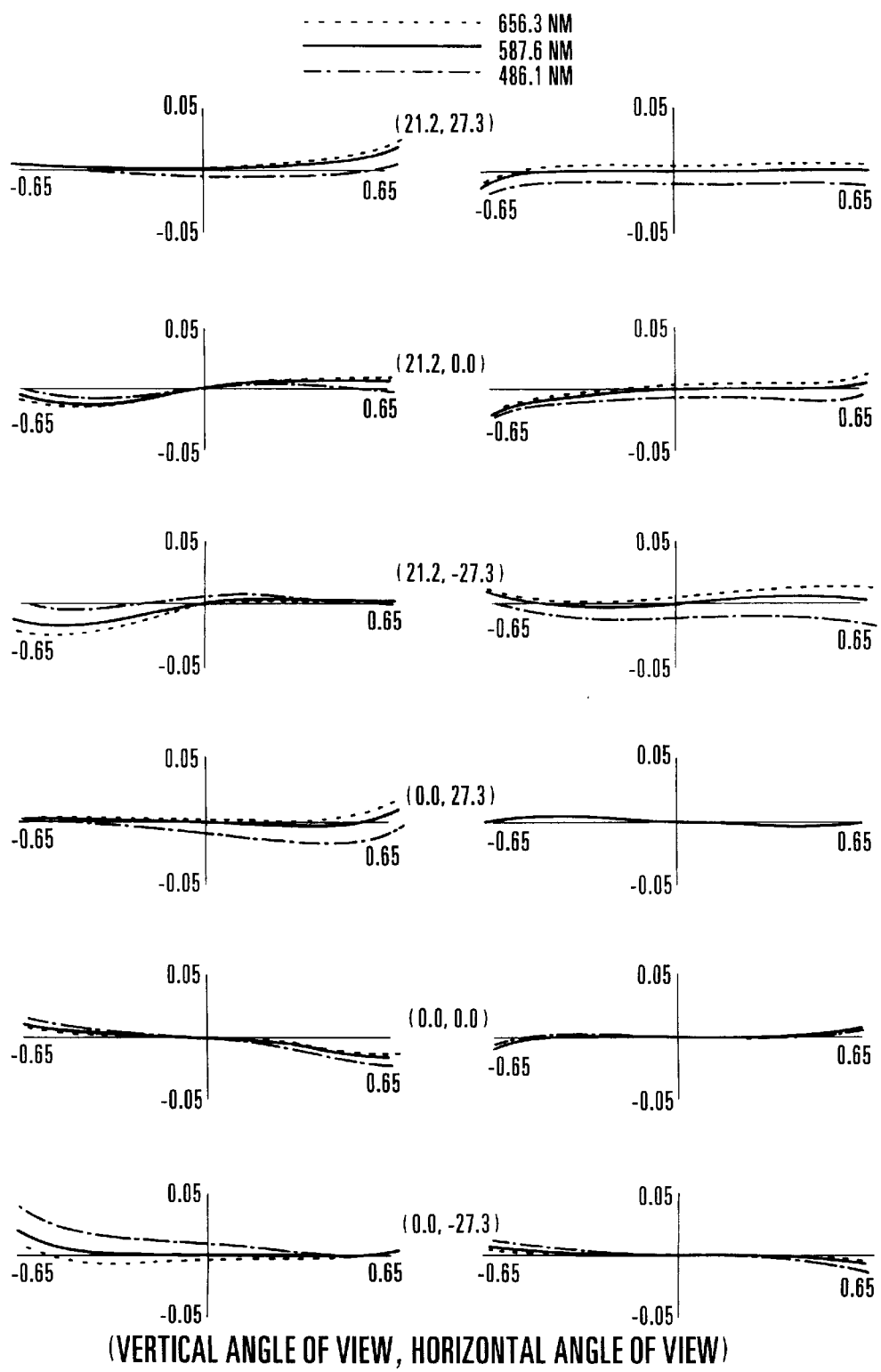
FIG. 16 is a lateral aberration chart of Numerical Example 1 relative to the wide-angle end.
Figure 17:
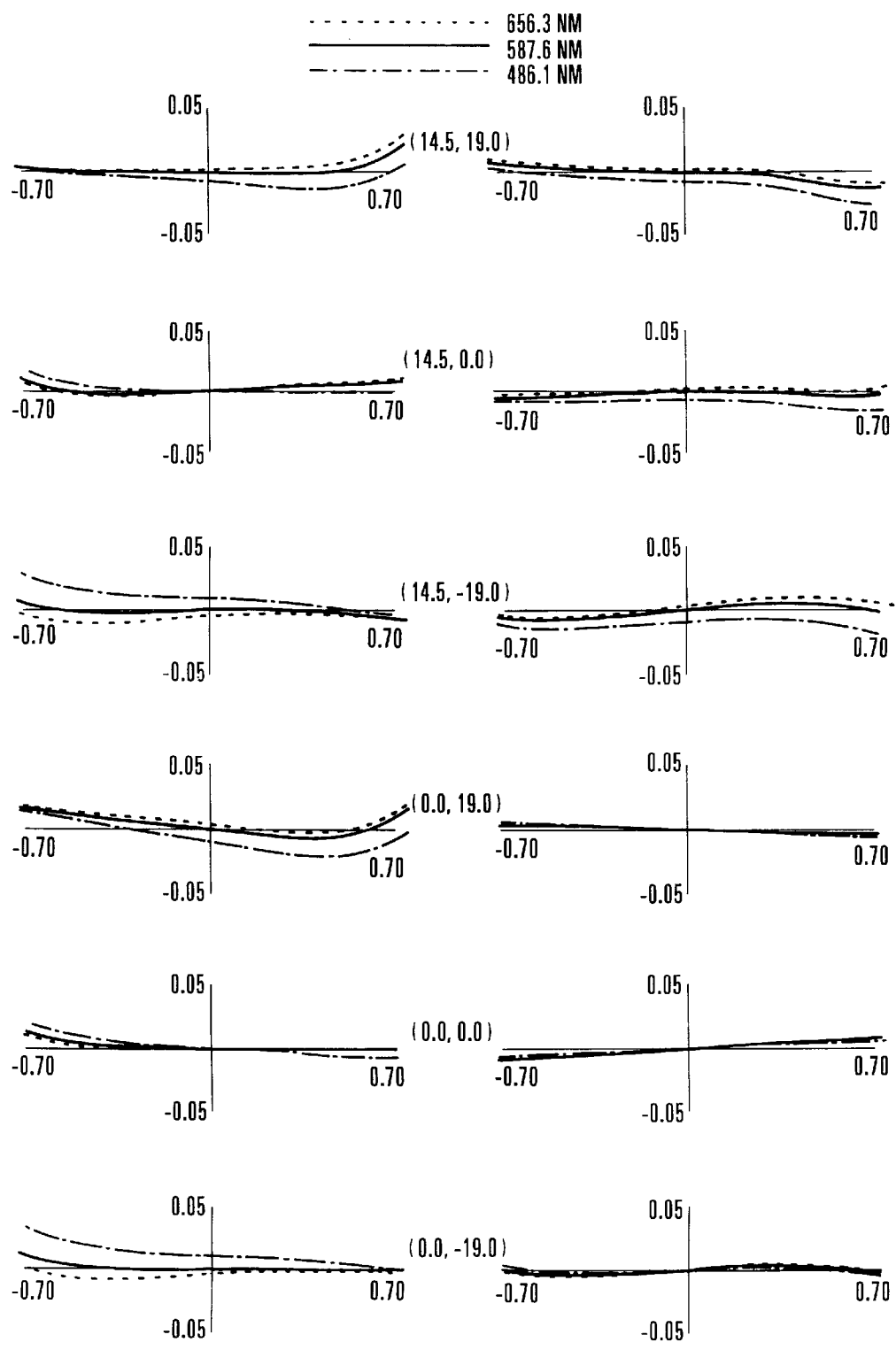
FIG. 17 is a lateral aberration chart of Numerical Example 1 relative to the middle position.
Figure 18:
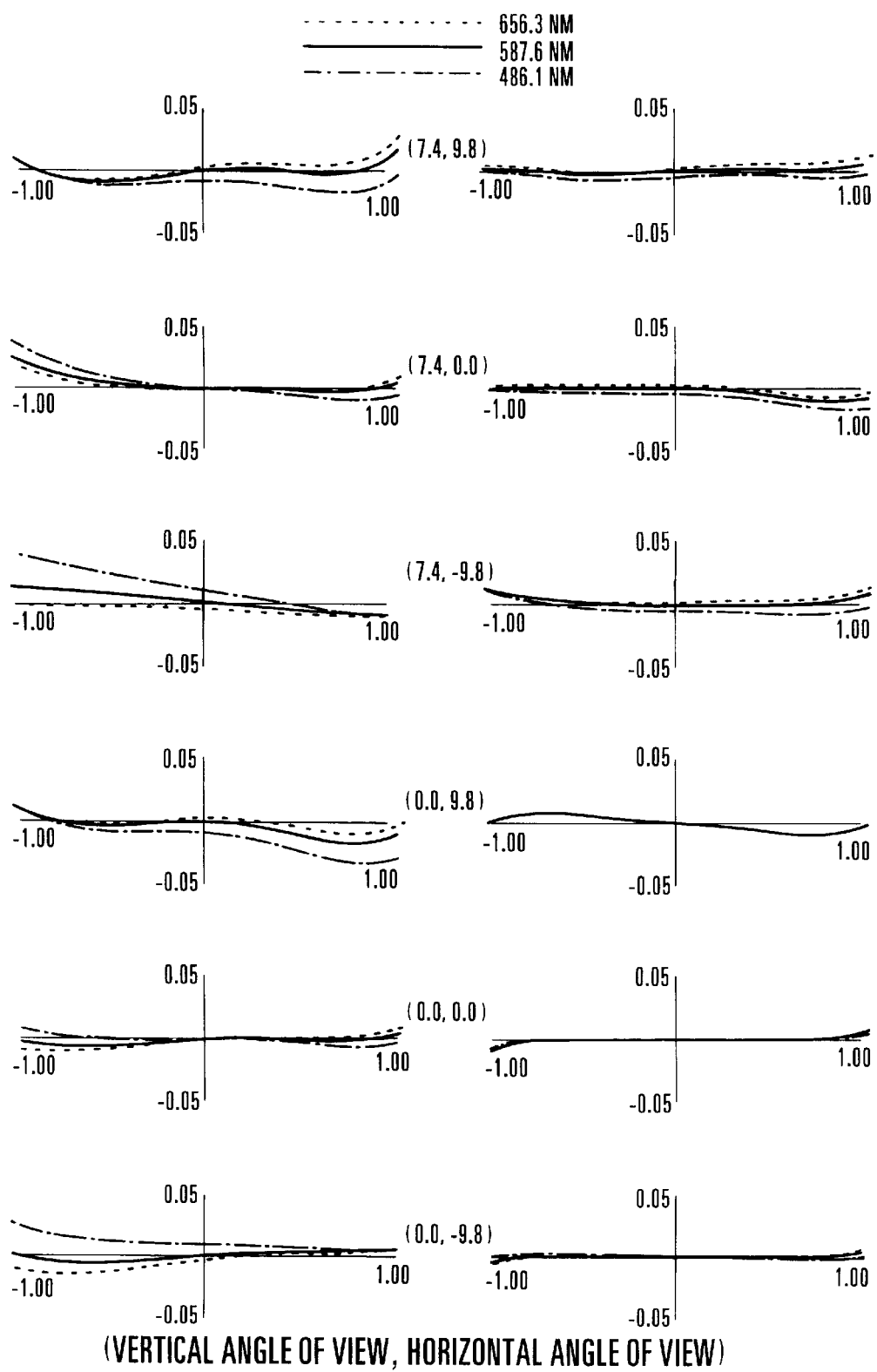
FIG. 18 is a lateral aberration chart of Numerical Example 1 relative to the telephoto end.

Each of FIGS. 16, 17 and 18 shows lateral aberration charts of Numerical Example 1 relative to the wide-angle end (W), the middle position (M) and the telephoto end (T). The respective lateral aberration charts show lateral aberrations in the Y and X directions, relative to six light beams which enter Numerical Example 1 at different angles of incidence of $(u_Y, u_X)$, $(0, u_X)$, $(-u_Y, u_X)$, $(u_Y, 0)$, $(0, 0)$ and $(-u_Y, 0)$, respectively. The horizontal axis of each of the lateral aberration charts represents the height of incidence in the Y or X direction of a light beam which is incident on each of the entrance pupils.

As can be seen from these figures, Numerical Example 1 is capable of achieving well-balanced correction of aberration at each zoom position.

In addition, the optical system of Numerical Example 1 is approximately 8.7 mm thick for an image size of 3.76 mm×2.82 mm. In Numerical Example 1, particularly because each of the optical elements and the entire optical system has a small thickness and each of the optical elements can be constructed by forming reflecting surfaces on predetermined sides of a plate-shaped transparent body, it is possible to readily construct a variable magnification optical system which is thin as a whole, by adopting a mechanism which causes two optical elements to move along a surface of one base plate.

Incidentally, in Numerical Example 1, although a chromatic aberration is caused by a plurality of refracting surfaces, the curvature of each of the refracting surfaces is appropriately determined so that the chromatic aberration is corrected over the entire range of variation of magnification. In particular, an axial chromatic aberration which occurs at the fourth surface R4 is fully corrected by the negative lens disposed immediately in front of the stop.

The values and its ratio of the lateral magnification of each of the second optical element B2 to the fourth optical element B4 relative to the wide-angle end and the telephoto end are shown below. The values shown below are calculated by using the aforesaid equation 19. An azimuth is contained in the Y, Z cross-sectional plane (the surface of the sheet of the optical path diagram of FIG. 16).

|  | WIDE-ANGLE END | TELE-PHOTO END | $\left(\begin{array}{c}\text{TELEPHOTO}\\\text{END}\end{array}\right)/\left(\begin{array}{c}\text{WIDE-ANGLE}\\\text{END}\end{array}\right)$ |
| --- | --- | --- | --- |
| SECOND OPTICAL ELEMENT | 0.189 | 0.169 | 0.894 |
| THIRD OPTICAL ELEMENT | 1.031 | 4.338 | 4.208 |
| FOURTH OPTICAL ELEMENT | −1.160 | −0.778 | 0.671 |

In Numerical Example 1, the third optical element B3 has the largest magnification ratio.

The pupil distance from the final image plane to an exit pupil is shown below. This value is calculated on the basis of the previously described paraxial tracing of the off-axial optical system. An azimuth is contained in the Y, Z cross-sectional plane (the surface of the sheet of the optical path diagram of FIG. 16).

|  | WIDE-ANGLE END | TELEPHOTO END |
| --- | --- | --- |
| EXIT PUPIL DISTANCE | −15.394 | 144.549 |

Incidentally, Numerical Example 1 is the variable magnification optical system of the second embodiment shown in FIG. 4.

NUMERICAL EXAMPLE 2

Figure 21:
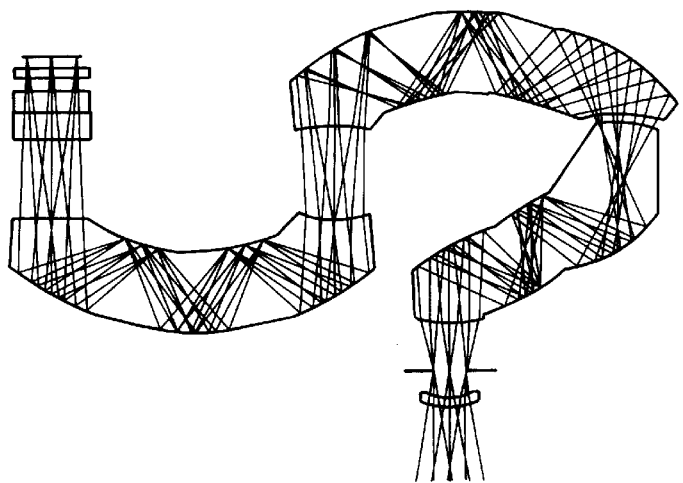
FIG. 21 is an optical cross-sectional view of Numerical Example 2 relative to its telephoto end.
Figure 20:
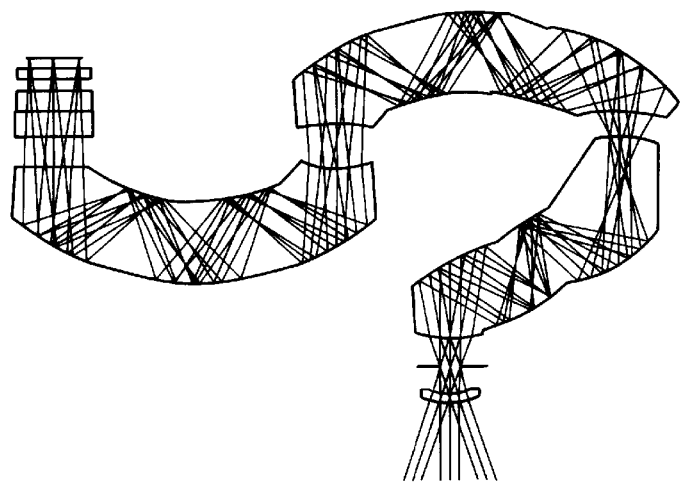
FIG. 20 is an optical cross-sectional view of Numerical Example 2 relative to its middle position.
Figure 19:
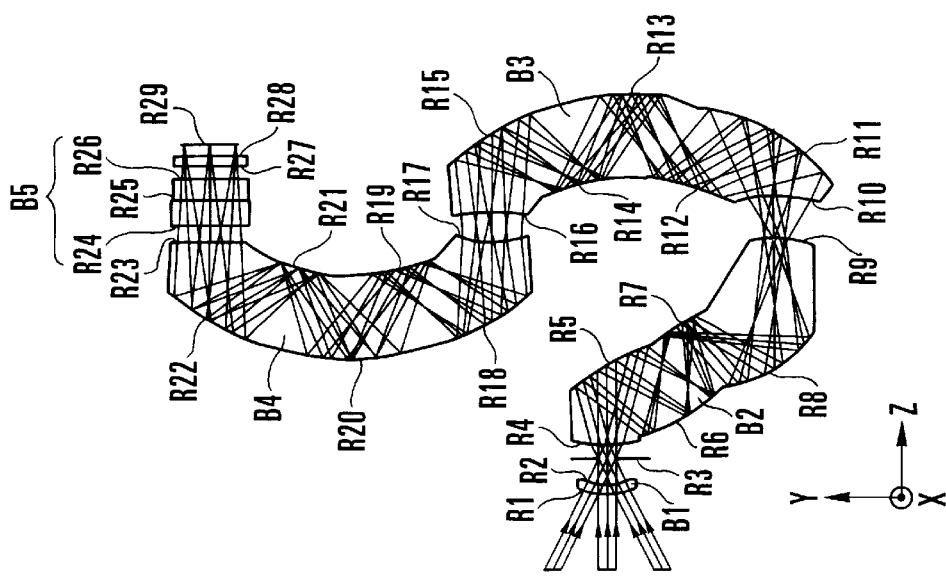
FIG. 19 is an optical cross-sectional view of Numerical Example 2 relative to its wide-angle end.

Numerical Example 2 is a variable magnification optical system having a magnification variation ratio of approximately 2.8×. FIGS. 19, 20 and 21 are cross-sectional views taken in the Y, Z plane, showing the respective optical paths of Numerical Example 2 relative to the wide-angle end (W), the middle position (M) and the telephoto end (T).

Constituent data for Numerical Example 2 are shown below.

|  | WIDE-ANGLE END | MIDDLE POSITION | TELEPHOTO END |
|---|---|---|---|
| HORIZONTAL HALF-ANGLE OF VIEW | 27.3 | 19.0 | 9.8 |
| VERTICAL HALF-ANGLE OF VIEW | 21.2 | 14.5 | 7.4 |
| APERTURE DIAMETER | 1.30 | 1.40 | 2.40 |

| i | Yi | Zi(W) | θi | Di | Ndi | vdi | |
|---|---|---|---|---|---|---|---|
| FIRST OPTICAL ELEMENT B1 (NEGATIVE LENS) | | | | | | | |
| 1 | 0.00 | 0.00 | 0.00 | 0.70 | 1.51633 | 64.15 | |
| 2 | 0.00 | 0.70 | 0.00 | 2.00 | 1 | | |
| 3 | 0.00 | 2.70 | 0.00 | VARIABLE | 1 | | STOP |
| SECOND OPTICAL ELEMENT B2 | | | | | | | |
| 4 | 0.00 | 3.70 | 0.00 | 6.00 | 1.49171 | 57.40 | REFRACTING SURFACE |
| 5 | 0.00 | 9.70 | 30.00 | 7.30 | 1.49171 | 57.40 | REFLECTING SURFACE |
| 6 | -6.32 | 6.05 | 30.00 | 7.10 | 1.49171 | 57.40 | REFLECTING SURFACE |
| 7 | -6.32 | 13.15 | 30.00 | 7.60 | 1.49171 | 57.40 | REFLECTING SURFACE |
| 8 | -12.90 | 9.35 | 30.00 | 10.00 | 1.49171 | 57.40 | REFLECTING SURFACE |
| 9 | -12.90 | 19.35 | 0.00 | VARIABLE | 1 | | REFRACTING SURFACE |
| THIRD OPTICAL ELEMENT B3 | | | | | | | |
| 10 | -12.90 | 22.55 | 0.00 | 5.00 | 1.49171 | 57.40 | REFRACTING SURFACE |
| 11 | -12.90 | 27.55 | -30.00 | 8.00 | 1.49171 | 57.40 | REFLECTING SURFACE |
| 12 | -5.98 | 23.55 | -15.00 | 8.00 | 1.49171 | 57.40 | REFLECTING SURFACE |
| 13 | -1.98 | 30.47 | 0.00 | 8.00 | 1.49171 | 57.40 | REFLECTING SURFACE |
| 14 | 2.02 | 23.55 | 15.00 | 8.00 | 1.49171 | 57.40 | REFLECTING SURFACE |
| 15 | 8.95 | 27.55 | 30.00 | 6.00 | 1 | | REFLECTING SURFACE |
| 16 | 8.95 | 21.55 | 0.00 | VARIABLE | 1 | | REFRACTING SURFACE |
| FOURTH OPTICAL ELEMENT B4 | | | | | | | |
| 17 | 8.95 | 19.14 | 0.00 | 6.00 | 1.49171 | 57.40 | REFRACTING SURFACE |
| 18 | 8.95 | 13.14 | 30.00 | 8.00 | 1.49171 | 57.40 | REFLECTING SURFACE |
| 19 | 15.88 | 17.14 | 15.00 | 8.00 | 1.49171 | 57.40 | REFLECTING SURFACE |
| 20 | 19.88 | 10.21 | 0.00 | 8.00 | 1.49171 | 57.40 | REFLECTING SURFACE |
| 21 | 23.88 | 17.14 | -15.00 | 8.00 | 1.49171 | 57.40 | REFLECTING SURFACE |
| 22 | 30.81 | 13.14 | -30.00 | 6.00 | 1.49171 | 57.40 | REFLECTING SURFACE |
| 23 | 30.81 | 19.14 | 0.00 | VARIABLE | 1 | | REFRACTING SURFACE |
| BLOCK B5 | | | | | | | |
| 24 | 30.81 | 20.33 | 0.00 | 2.08 | 1.51400 | 70.00 | FILTER |
| 25 | 30.81 | 22.41 | 0.00 | 1.60 | 1.52000 | 74.00 | FILTER |
| 26 | 30.81 | 24.01 | 0.00 | 1.00 | 1 | | |
| 27 | 30.81 | 25.01 | 0.00 | 0.80 | 1.51633 | 64.15 | COVER GLASS |
| 28 | 30.81 | 25.81 | 0.00 | 0.91 | 1 | | |
| 29 | 30.81 | 26.72 | -0.00 | | 1 | | IMAGE PLANE |

|  | WIDE-ANGLE END | MIDDLE POSITION | TELEPHOTO END |
|---|---|---|---|
| D3 | 1.00 | 2.24 | 3.60 |
| D9 | 3.20 | 1.96 | 0.60 |
| D16 | 2.40 | 3.50 | 7.21 |
| D23 | 1.19 | 2.29 | 6.00 |
| R1–R3 | | Zi(M) = Zi(W) | Zi(T) = Zi(W) |
| R4–R9 | | Zi(M) = Zi(W) + 1.24 | Zi(T) = Zi(W) + 2.60 |

-continued

| | | |
|---|---|---|
| R10–R16 | Zi(M) = Zi(W) | Zi(T) = Zi(W) |
| R17–R23 | Zi(M) = Zi(W) − 1.10 | Zi(T) = Zi(W) − 4.81 |
| R24 | Zi(M) = Zi(W) | Zi(T) = Zi(W) |

SPHERICAL SHAPE

| | |
|---|---|
| R1 | $R_1$ = 6.178 |
| R2 | $R_2$ = 3.575 |
| R4 | $R_4$ = 8.000 |
| R9 | $R_9$ = −8.094 |
| R10 | $R_{10}$ = −14.301 |
| R16 | $R_{16}$ = −14.930 |
| R17 | $R_{17}$ = 7.534 |
| R23 | $R_{23}$ = ∞ |
| R24 | $R_{24}$ = ∞ |
| R25 | $R_{25}$ = ∞ |
| R26 | $R_{26}$ = ∞ |
| R27 | $R_{27}$ = ∞ |
| R28 | $R_{28}$ = ∞ |

ASPHERICAL SHAPE

| | | | |
|---|---|---|---|
| R5 | $C_{02}$ = −2.10440e-02 | $C_{20}$ = −6.88526e-02 | |
| | $C_{03}$ = 1.83699e-03 | $C_{21}$ = −1.46872e-03 | |
| | $C_{04}$ = 1.34949e-04 | $C_{22}$ = −5.82208e-04 | $C_{40}$ = −4.21790e-04 |
| | $C_{05}$ = −5.37823e-06 | $C_{23}$ = −8.37809e-05 | $C_{41}$ = 8.29155e-05 |
| | $C_{06}$ = −5.56652e-06 | $C_{24}$ = −9.32652e-06 | $C_{42}$ = −3.09610e-05 |
| | $C_{60}$ = 1.43427e-05 | | |
| R6 | $C_{02}$ = 3.01751e-02 | $C_{20}$ = 4.05535e-02 | |
| | $C_{03}$ = −9.72322e-04 | $C_{21}$ = 6.66467e-03 | |
| | $C_{04}$ = 1.40569e-04 | $C_{22}$ = 1.32485e-04 | $C_{40}$ = 5.21673e-04 |
| | $C_{05}$ = −4.72601e-05 | $C_{23}$ = −1.85290e-05 | $C_{41}$ = −8.53945e-05 |
| | $C_{06}$ = 5.26656e-06 | $C_{24}$ = −3.79418e-06 | $C_{42}$ = −1.36321e-05 |
| | $C_{60}$ = −2.58044e-05 | | |
| R7 | $C_{02}$ = −2.96565e-02 | $C_{20}$ = −2.25708e-02 | |
| | $C_{03}$ = 3.19727e-05 | $C_{21}$ = −5.92886e-03 | |
| | $C_{04}$ = 2.14567e-04 | $C_{22}$ = 3.57027e-04 | $C_{40}$ = −1.22342e-04 |
| | $C_{05}$ = −2.22202e-05 | $C_{23}$ = 9.98206e-06 | $C_{41}$ = 5.48399e-05 |
| | $C_{06}$ = −6.53759e-05 | $C_{24}$ = −5.28163e-05 | $C_{42}$ = −6.42052e-06 |
| | $C_{60}$ = 9.43292e-07 | | |
| R8 | $C_{02}$ = 5.12990e-02 | $C_{20}$ = 3.35016e-02 | |
| | $C_{03}$ = −8.63164e-04 | $C_{21}$ = 1.89263e-03 | |
| | $C_{04}$ = 2.28926e-04 | $C_{22}$ = 7.22598e-05 | $C_{40}$ = 2.15995e-05 |
| | $C_{05}$ = −2.81376e-06 | $C_{23}$ = 2.33569e-05 | $C_{41}$ = −1.61267e-05 |
| | $C_{06}$ = −7.57749e-07 | $C_{24}$ = 2.94772e-06 | $C_{42}$ = −8.62955e-06 |
| | $C_{60}$ = −1.50908e-06 | | |
| R11 | $C_{02}$ = −3.55122e-02 | $C_{20}$ = −4.20556e-02 | |
| | $C_{03}$ = 3.14719e-05 | $C_{21}$ = −1.81869e-03 | |
| | $C_{04}$ = −5.61765e-05 | $C_{22}$ = −1.52031e-04 | $C_{40}$ = −1.67091e-04 |
| R12 | $C_{02}$ = −1.41192e-02 | $C_{20}$ = 6.11333e-03 | |
| | $C_{03}$ = −2.22136e-04 | $C_{21}$ = 2.26429e-03 | |
| | $C_{04}$ = −1.40277e-04 | $C_{22}$ = −8.21339e-05 | $C_{40}$ = 4.34677e-04 |
| R13 | $C_{02}$ = −2.17200e-02 | $C_{20}$ = −3.63945e-02 | |
| | $C_{03}$ = 2.99814e-04 | $C_{21}$ = −2.35042e-03 | |
| | $C_{04}$ = −5.77814e-05 | $C_{22}$ = −2.47845e-05 | $C_{40}$ = −1.35757e-04 |
| R14 | $C_{02}$ = −4.69754e-03 | $C_{20}$ = −3.30577e-02 | |
| | $C_{03}$ = −2.12404e-04 | $C_{21}$ = 9.87897e-03 | |
| | $C_{04}$ = 2.91489e-06 | $C_{22}$ = 1.45151e-03 | $C_{40}$ = 1.56530e-03 |
| R15 | $C_{02}$ = −2.44735e-02 | $C_{20}$ = −4.32725e-02 | |
| | $C_{03}$ = 1.29214e-05 | $C_{21}$ = −7.05429e-04 | |
| | $C_{04}$ = −3.96652e-05 | $C_{22}$ = −1.21232e-04 | $C_{40}$ = −8.53259e-05 |
| R18 | $C_{02}$ = 2.46685e-02 | $C_{20}$ = 1.70059e-02 | |
| | $C_{03}$ = −1.07447e-04 | $C_{21}$ = 1.27814e-03 | |
| | $C_{04}$ = −4.75274e-05 | $C_{22}$ = −9.43105e-05 | $C_{40}$ = −9.11962e-05 |
| R19 | $C_{02}$ = 1.91547e-02 | $C_{20}$ = 1.63259e-02 | |
| | $C_{03}$ = −1.99806e-04 | $C_{21}$ = −1.01916e-03 | |
| | $C_{04}$ = 2.80852e-04 | $C_{22}$ = −8.00207e-04 | $C_{40}$ = −2.60931e-04 |
| R20 | $C_{02}$ = 3.04540e-02 | $C_{20}$ = 3.95082e-02 | |
| | $C_{03}$ = −1.70729e-04 | $C_{21}$ = 7.35847e-04 | |
| | $C_{04}$ = 5.22719e-05 | $C_{22}$ = −2.48107e-06 | $C_{40}$ = 6.92769e-05 |
| R21 | $C_{02}$ = 1.83456e-02 | $C_{20}$ = 6.39762e-02 | |
| | $C_{03}$ = 1.55164e-04 | $C_{21}$ = −5.22449e-03 | |
| | $C_{04}$ = 1.22578e-04 | $C_{22}$ = 7.47137e-05 | $C_{40}$ = 2.26637e-03 |
| R22 | $C_{02}$ = 2.08626e-02 | $C_{20}$ = 3.5207.e-02 | |
| | $C_{03}$ = −2.21145e-04 | $C_{21}$ = −1.08183e-03 | |
| | $C_{04}$ = 1.82605e-05 | $C_{22}$ = 4.95072e-06 | $C_{40}$ = 1.59696e-04 |

The construction of Numerical Example 2 will be described below. The first optical element B1 is a negative lens which has the first surface R1 and the second surface R2, and the third surface R3 is an aperture plane. The second optical element B2 is formed as one transparent body on which the fourth surface R4 (entrance refracting surface), the fifth to eighth surfaces R5 to R8 each of which is a decentered curved internal reflecting surface, and the ninth surface R9 (exit refracting surface) are formed. The third optical element B3 is formed as one transparent body on which the tenth surface R10 (entrance refracting surface), the eleventh to fifteenth surfaces R11 to R15 each of which is a decentered curved internal reflecting surface, and the sixteenth surface R16 (exit refracting surface) are formed. The fourth optical element B4 is formed as one transparent body on which the seventeenth surface R17 (entrance refracting surface), the eighteenth to twenty-second surfaces R18 to R22 each of which is a decentered curved internal reflecting surface, and the twenty-third surface R23 (exit refracting surface) are formed.

The twenty-fourth to twenty-eighth surfaces R24 to R28 are those of plane parallel plates such as a filter and a cover glass. The surfaces R24 to R28 constitute the block B5. The twenty-ninth surface R29 is a final image plane in which the image pickup surface of an image pickup device such as a CCD is positioned.

The optical elements of Numerical Example 2 are grouped into four optical units which constitute a variable magnification optical system. Specifically, the first optical element B1 and the stop R3 constitute the first optical unit, the second optical element B2 constitutes the second optical unit, the third optical element B3 constitutes the third optical unit, and the fourth optical element B4 constitutes the fourth optical unit. The second and fourth optical units are magnification varying optical units which vary the relative position therebetween to vary the magnification of the variable magnification optical system.

An image forming operation for an object lying at infinity will be described below. First, a light beam which has passed through the first optical element B1 and the stop R3 in that order enters the second optical element B2. In the second optical element B2, the light beam is refracted by the fourth surface R4, then reflected from surface to surface by the fifth surface R5 to the eighth surface R8, then refracted by the ninth surface R9, and then exits from the second optical element B2. During this time, a primary image is formed in the vicinity of the sixth surface R6, and a secondary image is formed between the eighth surface R8 and the ninth surface R9. A pupil is formed in the vicinity of the seventh surface R7.

Then, the light beam enters the third optical element B3. In the third optical element B3, the light beam is refracted by the tenth surface R10, then reflected from surface to surface by the eleventh surface R11 to the fifteenth surface R15, then refracted by the sixteenth surface R16, and then exits from the third optical element B3. During this time, a tertiary image forming plane is formed between the twelfth surface R12 and the thirteenth surface R13 when the focal length is at the wide-angle end, or in the vicinity of the thirteenth surface R13 when the focal length is at the telephoto end. A pupil is formed in the vicinity of the fourteenth surface R14 when the focal length is at the wide-angle end, or between the fourteenth surface R14 and the fifteenth surface R15 when the focal length is at the telephoto end.

Then, the light beam enters the fourth optical element B4. In the fourth optical element B4, the light beam is refracted by the seventeenth surface R17, then reflected from surface to surface by the eighteenth surface R18 to the twenty-second surface R22, then refracted by the twenty-third surface R23, and then exits from the fourth optical element B4. During this timer a quaternary image forming plane is formed between the eighteenth surface R18 and the nineteenth surface R19 when the focal length is at the wide-angle end, or in the vicinity of the nineteenth surface R19 when the focal length is at the telephoto end. A pupil is formed in the vicinity of the twenty-first surface R21 at any focal length from the wide-angle end to the telephoto end.

The light beam which has exited from the fourth optical element B4 passes through the twenty-fourth to twenty-eighth surfaces R24 to R28, and finally forms an object image on the twenty-ninth surface R29 which is a quinary image forming plane.

In Numerical Example 2, the entering reference axis and the exiting reference axis of the second optical element B2 are parallel to and the same as each other in direction. The entering reference axis and the exiting reference axis of each of the third optical element B3 and the fourth optical element B4 are parallel to each other, but differ from each other by 180° in direction.

The movements of the respective optical elements during a magnification varying operation will be described below. During the magnification varying operation, the first optical element B1 and the stop R3 which constitute the first optical unit, the third optical element B3 which constitutes the third optical unit, and the block B5 are fixed and do not move. As the focal length varies from the wide-angle end toward the telephoto end, the second optical element B2 which constitutes the second optical unit moves in the Z plus direction in parallel with the entering reference axis of the second optical element B2. In the meantime, the fourth optical element B4 which constitutes the fourth optical unit moves in the Z minus direction in parallel with the entering reference axis of the fourth optical element B4.

During the magnification varying operation, the filter, the cover glass and the twenty-ninth surface R29 which is the final image plane do not move.

Thus, as the focal length varies from the wide-angle end toward the telephoto end, the distance between the second optical element B2 and the third optical element B3 is decreased, the distance between the third optical element B3 and the fourth optical element B4 is increased, and the distance between the fourth optical element B4 and the twenty-fourth surface R24 is increased.

In addition, as the focal length varies from the wide-angle end toward the telephoto end, the entire optical path length which extends from the first surface R1 to the final image plane R30 becomes longer.

Figure 22:
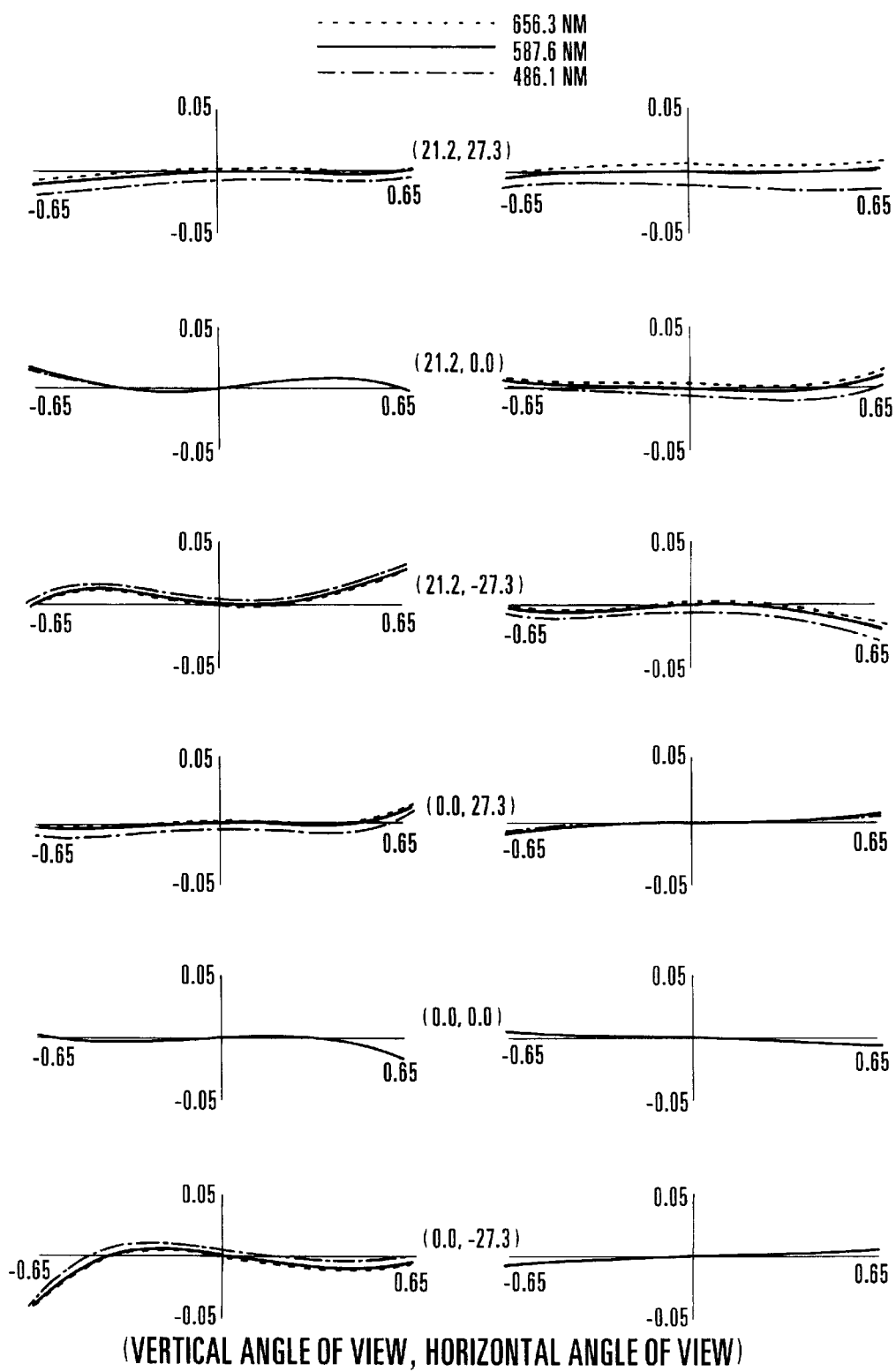
FIG. 22 is a lateral aberration chart of Numerical Example 2 relative to the wide-angle end.
Figure 23:
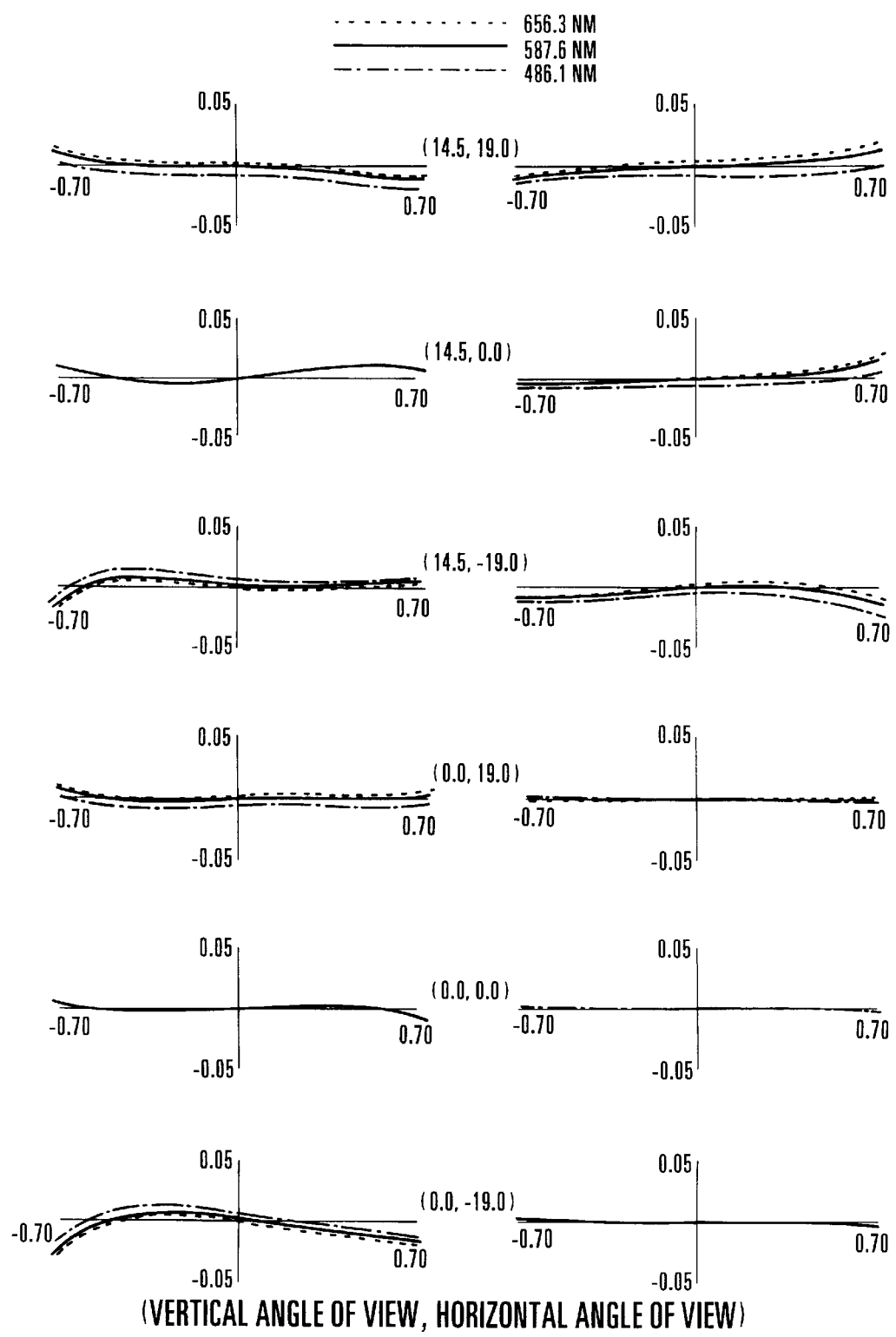
FIG. 23 is a lateral aberration chart of Numerical Example 2 relative to the middle position.
Figure 24:
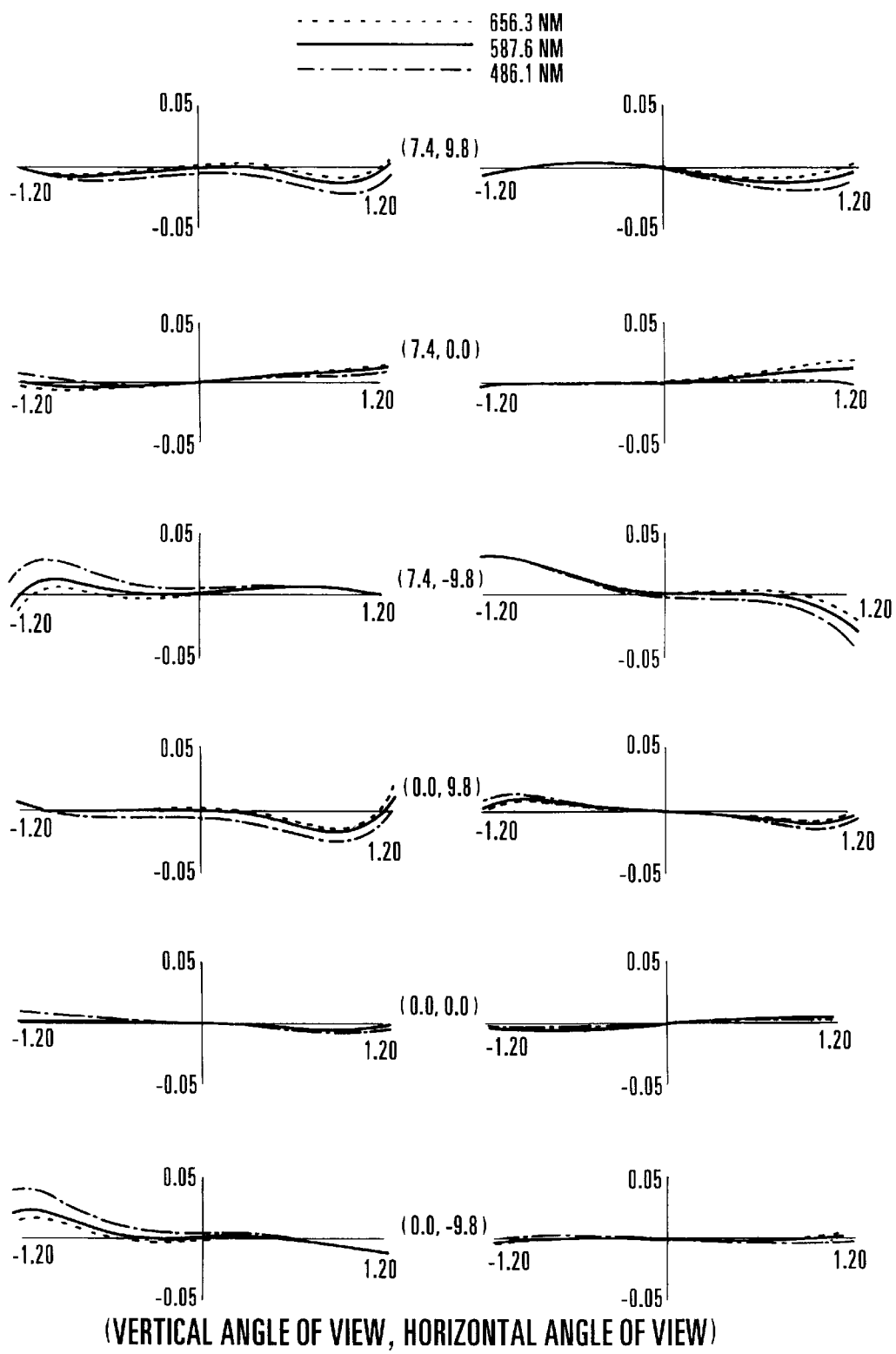
FIG. 24 is a lateral aberration chart of Numerical Example 2 relative to the telephoto end.

FIGS. 22, 23 and 24 show lateral aberration charts of Numerical Example 2 relative to the wide-angle end (W), the middle position (M) and the telephoto end (T). The respective lateral aberration charts show lateral aberrations in the Y and X directions, relative to six light beams which enter Numerical Example 2 at different angles of incidence of $(u_Y, u_X)$, $(0, u_X)$, $(-u_Y, u_X)$, $(u_Y, 0)$, $(0, 0)$ and $(-u_Y, 0)$, respectively. The horizontal axis of each of the lateral aberration charts represents the height of incidence in the Y or X direction of a light beam which is incident on each of the entrance pupils.

As can be seen from these figures, Numerical Example 2 is capable of achieving well-balanced correction of aberration at each zoom position.

In addition, the optical system of Numerical Example 2 is approximately 7.4 mm thick for an image size of 3.76 mm×2.82 mm. In Numerical Example 2, particularly because each of the optical elements and the entire optical system has a small thickness and each of the optical elements can be constructed by forming reflecting surfaces on predetermined sides of a plate-shaped transparent body, it is possible to readily construct a variable magnification optical system which is thin as a whole, by adopting a mechanism which causes two optical elements to move along a surface of one base plate.

Incidentally, in Numerical Example 2, although a chromatic aberration is caused by a plurality of refracting surfaces, the curvature of each of the refracting surfaces is appropriately determined so that the chromatic aberration is corrected over the entire range of variation of magnification. In particular, an axial chromatic aberration which occurs at the fourth surface R4 is fully corrected by the negative lens disposed immediately in front of the stop.

The values and its ratio of the lateral magnification of each of the second optical element B2 to the fourth optical element B4 relative to the wide-angle end and the telephoto end are shown below. The values shown below are calculated by using the aforesaid equation 19. An azimuth is contained in the Y, Z cross-sectional plane (the surface of the sheet of the optical path diagram of FIG. 19).

|  | WIDE-ANGLE END | TELE-PHOTO END | $\left(\dfrac{\text{TELEPHOTO}}{\text{END}}\right) / \left(\dfrac{\text{WIDE-ANGLE}}{\text{END}}\right)$ |
| --- | --- | --- | --- |
| SECOND OPTICAL ELEMENT | 0.212 | 0.190 | 0.896 |
| THIRD OPTICAL ELEMENT | 1.147 | 3.660 | 3.191 |
| FOURTH OPTICAL ELEMENT | −0.972 | −0.858 | 0.883 |

In Numerical Example 2, the third optical element B3 has the largest magnification ratio.

The pupil distance from the final image plane to an exit pupil is shown below. This value is calculated on the basis of the previously described paraxial tracing of the off-axial optical system. An azimuth is contained in the Y, Z cross-sectional plane (the surface of the sheet of the optical path diagram of FIG. 19).

|  | WIDE-ANGLE END | TELEPHOTO END |
| --- | --- | --- |
| EXIT PUPIL DISTANCE | −13.202 | −34.469 |

Incidentally, Numerical Example 2 is the variable magnification optical system in which the negative lens is provided in front of the stop of the third embodiment shown in FIG. 5.

NUMERICAL EXAMPLE 3

Figure 27:
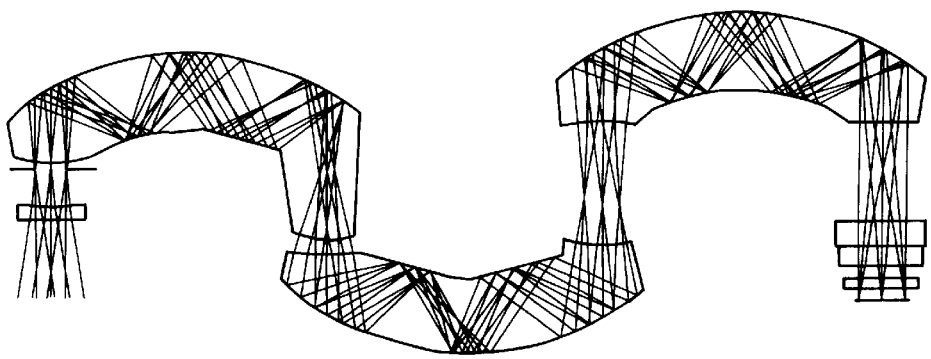
FIG. 27 is an optical cross-sectional view of Numerical Example 3 relative to its telephoto end.
Figure 26:
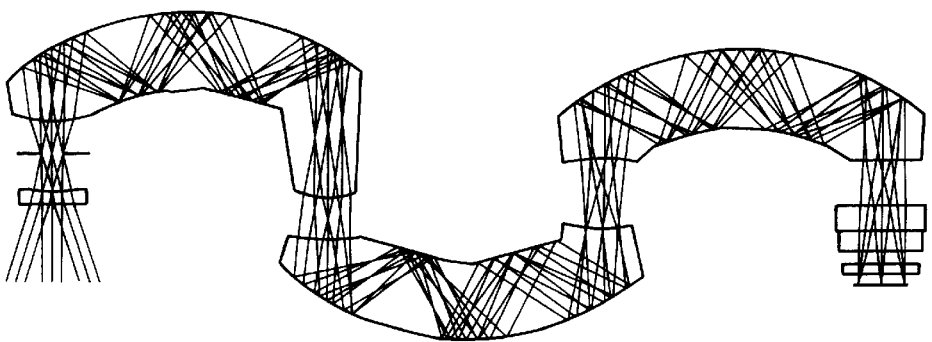
FIG. 26 is an optical cross-sectional view of Numerical Example 3 relative to its middle position.
Figure 25:
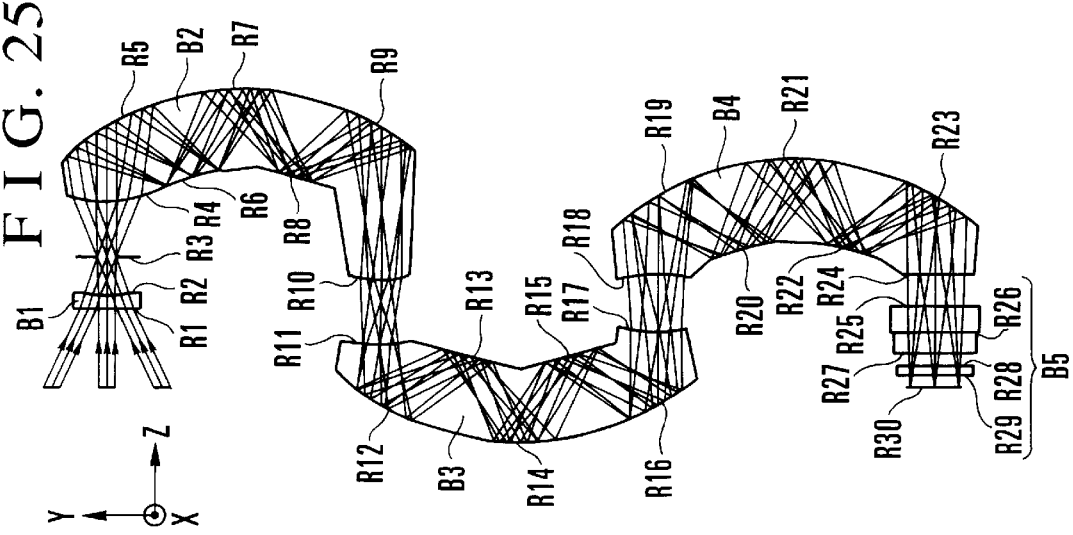
FIG. 25 is an optical cross-sectional view of Numerical Example 3 relative to its wide-angle end.

Numerical Example 3 is a variable magnification optical system having a magnification variation ratio of approximately 2.8×. FIGS. 25, 26 and 27 are cross-sectional views taken in the Y, Z plane, showing the respective optical paths of Numerical Example 3 relative to the wide-angle end (W), the middle position (M) and the telephoto end (T).

Constituent data for Numerical Example 3 are shown below.

|  | WIDE-ANGLE END | MIDDLE POSITION | TELEPHOTO END |
|---|---|---|---|
| HORIZONTAL HALF-ANGLE OF VIEW | 26.0 | 18.0 | 9.2 |
| VERTICAL HALF-ANGLE OF VIEW | 20.0 | 13.6 | 6.9 |
| APERTURE DIAMETER | 1.30 | 1.60 | 2.40 |

| i | Yi | Zi(W) | θi | Di | Ndi | νdi | |
|---|---|---|---|---|---|---|---|
| FIRST OPTICAL ELEMENT B1 (NEGATIVE LENS) | | | | | | | |
| 1 | 0.00 | 0.00 | 0.00 | 1.00 | 1.49700 | 81.61 | |
| 2 | 0.00 | 1.00 | 0.00 | 3.00 | 1 | | |
| 3 | 0.00 | 4.00 | 0.00 | VARIABLE | 1 | | STOP |
| SECOND OPTICAL ELEMENT B2 | | | | | | | |
| 4 | 0.00 | 8.18 | 0.00 | 6.00 | 1.58312 | 59.37 | REFRACTING SURFACE |
| 5 | 0.00 | 14.18 | 30.00 | 8.00 | 1.58312 | 59.37 | REFLECTING SURFACE |
| 6 | −6.93 | 10.18 | 15.00 | 8.00 | 1.58312 | 59.37 | REFLECTING SURFACE |
| 7 | −10.93 | 17.11 | 0.00 | 8.00 | 1.58312 | 59.37 | REFLECTING SURFACE |
| 8 | −14.93 | 10.18 | −15.00 | 8.00 | 1.58312 | 59.37 | REFLECTING SURFACE |
| 9 | −21.86 | 14.18 | −30.00 | 12.00 | 1.58312 | 59.37 | REFLECTING SURFACE |
| 10 | −21.86 | 2.18 | 0.00 | VARIABLE | 1 | | REFRACTING SURFACE |
| THIRD OPTICAL ELEMENT B3 | | | | | | | |
| 11 | −21.86 | −2.60 | 0.00 | 5.00 | 1.58312 | 59.37 | REFRACTING SURFACE |
| 12 | −21.86 | −7.60 | −30.00 | 8.00 | 1.58312 | 59.37 | REFLECTING SURFACE |
| 13 | −28.78 | −3.60 | −15.00 | 8.00 | 1.58312 | 59.37 | REFLECTING SURFACE |
| 14 | −32.78 | −10.52 | 0.00 | 8.00 | 1.58312 | 59.37 | REFLECTING SURFACE |
| 15 | −36.78 | −3.60 | 15.00 | 8.00 | 1.58312 | 59.37 | REFLECTING SURFACE |
| 16 | −43.71 | −7.60 | 30.00 | 6.00 | 1.58312 | 59.37 | REFLECTING SURFACE |
| 17 | −43.71 | −1.60 | 0.00 | VARIABLE | 1 | | REFRACTING SURFACE |
| FOURTH OPTICAL ELEMENT B4 | | | | | | | |
| 18 | −43.71 | 2.75 | 0.00 | 6.00 | 1.58312 | 59.37 | REFRACTING SURFACE |
| 19 | −43.71 | 8.75 | 30.00 | 8.00 | 1.58312 | 59.37 | REFLECTING SURFACE |
| 20 | −50.64 | 4.75 | 15.00 | 8.00 | 1.58312 | 59.37 | REFLECTING SURFACE |
| 21 | −54.64 | 11.68 | 0.00 | 8.00 | 1.58312 | 59.37 | REFLECTING SURFACE |
| 22 | −58.64 | 4.75 | −15.00 | 8.00 | 1.58312 | 59.37 | REFLECTING SURFACE |
| 23 | −65.57 | 8.75 | −30.00 | 6.00 | 1.58312 | 59.37 | REFLECTING SURFACE |
| 24 | −65.57 | 2.75 | 0.00 | VARIABLE | 1 | | REFRACTING SURFACE |
| BLOCK B5 | | | | | | | |
| 25 | −65.57 | 0.33 | 0.00 | 2.08 | 1.51400 | 70.00 | FILTER |
| 26 | −65.57 | −1.75 | 0.00 | 1.60 | 1.52000 | 74.00 | FILTER |
| 27 | −65.57 | −3.35 | 0.00 | 1.00 | 1 | | |
| 28 | −65.57 | −4.35 | 0.00 | 0.80 | 1.51633 | 64.15 | COVER GLASS |
| 29 | −65.57 | −5.15 | 0.00 | 0.91 | 1 | | |
| 30 | −65.57 | −6.06 | −0.00 | | 1 | | IMAGE PLANE |

|  | WIDE-ANGLE END | MIDDLE POSITION | TELEPHOTO END |
|---|---|---|---|
| D3 | 4.18 | 2.65 | 0.46 |
| D10 | 4.77 | 3.24 | 1.06 |
| D17 | 4.34 | 5.45 | 9.72 |
| D24 | 2.42 | 3.53 | 7.79 |
| R1–R3 | Zi(M) = Zi(W) | | Zi(T) = Zi(W) |
| R4–R10 | Zi(M) = Zi(W)−1.53 | | Zi(T) = Zi(W) − 3.72 |
| R11–R17 | Zi(M) = Zi(W) | | Zi(T) = Zi(W) |
| R18–R24 | Zi(M) = Zi(W)+1.11 | | Zi(T) = Zi(W) + 5.37 |
| R25 | Zi(M) = Zi(W) | | Zi(T) = Zi(W) |

SPHERICAL SHAPE

| R1 | $R_1 = \infty$ |
| R2 | $R_2 = 10.000$ |
| R4 | $R_4 = 10.000$ |
| R10 | $R_{10} = 6.000$ |
| R11 | $R_{11} = 30.000$ |
| R17 | $R_{17} = 16.000$ |
| R18 | $R_{18} = -16.000$ |
| R24 | $R_{24} = \infty$ |
| R25 | $R_{25} = \infty$ |
| R26 | $R_{26} = \infty$ |
| R27 | $R_{27} = \infty$ |
| R28 | $R_{28} = \infty$ |
| R29 | $R_{29} = \infty$ |

ASPHERICAL SHAPE

R5  $C_{02} = -2.76771e-02$  $C_{20} = -3.38475e-02$
    $C_{03} = 8.72588e-05$   $C_{21} = 1.27014e-03$
    $C_{04} = 9.91343e-05$   $C_{22} = 2.88418e-06$   $C_{40} = 1.95838e-04$

R6  $C_{02} = -1.33887e-02$  $C_{20} = -3.29802e-02$
    $C_{03} = -4.34730e-04$  $C_{21} = -1.56119e-02$
    $C_{04} = -3.34908e-04$  $C_{22} = 1.13638e-04$   $C_{40} = 3.54554e-03$

R7  $C_{02} = -2.76384e-02$  $C_{20} = -4.00638e-02$
    $C_{03} = -4.21455e-04$  $C_{21} = 1.38350e-04$
    $C_{04} = -6.85970e-05$  $C_{22} = -3.26960e-05$  $C_{40} = -1.32135e-04$

R8  $C_{02} = -6.69839e-04$  $C_{20} = -3.41563e-03$
    $C_{03} = 1.64573e-04$   $C_{21} = 2.45641e-03$
    $C_{04} = -5.36361e-05$  $C_{20} = -2.12330e-04$  $C_{40} = -6.79401e-04$

R9  $C_{02} = -3.02725e-02$  $C_{20} = -4.88968e-02$
    $C_{03} = 2.65523e-04$   $C_{21} = 6.32978e-04$
    $C_{04} = -1.32703e-04$  $C_{22} = 1.36494e-04$   $C_{40} = -1.26186e-04$

R12 $C_{02} = 3.15601e-02$   $C_{20} = 4.15702e-02$
    $C_{03} = 1.14258e-04$   $C_{21} = 7.07101e-04$
    $C_{04} = 1.34163e-05$   $C_{22} = 7.32145e-05$   $C_{40} = 9.20123e-05$

R13 $C_{02} = 2.52923e-04$   $C_{20} = 1.25782e-02$
    $C_{03} = 5.54522e-04$   $C_{21} = 1.12824e-02$
    $C_{04} = 4.04731e-05$   $C_{22} = -3.835520e-04$ $C_{40} = -2.60477e-04$

R14 $C_{02} = 2.53658e-02$   $C_{20} = 4.67700e-02$
    $C_{03} = -7.25493e-04$  $C_{21} = 3.83906e-03$
    $C_{04} = -1.17824e-04$  $C_{22} = 9.40586e-05$   $C_{40} = 1.88707e-04$

-continued

| | | | |
|---|---|---|---|
| R15 | $C_{02} = -1.44253e-03$ | $C_{20} = 3.51310e-03$ | |
| | $C_{03} = -3.30632e-04$ | $C_{21} = -8.16892e-04$ | |
| | $C_{04} = 7.74891e-06$ | $C_{22} = -1.02950e-04$ | $C_{40} = 3.13600e-04$ |
| R16 | $C_{02} = 1.82845e-02$ | $C_{20} = 2.24423e-02$ | |
| | $C_{03} = -1.24310e-04$ | $C_{21} = 1.54839e-03$ | |
| | $C_{04} = 4.33331e-05$ | $C_{22} = 1.05157e-04$ | $C_{40} = 8.03684e-05$ |
| R19 | $C_{02} = -2.31259e-02$ | $C_{20} = -3.24017e-02$ | |
| | $C_{03} = 2.36012e-04$ | $C_{21} = 5.79554e-04$ | |
| | $C_{04} = -1.77382e-05$ | $C_{22} = -6.03475e-05$ | $C_{40} = -8.56820e-05$ |
| R20 | $C_{02} = -2.33043e-02$ | $C_{20} = -6.17797e-02$ | |
| | $C_{03} = 6.98278e-04$ | $C_{21} = 8.01837e-03$ | |
| | $C_{04} = 1.59521e-04$ | $C_{22} = -1.91837e-04$ | $C_{40} = -3.96353e-03$ |
| R21 | $C_{02} = -2.89424e-02$ | $C_{20} = -3.42028e-02$ | |
| | $C_{03} = -7.45218e-05$ | $C_{21} = -2.41487e-04$ | |
| | $C_{04} = -3.79400e-06$ | $C_{22} = -1.45880e-04$ | $C_{40} = -7.80549e-05$ |
| R22 | $C_{02} = -2.14031e-02$ | $C_{20} = -3.63620e-02$ | |
| | $C_{03} = -1.52231e-03$ | $C_{21} = -9.02231e-04$ | |
| | $C_{04} = -2.27125e-04$ | $C_{22} = -2.01910e-04$ | $C_{40} = -3.56618e-04$ |
| R23 | $C_{02} = -2.18555e-02$ | $C_{20} = -3.11135e-02$ | |
| | $C_{03} = -1.02866e-04$ | $C_{21} = -1.08499e-04$ | |
| | $C_{04} = -2.44313e-05$ | $C_{22} = -3.44400e-05$ | $C_{40} = -4.75047e-05$ |

The construction of Numerical Example 3 will be described below. The first optical element B1 is a negative lens which has the first surface R1 and the second surface R2, and the third surface R3 is an aperture plane. The second optical element B2 is formed as one transparent body on which the fourth surface R4 (entrance refracting surface), the fifth to ninth surfaces R5 to R9 each of which is a decentered curved internal reflecting surface, and the tenth surface R10 (exit refracting surface) are formed. The third optical element B3 is formed as one transparent body on which the eleventh surface R11 (entrance refracting surface), the twelfth to sixteenth surfaces R12 to R16 each of which is a decentered curved internal reflecting surface, and the seventeenth surface R17 (exit refracting surface) are formed. The fourth optical element B4 is formed as one transparent body on which the eighteenth surface R18 (entrance refracting surface), the nineteenth to twenty-third surfaces R19 to R23 each of which is a decentered curved internal reflecting surface, and the twenty-fourth surface R24 (exit refracting surface) are formed.

The twenty-fifth to twenty-ninth surfaces R25 to R29 are those of plane parallel plates such as a filter and a cover glass. The surfaces R25 to R29 constitute the block B5. The thirtieth surface R30 is a final image plane in which the image pickup surface of an image pickup device such as a CCD is positioned.

The optical elements of Numerical Example 3 are grouped into four optical units which constitute a variable magnification optical system. Specifically, the first optical element B1 and the stop R3 constitute the first optical unit, the second optical element B2 constitutes the second optical unit, the third optical element B3 constitutes the third optical unit, and the fourth optical element B4 constitutes the fourth optical unit. The second and fourth optical units are magnification varying optical units which vary the relative position therebetween to vary the magnification of the variable magnification optical system.

An image forming operation for an object lying at infinity will be described below. First, a light beam which has passed through the first optical element B1 and the stop R3 in that order enters the second optical element B2. In the second optical element B2, the light beam is refracted by the fourth surface R4, then reflected from surface to surface by the fifth surface R5 to the ninth surface R9, then refracted by the tenth surface R10, and then exits from the second optical element B2. During this time, a primary image is formed in the vicinity of the sixth surface R6, and a secondary image is formed between the ninth surface R9 and the tenth surface R10. A pupil is formed in the vicinity of the eighth surface R8.

Then, the light beam enters the third optical element B3. In the third optical element B3, the light beam is refracted by the eleventh surface R11, then reflected from surface to surface by the twelfth surface R12 to the sixteenth surface R16, then refracted by the seventeenth surface R17, and then exits from the third optical element B3. During this time, a tertiary image forming plane is formed between the thirteenth surface R13 and the fourteenth surface R14 when the focal length is at the wide-angle end, or in the vicinity of the fourteenth surface R14 when the focal length is at the telephoto end. A pupil is formed between the fifteenth surface R15 and the sixteenth surface R16 when the focal length is at the wide-angle end, or in the vicinity of the fourteenth surface R14 when the focal length is at the telephoto end.

Then, the light beam enters the fourth optical element B4. In the fourth optical element B4, the light beam is refracted by the eighteenth surface R18, then reflected from surface to surface by the nineteenth surface R19 to the twenty-third surface R23, then refracted by the twenty-fourth surface R24, and then exits from the fourth optical element B4. During this time, a quaternary image forming plane is formed between the nineteenth surface R19 and the twentieth surface R20 when the focal length is at the wide-angle end, or in the vicinity of the twentieth surface R20 when the focal length is at the telephoto end. A pupil is formed in the vicinity of the twenty-second surface R22 when the focal length is at the wide-angle end, or in the vicinity of the twenty-third surface R23 when the focal length is at the telephoto end.

The light beam which has exited from the fourth optical element B4 passes through the twenty-fifth to twenty-ninth surfaces R25 to R29, and finally forms an object image on the thirtieth surface R30 which is a quinary image forming plane.

In Numerical Example 3, the entering reference axis and the exiting reference axis of each of the second optical element B2, the third optical element B3 and the fourth optical element B4 are parallel to each other, but differ from each other by 180° in direction.

The movements of the respective optical elements during a magnification varying operation will be described below. During the magnification varying operation, the first optical element B1 and the stop R3 which constitute the first optical unit, the third optical element B3, and the block B5 are fixed and do not move. As the focal length varies from the wide-angle end toward the telephoto end, the second optical element B2 moves in the Z minus direction in parallel with the entering reference axis of the second optical element B2. In the meantime, the fourth optical element B4 moves in the Z plus direction in parallel with the entering reference axis of the fourth optical element B4.

During the magnification varying operation, the filter, the cover glass and the thirtieth surface R30 which is the final image plane do not move.

Thus, as the focal length varies from the wide-angle end toward the telephoto end, the distance between the second optical element B2 and the third optical element B3 is decreased, the distance between the third optical element B3 and the fourth optical element B4 is increased, and the distance between the fourth optical element B4 and the twenty-fifth surface R25 is increased.

In addition, as the focal length varies from the wide-angle end toward the telephoto end, the entire optical path length which extends from the first surface R1 to the final image plane R30 becomes temporarily shorter and then longer.

Figure 28:
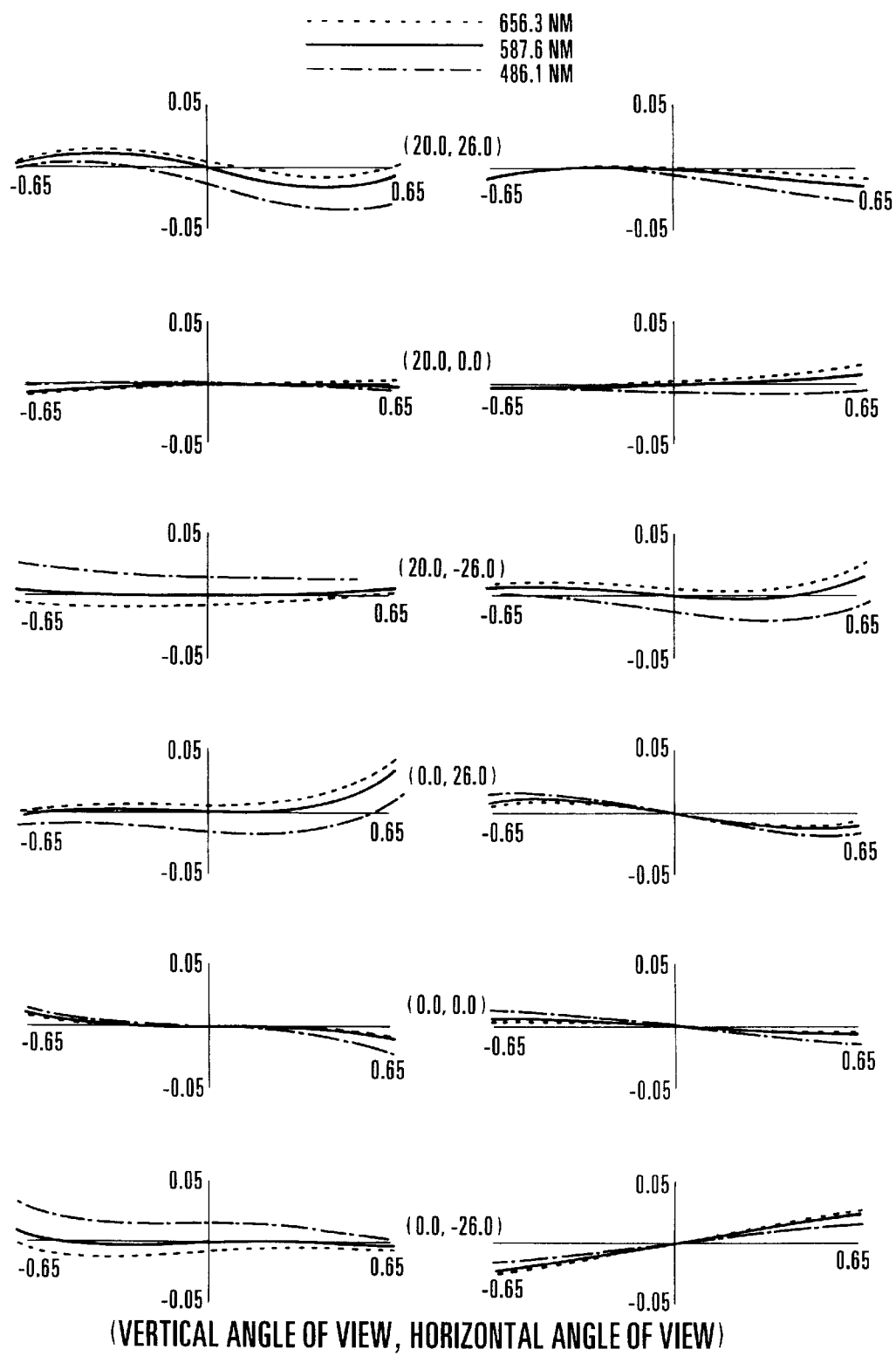
FIG. 28 is a lateral aberration chart of Numerical Example 3 relative to the wide-angle end.
Figure 29:
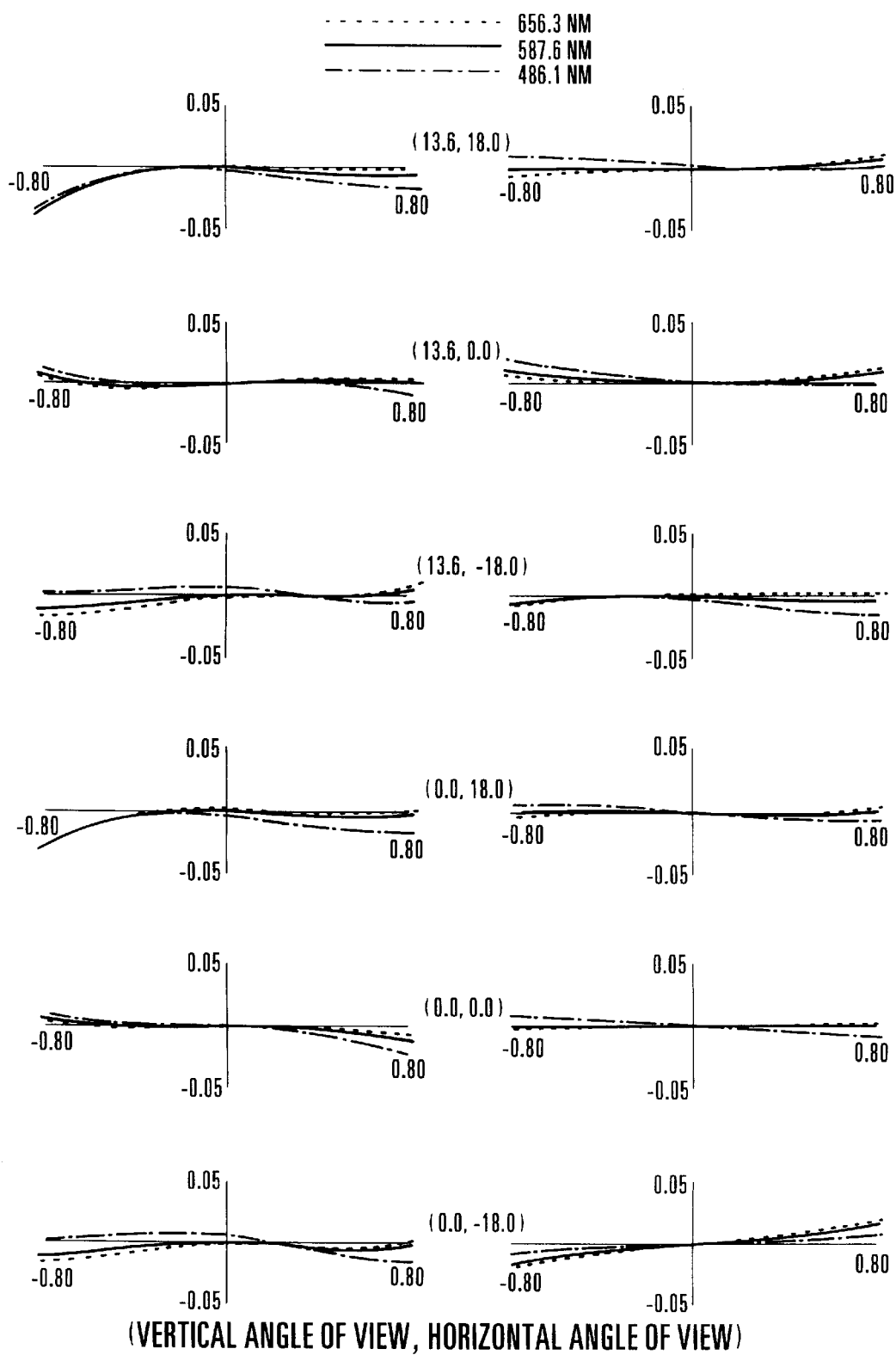
FIG. 29 is a lateral aberration chart of Numerical Example 3 relative to the middle position.
Figure 30:
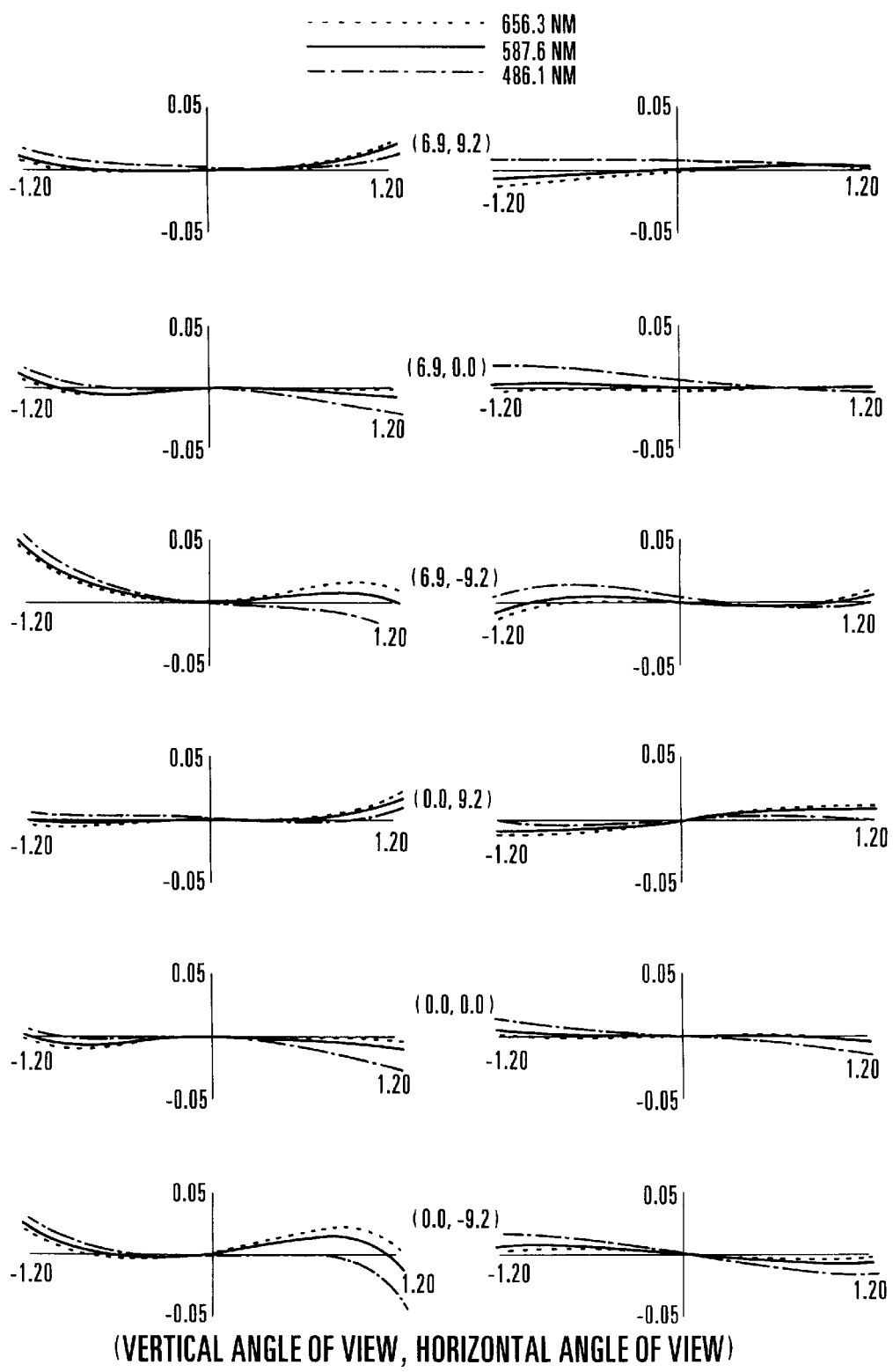
FIG. 30 is a lateral aberration chart of Numerical Example 3 relative to the telephoto end.

FIGS. 28, 29 and 30 show lateral aberration charts of Numerical Example 3 relative to the wide-angle end (W), the middle position (M) and the telephoto end (T). The respective lateral aberration charts show lateral aberrations in the Y and X directions, relative to six light beams which enter Numerical Example 3 at different angles of incidence of $(u_Y, u_X)$, $(0, u_X)$, $(-u_Y, u_X)$, $(u_Y, 0)$, $(0, 0)$ and $(-u_Y, 0)$, respectively. The horizontal axis of each of the lateral aberration charts represents the height of incidence in the Y or X direction of a light beam which is incident on each of the entrance pupils.

As can be seen from these figures, Numerical Example 3 is capable of achieving well-balanced correction of aberration at each zoom position.

In addition, the optical system of Numerical Example 3 is approximately 9.1 mm thick for an image size of 3.76 mm×2.82 mm. In Numerical Example 3, particularly because each of the optical elements and the entire optical system has a small thickness and each of the optical elements can be constructed by forming reflecting surfaces on predetermined sides of a plate-shaped transparent body, it is possible to readily construct a variable magnification optical system which is thin as a whole, by adopting a mechanism which causes two optical elements to move along a surface of one base plate.

Incidentally, in Numerical Example 3, although a chromatic aberration is caused by a plurality of refracting surfaces, the curvature of each of the refracting surfaces is appropriately determined so that the chromatic aberration is corrected over the entire range of variation of magnification. In particular, an axial chromatic aberration which occurs at the fourth surface R4 is fully corrected by the negative lens disposed immediately in front of the stop.

The values and its ratio of the lateral magnification of each of the second optical element B2 to the fourth optical element B4 relative to the wide-angle end and the telephoto end are shown below. The values shown below are calculated by using the aforesaid equation 19. An azimuth is contained in the Y, Z cross-sectional plane (the surface of the sheet of the optical path diagram of FIG. 25).

| | WIDE-ANGLE END | TELE-PHOTO END | $\left(\dfrac{\text{TELEPHOTO}}{\text{END}}\right) / \left(\dfrac{\text{WIDE-ANGLE}}{\text{END}}\right)$ |
|---|---|---|---|
| SECOND OPTICAL ELEMENT | 0.231 | 0.269 | 1.164 |
| THIRD OPTICAL ELEMENT | 1.190 | 4.010 | 3.370 |
| FOURTH OPTICAL ELEMENT | −0.742 | −0.539 | 0.726 |

In Numerical Example 3, the third optical element B3 has the largest magnification ratio.

Incidentally, Numerical Example 3 is the variable magnification optical system in which the negative lens is provided in front of the stop of the fourth embodiment shown in FIG. 6.

Incidentally, if the first optical unit is not a fixed lens but a moving optical unit, the aforesaid ratio of (the lateral magnification at the telephoto end) to (the lateral magnification at the wide-angle end) becomes "1" because of the same image forming magnification.

Since a fixed optical unit is provided in the variable magnification optical system according to the present invention, if the fixed optical unit is formed as a transparent body on which an entrance refracting surface a plurality of internal reflecting surfaces each of which is a decentered curved surface, and an exiting reference axis are formed, the exiting reference axis can be inclined by an arbitrary angle with respect to the entering reference axis. Accordingly, the degree of freedom of layout with which the .variable magnification optical system is to be arranged on one base plate is extremely increased.

Since each of Numerical Examples 1 to 3 is constructed in such a manner that an object image is formed at least twice in a variable magnification optical system, the thickness of the variable magnification optical system can be made small in spite of its wide angle of view. In addition, since decentered concave reflecting surfaces are provided in the moving optical unit (the moving optical unit B) lying on the image-plane side of the fixed optical unit, and also in another optical unit, the optical path in the variable magnification optical system is bent into a desired shape so that the entire length of the variable magnification optical system is reduced in a predetermined direction. Furthermore, the reflecting surfaces of the moving optical unit B are formed to have cross sections which are asymmetrical in a plane containing the entering reference axis and the exiting reference axis. Accordingly, the variable magnification optical system can be realized as a small-sized high-performance variable magnification optical system which is fully corrected for decentering aberration over the entire range of variation of magnification.

In accordance with the present invention having the aforesaid arrangement and construction, a variable magnification optical system, in which at least three optical units, a moving optical unit, a fixed optical unit and a moving optical unit are arranged in that order from an object side and the magnification of the variable magnification optical system is varied by the relative movement between the two moving optical units, can be realized as a high-performance variable magnification optical system which is capable of varying the magnification while varying the optical path length from an object to a final image plane with the final image forming plane spatially fixed, so that the thickness of the variable magnification optical system is small in spite of its wide angle of view and its entire length is short in a predetermined direction as well as its decentering aberration is fully corrected over the entire range of variation of magnification. In addition, an image pickup apparatus using such high-performance variable magnification optical system is achieved.

In addition, it is possible to achieve a variable magnification optical system having at least one of the following effects and advantages, and an image pickup apparatus employing such a variable magnification optical system.

Since a stop is arranged on the object side of the variable magnification optical system or in the vicinity of the first surface and an object image is formed by a plurality of times in the variable magnification optical system, the effective diameter and the thickness of the variable magnification optical system can be made small in spite of its wide angle of view.

Since each optical unit employs an optical element having a plurality of reflecting surfaces having appropriate refractive powers and the reflecting surfaces are arranged in a decentered manner, the optical path in the variable magnification optical system can be bent into a desired shape to reduce the entire length of the variable magnification optical system in a predetermined direction.

A plurality of optical elements which constitute the variable magnification optical system are each formed as a transparent body on which two refracting surfaces and a plurality of reflecting surfaces are integrally formed in such a manner that each of the reflecting surfaces is arranged in a decentered manner and is given an appropriate refractive power. Accordingly, the decentering aberration of the variable magnification optical system can be fully corrected over the entire range of variation of magnification.

Since each magnification varying optical unit employs an optical element which is formed as a transparent body on which two refracting surfaces and a plurality of curved or plane reflecting surfaces are integrally formed, not only is it possible to reduce the entire size of the variable magnification optical system, but it is also possible to solve the problem of excessively strict arrangement accuracy (assembly accuracy) which would have often been experienced with reflecting surfaces.

A variator optical unit which shows a largest amount of variation of magnification during a magnification varying operation is fixed, and an optical unit lying on the object side of the variator optical unit is moved to vary the magnification of the variable magnification optical system, so that an exit pupil on its telephoto side can be formed at a position more distant from an image plane than that on its wide-angle side. Accordingly, by appropriately setting the position of the exit pupil at the wide-angle end, it is possible to restrain occurrence of shading over the entire range of variation of magnification in an image pickup apparatus employing a solid-state image pickup device.

A variator optical unit which shows a largest amount of variation of magnification during a magnification varying operation is composed of an optical element having an entering reference axis and an exiting reference axis which differ from each other by 180° in direction. The variator optical unit is fixed, and an optical unit lying on the object side of the variator optical unit is moved to vary the magnification of the variable magnification optical system, so that the distance of movement of a moving optical unit positioned on the image-plane side of the variator optical unit can be reduced.

Yet another embodiment will be described below.

Figure 43:
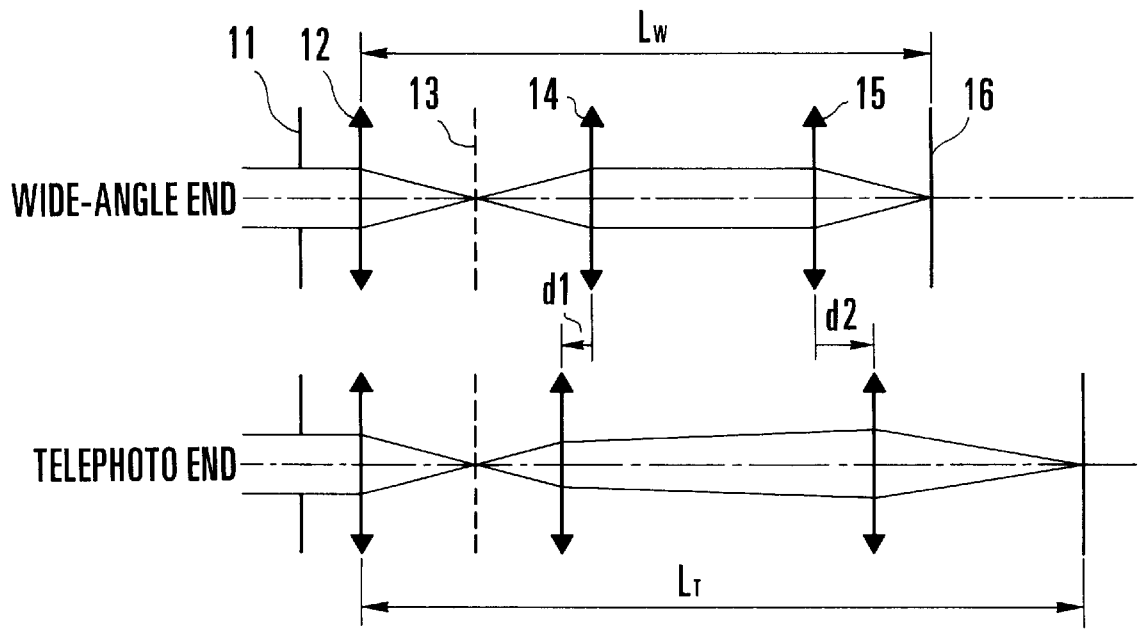
FIG. 43 is an explanatory view showing the variable magnification optical system according to the present invention in the form of a coaxial refracting system.

FIG. 43 is an explanatory view showing a variable magnification optical system according to the present invention in the form of a coaxial refracting optical system. The variable magnification optical system shown in FIG. 43 includes the stop 11 and the first optical unit 12 which is fixed during a magnification varying operation and has a positive refractive power, and the intermediate image 13 is formed by the first optical unit 12. The variable magnification optical system also includes the second optical unit 14 and the third optical unit 15 which moves relative to each other to perform the magnification varying operation. A solid-state image pickup device or the like is disposed in the final image forming plane (final image plane) 16.

The image forming operation of the variable magnification optical system will be described below.

A light beam which has passed through the stop 11 forms the intermediate image 13 by means of the first optical unit 12. The intermediate image 13 becomes an object point for a combined system consisting of the second optical unit 14 and the third optical unit 15, and such combined system serves as a finite-distance image forming optical system to again form an image on the final image forming plane 16. The second and third optical units 14 and 15 move relative to each other to vary the image forming magnification of the combined system, thereby varying the image forming magnification of the variable magnification optical system.

Figure 44:
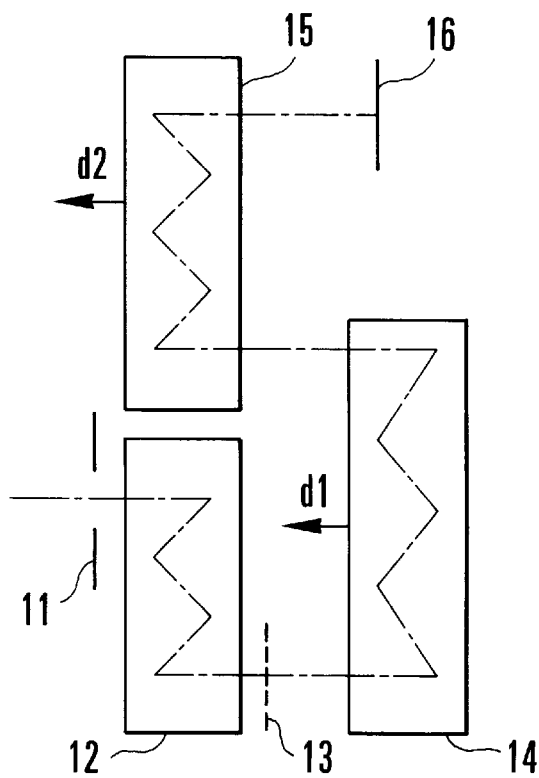
FIG. 44 is a view showing the optical arrangement of a fifth embodiment according to the present invention.

FIG. 44 is a view of the optical arrangement of a fifth embodiment of the variable magnification optical system according to the present invention. The optical arrangement shown in FIG. 44 includes the first optical unit 12, the second optical unit 14 and the third optical unit 15 each of which has a plurality of reflecting surfaces which are inclined with respect to the reference axis. In FIG. 44, although the first to third optical units are schematically shown, their reflecting surfaces are not shown. A dot-dashed line represents a principal ray which passes through the first to third optical units while being repeatedly reflected by the reflecting surfaces (not shown) in each of the optical units, and reaches the center of the final image forming plane 16. As is apparent from the above description, the variable magnification optical system according to the present invention is composed of optical units each having decentered reflecting surfaces, and an optical axis similar to that of the coaxial optical system does not definitely exist. For this reason, as described previously, a ray which passes through the center of the stop of the variable magnification optical system and reaches the center of the final image forming plane is determined as a reference axis ray, and the reference axis ray is defined as a reference axis.

In the variable magnification optical system of the fifth embodiment, the stop 11 is disposed on the object side of the first optical unit 12 or in the vicinity of the first surface, and reflecting surfaces are used in the first optical unit 12 so as to collect a light beam, so that the first optical unit 12 can be made a thin optical system having a small effective diameter. In addition, since each of the second optical unit 14 and the third optical unit 15 is composed of decentered reflecting surfaces, the intermediate image formed by the first optical unit 12 can be relayed (again formed) by a compact arrangement. Accordingly, the variable magnification optical system of the fifth embodiment can be realized as a variable magnification optical system which is thin in spite of its wide angle of view, as will be described later in several numerical examples. Incidentally, the "thickness of an optical system" referred to herein means the thickness taken in a direction perpendicular to the surface of the sheet of FIG. 44, and the term "thin" or similar expressions used herein mean that such thickness is small.

The magnification varying operation of the variable magnification optical system shown in FIG. 44 will be described below. FIG. 44 is a view showing that the variable magnification optical system is set to the wide-angle end. The second optical unit 14 and the third optical unit 15 move independently of each other, for example, in the directions of the respective arrows, thereby effecting a magnification varying operation. During the magnification varying operation, as the focal length varies from the wide-angle end to the telephoto end, the distance between the first optical unit 12 and the second optical unit 14 is decreased, while the distance between the third optical unit 15 and the image plane 16 is increased. Each optical unit which is responsible for the magnification varying operation is called the magnification varying optical unit, and all the optical units from the magnification varying optical unit which is closest to the object side to the magnification varying optical unit closest to the image side are collectively called the magnification varying portion.

Letting d1 be the amount of movement of the second optical unit 14 and d2 the amount of movement of the third optical unit 15, and letting $L_W$ be the value of the optical path length from the first surface numbered from the object side of the variable magnification optical system to the final image forming plane 16 when the focal length is at the wide-angle end, and letting $L_T$ be the value of such optical path length when the focal length is at the telephoto end, if the following condition is satisfied:

$$L_T = L_W + 2(d2-d1), \qquad \text{(Condition 1)}$$

the final image forming plane 16 can be fixed at a constant position in the arrangement shown in FIG. 44 even during the magnification varying operation.

If d1 and d2 are not equal in Condition 1, i.e., the amounts of movements of the second optical unit 14 and the third optical unit 15 are not equal, the entire optical length L of the entire variable magnification optical system varies. To satisfy Condition 1, in the variable magnification optical system of the fifth embodiment, the magnification varying optical units 14 and 15 are cooperatively assembled, and each of the magnification varying optical units 14 and 15 is constructed in such a manner that its entering reference axis and its exiting reference axis differ from each other by 180° in direction. In this arrangement and construction, since the optical path length of the entire variable magnification optical system can be varied with the final image forming plane 16 physically fixed, there is no need to move an image pickup device provided with electrical wiring or the like, so that the construction of the entire image pickup apparatus can be simplified.

The variable magnification optical system of the fifth embodiment repeats intermediate image formation to form an aberration-corrected image on the final image forming plane. Since a pupil is present between each of the intermediate image forming planes and the adjacent one, the variable magnification optical system of the fifth embodiment repeats pupil image formation to form an exit pupil relative to the entire variable magnification optical system. To correct the off-axial distortion of such optical system, it is preferable that a principal ray which symmetrically enters from an object plane at each angle of view repeats image formation from one pupil plane to another while maintaining the symmetry of the principal ray. In other words, it is necessary to correctly relay both image formation and pupil formation relative to an object image. The fifth embodiment of the variable magnification optical system has the basic arrangement in which each of the magnification varying optical units has at least three decentered concave reflecting surfaces each having a positive refractive power. Such basic arrangement can compatibly realize image formation and pupil formation and can also realize a thin variable magnification optical system.

The fifth embodiment of the variable magnification optical system according to the present invention has the aforesaid decentered reflecting surfaces and, therefore, suffers various decentering aberrations. To correct these decentering aberrations over the entire range of variation of magnification, it is necessary to correct the decentering aberrations in the respective optical units or to make the decentering aberrations cancel one another among the optical units. Although the object point of each of the magnification varying optical units moves during a magnification varying operation, it is generally difficult to correct a decentering aberration in the corresponding optical unit itself irrespective of the movement of the object point. For this reason, the concave reflecting surfaces of each of the magnification varying optical units of the fifth embodiment have cross-sectional shapes which are asymmetrical on the surface of the sheet of FIG. 44, so that the decentering aberration is corrected as fully as possible in the corresponding optical unit with respect to a particular object point. In addition, decentering aberration variations due to the movement of the object point are made to cancel one another among the optical units. Thus, the variable magnification optical system is capable of correcting the decentering aberrations over the entire range of variation of magnification.

Figure 45:
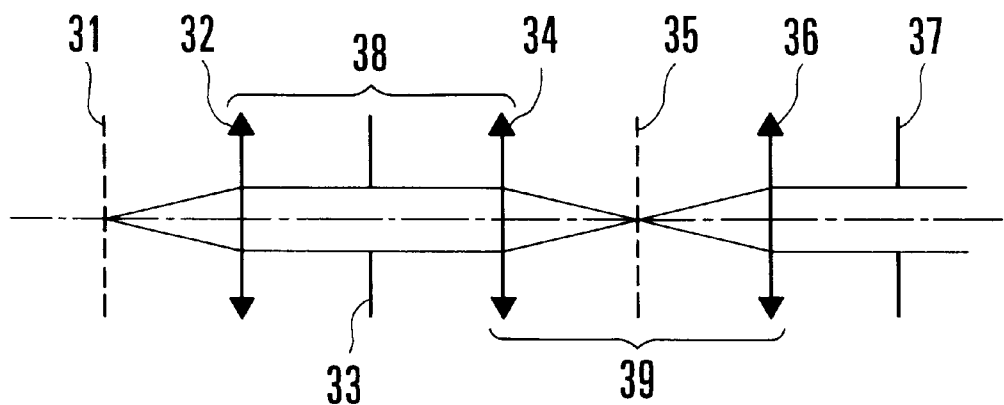
FIG. 45 is a view showing one basic arrangement of a magnification varying optical unit of the variable magnification optical system according to the present invention in the form of a coaxial refracting system.

The basic arrangement of a magnification varying optical unit suitable for use in the variable magnification optical system of the fifth embodiment will be described below. FIG. 45 is a view showing the basic arrangement of such magnification varying optical unit in the form of a coaxial refracting optical system. The optical system shown in FIG. 45 is an optical system which causes a light beam entering from an object point to exit as a parallel light beam. In FIG. 45, reference numeral 31 denotes an object plane of the magnification varying optical unit, reference numerals 32 and 34 denote surfaces each having a positive refractive power, reference numeral 33 denotes a pupil plane in a combined system 38 consisting of surfaces 32 and 34, and reference numeral 35 denotes an image forming plane of the combined system 38 consisting of the surfaces 32 and 34 Reference numeral 36 denotes a surface having a positive refractive power for forming the light beam from the image forming plane 35 into a parallel light beam. Reference numeral 37 denotes a pupil plane which is formed as an image of the pupil 33 by a combined system 39 consisting of the surfaces 34 and 36. If the focal lengths of the surfaces 32, 34 and 36 are the same and the distance between each of them is the same as the focal length, each of the combined systems 38 and 39 becomes a life-size optical system having a symmetrical arrangement. If such a life-size optical system is repeatedly arranged, an image can be relayed through a certain effective diameter. Accordingly, such repeated arrangement of the life-size optical system is suited to a thin optical system. In addition, since power surfaces are symmetrically arranged, off-axial aberration is cancelled, so that both image formation and pupil formation can be correctly relayed.

Figure 46:
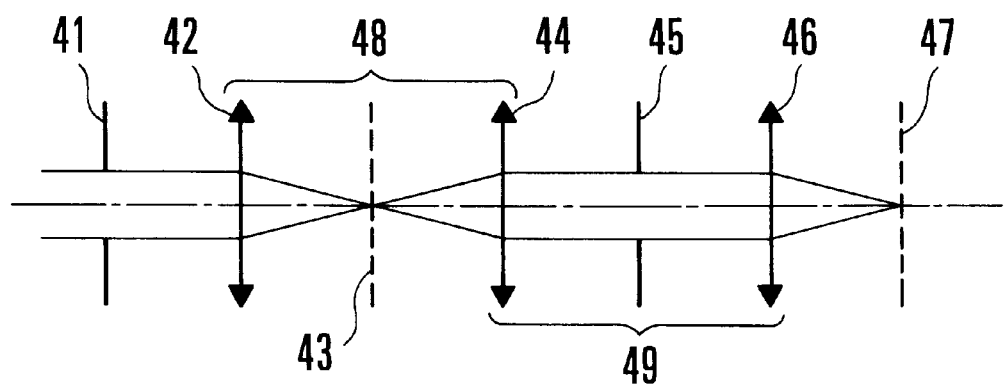
FIG. 46 is an explanatory view showing another basic arrangement of the magnification varying optical unit of the variable magnification optical system according to the present invention in the form of a coaxial refracting system.

FIG. 46 is a view similar to FIG. 45 and shows, in the form of a coaxial system, another basic arrangement of the magnification varying optical unit of the fifth embodiment of the variable magnification optical system according to the present invention. In FIG. 46, the arrangement of image forming planes and pupil planes is opposite to that of FIG. 45. In FIG. 46, reference numeral 41 denotes a pupil plane, reference numeral 42 denotes a surface having a positive refractive power for forming a parallel light beam from an object plane of the magnification varying optical unit which is at infinity, reference numeral 43 denotes an image forming plane formed by the surface 42, reference numerals 44 and 46 denote surfaces each having a positive refractive power, reference numeral 45 denotes a pupil plane formed by a combined system 48 consisting of the surfaces 42 and 44, and reference numeral 47 denotes an image forming plane which is formed with respect to the image forming plane 43 by a combined system 49 consisting of the surfaces 44 and 46. In FIG. 46 as well, if the focal lengths of the surfaces 42, 44 and 46 are the same and the distance between each of them is the same as the focal length similarly to FIG. 45, each of the combined systems 48 and 49 becomes a life-size optical system having a symmetrical arrangement, so that both image formation and pupil formation can be correctly relayed.

If the respective optical systems shown in FIGS. 45 and 46 are applied to the second optical unit 14 and the third optical unit 15 shown in FIG. 43, a relay optical system having a lateral magnification of 1× is formed by a combined system consisting of the second optical unit 14 and the third optical unit 15. If the entire variable magnification optical system is to be made thin, that state may be applied to the wide-angle end. Letting Z be a magnification variation ratio, if the magnification varying portion is designed so that the second optical unit 14 and the third optical unit 15 are moved in such a manner that the lateral magnification of their combined system becomes Z at the telephoto end, it is possible to realize a magnification varying portion which is capable of maintaining the thickness of the variable magnification optical system even at the wide-angle end. The variable magnification optical system according to the present invention is basically formed by assembling decentered reflecting surfaces on the basis of the aforesaid power arrangement.

Figure 47A:
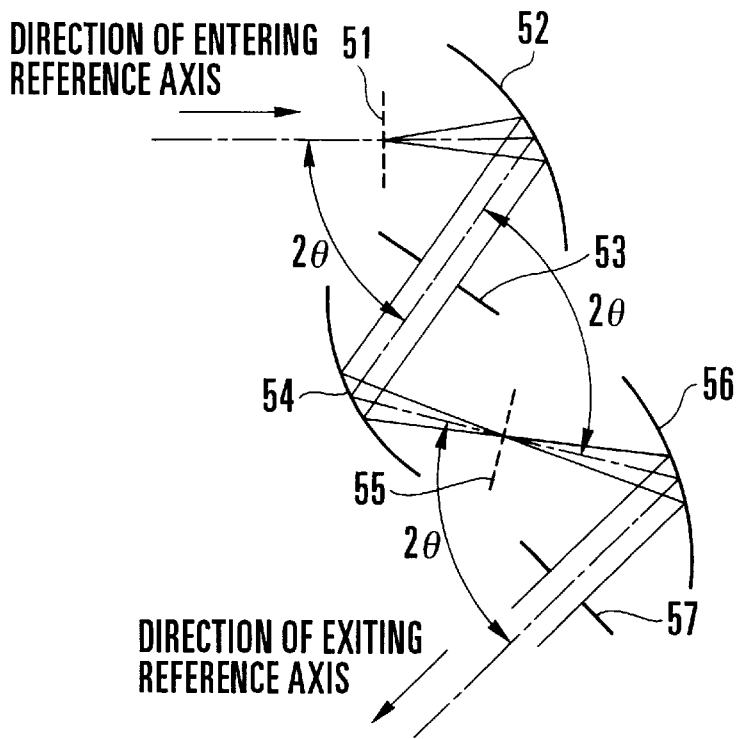
FIGS. 47(A) and 47(B) are explanatory views of the basic arrangement of the magnification varying optical unit of the variable magnification optical system according to the present invention.
Figure 47B:
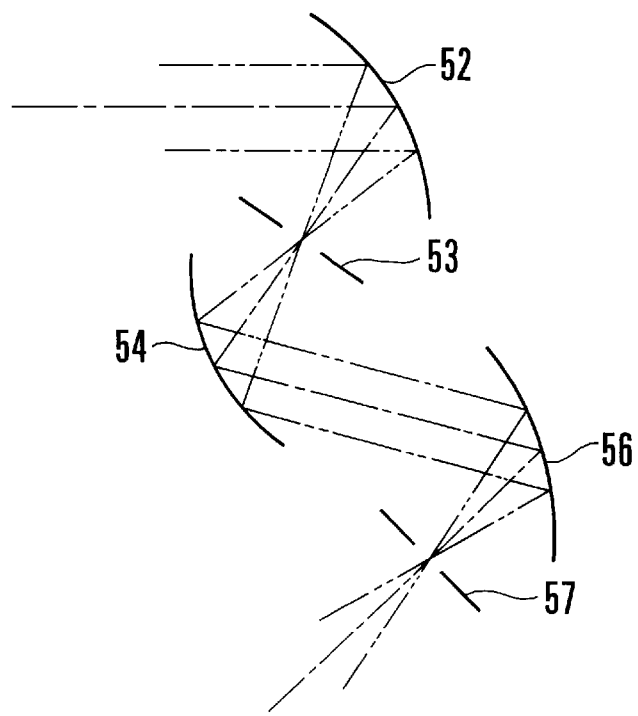

FIGS. 47(A) and 47(B) are explanatory views of the basic arrangement of a magnification varying optical unit for the variable magnification optical system of the fifth embodiment. The shown magnification varying optical unit has the arrangement shown in FIG. 45 and is composed of decentered reflecting surfaces. In each of FIGS. 47(A) and 47(B), reference numeral 51 denotes an object plane of the magnification varying optical unit, reference numerals 52 and 54 denote concave reflecting surfaces, reference numeral 53 denotes a pupil in a combined system consisting of the concave reflecting surfaces 52 and 54, reference numeral 55 denotes an intermediate image forming plane formed by a combined system consisting of the concave reflecting surfaces 52 and 54, reference numeral 56 denotes a concave reflecting surface, and reference numeral 57 denotes a pupil which is an image of the pupil plane 53 formed by a combined system consisting of the concave reflecting surfaces 54 and 56. The dot-dashed line shown in each of FIGS. 47(A) and 47(B) represents the aforesaid reference axis ray, and the dot-dashed line of FIG. 47(A) represents the optical path of an object ray passing through the center of the angle of view, while the dot-dashed line of FIG. 47(B) represents the optical path of a pupil ray (principal ray). Incidentally, in the arrangement shown in each of FIGS. 47(A) and 47(B), the distance between each of the object plane 51, the concave reflecting surface 52, the pupil plane 53, the concave reflecting surface 54, the image forming plane 55, the concave reflecting surface 56 and the pupil plane 57 is equal.

In the arrangement shown in each of FIGS. 47(A) and 47(B), the focal length of each reflecting surface is determined by the angle of incidence of the reference axis on the reflecting surface and the curvature thereof at the intersection of the reference axis and the reflecting surface, as described previously. Accordingly, innumerable combinations of the angle of incidence and the curvature are present with respect to a particular focal length. However, if off-axial aberration is to be cancelled between the combined system consisting of the reflecting surfaces 52 and 54 and the combined system consisting of the concave reflecting surfaces 54 and 56, the shapes of the reflecting surfaces 52, 54 and 56 preferably have symmetry. For this reason, the reflecting surfaces 52, 54 and 56 preferably have the same curvature. To make the focal lengths of the reflecting surfaces equal to one another, the angle of incidence of the reference axis on each surface needs to be made equal at θ (or 2θ in the case of the angle of the entering reference axis and the exiting reference axis).

However, in such an arrangement, it is impossible to construct the magnification varying optical unit in such a manner that its entering reference axis and its exiting reference axis of the magnification varying optical unit differ from each other by 180° in direction. Such a magnification varying optical unit cannot be applied to the second optical unit 14 shown in FIG. 44.

For the above-described reason, in the magnification varying optical unit of the variable magnification optical system of the fifth embodiment, five reflecting surfaces are formed by inserting a ray-folding reflecting surface between each of the three concave reflecting surfaces shown in each of FIGS. 47(A) and 47(B), so that the entering reference axis and the exiting reference axis of the magnification varying optical unit differ from each other by 180° in direction with the angle of incidence of the reference axis on each of the concave reflecting surfaces being equal.

The construction of the magnification varying optical unit of the fifth embodiment will be described below with reference to FIGS. 48(A) and 48(B).

Figure 48A:
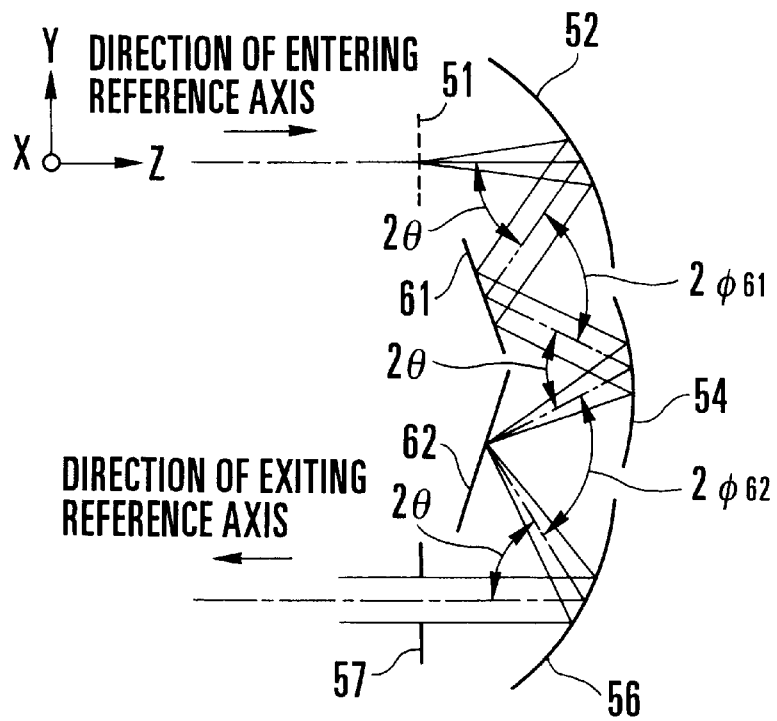
FIGS. 48(A) and 48(B) are views of the basic arrangement of the magnification varying optical unit of the variable magnification optical system according to the present invention.
Figure 48B:
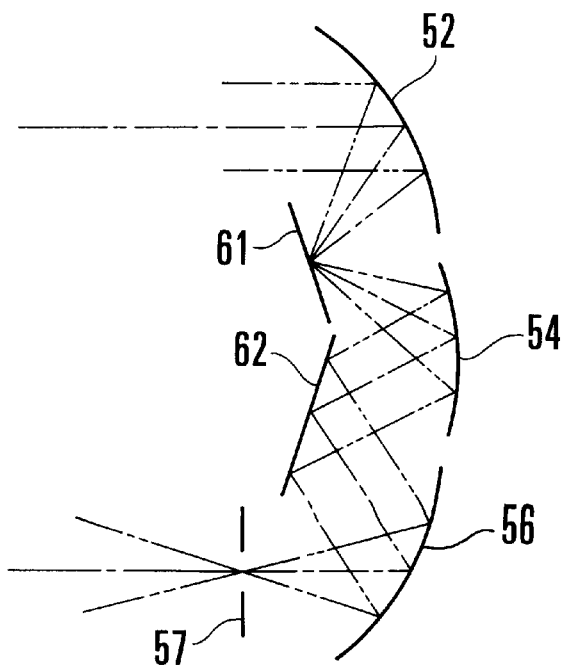

FIGS. 48(A) and 48(B) are views showing the construction of a magnification varying optical unit for the variable magnification optical system of the fifth embodiment. The dot-dashed line shown in each of FIGS. 48(A) and 48(B) represents the reference axis, and the dot-dashed line shown in FIG. 48(A) shows the optical path of an object ray passing through the center of the angle of view, while the dot-dashed line shown in FIG. 48(B) shows the optical path of a pupil ray (principal ray). FIGS. 48(A) and 48(B) show the arrangement in which ray-folding plane reflecting surfaces 61 and 62 are respectively inserted between the reflecting surfaces 52 and 54 and between the reflecting surfaces 54 and 56 in the arrangement of FIGS. 47(A) and 47(B), and the power arrangement of FIGS. 48(A) and 48(B) is identical to that shown in FIGS. 47(A) and 47(B), i.e., the curvature of each of the reflecting surfaces and the angle of incidence of the reference axis on each of the reflecting surfaces are the same as those of FIGS. 47(A) and 47(B). Letting $\phi_{61}$ and $\phi_{62}$ are the respective angles of incidence of the reference axis on the ray-folding plane reflecting surfaces 61 and 62, if the following relation is satisfied:

$$3\theta = \phi_{61} + \phi_{62},$$

the entering reference axis and the exiting reference axis of the magnification varying optical unit can be made to differ from each other by 180° in direction. Accordingly, the above-described arrangement can be applied to the second optical unit 14 shown in FIG. 44.

Similarly, if the arrangement shown in FIG. 48(A) is reversed so that a light beam travels from the pupil plane 57 to the object plane 51, this arrangement can be applied to another magnification varying optical unit, i.e., the third optical unit 15 shown in FIG. 44.

Incidentally, it is preferable that each of the concave reflecting surfaces (52, 54 and 56 in FIGS. 48(A) and 48(B)) of the magnification varying optical unit be formed in such a manner that the radius of curvature $R_y$ in a plane in which the reference axis is bent (on the surface of the sheet of FIGS. 48(A) and 48(B), i.e., in the Y, Z plane) is made different from the radius of curvature $R_x$ in a plane which is perpendicular to the Y, Z plane and contains a normal to a reference point of the concave reflecting surface. Letting θ be the angle of incidence of the reference axis on each of the concave reflecting surfaces, it is necessary to satisfy the aforesaid equation 28 so that the focal lengths in these two planes can be made coincident at the concave reflecting surface.

Figure 49:
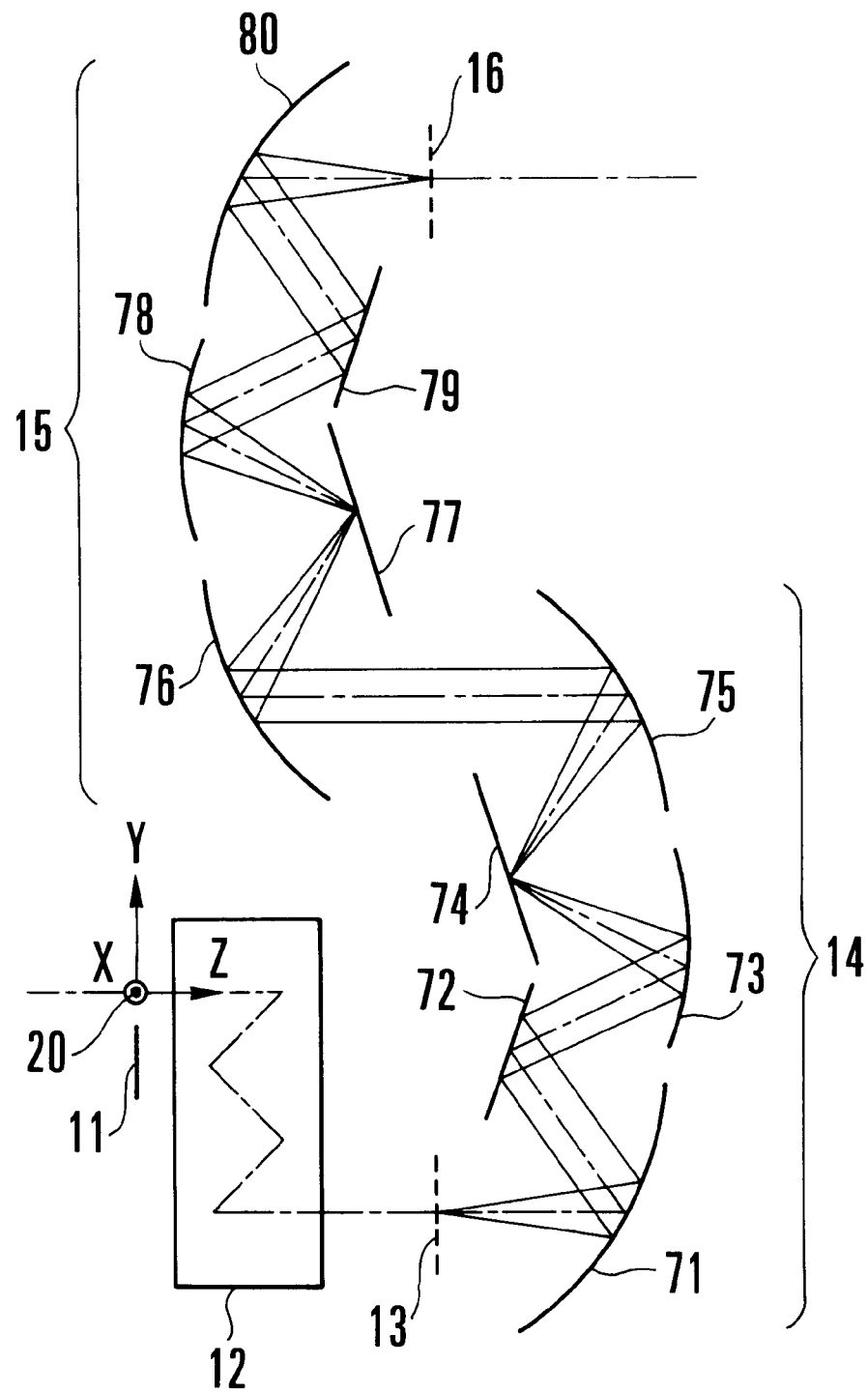
FIG. 49 is a view showing an arrangement of the fifth embodiment of the variable magnification optical system according to the present invention.

FIG. 49 is a view showing the arrangement of the fifth embodiment of the variable magnification optical system according to the present invention. The arrangement shown in FIG. 49 includes concave reflecting surfaces 71, 73, 75, 76, 78 and 80, and ray-folding reflecting surfaces 72, 74, 77 and 79, and the reflecting surfaces 71 to 75 constitute the second optical unit 14 and the reflecting surfaces 76 to 80 constitute the third optical unit 15. The second and third optical units 14 and 15 serve as magnification varying optical units, and the focal length f of each of the second and third optical units 14 and 15 is negative. In each of the magnification varying optical units 14 and 15, an on-axial light beam forms an intermediate image once.

In the present invention, letting $f_i$ be the focal length of the i-th magnification varying optical unit and letting k be the number of times by which a parallel on-axial light beam which has entered the i-th magnification varying optical unit forms an intermediate image in the i-th magnification varying optical unit, the magnification varying optical unit satisfies the following condition:

$$f_i(-1)^k > 0 \quad (k \text{ is an integer not less than 0}). \quad \text{(Condition 2)}$$

If the magnification varying optical unit satisfies Condition 2, an image can be relayed from one reflecting surface to another as intermediate images compactly folded by the reflecting surfaces, so that a thin magnification varying portion can be realized.

In the fifth embodiment, the magnification varying portion is formed by a combination of two optical units consisting of three concave reflecting surfaces having aspherical shapes and two ray-folding reflecting surfaces. In this arrangement, the second optical unit 14 and the third optical unit 15 in the arrangement of FIG. 44 are formed as optical units having the aforesaid arrangement.

Incidentally, the distance between each of the image forming plane 13 and the refracting surface 71, 72, 73, 74 and 75 is equal, and the distance between each of the refracting surface 76, 77, 78, 79 and 80 and the final image forming plane 16 is equal. In other words, letting D(i−1) be the distance between a reflecting surface Ri and a reflecting surface adjacent to the reflecting surface Ri on the object side thereof and letting Di be the distance between the reflecting surface Ri and a reflecting surface adjacent to the reflecting surface Ri on the image side thereof, the following relation is obtained:

$$\frac{Di}{D(i-1)} = 1. \quad \text{(Equation 29)}$$

Incidentally, to fully correct off-axial aberration, it is preferable that the refracting surfaces 71, 73, 75, 76, 78 and 80 be formed to have an asymmetrical shape in a plane in which the reference axis is bent (the Y, Z plane).

In the arrangement shown in FIG. 49, a longer distance between the reflecting surface 80 and the image forming plane 16 may be desired, i.e., a longer back focus may be desired, in order to dispose a glass member, such as a low-pass filter or an infrared cut-filter, immediately in front of the final image forming plane 16. For this purpose, the state in which life-size image formation is repeated by a plurality of times from the intermediate image forming plane 13 to the final image forming plane 16 may be altered as a whole, and the respective ray-folding reflecting surfaces 72, 74, 77 and 79 may be given appropriate curvatures so as to control the entire power arrangement at each of the ray-folding reflecting surfaces 72, 74, 77 and 79. Similarly to the concave reflecting surfaces, if the reflecting surfaces 72, 74, 77 and 79 are formed to have asymmetrical shapes in the plane in which the reference axis is bent (the Y, Z plane), off-axial aberration can be effectively corrected.

As described above, in the variable magnification optical system of the fifth embodiment, the concave reflecting surfaces 71, 73, 75, 76, 78 and 80 shown in FIG. 49 are formed by aspheric surfaces of rotational asymmetry, and the condition of movement of the variable magnification optical system satisfies Condition 1 referred to above. The reflecting surfaces 71, 73, 75, 76, 78 and 80 are formed in such a manner that the radii of curvature $R_x$ and $R_y$ of a paraxial region of each of the reflecting surfaces 71, 73, 75, 76, 78 and 80 slightly differ among the reflecting surfaces on the basis of the condition of Equation 28, specifically, within the following range:

$$.4 < \left( \frac{R_x}{R_y} \cdot \frac{1}{\cos^2\theta} \right) < 2.5. \quad \text{(Condition 3)}$$

In the variable magnification optical system according to the present invention, a focal length variation due to an azimuth must be corrected in the entire variable magnification optical system over the entire range of variation of magnification. For this purpose, it is preferable that such a focal length variation be corrected in one optical unit as fully as possible and the remaining non-corrected variation component be cancelled between the magnification varying optical units.

Above or below the limits of Condition 3, the amount of focal length variation due to an azimuth becomes large to such an extent that the amount of correction becomes extremely insufficient in each of the magnification varying optical units, with the result that such a focal length variation is difficult to cancel between the other magnification varying optical units over the entire range of variation of magnification.

Incidentally, the focal length variation due to the azimuth can be more effectively corrected by giving appropriate curvatures to the respective ray-folding reflecting surfaces 72, 74, 77 and 79. If the ray-folding reflecting surfaces 72, 74, 77 and 79 are formed by aspheric surfaces which are asymmetrical in the plane which contains the entering and exiting reference axes, off-axial aberration can be effectively corrected.

The aberrations may also be corrected by varying the distance between each of the reflecting surfaces from Equation 29 and controlling the power arrangement. The distance between each of the reflecting surfaces in the variable magnification optical system according to the present invention is set within a range which satisfies the following condition:

$$0.8 < \left( \frac{Di}{D(i-1)} \right) < 1.2. \quad \text{(Condition 4)}$$

Above or below the limits of Condition 4, the image forming action of a combined system consisting of adjacent two concave reflecting surfaces (for example, 71 and 73) in the arrangement shown in FIG. 49 is greatly deviated from life-size image formation with respect to image formation or pupil formation, so that the relation of cancellation of aberration between the two reflecting surfaces is impaired and, particularly, off-axial aberration becomes difficult to correct.

It is desirable that the three concave reflecting surfaces of each of the magnification varying optical units shown in FIG. 49 have the radius of curvature, as described previously in connection with FIGS. 47(A) and 47(B), but the power arrangement of the magnification varying optical units may be controlled to correct off-axial aberration. In the variable magnification optical system according to the present invention, if each of the magnification varying optical units contains a partial system which is formed by a concave reflecting surface i, a reflecting surface (i+1), and a concave reflecting surface (i+2) in that order, letting $R_{y,\,i}$ and $R_{y,\,i+2}$ be the radii of curvature of paraxial regions in a plane which contains the entering and exiting reference axes at the respective reference points of the concave reflecting surface i and the concave reflecting surface (i+2), the radii of curvature $R_{y,\,i}$ and $R_{y,\,i+2}$ are set within a range which satisfies the following condition:

$$0.5 < \left(\frac{R_{y,i+2}}{R_{y,i}}\right) < 2.0. \qquad \text{(Condition 5)}$$

Above or below the limits of Condition 5, the image forming action of a combined system consisting of adjacent two concave reflecting surfaces (for example, 71 and 73) is greatly deviated from life-size image formation with respect to image formation or pupil formation, so that the relation of cancellation of aberration between the two reflecting surfaces is impaired and, particularly, off-axial aberration becomes difficult to correct.

In addition, if the lateral magnification of the magnification varying portion composed of all the optical units is set to approximately "1" at the wide-angle end, it is possible to realize a variable magnification optical system which is kept thin and corrected for aberration over the entire range of variation of magnification. In the arrangement shown in FIG. 49, the size of the final image forming plane 16 is kept constant during a magnification varying operation, so that if the magnification variation ratio is set to Z, the effective image size in the intermediate image forming plane 13 at the wide-angle end becomes Z times that obtainable at the telephoto end. Accordingly, the respective effective sizes of the planes in the optical units 14 and 15 are basically determined at the wide-angle end. Accordingly, it is preferable to set the lateral magnification of the entire magnification varying portion to not greater than "1" at the wide-angle end.

Basically, if image formation and pupil formation are to be correctly relayed in each of the magnification varying optical units, it is preferable to relay both of them through life-size image formation. For this reason, it is desirable that the lateral magnification of the magnification varying portion at the wide-angle end be approximately "1". However, in the present invention, in order to extend back focus, the power arrangement is controlled by adjusting the life-size image formation within the range represented by Conditions 3 to 5. The life-size image formation is adjusted in such a way that a plurality of image formations and pupil formations in the magnification varying portion are varied within a range in which correction of aberration is possible on the basis of the life-size image formation.

Accordingly, the lateral magnification of the entire magnification varying portion which is determined by summing up individual image formations or pupil formations deviated from the life-size image formation is set to a value in a particular range centered at "1". The lateral magnification at the wide-angle end of the magnification varying portion of the variable magnification optical system according to the present invention satisfies the following condition:

$$0.5 < |\beta_W| < 1.5. \qquad \text{(Condition 6)}$$

Incidentally, the lateral magnification of a decentered optical system can be calculated by using Equation 19. Strictly, the lateral magnification $\beta_W$ is a paraxial value which is calculated in the range of from a plane which is closest to the object side in a magnification varying optical unit which is closet to the object side to a plane which is closest to the image-plane side in a magnification varying optical unit which is closest to the image-plane side.

Incidentally, the aforesaid magnification varying optical unit according to the present invention may be a surface mirror whose medium is gas present among its reflecting surfaces, or a transparent body on which a plurality of internal reflecting surfaces are formed, i.e., a transparent body which is composed of a medium other than gas and internally reflects an entering ray. FIG. 49 shows the former arrangement.

Figure 50:
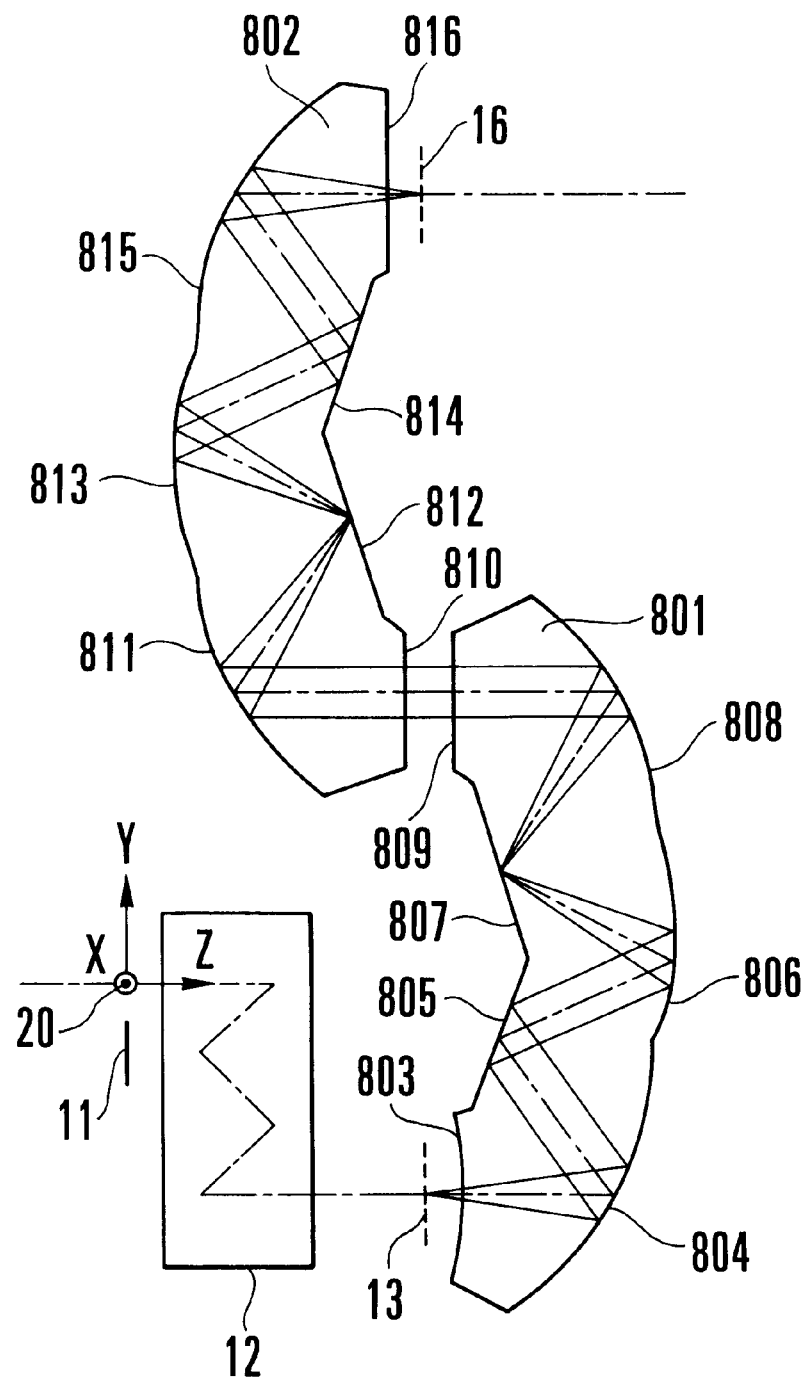
FIG. 50 is a view showing another arrangement of the fifth embodiment of the variable magnification optical system according to the present invention.

FIG. 50 shows another optical arrangement which adopts the latter arrangement. Each optical element 801 and 802 is formed as a transparent body made of glass, plastics or the like, and serves as a magnification varying optical unit.

The optical element 801 includes a refracting surface 803 which is formed on the optical element 801 and allows a light beam from the intermediate image forming plane 13 to enter the optical element 801, internal reflecting surfaces 804, 805, 806, 807 and 808 each having a reflecting film formed on the surface of the optical element 801, and a refracting surface 809 which allows the light beam to exit from the optical element 801. The optical element 802 includes a refracting surface 810 which is formed on the optical element 802 and allows the light beam from the optical element 801 to enter the optical element 802, internal reflecting surfaces 811, 812, 813, 814 and 815 each having a reflecting film formed on the surface of the optical element 802, and a refracting surface 816 which allows the light beam to exit from the optical element 802

Each of the aforesaid reflecting surfaces is set in a way which is basically identical to that described above in connection with the reflecting surfaces shown in FIG. 49. However, if the sizes of an intermediate image and a pupil formed in each of the optical elements 801 and 802 are set equivalently to the arrangement of FIG. 49 whose medium is air, the sizes in an actual optical element become smaller according to the ratio of the refractive index of the transparent body to the refractive index of air. Accordingly, the arrangement of FIG. 50 can be made thin compared to that of FIG. 49. In other words, in the arrangement of FIG. 50, since the pupil size can be made larger for the same thickness, the amount of light can be increased. Accordingly, if a bright variable magnification optical system is needed, each of the magnification varying optical units is preferably formed as a transparent body on which two refracting surfaces and a plurality of refracting surfaces are formed.

Incidentally, in each of the variable magnification optical systems shown in FIGS. 49 and 50, focusing can be effected by moving any one of the first to third optical units in the direction of the reference axis. For example, an object which lies at a closest distance can be focused by moving the first optical unit toward an object side (toward the left as viewed in FIG. 49 or 50), or by moving the second optical unit in a direction away from the first optical unit (toward the right as viewed in FIG. 49 or 50), or by moving the third optical unit in a direction away from the second optical unit (toward the left as viewed in FIG. 49 or 50). In particular, since the second and third optical units are arranged to move in parallel with their respective entering reference axes, if the second and third optical units are used as focusing optical units, a magnification varying mechanism can be used without modification for the purpose of focusing, so that the required number of constituent components can be reduced. In such arrangement, either or both of the second and third optical units may be moved.

Incidentally, each of the optical elements 801 and 802 may be prepared by cutting a transparent material into a shape having the required refracting and reflecting surfaces, or by molding with a mold having the inverse shape of the required refracting and reflecting surfaces. If the optical elements 801 and 802 are prepared by either method, the position accuracy of the surfaces is higher than when each surface is independently formed, so that adjustment of positions, inclinations or the like can be omitted. In addition, since members for supporting the reflecting surfaces are not needed, the required number of constituent components is reduced.

Figure 51:
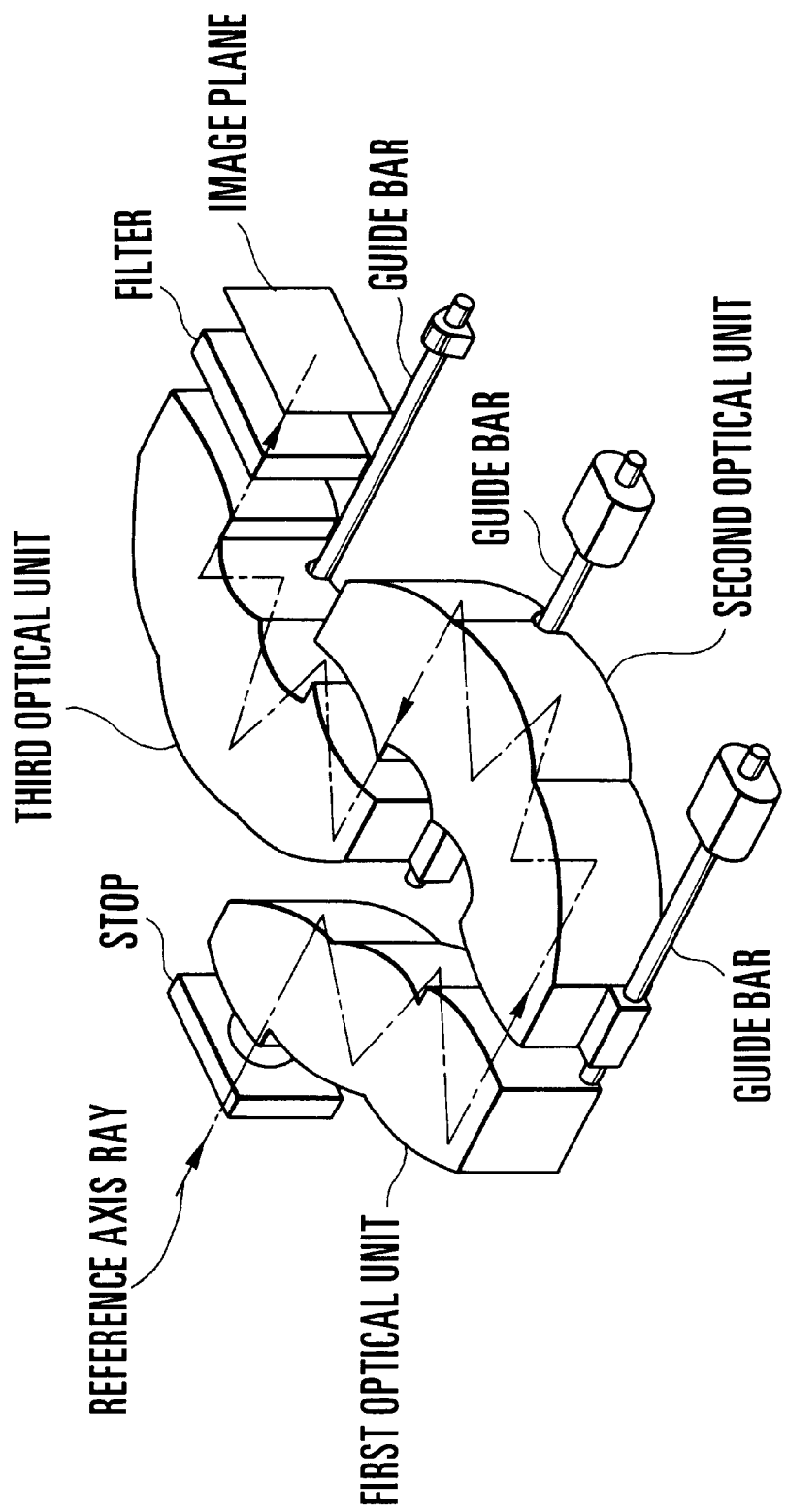
FIG. 51 is a perspective view showing the essential portion of one example of the variable magnification optical system according to the present invention.

In addition, holes or the like each of which receives a guide bar for guiding the magnification varying movement of an optical unit may be formed in predetermined transparent bodies in the manner shown in FIG. 51. With this arrangement, since the variable magnification optical system can be composed of such transparent bodies alone, a member such as a barrel for holding normal lenses is not needed, so that the required number of constituent components can be reduced to a further extent.

Incidentally, if the required number of constituent components is to be reduced, the first optical unit 12 shown in each of FIGS. 49 and 50 may be basically any type of optical system which forms an image on the intermediate image forming plane 13. However, in order to realize a thin optical system which is one of the objects of the present invention, it is necessary to dispose a stop in front of the first optical unit 12. Otherwise, it is necessary to dispose a stop at a position conjugate to the stop 11 so that an entrance pupil is formed in the vicinity of the first surface.

If the first optical unit 12 is provided as a decentered optical system, the decentering aberration remaining in a magnification varying optical system can be cancelled by the first optical unit 12, so that it is possible to realize an optical system whose decentering aberration is reduced to a further extent. In each of Numerical Examples 4 to 6 of the present invention which will be described later, a particular optical element provided in the first optical unit is formed of four or five decentered reflecting surfaces so that decentering aberration can be fully corrected over the entire variable magnification optical system.

Prior to the detailed description of Numerical Examples 4 to 6, reference will be made to terms which are herein used to express various constituent elements of the numerical examples, and matters common to all the numerical examples.

Figure 52:
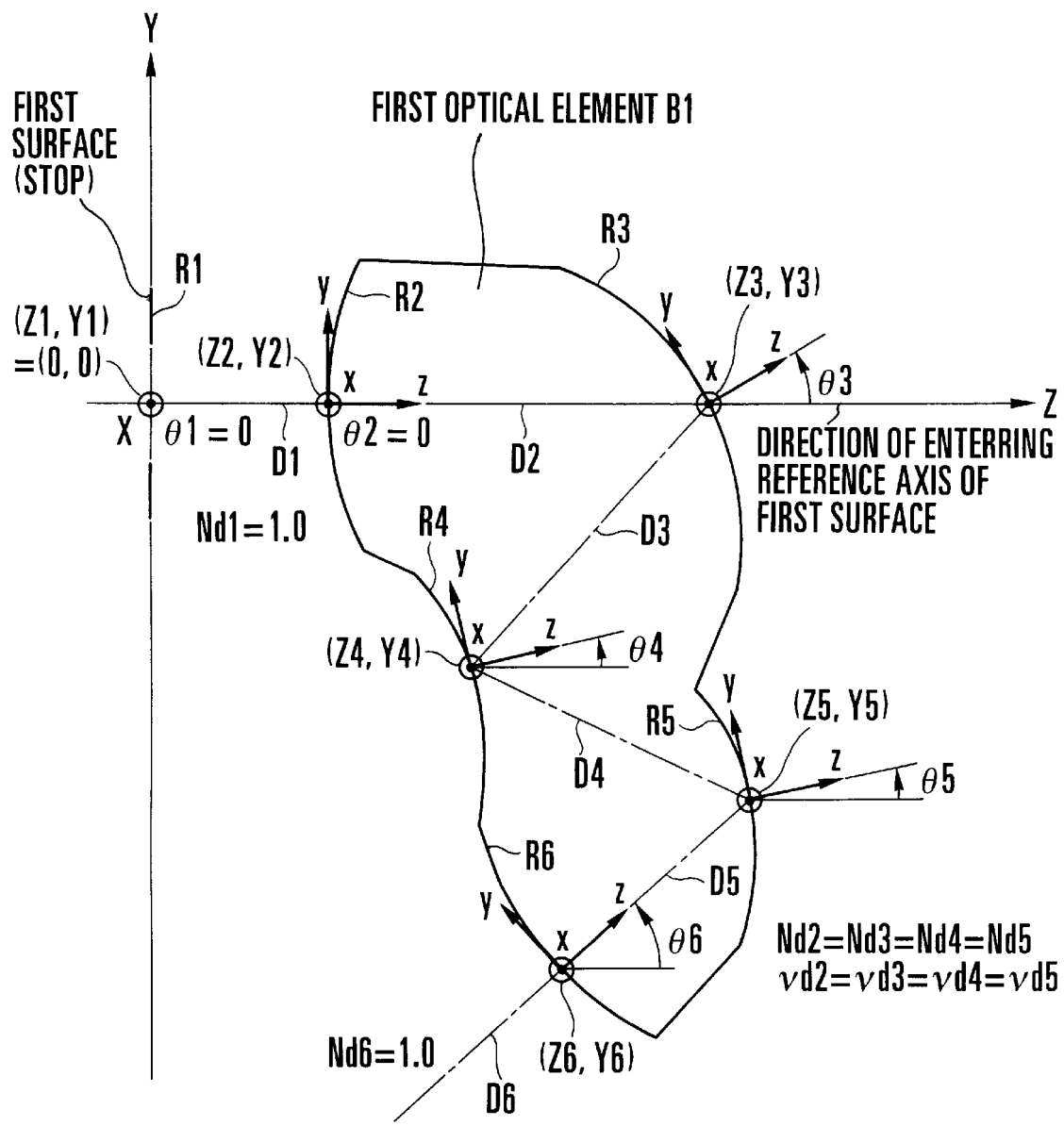
FIG. 52 is an explanatory view of a coordinate system for Numerical Examples 4 to 6 of the present invention.

FIG. 52 is an explanatory view of a coordinate system which defines the constituent data of an optical system according to the present invention. In each of the numerical examples 4 to 6 of the present invention, the i-th surface is a surface which lies at the i-th position numbered from an object side from which a ray travels toward an image plane (the ray is shown by dot-dashed lines in FIG. 52 and is hereinafter referred to as the reference axis ray).

In FIG. 52, the first surface R1 is a stop, the second surface R2 is a refracting surface coaxial with the first surface R1, the third surface R3 is a reflecting surface which is tilted with respect to the second surface R2, the fourth surface R4 is a reflecting surface which is shifted and tilted with respect to the third surface R3, the fifth surface R5 is a reflecting surface which is shifted and tilted with respect to the fourth surface R4, and the sixth surface R6 is a refracting surface which is shifted and tilted with respect to the fifth surface R5. All of the second surface R2 to the sixth surface R6 are arranged on one optical element composed of a medium such as glass or plastics. In FIG. 52, such optical element is shown as the first optical element B1.

Accordingly, in the arrangement shown in FIG. 52, the medium between an object plane (not shown) and the second surface R2 is air, the second surface R2 to the sixth surface R6 are arranged on a certain common medium, and the medium between the sixth surface R6 and the seventh surface R7 (not shown) is air.

Since the optical system according to the present invention is an off-axial optical system, the surfaces which constitute part of the optical system do not have a common optical axis. For this reason, in each of the numerical examples of the present invention, an absolute coordinate system is set, the origin of which is the central point of an effective ray diameter at the first surface which is the stop. In the present invention, each axis of the absolute coordinate system is defined as follows:

Z axis: reference axis which passes through the origin and extends to the second surface R2;

Y axis: straight line which passes through the origin and makes an angle of 90° with the z axis in the counterclockwise direction in a tilting plane (on the surface of the sheet of FIG. 52); and X axis: straight line which passes through the origin and is perpendicular to each of the Z and Y axes (perpendicular to the surface of the sheet of FIG. 52).

If the surface shape of the i-th surface which constitutes part of the optical system is to be expressed, it is possible to more readily understand and recognize such surface shape by setting a local coordinate system the origin of which is a point at which the reference axis intersects with the i-th surface, and expressing the surface shape of the i-th surface by using the local coordinate system than by expressing the surface shape of the i-th surface by using the absolute coordinate system. Accordingly, in the numerical examples of the present invention the constituent data of which are shown herein. the surface shape of the i-th surface is expressed by its local coordinate system.

The tilting angle of the i-th surface in the Y, Z plane is expressed by an angle $\theta i$ (unit: degree) which shows a positive value in the counterclockwise direction with respect to the Z axis of the absolute coordinate system. Accordingly, in each of the numerical examples of the present invention, the origins of the local coordinate systems of the respective surfaces are located on the Y, Z plane, as shown in FIG. 52. The tilting or shifting of the surfaces is absent in the X-Z plane or the X-Y plane. In addition, the y and z axes of the local coordinates (x, y, z) of the i-th surface are inclined by the angle $\theta i$ in the Y, Z plane with respect to the absolute coordinate system (X, Y, Z). Specifically, the x, y and z axes of the local coordinates (x, y, z) are set in the follow manner:

z axis: straight line which passes through the origin of the local coordinates and makes the angle $\theta i$ with the Z direction of the absolute coordinate system in the counterclockwise direction in the Y, Z plane;

y axis: straight line which passes through the origin of the local coordinates and makes an angle of 90° with the z direction of the local coordinates in the counterclockwise direction in the Y, Z plane; and x axis: straight line which passes through the origin of the local coordinates and is perpendicular to the Y, Z plane.

Symbol Di indicates a scalar which represents the distance between the origin of the local coordinates of the i-th surface and that of the (i+1)-st surface. Symbols Ndi and vdi respectively indicate the refractive index and the Abbe number of the medium between the i-th surface and the (i+1)-st surface. In FIG. 52, each of the stop and the final image forming plane is shown as one plane surface.

The optical system of each of the numerical examples of the present invention varies its entire focal length (magnification) by the movement of a plurality of optical elements. Regarding each of the numerical examples which have the numerical data shown herein, the cross section of its optical system and the numerical data are shown with respect to three positions, i.e., the wide-angle end (W), the telephoto end (T) and the middle position (M).

If the optical element shown in FIG. 52 moves in the Y, Z plane, the origin (Yi, Zi) of each of the local coordinate systems which represent the positions of the respective surfaces takes on a different value for each varied magnification position. However, in the case of the numerical examples shown herein, since the optical element is assumed to move in only the Z direction for the purpose of variation of magnification, the coordinate value Zi is expressed by Zi(W), Zi(M) and Zi(T) in the order of the wide-angle end, the middle position and the telephoto end which respectively correspond to three states to be taken by the optical system.

Incidentally, the coordinate values of each of the surfaces represent those obtained at the wide-angle end, and each of the middle position and the telephoto end is expressed as a difference between the coordinate values obtained at the wide-angle end and the coordinate values obtained at the respective one of the middle position and the telephoto end. Specifically, letting "a" and "b" be the respective amounts of movements of the optical element at the middle position (M) and the telephoto end (T) with respect to the wide-angle end (W), these amounts of movements are expressed by the following equations:

$$Zi(M)=Zi(W)+a,$$

$$Zi(T)=Zi(W)+b.$$

If all the surfaces move in their Z plus directions, the signs of "a" and "b" are positive, whereas if they move in their Z minus directions, the signs of "a" and "b" are negative. The surface-to-surface distance Di which varies with these movements is a variable, and the values of the variable at the respective varied magnification positions are collectively shown on tables which will be referred to later.

Each of the numerical examples 4 to 6 of the present invention has spheric surfaces and aspheric surfaces of rotational asymmetry. Each of the spheric surfaces has a spherical shape expressed by the radius of curvature $R_i$. The sign of the radius of curvature $R_i$ is plus if the center of curvature is located in the z-axis plus direction of the local coordinates, whereas if the center of curvature is located in the z-axis minus direction of the local coordinates, the sign of the radius of curvature $R_i$ is minus.

Each of the spheric surfaces is a shape expressed by the following equation:

$$z = \frac{(x^2 + y^2)/R_i}{1 + \{1 - (x^2 + y^2)/R_i^2\}^{1/2}}.$$

In addition, the optical system according to the present invention has at least one aspheric surface of rotational asymmetry, and its shape is expressed by the following equation in which all the terms that contain the variable x having an odd exponent are omitted from Equation 1 and such binomial coefficient is put in the coefficient term of each of the remaining terms of Equation 1:

$$z=C_{02}y^2+C_{20}x^2+C_{03}y^3+C_{21}x^2y+C_{04}y^4+C_{22}x^2y^2+C_{40}x^4.$$

Since the above curved-surface equation has only even-exponent terms regarding x, the curved surface expressed by the above curved-surface equation has a shape symmetrical with respect to the Y, Z plane. Further, if the following condition is satisfied, a shape symmetrical with respect to the X-Z plane is obtained:

$$C_{03}=C_{21}=0.$$

Further, if the following equations are satisfied, a shape of rotational symmetry is obtained:

$$C_{02}=C_{20}, C_{04}=C_{40}=C_{22}/2.$$

If the above conditions are not satisfied, a shape of rotational asymmetry is obtained.

The horizontal half-angle of view $u_Y$ is the maximum angle of view of a light beam incident on the first surface R1 in the Y, Z plane of FIG. 52, while the vertical half-angle of view $u_X$ is the maximum angle of view of a light beam incident on the first surface R1 in the X, Z plane of FIG. 52.

The brightness of the optical system is represented by an entrance pupil diameter which is the diameter of an entrance pupil. The effective image area in the image plane is represented by an image size. The image size is represented by a rectangular region having a horizontal size taken in the y direction of the local coordinate system and a vertical size taken in the x direction of the local coordinate system.

Regarding the numerical examples which are illustrated together with the constituent data, their respective lateral aberration charts are shown. Each of the lateral aberration charts shows the lateral aberrations of a light beam for the wide-angle end (W), the middle position (M) and the telephoto end (T), and the lateral aberrations are those of the light beam which is incident on the stop R1 at an angle of incidence which is defined by a horizontal angle of incidence and a vertical angle of incidence which are $(u_Y, u_X)$, $(0, u_X)$, $(-u_Y, u_X)$, $(u_Y, 0)$, $(0, 0)$ and $(-u_Y, 0)$, respectively. In each of the lateral aberration charts, the horizontal axis represents the height of incidence on the pupil, and the vertical axis represents the amount of aberration. In any of the numerical examples, since each of the surfaces basically has a shape symmetrical with respect to the Y, Z plane, the plus and minus directions of a vertical angle of view are the same in the lateral aberration chart. For this reason, the lateral aberration chart relative to the minus direction is omitted for the sake of simplicity.

The numerical examples 4 to 6 are described below.

NUMERICAL EXAMPLE 4

Figure 55:
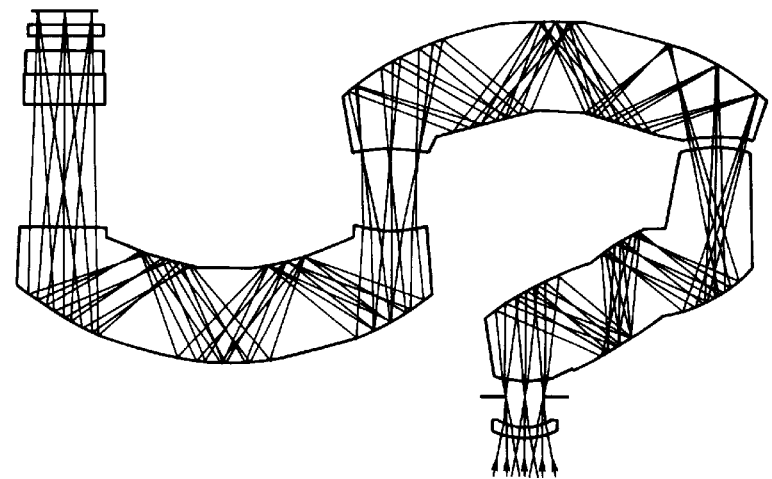
FIG. 55 is an optical cross-sectional view of Numerical Example 4 relative to its telephoto end.
Figure 54:
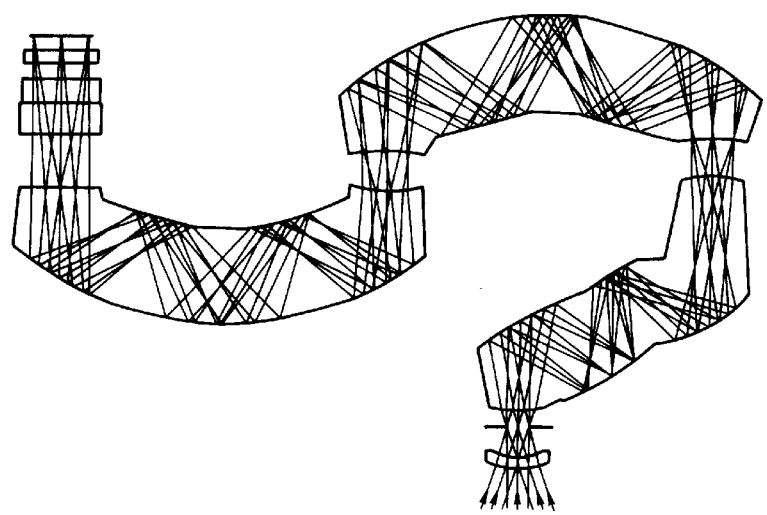
FIG. 54 is an optical cross-sectional view of Numerical Example 4 relative to its middle position.
Figure 53:
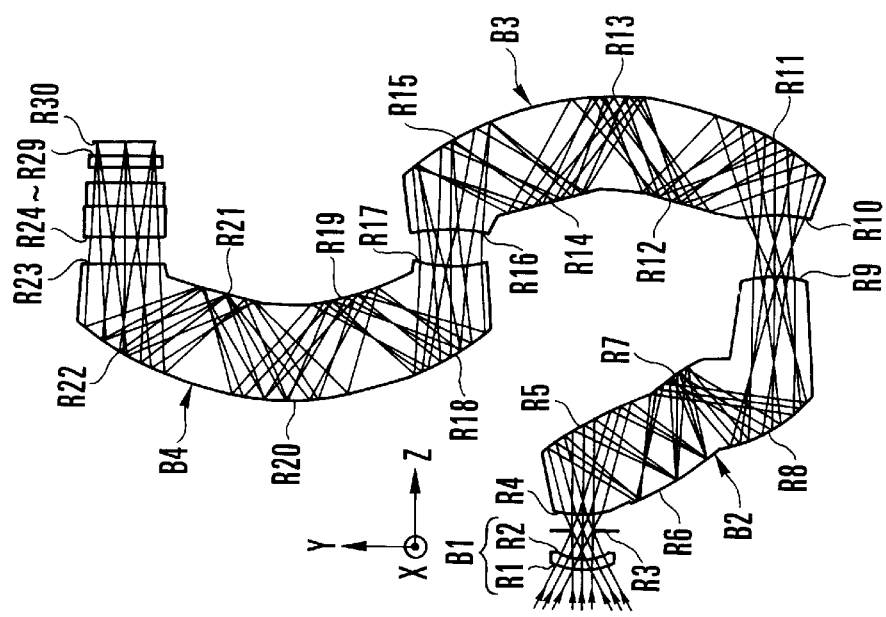
FIG. 53 is an optical cross-sectional view of Numerical Example 4 of the variable magnification optical system of the present invention with respect to its wide-angle end.

FIGS. 53, 54 and 55 are optical cross-sectional views taken in the Y, Z plane, showing Numerical Example 4 relative to the wide-angle end (W), the middle position (M) and the telephoto end (T). Numerical Example 4 is a variable magnification optical system having a magnification variation ratio of approximately 3×. Constituent data for Numerical Example 4 are shown below.

|  | WIDE-ANGLE END | MIDDLE POSITION | TELEPHOTO END |
| --- | --- | --- | --- |
| HORIZONTAL HALF-ANGLE OF VIEW | 27.3 | 19.0 | 9.8 |
| VERTICAL HALF-ANGLE OF VIEW | 21.2 | 14.5 | 7.4 |
| APERTURE DIAMETER | 1.30 | 1.40 | 2.40 |
| IMAGE SIZE |  | 3.76 × 2.82 mm |  |

| i | Yi | Zi(W) | θi | Di | Ndi | νdi |  |
| --- | --- | --- | --- | --- | --- | --- | --- |
| FIRST OPTICAL ELEMENT B1 (NEGATIVE LENS) |||||||
| 1 | 0.00 | 0.00 | 0.00 | 0.66 | 1.51633 | 64.15 | REFRACTING SURFACE |
| 2 | 0.00 | 0.66 | 0.00 | 2.00 | 1 |  | REFRACTING SURFACE |
| 3 | 0.00 | 2.66 | 0.00 | 1.00 | 1 |  | STOP |
| SECOND OPTICAL ELEMENT B2 |||||||
| 4 | 0.00 | 3.66 | 0.00 | 6.00 | 1.49171 | 57.46 | REFRACTING SURFACE |
| 5 | 0.00 | 9.66 | 30.00 | 7.40 | 1.49171 | 57.40 | REFLECTING SURFACE |
| 6 | −6.41 | 5.96 | 30.00 | 7.00 | 1.49171 | 57.40 | REFLECTING SURFACE |
| 7 | −6.41 | 12.96 | 30.00 | 7.40 | 1.49171 | 57.40 | REFLECTING SURFACE |
| 8 | −12.82 | 9.26 | 30.00 | 10.00 | 1.49171 | 57.40 | REFLECTING SURFACE |
| 9 | −12.82 | 19.26 | 0.00 | VARIABLE | 1 |  | REFRACTING SURFACE |
| THIRD OPTICAL ELEMENT B3 |||||||
| 10 | −12.82 | 23.32 | 0.00 | 5.00 | 1.49171 | 57.40 | REFRACTING SURFACE |
| 11 | −12.82 | 28.32 | −30.00 | 8.00 | 1.49171 | 57.40 | REFLECTING SURFACE |
| 12 | −5.89 | 24.32 | −15.00 | 8.00 | 1.49171 | 57.40 | REFLECTING SURFACE |
| 13 | −1.89 | 31.25 | 0.00 | 8.00 | 1.49171 | 57.40 | REFLECTING SURFACE |
| 14 | 2.11 | 24.32 | 15.00 | 8.00 | 1.49171 | 57.40 | REFLECTING SURFACE |
| 15 | 9.04 | 28.32 | 30.00 | 6.00 | 1.49171 | 57.40 | REFLECTING SURFACE |
| 16 | 9.04 | 22.32 | 0.00 | VARIABLE | 1 |  | REFRACTING SURFACE |
| FOURTH OPTICAL ELEMENT B4 |||||||
| 17 | 9.04 | 19.92 | 0.00 | 6.00 | 1.49171 | 57.40 | REFRACTING SURFACE |
| 18 | 9.04 | 13.92 | 30.00 | 8.00 | 1.49171 | 57.40 | REFLECTING SURFACE |
| 19 | 15.97 | 17.92 | 15.00 | 8.00 | 1.49171 | 57.40 | REFLECTING SURFACE |
| 20 | 19.97 | 11.00 | 0.00 | 8.00 | 1.49171 | 57.40 | REFLECTING SURFACE |
| 21 | 23.97 | 17.92 | −15.00 | 8.00 | 1.49171 | 57.40 | REFLECTING SURFACE |
| 22 | 30.90 | 13.92 | −30.00 | 6.00 | 1.49171 | 57.40 | REFLECTING SURFACE |
| 23 | 30.90 | 19.92 | 0.00 | VARIABLE | 1 |  | REFRACTING SURFACE |
| 24 | 30.90 | 21.65 | 0.00 | 2.08 | 1.51400 | 70.00 | FILTER |
| 25 | 30.90 | 23.73 | 0.00 | 0.00 | 1 |  |  |
| 26 | 30.90 | 23.73 | 0.00 | 1.60 | 1.52000 | 74.00 | FILTER |
| 27 | 30.90 | 25.33 | 0.00 | 1.00 | 1 |  |  |
| 28 | 30.90 | 26.33 | 0.00 | 0.80 | 1.51633 | 64.15 | COVER GLASS |
| 29 | 30.90 | 27.13 | 0.00 | 0.91 | 1 |  |  |
| 30 | 30.90 | 28.04 | 0.00 |  |  |  | IMAGE PLANE |

|  | WIDE-ANGLE END | MIDDLE POSITION | TELEPHOTO END |
| --- | --- | --- | --- |
| D9 | 4.06 | 2.54 | 0.60 |
| D16 | 2.40 | 2.72 | 5.34 |
| D23 | 1.72 | 3.57 | 8.12 |
| R1–R9 | Zi(M) = Zi(W) |  | Zi(T) = Zi(W) |
| R10–R16 | Zi(M) = Zi(W) − 1.53 |  | Zi(T) = Zi(W) − 3.46 |
| R17–R23 | Zi(M) = Zi(W) − 1.84 |  | Zi(T) = Zi(W) − 6.40 |
| R24–R30 | Zi(M) = Zi(W) |  | Zi(T) = Zi(W) |

SPHERICAL SHAPE

| R1 | $R_1 = 6.168$ |
| --- | --- |
| R2 | $R_2 = 3.604$ |
| R4 | $R_4 = 8.000$ |
| R9 | $R_9 = -8.094$ |
| R10 | $R_{10} = -14.301$ |
| R16 | $R_{16} = -14.930$ |
| R17 | $R_{17} = 7.534$ |
| R23 | $R_{23} = \infty$ |
| R24 | $R_{24} = \infty$ |
| R25 | $R_{25} = \infty$ |
| R26 | $R_{26} = \infty$ |
| R27 | $R_{27} = \infty$ |
| R28 | $R_{28} = \infty$ |
| R29 | $R_{29} = \infty$ |

ASPHERICAL SHAPE

| R5 | $C_{02} = -2.48795e-02$ | $C_{20} = -6.93059e-02$ |  |
| --- | --- | --- | --- |
|  | $C_{03} = 5.73301e-04$ | $C_{21} = -1.68160e-03$ |  |
|  | $C_{04} = 9.86673e-05$ | $C_{22} = -2.62542e-04$ | $C_{40} = -4.65288e-04$ |
| R6 | $C_{02} = 2.57868e-02$ | $C_{20} = 4.25914e-02$ |  |
|  | $C_{03} = -1.22602e-03$ | $C_{21} = 4.81265e-03$ |  |
|  | $C_{04} = 2.82052e-05$ | $C_{22} = -4.29430e-04$ | $C_{40} = -3.48277e-04$ |
| R7 | $C_{02} = -3.32169e-02$ | $C_{20} = -2.79739e-02$ |  |
|  | $C_{03} = 1.26172e-04$ | $C_{21} = -4.74552e-03$ |  |
|  | $C_{04} = -6.48835e-06$ | $C_{22} = 3.07151e-04$ | $C_{40} = -2.51179e-04$ |
| R8 | $C_{02} = 5.18661e-02$ | $C_{20} = 3.05881e-02$ |  |
|  | $C_{03} = -7.39583e-04$ | $C_{21} = 1.89622e-03$ |  |
|  | $C_{04} = 3.23835e-04$ | $C_{22} = 2.51407e-04$ | $C_{40} = -2.30108e-05$ |
| R11 | $C_{02} = -3.36682e-02$ | $C_{20} = -4.23355e-02$ |  |
|  | $C_{03} = -3.58878e-05$ | $C_{21} = -1.31841e-03$ |  |
|  | $C_{04} = -4.76471e-05$ | $C_{22} = 1.22212e-06$ | $C_{40} = -1.38018e-04$ |
| R12 | $C_{02} = -8.45125e-03$ | $C_{20} = -2.53367e-03$ |  |
|  | $C_{03} = -1.24138e-03$ | $C_{21} = 2.73698e-03$ |  |
|  | $C_{04} = -2.30027e-04$ | $C_{22} = 3.34562e-04$ | $C_{40} = -2.12308e-04$ |
| R13 | $C_{02} = -2.14116e-02$ | $C_{20} = -4.05649e-02$ |  |
|  | $C_{03} = 7.57771e-04$ | $C_{21} = -2.94640e-03$ |  |
|  | $C_{04} = -1.10645e-04$ | $C_{22} = 4.30439e-05$ | $C_{40} = -1.13097e-04$ |
| R14 | $C_{02} = -3.32218e-03$ | $C_{20} = -4.16062e-02$ |  |
|  | $C_{03} = -1.88788e-04$ | $C_{21} = 1.23956e-02$ |  |
|  | $C_{04} = 1.17299e-05$ | $C_{22} = 8.52794e-04$ | $C_{40} = 7.74804e-04$ |
| R15 | $C_{02} = -2.41680e-02$ | $C_{20} = -4.37423e-02$ |  |
|  | $C_{03} = -5.81282e-05$ | $C_{21} = -4.16500e-04$ |  |
|  | $C_{04} = -3.44370e-05$ | $C_{22} = -1.41119e-04$ | $C_{40} = -9.40307e-05$ |
| R18 | $C_{02} = 2.51483e-02$ | $C_{20} = 1.51580e-02$ |  |
|  | $C_{03} = -4.43147e-04$ | $C_{21} = 1.98560e-03$ |  |
|  | $C_{04} = -2.88674e-05$ | $C_{22} = -4.64797e-04$ | $C_{40} = -2.21638e-04$ |

-continued

| | | | |
|---|---|---|---|
| R19 | $C_{02}$ = 1.595911e–02 | $C_{20}$ = 1.99007e–02 | |
| | $C_{03}$ = 2.33671e–04 | $C_{21}$ = –3.88447e–03 | |
| | $C_{04}$ = 1.42672e–04 | $C_{22}$ = –1.24441e–03 | $C_{40}$ = –2.62688e–04 |
| R20 | $C_{02}$ = 3.09393e–02 | $C_{20}$ = 4.11529e–02 | |
| | $C_{03}$ = –1.45588e–04 | $C_{21}$ = 3.72684e–04 | |
| | $C_{04}$ = 5.42962e–05 | $C_{22}$ = 3.92704e–05 | $C_{40}$ = 7.42443e–05 |
| R21 | $C_{02}$ = 2.01137e–02 | $C_{20}$ = 7.57535e–02 | |
| | $C_{03}$ = 1.37833e–04 | $C_{21}$ = –8.04032e–03 | |
| | $C_{04}$ = 1.60523e–04 | $C_{22}$ = –1.16036e–04 | $C_{40}$ = 1.84743e–03 |
| R22 | $C_{02}$ = 1.94558e–02 | $C_{20}$ = 3.42531e–02 | |
| | $C_{03}$ = –3.77644e–04 | $C_{21}$ = –1.04434e–03 | |
| | $C_{04}$ = 2.05664e–05 | $C_{22}$ = 6.08001e–05 | $C_{40}$ = 9.48100e–05 |

The construction of Numerical Example 4 will be described below. The first optical element B1 is a negative lens which has the first surface R1 and the second surface R2, and the third surface R3 is an aperture plane. The second optical element B2 is formed as one transparent body on which the fourth surface R4 (entrance refracting surface), the fifth to eighth surfaces R5 to R8 each of which is a decentered curved internal reflecting surface, and the ninth surface R9 (exit refracting surface) are formed. The third optical element B3 is formed as one transparent body on which the tenth surface R10 (entrance refracting surface), the eleventh to fifteenth surfaces R11 to R15 each of which is a decentered curved internal reflecting surface, and the sixteenth surface R16 (exit refracting surface) are formed. The fourth optical element B4 is formed as one transparent body on which the seventeenth surface R17 (entrance refracting surface), the eighteenth to twenty-second surfaces R18 to R22 each of which is a decentered curved internal reflecting surface, and the twenty-third surface R23 (exit refracting surface) are formed.

The twenty-fourth to twenty-ninth surfaces R24 to R29 are those of plane parallel plates such as a filter and a cover glass. The thirtieth surface R30 is a final image plane in which the image pickup surface of an image pickup device such as a CCD is positioned.

The optical elements of Numerical Example 4 are grouped into three optical units which constitute a variable magnification optical system. Specifically, the first optical element B1, the stop R3 and the second optical element B2 constitute the first optical unit, the third optical element B3 constitutes the second optical unit, and the fourth optical element B4 constitutes the third optical unit. The second and third optical units are magnification varying optical units which vary the relative position therebetween to vary the magnification of the variable magnification optical system. The concave reflecting surfaces R11, R13, R15, R18, R20 and R22 effectively act to relay the aforesaid intermediate images and pupil images in each of the magnification varying optical units.

An image forming operation for an object lying at infinity will be described below. First, a light beam which has passed through the first optical element B1 and the stop R3 in that order enters the second optical element B2. In the second optical element B2, the light beam is refracted by the fourth surface R4, then reflected from surface to surface by the fifth surface R5 to the eighth surface R8, then refracted by the ninth surface R9, and then exits from the second optical element B2. During this time, a primary image is formed in the vicinity of the sixth surface R6, and a secondary image is formed between the eighth surface R8 and the ninth surface R9. A pupil is formed between the seventh surface R7 and the eighth surface R8.

Then, the light beam enters the third optical element B3. In the third optical element B3, the light beam is refracted by the tenth surface R10, then reflected from surface to surface by the eleventh surface R11 to the fifteenth surface R15, then refracted by the sixteenth surface R16, and then exits from the third optical element B3. During this time, a tertiary image forming plane is formed between the twelfth surface R12 and the thirteenth surface R13 when the focal length is at the wide-angle end, or in the vicinity of the thirteenth surface R13 when the focal length is at the telephoto end. Another pupil is formed between the fourteenth surface R14 and the fifteenth surface R15 when the focal length is at the wide-angle end, or in the vicinity of the sixteenth surface R16 when the focal length is at the telephoto end.

Then, the light beam enters the fourth optical element B4. In the fourth optical element B4, the light beam is refracted by the seventeenth surface R17, then reflected from surface to surface by the eighteenth surface R18 to the twenty-second surface R22, then refracted by the twenty-third surface R23, and then exits from the fourth optical element B4. During this time, a quaternary image forming plane is formed between the eighteenth surface R18 and the nineteenth surface R19 when the focal length is at the wide-angle end, or in the vicinity of the nineteenth surface R19 when the focal length is at the telephoto end. A pupil is formed in the vicinity of the twenty-second surface R22 when the focal length is at the wide-angle end, or between the twenty-second surface R22 and the twenty-third surface R23 when the focal length is at the telephoto end.

The light beam which has exited from the fourth optical element B4 passes through the twenty-fourth to twenty-ninth surfaces R24 to R29, and finally forms an object image on the thirtieth surface R30 which is a quinary image forming plane.

In Numerical Example 4, the entering reference axis and the exiting reference axis of each of the second optical element B2 are the same as each other in direction. The entering reference axis and the exiting reference axis of each of the third optical element B3 and the fourth optical element B4 differ from each other by 180° in direction.

The movements of the respective optical elements during a magnification varying operation will be described below. During the magnification varying operation, the first optical element B1, the stop R3 and the second optical element B2 which constitute the first optical unit are fixed and do not move. As the focal length varies from the wide-angle end toward the telephoto end, the third optical element B3 moves in the Z minus direction in parallel with the entering reference axis of the third optical element B3. In the meantime, the fourth optical element B4 moves in the Z minus direction in parallel with the entering reference axis of the fourth optical element B4.

During the magnification varying operation, the filter, the cover glass and the thirtieth surface R30 which is the final image plane do not move. In the present specification, these plane parallel plates, which do not have refractive power, are not regarded as optical units which constitute part of the optical system.

As the focal length varies from the wide-angle end toward the telephoto end, the distance between the second optical element B2 and the third optical element B3 is decreased, the distance between the third optical element B3 and the fourth optical element B4 is increased, and the distance between the fourth optical element B4 and the twenty-fourth surface R24 is increased.

In addition, as the focal length varies from the wide-angle end toward the telephoto end, the entire optical path length which extends from the first surface R1 to the final image plane R30 becomes longer.

Figure 56:
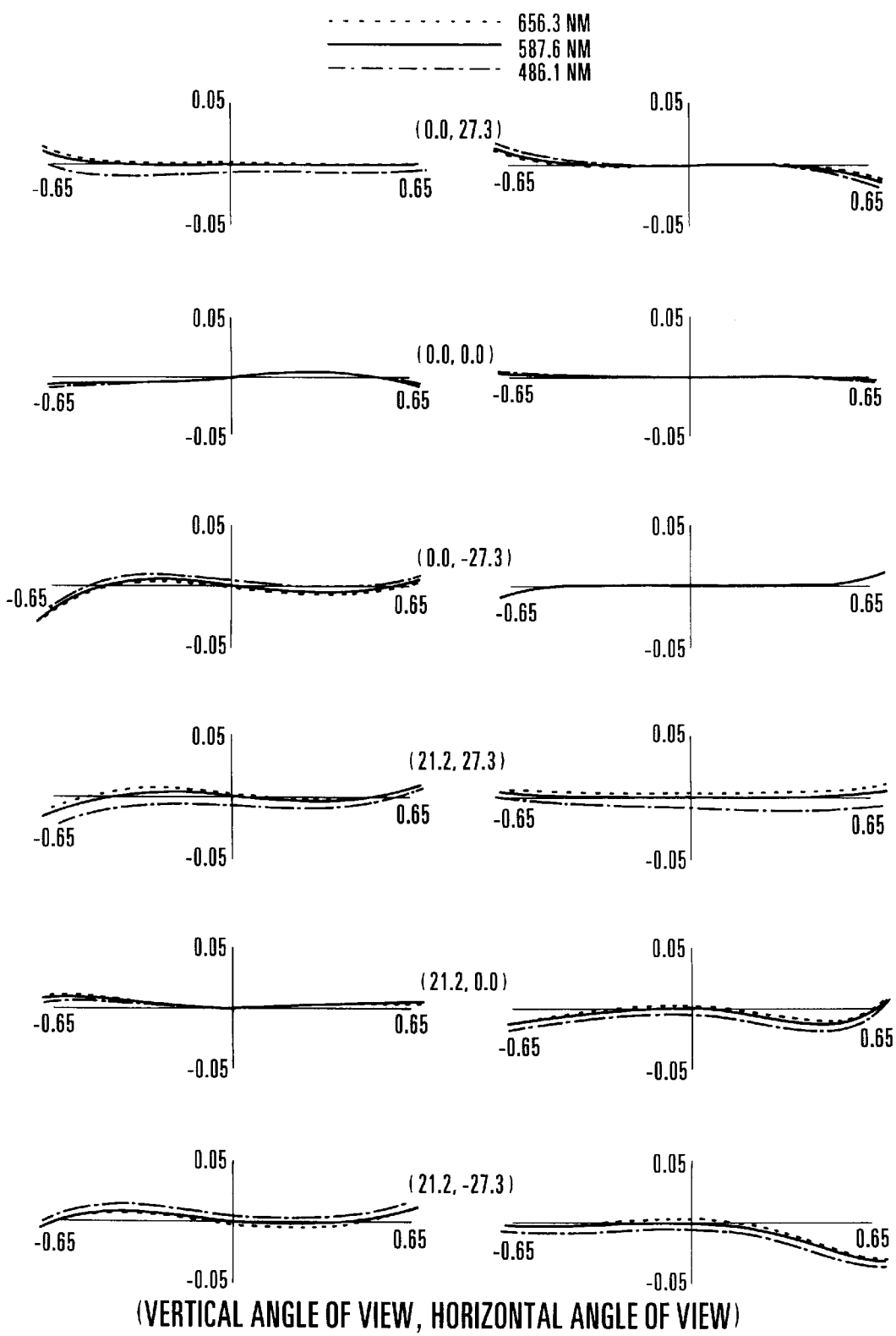
FIG. 56 is a lateral aberration chart of Numerical Example 4 relative to the wide-angle end.
Figure 57:
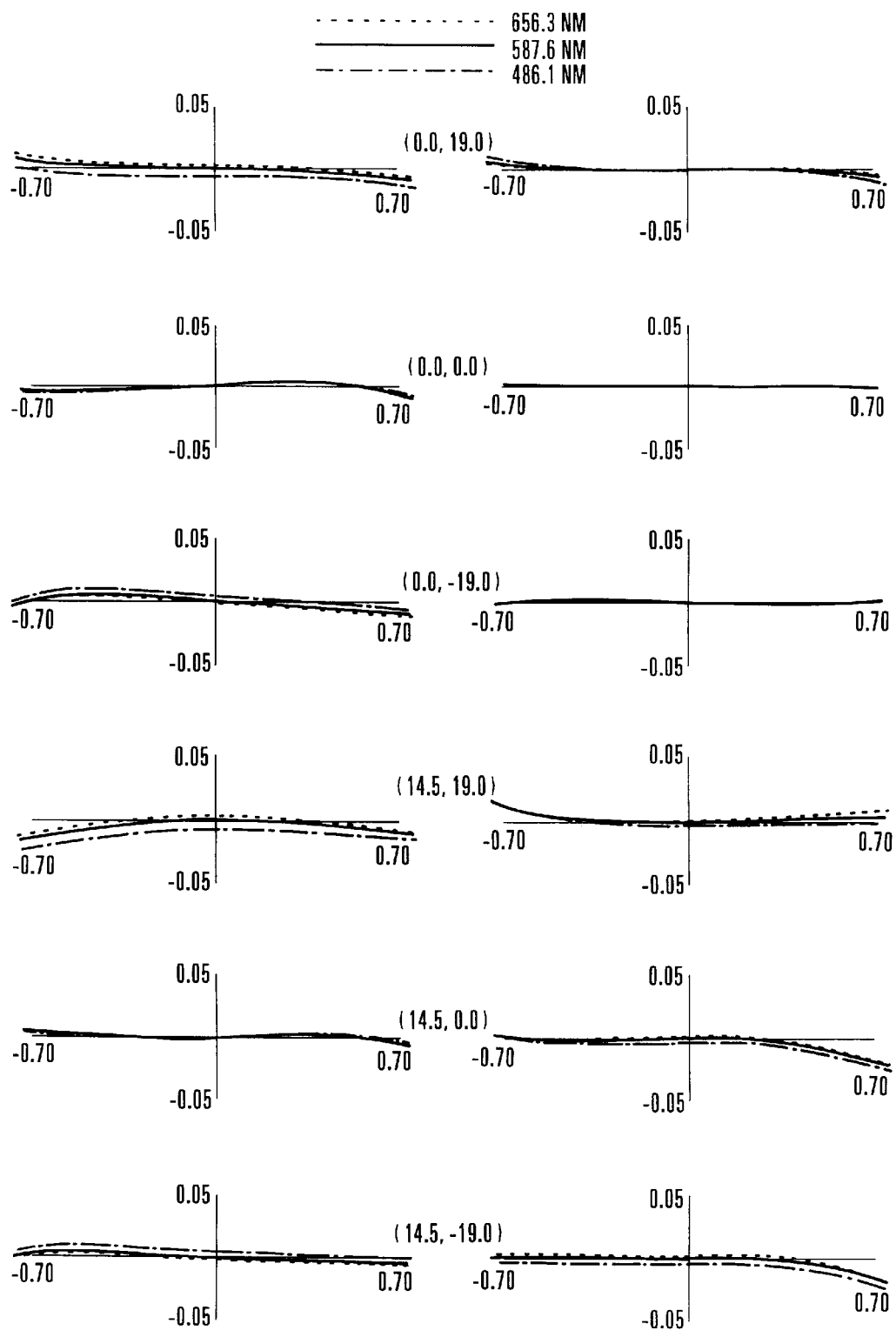
FIG. 57 is a lateral aberration chart of Numerical Example 4 relative to the middle position.
Figure 58:
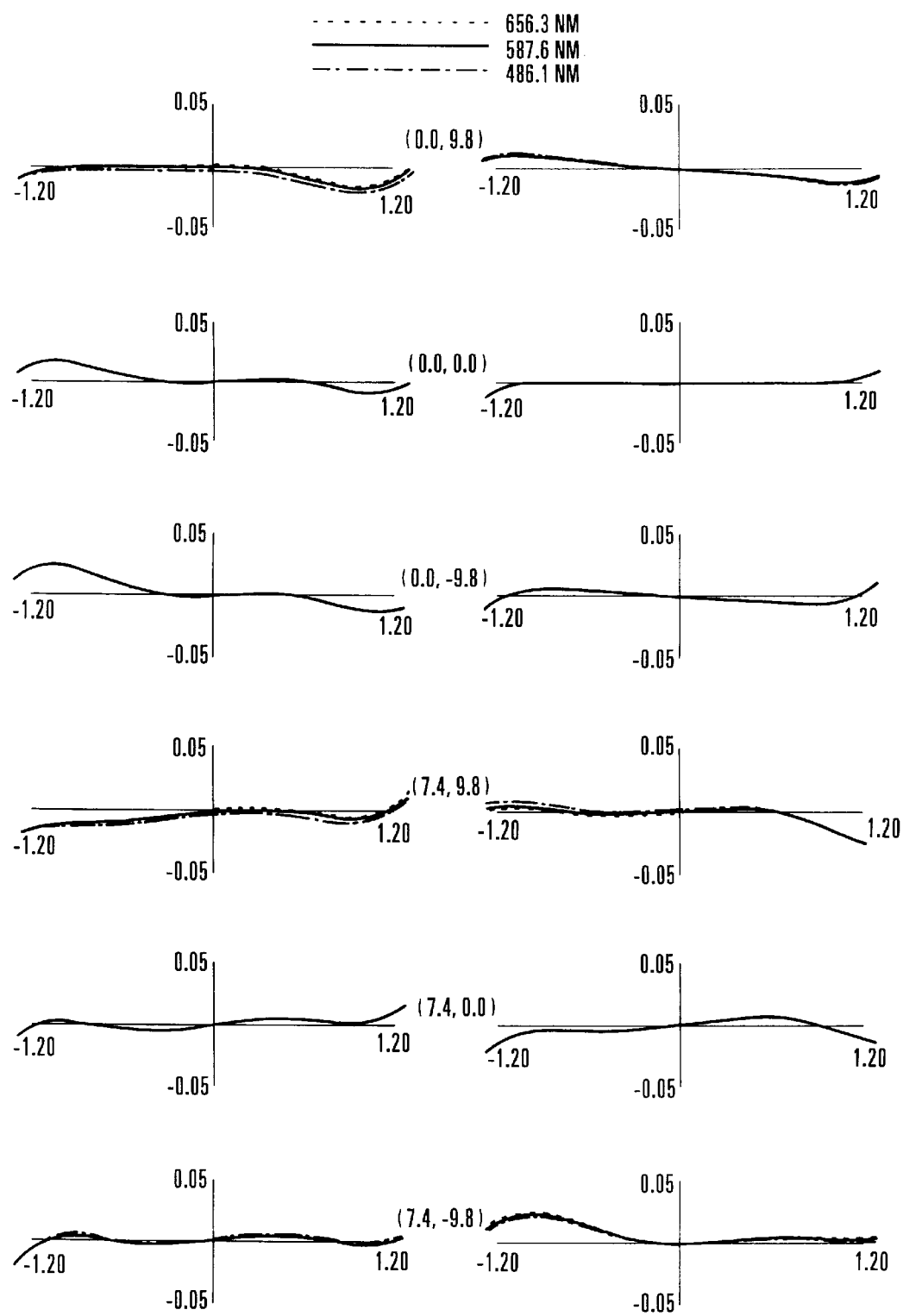
FIG. 58 is a lateral aberration chart of Numerical Example 4 relative to the telephoto end.

Each of FIGS. 56, 57 and 58 shows lateral aberration charts of Numerical Example 4 relative to the wide-angle end (W), the middle position (M) and the telephoto end (T). The respective lateral aberration charts show lateral aberrations in the Y and X directions, relative to six light beams which enter Numerical Example 4 at different angles of incidence of $(u_Y, u_X)$, $(0, u_X)$, $(-u_Y, u_X)$, $(u_Y, 0)$, $(0, 0)$ and $(-u_Y, 0)$, respectively. The horizontal axis of each of the lateral aberration charts represents the height of incidence in the Y or X direction of a light beam which is incident on each of the entrance pupils.

As can be seen from these figures, Numerical Example 4 is capable of achieving well-balanced correction of aberration at each zoom position.

In addition, the optical system of Numerical Example 4 is approximately 7.6 mm thick for an image size of 3.76 mm×2.82 mm. In Numerical Example 4, particularly because each of the optical elements and the entire optical system has a small thickness and each of the optical elements can be constructed by forming reflecting surfaces on predetermined sides of a plate-shaped transparent body, it is possible to readily construct a variable magnification optical system which is thin as a whole, by adopting a mechanism which causes two optical elements to move along a surface of one base plate.

Incidentally, in Numerical Example 4, although a chromatic aberration is caused by a plurality of refracting surfaces, the curvature of each of the refracting surfaces is appropriately determined so that the chromatic aberration is corrected over the entire magnification variation range. In particular, an axial chromatic aberration which occurs at the fourth surface R4 is fully corrected by the negative lens disposed immediately in front of the stop.

Numerical Example 4 is the variable magnification optical system in which the negative lens is provided on the object side of the stop of the fifth embodiment shown in FIG. 50.

NUMERICAL EXAMPLE 5

Figure 61:
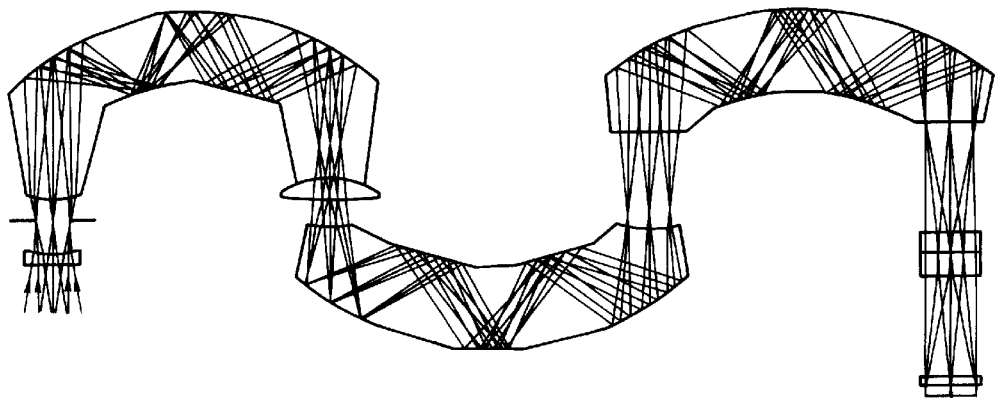
FIG. 61 is an optical cross-sectional view of Numerical Example 5 relative to its telephoto end.
Figure 60:
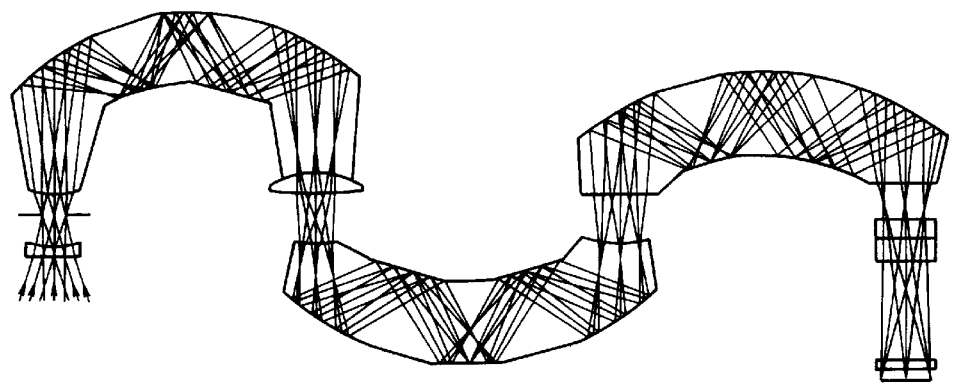
FIG. 60 is an optical cross-sectional view of Numerical Example 5 relative to its middle position.
Figure 59:
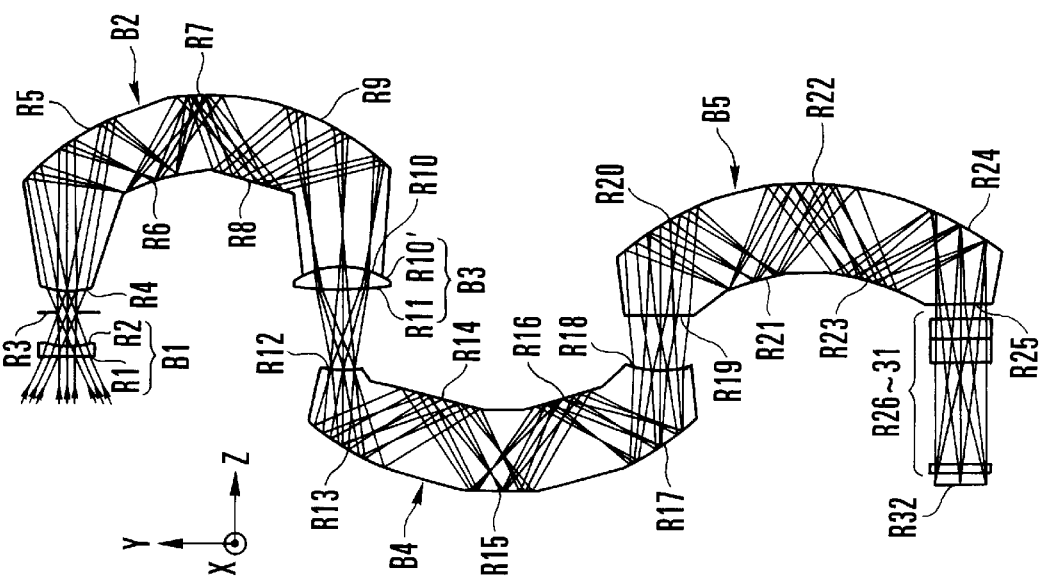
FIG. 59 is an optical cross-sectional view of Numerical Example 5 of the variable magnification optical system of the present invention with respect to its wide-angle end.

FIGS. 59, 60 and 61 are optical cross-sectional views taken in the Y, Z plane, showing Numerical Example 5 relative to the wide-angle end (W), the middle position (M) and the telephoto end (T). Numerical Example 5 is a variable magnification optical system having a magnification variation ratio of approximately 3×. Constituent data for Numerical Example 5 are shown below.

| | WIDE-ANGLE END | MIDDLE POSITION | TELEPHOTO END |
|---|---|---|---|
| HORIZONTAL HALF-ANGLE OF VIEW | 26.0 | 18.0 | 9.2 |
| VERTICAL HALF-ANGLE OF VIEW | 20.0 | 13.6 | 6.9 |
| APERTURE DIAMETER | 1.40 | 2.00 | 2.80 |
| IMAGE SIZE | | 4.8 × 3.6 mm | |

| i | Yi | Zi(W) | θi | Di | Ndi | vdi | |
|---|---|---|---|---|---|---|---|
| FIRST OPTICAL ELEMENT B1 (NEGATIVE LENS) | | | | | | | |
| 1 | 0.00 | 0.00 | 0.00 | 1.00 | 1.49700 | 81.61 | REFRACTING SURFACE |
| 2 | 0.00 | 1.00 | 0.00 | 3.00 | 1 | | REFRACTING SURFACE |
| 3 | 0.00 | 4.00 | 0.00 | 2.00 | 1 | | STOP |
| SECOND OPTICAL ELEMENT B2 | | | | | | | |
| 4 | 0.00 | 6.00 | 0.00 | 13.00 | 1.58312 | 59.37 | REFRACTING SURFACE |
| 5 | 0.00 | 19.00 | 34.00 | 9.00 | 1.58312 | 59.37 | REFLECTING SURFACE |
| 6 | −8.34 | 15.63 | 19.00 | 9.00 | 1.58312 | 59.37 | REFLECTING SURFACE |
| 7 | −12.84 | 23.42 | 0.00 | 9.00 | 1.58312 | 59.37 | REFLECTING SURFACE |
| 8 | −17.34 | 15.63 | −15.00 | 9.00 | 1.58312 | 59.37 | REFLECTING SURFACE |
| 9 | −25.14 | 20.13 | −30.00 | 12.00 | 1.58312 | 59.37 | REFLECTING SURFACE |
| 10 | −25.14 | 8.13 | 0.00 | 0.00 | 1 | | REFRACTING SURFACE |
| THIRD OPTICAL ELEMENT B3 (POSITIVE LENS) | | | | | | | |
| 10' | −25.14 | 8.13 | 0.00 | 2.00 | 1.76181 | 26.51 | REFRACTING SURFACE |
| 11 | −25.14 | 6.13 | 0.00 | VARIABLE | 1 | | REFRACTING SURFACE |
| FOURTH OPTICAL ELEMENT B4 | | | | | | | |
| 12 | −25.14 | −1.01 | 0.00 | 7.00 | 1.58312 | 59.37 | REFRACTING SURFACE |
| 13 | −25.14 | −8.01 | −32.00 | 10.00 | 1.58312 | 59.37 | REFLECTING SURFACE |
| 14 | −34.13 | −3.63 | −16.00 | 10.00 | 1.58312 | 59.37 | REFLECTING SURFACE |
| 15 | −39.43 | −12.11 | 0.00 | 10.00 | 1.58312 | 59.37 | REFLECTING SURFACE |
| 16 | −44.73 | −3.63 | 16.00 | 10.00 | 1.58312 | 59.37 | REFLECTING SURFACE |
| 17 | −53.71 | −8.01 | 32.00 | 7.00 | 1.58312 | 59.37 | REFLECTING SURFACE |
| 18 | −53.17 | −1.01 | 0.00 | VARIABLE | 1 | | REFRACTING SURFACE |
| FIFTH OPTICAL ELEMENT B5 | | | | | | | |
| 19 | −53.71 | 3.78 | 0.00 | 8.00 | 1.58312 | 59.37 | REFRACTING SURFACE |
| 20 | −53.71 | 11.78 | 30.00 | 10.00 | 1.58312 | 59.37 | REFLECTING SURFACE |
| 21 | −62.37 | 6.78 | 15.00 | 10.00 | 1.58312 | 59.37 | REFLECTING SURFACE |
| 22 | −67.37 | 15.44 | 0.00 | 10.00 | 1.58312 | 59.37 | REFLECTING SURFACE |
| 23 | −72.37 | 6.78 | −15.00 | 10.00 | 1.58312 | 59.37 | REFLECTING SURFACE |
| 24 | −81.03 | 11.78 | −30.00 | 7.00 | 1.58312 | 59.37 | REFLECTING SURFACE |

-continued

| | | | | | | |
|---|---|---|---|---|---|---|
| 25 | −81.03 | 4.78 | 0.00 | VARIABLE | 1 | REFRACTING SURFACE |
| 26 | −81.03 | 3.44 | 0.00 | 1.80 | 1.51633 64.15 | FILTER |
| 27 | −81.03 | 1.64 | 0.00 | 0.00 | 1 | |
| 28 | −81.03 | 1.64 | 0.00 | 2.20 | 1.51633 64.15 | FILTER |
| 29 | −81.03 | −0.56 | 0.00 | 9.00 | 1 | |
| 30 | −81.03 | −9.56 | 0.00 | 0.80 | 1.51633 64.15 | COVER GLASS |
| 31 | −81.03 | −10.36 | −0.00 | 1.00 | 1 | |
| 32 | −81.03 | −11.36 | | | | FINAL IMAGE FORMING PLANE |

| | WIDE-ANGLE END | MIDDLE POSITION | TELEPHOTO END |
|---|---|---|---|
| D11 | 7.14 | 4.84 | 2.37 |
| D18 | 4.79 | 4.67 | 8.64 |
| D25 | 1.34 | 3.52 | 9.96 |
| R1–R11 | $Zi(M) = Zi(W)$ | | $Zi(T) = Zi(W)$ |
| R12–R18 | $Zi(M) = Zi(W) + 2.30$ | | $Zi(T) = Zi(W) + 4.77$ |
| R19–R25 | $Zi(M) = Zi(W) + 2.18$ | | $Zi(T) = Zi(W) + 8.61$ |
| R26–R32 | $Zi(M) = Zi(W)$ | | $Zi(T) = Zi(W)$ |

SPHERICAL SHAPE

R1   $R_1 = \infty$
R2   $R_2 = 10.000$
R4   $R_4 = 10.000$
R10  $R_{10} = -8.400$
R11  $R_{11} = 43.931$
R12  $R_{12} = 10.000$
R18  $R_{18} = 10.577$
R19  $R_{19} = \infty$
R25  $R_{25} = \infty$
R26  $R_{26} = \infty$
R27  $R_{27} = \infty$
R28  $R_{28} = \infty$
R29  $R_{29} = \infty$
R30  $R_{30} = \infty$

ASPHERICAL SHAPE

R5   $C_{02} = -2.72936e-02$   $C_{20} = -3.34457e-02$
     $C_{03} = 2.09387e-04$   $C_{21} = 1.09608e-04$
     $C_{04} = 3.65695e-05$   $C_{22} = -8.82752e-05$   $C_{40} = -2.30222e-07$
R6   $C_{02} = 3.44322e-05$   $C_{20} = -3.97258e-02$
     $C_{03} = -1.24585e-03$   $C_{21} = -7.55604e-03$
     $C_{04} = -2.57973e-04$   $C_{22} = -8.79636e-04$   $C_{40} = 1.91328e-03$
R7   $C_{02} = -2.70082e-02$   $C_{20} = -4.40194e-02$
     $C_{03} = -6.33660e-05$   $C_{21} = 2.38734e-05$
     $C_{04} = -1.64944e-05$   $C_{22} = -8.84975e-05$   $C_{40} = -8.88770e-05$
R8   $C_{02} = -5.33009e-03$   $C_{20} = -4.59243e-02$
     $C_{03} = 1.26419e-03$   $C_{21} = 5.93561e-03$
     $C_{04} = -7.16610e-05$   $C_{22} = -2.67759e-04$   $C_{40} = -1.44607e-04$
R9   $C_{02} = -1.87121e-02$   $C_{20} = -3.92180e-02$
     $C_{03} = 4.37501e-04$   $C_{21} = 4.4\ 6436e-04$
     $C_{04} = -4.98868e-05$   $C_{22} = -6.31610e-05$   $C_{40} = -5.60586e-05$
R13  $C_{02} = 2.34150e-02$   $C_{20} = 3.64057e-02$
     $C_{03} = 1.02145e-04$   $C_{21} = 4.6\ 8498e-04$
     $C_{04} = 2.92271e-05$   $C_{22} = 1.09843e-04$   $C_{40} = 6.77913e-05$
R14  $C_{02} = -6.97862e-04$   $C_{20} = 3.46717e-02$
     $C_{03} = 1.79534e-94$   $C_{21} = 4.31674e-03$
     $C_{04} = 3.30144e-04$   $C_{22} = 5.23135e-04$   $C_{40} = 7.90998e-04$
R15  $C_{02} = 1.60878e-02$   $C_{20} = 3.79592e-02$
     $C_{03} = 2.34613e-04$   $C_{21} = -1.38600e-04$
     $C_{04} = 4.98729e-06$   $C_{22} = -2.05181e-05$   $C_{40} = 1.89633e-05$
R16  $C_{02} = 3.52434e-03$   $C_{20} = 5.37197e-02$
     $C_{03} = -4.89992e-05$   $C_{21} = 9.97199e-04$
     $C_{04} = 2.31611e-05$   $C_{22} = 8.93152e-04$   $C_{40} = -7.89179e-04$
R17  $C_{02} = 1.99213e-02$   $C_{20} = 3.37854e-02$
     $C_{03} = 3.28820e-05$   $C_{21} = -3.43089e-04$
     $C_{04} = 6.26649e-06$   $C_{22} = 5.90309e-05$   $C_{40} = 2.48524e-05$
R20  $C_{02} = -1.63827e-02$   $C_{20} = -2.23970e-02$
     $C_{03} = 2.88869e-04$   $C_{21} = 8.53595e-04$
     $C_{04} = -1.85852e-06$   $C_{22} = -6.00163e-05$   $C_{40} = -9.69682e-05$
R21  $C_{02} = -1.52735e-02$   $C_{20} = -5.01525e-02$
     $C_{03} = 6.27635e-04$   $C_{21} = -7.57356e-03$
     $C_{04} = 1.68568e-05$   $C_{22} = -5.09136e-04$   $C_{40} = -1.70684e-03$
R22  $C_{02} = -1.86688e-02$   $C_{20} = -3.18271e-02$
     $C_{03} = 6.79138e-05$   $C_{21} = -3.05799e-04$
     $C_{04} = -2.00801e-05$   $C_{22} = -1.39814e-04$   $C_{40} = -6.11987e-05$
R23  $C_{02} = -1.26889e-02$   $C_{20} = -4.73700e-02$
     $C_{03} = -1.42598e-04$   $C_{21} = -1.34375e-03$
     $C_{04} = -5.42168e-05$   $C_{22} = -3.13011e-04$   $C_{40} = -4.55329e-04$
R24  $C_{02} = -1.65129e-02$   $C_{20} = -2.42770e-02$
     $C_{03} = -9.19071e-05$   $C_{21} = 1.27830e-04$
     $C_{04} = -9.52284e-06$   $C_{22} = -5.03070e-05$   $C_{40} = -1.25140e-05$

The construction of Numerical Example 5 will be described below. The first optical element B1 is a negative lens which has the first surface R1 and the second surface R2, and the third surface R3 is an aperture plane. The second optical element B2 is formed as one transparent body on which the fourth surface R4 (entrance refracting surface), the fifth to ninth surfaces R5 to R9 each of which is a decentered curved internal reflecting surface, and the tenth surface R10 (exit refracting surface) are formed. The third optical element B3 is a positive lens which has the tenth-apostrophe surface R10' and the eleventh surface R11. The second optical element B2 and the third optical element B3 are joined to each other at the tenth-apostrophe surface R10' and the tenth surface R10.

The fourth optical element B4 is formed as one transparent body on which the twelfth surface R12 (entrance refracting surface), the thirteenth to seventeenth surfaces R13 to R17 each of which is a decentered curved internal reflecting surface, and the eighteenth surface R18 (exit refracting surface) are formed. The fifth optical element B5 is formed as one transparent body on which the nineteenth surface R19 (entrance refracting surface), the twentieth to twenty-fourth surfaces R20 to R24 each of which is a decentered curved internal reflecting surface, and the twenty-fifth surface R25 (exit refracting surface) are formed.

The twenty-sixth to thirty-first surfaces R26 to R31 are those of plane parallel plates such as a filter and a cover glass. The thirty-second surface R32 is a final image plane in which the image pickup surface of an image pickup device such as a CCD is positioned.

The optical elements of Numerical Example 5 are grouped into three optical units which constitute a variable magnification optical system. Specifically, the first optical element B1, the stop R3, the second optical element B2 and the third optical element B3 constitute the first optical unit, the fourth optical element B4 constitutes the second optical unit, and the fifth optical element B5 constitutes the third optical unit. The second and fourth optical units are magnification varying optical units which vary the relative position therebetween to vary the magnification of the variable magnification optical system. The concave reflecting surfaces R13, R15, R17, R20, R22 and R24 effectively act to relay the aforesaid intermediate images and pupil images in each of the magnification varying optical units.

An image forming operation for an object lying at infinity will be described below. First, a light beam which has passed through the first optical element B1 and the stop R3 in that order enters the second optical element B2. In the second optical element B2, the light beam is refracted by the fourth surface R4, then reflected from surface to surface by the fifth surface R5 to the ninth surface R9, then refracted by the tenth surface R10, and then enters the third optical element B3. In the third optical element B3, the light beam is refracted by the eleventh surface R11, and then exits from the third optical element B3. During this time, a primary image is formed in the vicinity of the sixth surface R6, and a secondary image is formed between the ninth surface R9 and the tenth surface R10. A pupil is formed between the sixth surface R6 and the seventh surface R7.

Then, the light beam enters the fourth optical element B4. In the fourth optical element B4, the light beam is refracted by the twelfth surface R12, then reflected from surface to surface by the thirteenth surface R13 to the seventeenth surface R17, then refracted by the eighteenth surface R18, and then exits from the fourth optical element B4. During this time, a tertiary image forming plane is formed in the vicinity of the fifteenth surface R15 when the focal length is at the wide-angle end, or between the fifteenth surface R15 and the sixteenth surface R16 when the focal length is at the telephoto end. A pupil is formed between the sixteenth surface R16 and the seventeenth surface R17 when the focal length is at the wide-angle end, or in the vicinity of the eighteenth surface R18 when the focal length is at the telephoto end.

Then, the light beam enters the fifth optical element B5. In the fifth optical element B5, the light beam is refracted by the nineteenth surface R19, then reflected from surface to surface by the twentieth surface R20 to the twenty-fourth surface R24, then refracted by the twenty-fifth surface R25, and then exits from the fifth optical element B5. During this time, a quaternary image forming plane is formed in the vicinity of the twenty-first surface R21 when the focal length is at the wide-angle end, or between the twenty-first surface R21 and the twenty-second surface R22 when the focal length is at the telephoto end. A pupil is formed in the vicinity of the twenty-fourth surface R24 when the focal length is at the wide-angle end, or in the vicinity of the twenty-fifth surface R25 when the focal length is at the telephoto end.

The light beam which has exited from the fifth optical element B5 passes through the twenty-sixth to thirty-first surfaces R26 to R31, and finally forms an object image on the thirty-second surface R32 which is a quinary image forming plane.

In Numerical Example 5, the entering reference axis and the exiting reference axis of each of the second optical element B2, the fourth optical element B4 and the fifth optical element B5 differ from each other by 180° in direction.

The movements of the respective optical elements during a magnification varying operation will be described below. During the magnification varying operation, the first optical element B1, the stop R3, the second optical element B2 and the third optical element B3 which constitute the first optical unit are fixed and do not move. As the focal length varies from the wide-angle end toward the telephoto end, the fourth optical element B4 moves in the Z plus direction in parallel with the entering reference axis of the fourth optical element B4. In the meantime, the fifth optical element B5 moves in the Z plus direction in parallel with the entering reference axis of the fifth optical element B5.

During the magnification varying operation, the filter, the cover glass and the thirty-second surface R32 which is the final image plane do not move.

Thus, as the focal length varies from the wide-angle end toward the telephoto end, the distance between the third optical element B3 and the fourth optical element B4 is decreased, the distance between the fourth optical element B4 and the fifth optical element B5 is temporarily decreased and then increased, and the distance between the twenty-sixth surface R26 and the final image plane R32 is increased.

In addition, as the focal length varies from the wide-angle end toward the telephoto end, the entire optical path length which extends from the first surface R1 to the final image plane R32 becomes temporarily shorter and then longer.

Figure 62:
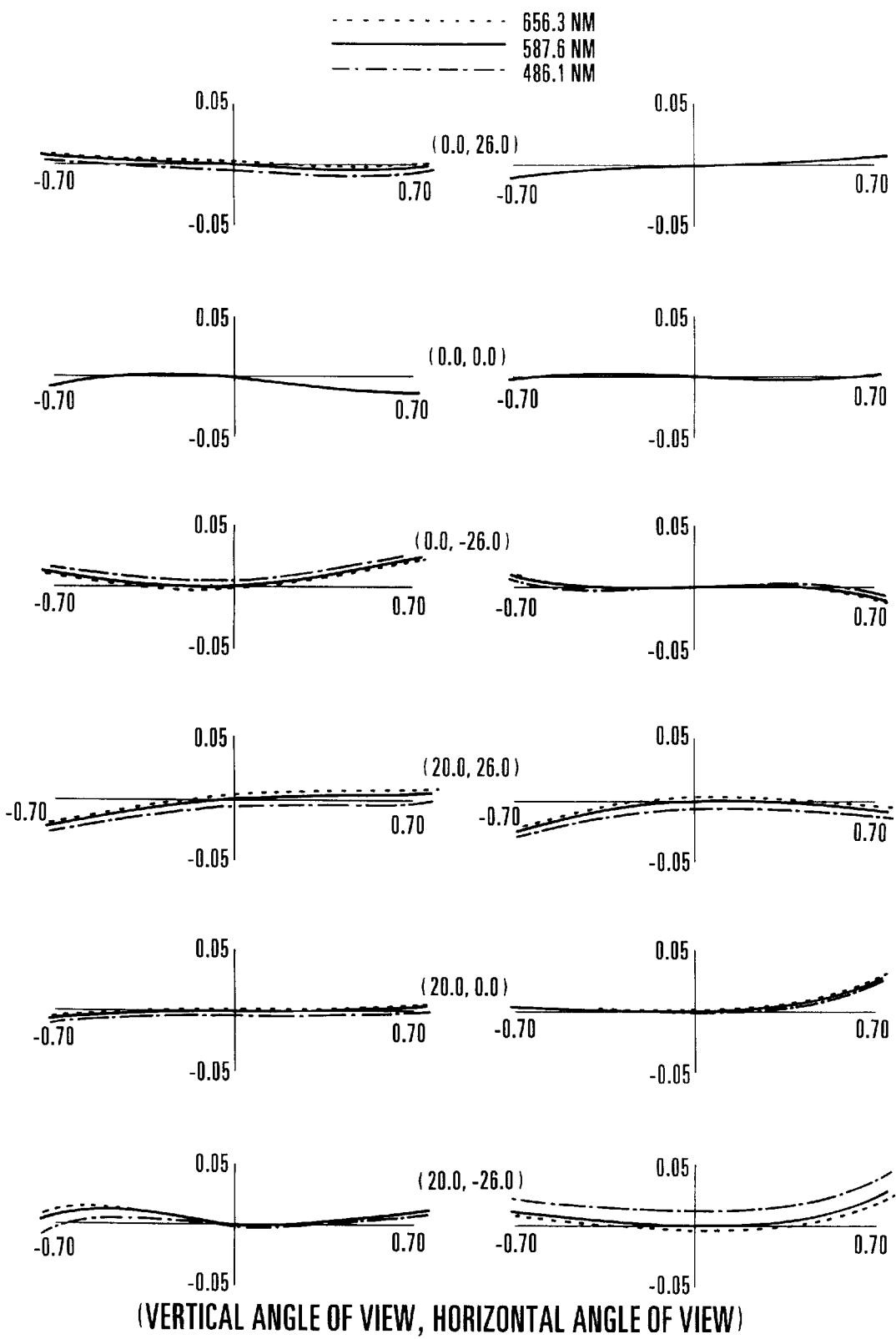
FIG. 62 is a lateral aberration chart of Numerical Example 5 relative to the wide-angle end.
Figure 63:
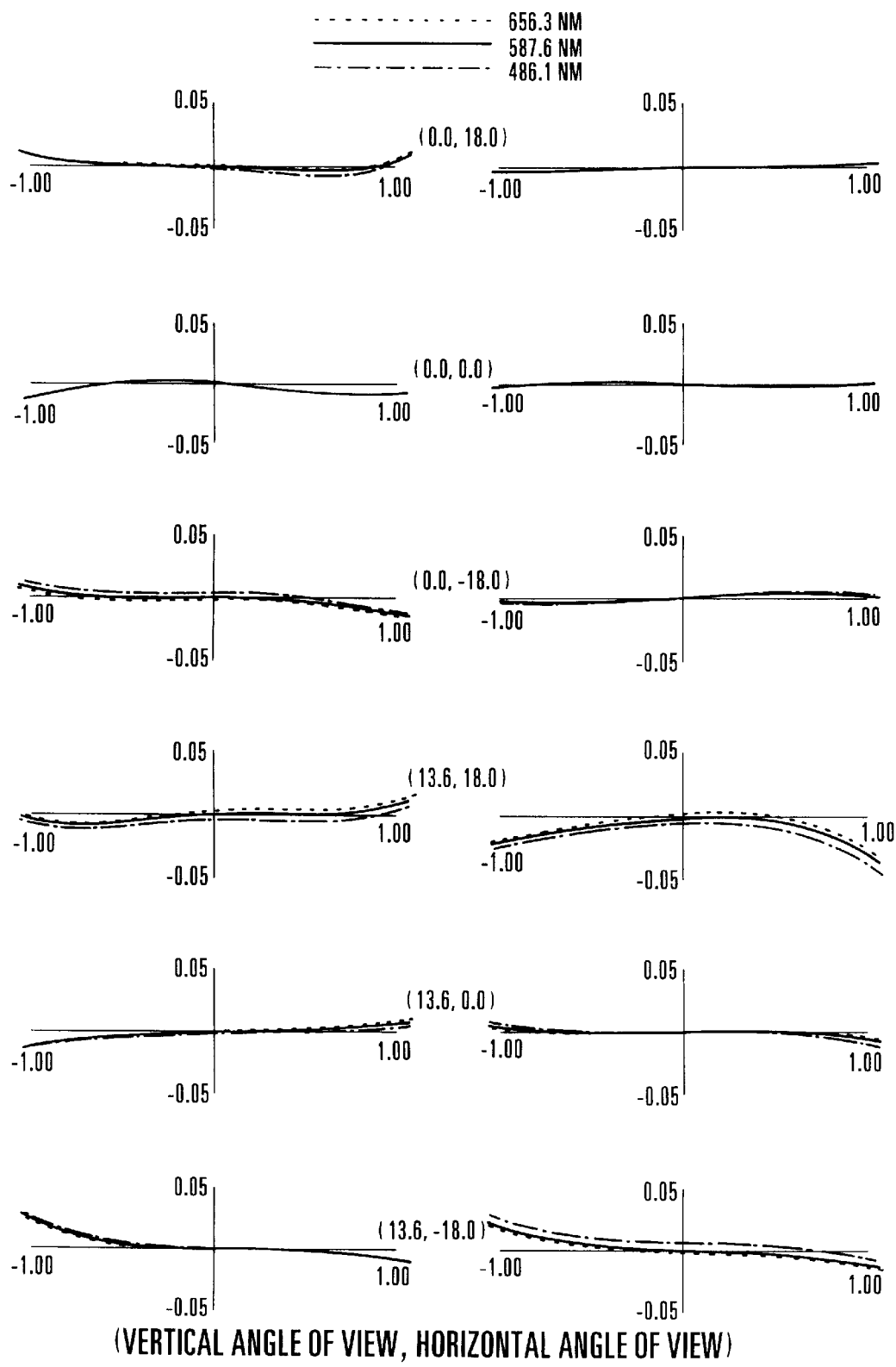
FIG. 63 is a lateral aberration chart of Numerical Example 5 relative to the middle position.
Figure 64:
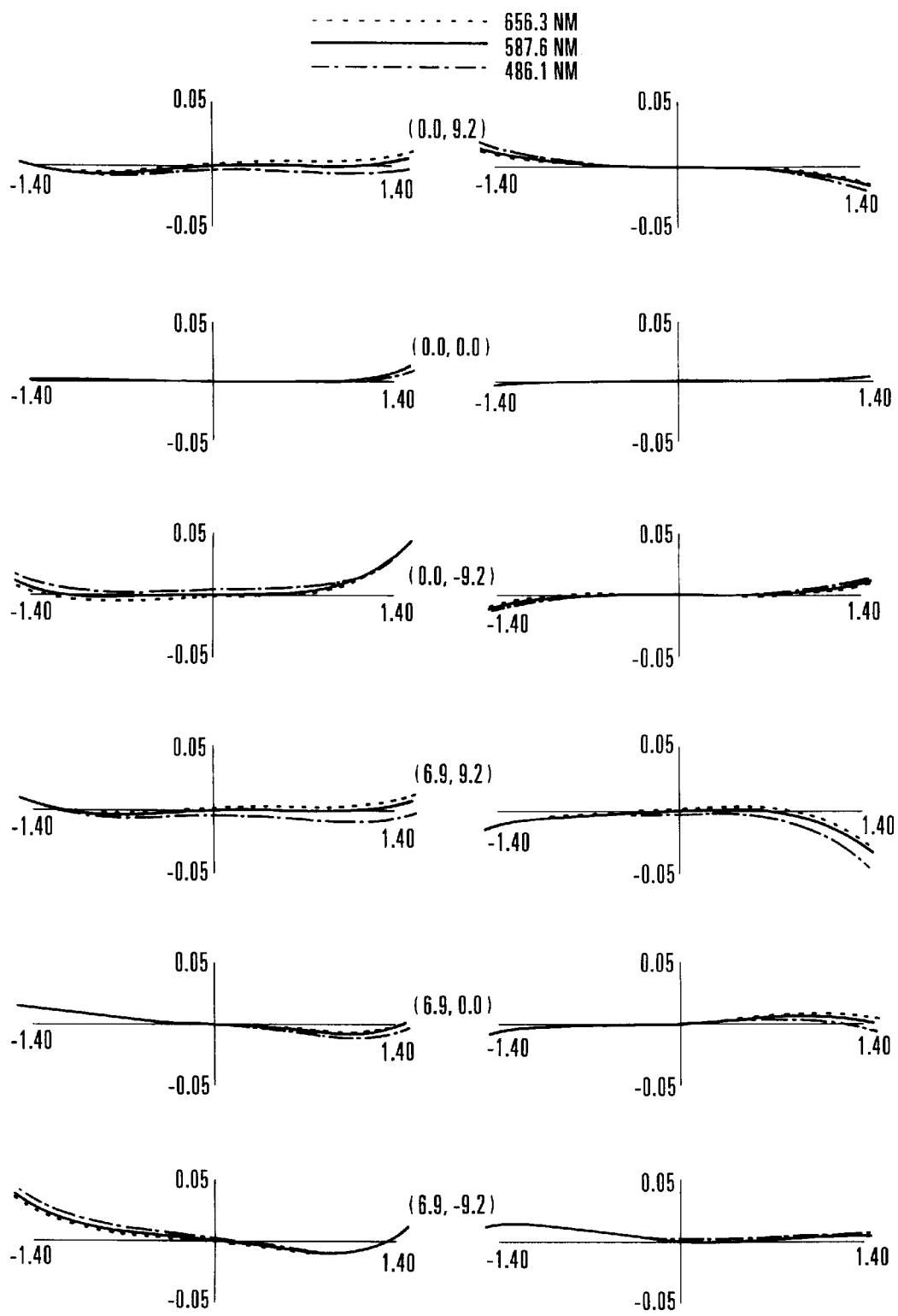
FIG. 64 is a lateral aberration chart of Numerical Example 5 relative to the telephoto end.

Each of FIGS. 62, 63 and 64 shows lateral aberration charts of Numerical Example 5 relative to the wide-angle end (W), the middle position (M) and the telephoto end (T). The respective lateral aberration charts show lateral aberrations in the Y and X directions, relative to six light beams which enter Numerical Example 5 at different angles of incidence of $(u_Y, u_X)$, $(0, u_X)$, $(-u_Y, u_X)$, $(u_Y, 0)$, $(0, 0)$ and $(-u_Y, 0)$, respectively. The horizontal axis of each of the lateral aberration charts represents the height of incidence in the Y or X direction of a light beam which is incident on each of the entrance pupils.

As can be seen from these figures, Numerical Example 5 is capable of achieving well-balanced correction of aberration at each zoom position.

Incidentally, in Numerical Example 5, although a chromatic aberration is caused by a plurality of refracting surfaces, the curvature of each of the refracting surfaces is appropriately determined so that the chromatic aberration is corrected over the entire magnification variation range. In particular, an axial chromatic aberration which occurs at the fourth surface R4 is fully corrected by the concave lens disposed immediately in front of the stop. Lateral chromatic aberration is fully corrected by securing a lens having a different refractive index (third optical element B3) to the second optical element B2.

In addition, the optical system of Numerical Example 5 is approximately 10.0 mm thick for an image size of 4.8 mm×3.6 mm. In Numerical Example 5, particularly because each of the optical elements and the entire optical system has a small thickness and each of the optical elements can be constructed by forming reflecting surfaces on predetermined sides of a plate-shaped transparent body, it is possible to readily construct a variable magnification optical system which is thin as a whole, by adopting a mechanism which causes two optical elements to move along a surface of one base plate.

Numerical Example 5 is the variable magnification optical system in which, in the fifth embodiment shown in FIG. 50, the first optical unit is formed as an optical unit having an entering reference axis and an exiting reference axis which differ from each other by 180° in direction, and one negative lens is provided on the object side of the stop.

Incidentally, all the reference axes of Numerical Example 5 are present in the Y, Z plane, and if an oblique reflecting surface which appropriately reflects the reference axis ray is provided in the first optical unit which is a fixed optical unit, the direction of the reference axis which enters the variable magnification optical system can be set to an arbitrary direction other than the Y, Z plane, so that the degree of freedom of design of the construction of an image pickup apparatus can be increased.

Figure 65:
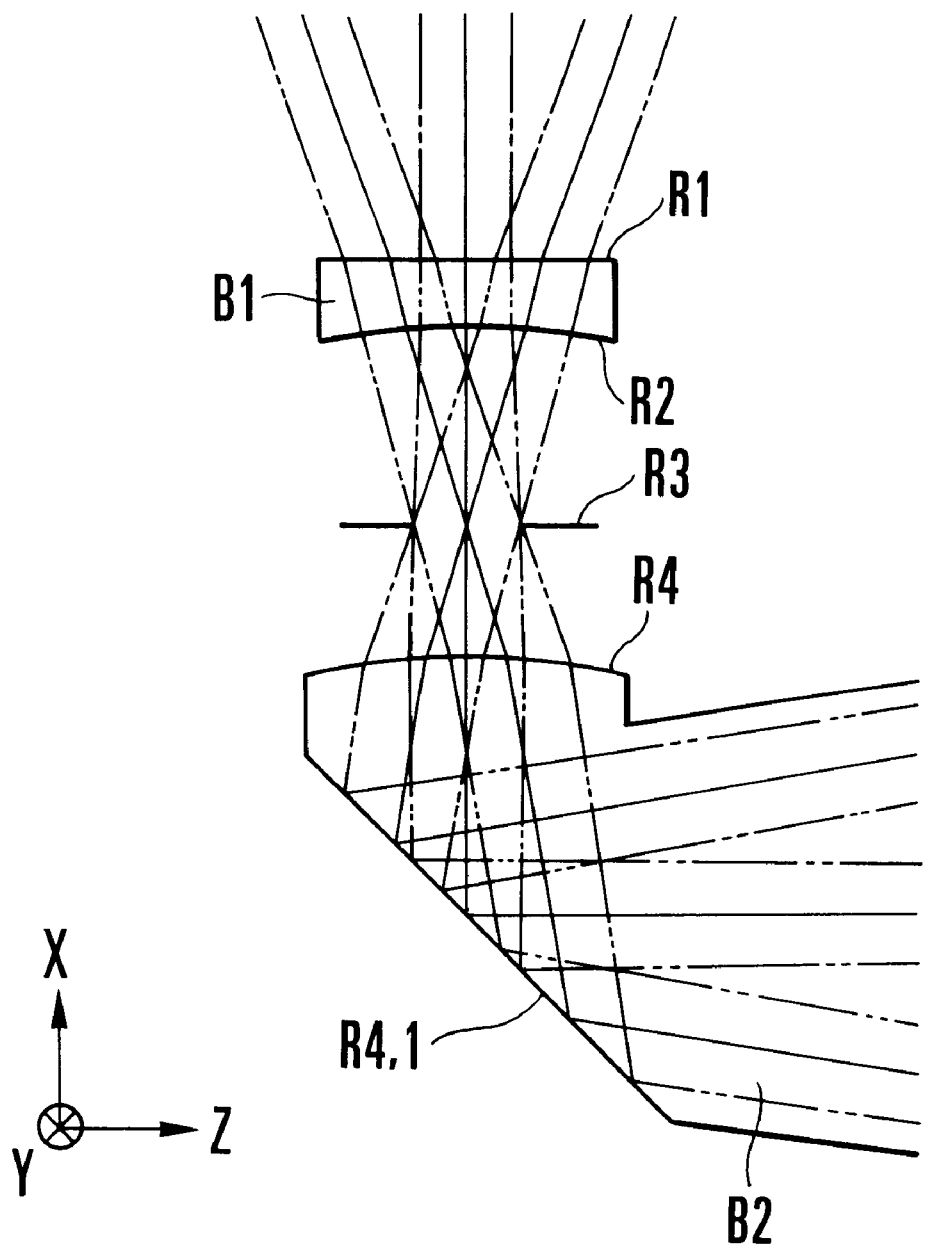
FIG. 65 is an explanatory view showing a method of changing the direction of the reference axis by using a prism as the second optical element of Numerical Example 5.

FIG. 65 is an explanatory view of a method of changing the direction of the reference axis by forming the second optical element B2 in Numerical Example 5 as a prism. As shown in FIG. 65, a reflecting surface R4,1 which reflects an entering reference axis ray parallel to the X axis in a direction parallel to the Z axis is provided immediately after the fourth surface of the second optical element B2 of Numerical Example 5. By forming the second optical element B2 as the prism, the first optical unit which is a fixed optical unit can be constructed as an optical unit whose entering and exiting reference axes differ from each other 90° in direction. This construction makes it possible to reduce the thickness of the second optical element B2 in the direction in which a ray enters the second optical element B2, so that it is possible to realize an image pickup apparatus which is extremely thin in the direction in which a light beam from a subject enters the variable magnification optical system.

NUMERICAL EXAMPLE 6

FIGS. 66, 67 and 68 are optical cross-sectional views taken in the Y, Z plane, showing Numerical Example 6 relative to the wide-angle end (w), the middle position (M) and the telephoto end (T). Numerical Example 6 is a variable magnification optical system having a magnification variation ratio of approximately 3×. Constituent data for Numerical Example 6 are shown below.

|  | WIDE-ANGLE END | MIDDLE POSITION | TELEPHOTO END |
|---|---|---|---|
| HORIZONTAL HALF-ANGLE OF VIEW | 26.0 | 18.0 | 9.2 |
| VERTICAL HALF-ANGLE OF VIEW | 20.0 | 13.6 | 6.9 |
| APERTURE DIAMETER | 1.40 | 2.00 | 2.80 |
| IMAGE SIZE | 4.8 × 3.6 mm | | |

| i | Yi | Zi(W) | θi | Di | Ndi | νdi | |
|---|---|---|---|---|---|---|---|
| 1 | 0.00 | 0.00 | 0.00 | 1.00 | 1 | | STOP |
| FIRST OPTICAL ELEMENT B1 (FIRST POSITIVE LENS) | | | | | | | |
| 2 | 0.00 | 1.00 | 0.00 | 8.00 | 1.58312 | 59.37 | REFRACTING SURFACE |
| 3 | 0.00 | 9.00 | 0.00 | 6.00 | 1 | | REFRACTING SURFACE |
| SECOND OPTICAL ELEMENT B2 | | | | | | | |
| 4 | 0.00 | 15.00 | 30.00 | 9.00 | 1 | | REFLECTING SURFACE |
| 5 | −7.79 | 10.50 | 15.00 | 9.00 | 1 | | REFLECTING SURFACE |
| 6 | −12.29 | 18.29 | −2.00 | 9.00 | 1 | | REFLECTING SURFACE |
| 7 | −16.24 | 10.21 | −17.00 | 9.00 | 1 | | REFLECTING SURFACE |
| 8 | −24.03 | 14.71 | −30.00 | 12.00 | 1 | | REFLECTING SURFACE |
| THIRD OPTICAL ELEMENT B3 (SECOND POSITIVE LENS) | | | | | | | |
| 9 | −24.03 | 2.71 | 0.00 | 1.00 | 1.76181 | 26.51 | REFRACTING SURFACE |
| 10 | −24.03 | 1.71 | 0.00 | VARIABLE | 1 | | REFRACTING SURFACE |
| FOURTH OPTICAL ELEMENT B4 | | | | | | | |
| 11 | −24.03 | −17.72 | −30.00 | VARIABLE | 1 | | REFLECTING SURFACE |
| 12 | −33.56 | −12.22 | −15.00 | 11.00 | 1 | | REFLECTING SURFACE |
| 13 | −39.06 | −21.75 | 0.00 | 11.00 | 1 | | REFLECTING SURFACE |
| 14 | −44.56 | −12.22 | 15.00 | 11.00 | 1 | | REFLECTING SURFACE |
| 15 | −54.09 | −17.72 | 30.00 | VARIABLE | 1 | | REFLECTING SURFACE |
| FIFTH OPTICAL ELEMENT B5 (NEGATIVE LENS) | | | | | | | |
| 16 | −54.09 | −3.29 | 0.00 | 0.70 | 1.51633 | 64.15 | REFRACTING SURFACE |
| 17 | −54.09 | −2.59 | 0.00 | VARIABLE | 1 | | REFRACTING SURFACE |
| SIXTH OPTICAL ELEMENT B6 | | | | | | | |
| 18 | −54.09 | 6.30 | 30.00 | 11.00 | 1 | | REFLECTING SURFACE |
| 19 | −63.61 | 0.80 | 15.00 | 11.00 | 1 | | REFLECTING SURFACE |
| 20 | −69.11 | 10.32 | 0.00 | 11.00 | 1 | | REFLECTING SURFACE |
| 21 | −74.61 | 0.80 | −15.00 | 11.00 | 1 | | REFLECTING SURFACE |
| 22 | −84.14 | 6.30 | −30.00 | VARIABLE | 1 | | REFLECTING SURFACE |

-continued

| | | | | | | | |
|---|---|---|---|---|---|---|---|
| 23 | −84.14 | −5.70 | 0.00 | 4.00 | 1.51633 | 64.15 | FILTER |
| 24 | −84.14 | −9.70 | 0.00 | 2.00 | 1 | | |
| 25 | −84.14 | −11.70 | 0.00 | 0.80 | 1.51633 | 64.15 | COVER GLASS |
| 26 | −84.14 | −12.50 | 0.00 | 1.00 | 1 | | |
| 27 | −84.14 | −13.50 | | | | | IMAGE PLANE |

| | WIDE-ANGLE END | MIDDLE POSITION | TELEPHOTO END |
|---|---|---|---|
| D10 | 19.43 | 15.69 | 11.61 |
| D15 | 12.50 | 9.26 | 5.72 |
| D17 | 8.89 | 12.30 | 20.89 |
| D17 | 10.39 | 13.34 | 20.78 |

| | | |
|---|---|---|
| R1–R10 | $Z_i(M) = Z_i(W)$ | $Z_i(T) = Z_i(W)$ |
| R11–R15 | $Z_i(M) = Z_i(W) + 3.74$ | $Z_i(T) = Z_i(W) + 7.82$ |
| R16–R17 | $Z_i(M) = Z_i(W)$ | $Z_i(T) = Z_i(W)$ |
| R18–R22 | $Z_i(M) = Z_i(W) + 3.41$ | $Z_i(T) = Z_i(W) + 12.00$ |
| R23–R27 | $Z_i(M) = Z_i(W)$ | $Z_i(T) = Z_i(W)$ |

SPHERICAL SHAPE

| | | |
|---|---|---|
| R2  | $R_2 =$ | $\infty$ |
| R3  | $R_3 =$ | −10.000 |
| R9  | $R_9 =$ | −50.000 |
| R10 | $R_{10} =$ | 36.000 |
| R16 | $R_{16} =$ | −70.000 |
| R17 | $R_{17} =$ | 70.000 |
| R23 | $R_{23} =$ | $\infty$ |
| R24 | $R_{24} =$ | $\infty$ |
| R25 | $R_{25} =$ | $\infty$ |
| R26 | $R_{26} =$ | $\infty$ |

ASPHERICAL SHAPE

| | | | | | |
|---|---|---|---|---|---|
| R4  | $C_{02} =$ | −2.57907e−02 | $C_{20} =$ | −3.33716e−02 | |
|     | $C_{03} =$ | −4.87309e−05 | $C_{21} =$ | −6.43446e−05 | |
|     | $C_{04} =$ | −5.55902e−06 | $C_{22} =$ | −6.87550e−05 | $C_{40} =$ −3.54539e−05 |
| R5  | $C_{02} =$ | −4.07727e−03 | $C_{20} =$ | −4.83586e−02 | |
|     | $C_{03} =$ | −3.29050e−04 | $C_{21} =$ | −1.08808e−03 | |
|     | $C_{04} =$ | −7.42806e−05 | $C_{22} =$ | −1.42016e−04 | $C_{40} =$ 3.96524e−04 |
| R6  | $C_{02} =$ | −2.32622e−02 | $C_{20} =$ | −3.78820e−02 | |
|     | $C_{03} =$ | −1.21446e−05 | $C_{21} =$ | 2.06307e−04 | |
|     | $C_{04} =$ | −2.33997e−05 | $C_{22} =$ | −7.12505e−05 | $C_{40} =$ −6.10911e−05 |
| R7  | $C_{02} =$ | −4.49711e−03 | $C_{20} =$ | −3.61203e−02 | |
|     | $C_{03} =$ | 1.30552e−04 | $C_{21} =$ | 2.06233e−03 | |
|     | $C_{04} =$ | −7.29751e−05 | $C_{22} =$ | −4.25831e−04 | $C_{40} =$ −2.55054e−04 |
| R8  | $C_{02} =$ | −2.27068e−02 | $C_{20} =$ | −3.80000e−02 | |
|     | $C_{03} =$ | 5.79085e−06 | $C_{21} =$ | −4.79760e−04 | |
|     | $C_{04} =$ | −2.60268e−05 | $C_{22} =$ | −4.20210e−05 | $C_{40} =$ −1.22588e−05 |
| R11 | $C_{02} =$ | 2.23034e−02 | $C_{20} =$ | 3.21256e−02 | |
|     | $C_{03} =$ | 2.42570e−05 | $C_{21} =$ | 2.65078e−05 | |
|     | $C_{04} =$ | 1.57855e−05 | $C_{22} =$ | 5.20198e−05 | $C_{40} =$ 4.21383e−05 |
| R12 | $C_{02} =$ | 4.47467e−03 | $C_{20} =$ | 1.74256e−02 | |
|     | $C_{03} =$ | −2.20245e−04 | $C_{21} =$ | −2.73590e−03 | |
|     | $C_{04} =$ | 1.90374e−05 | $C_{22} =$ | 1.63565e−04 | $C_{40} =$ 1.29696e−04 |
| R13 | $C_{02} =$ | 1.15968e−02 | $C_{20} =$ | 3.81521e−02 | |
|     | $C_{03} =$ | 1.48813e−04 | $C_{21} =$ | 3.36024e−04 | |
|     | $C_{04} =$ | 2.46826e−05 | $C_{22} =$ | 6.99720e−05 | $C_{40} =$ 5.08874e−05 |
| R14 | $C_{02} =$ | 2.46824e−03 | $C_{20} =$ | −2.74990e−02 | |
|     | $C_{03} =$ | 4.17008e−05 | $C_{21} =$ | −1.86558e−03 | |
|     | $C_{04} =$ | 6.61747e−06 | $C_{22} =$ | −4.34716e−05 | $C_{40} =$ 1.17941e−04 |
| R15 | $C_{02} =$ | 1.61390e−02 | $C_{20} =$ | 2.51656e−02 | |
|     | $C_{03} =$ | 9.88747e−05 | $C_{21} =$ | 6.61330e−05 | |
|     | $C_{04} =$ | 1.20942e−05 | $C_{22} =$ | 8.53843e−05 | $C_{40} =$ 4.30022e−06 |
| R18 | $C_{02} =$ | −1.64464e−02 | $C_{20} =$ | −1.33934e−02 | |
|     | $C_{03} =$ | 1.55688e−04 | $C_{21} =$ | −4.52421e−04 | |
|     | $C_{04} =$ | 1.63771e−05 | $C_{22} =$ | −2.79819e−05 | $C_{40} =$ 1.18921e−05 |
| R19 | $C_{02} =$ | −8.21811e−03 | $C_{20} =$ | −1.69071e−02 | |
|     | $C_{03} =$ | 4.30452e−05 | $C_{21} =$ | 2.62997e−04 | |
|     | $C_{04} =$ | 4.90960e−05 | $C_{22} =$ | 5.55031e−05 | $C_{40} =$ 4.52979e−05 |
| R20 | $C_{02} =$ | −1.86035e−02 | $C_{20} =$ | −2.12277e−02 | |
|     | $C_{03} =$ | −1.09892e−04 | $C_{21} =$ | 2.65234e−04 | |
|     | $C_{04} =$ | −2.09254e−05 | $C_{22} =$ | −3.05974e−05 | $C_{40} =$ −9.75780e−06 |

-continued

| | | | | | |
|---|---|---|---|---|---|
| R21 | $C_{02} =$ -9.99210e-03 | $C_{20} =$ -2.80526e-02 | | | |
| | $C_{03} =$ -1.56705e-04 | $C_{21} =$ 1.56578e-03 | | | |
| | $C_{04} =$ -4.35488e-05 | $C_{22} =$ -1.62275e-04 | $C_{40} =$ | -1.34152e-04 | |
| R22 | $C_{02} =$ -1.65231e-02 | $C_{20} =$ -1.81685e-02 | | | |
| | $C_{03} =$ -6.45758e-05 | $C_{21} =$ -1.95699e-04 | | | |
| | $C_{04} =$ -5.30753e-06 | $C_{22} =$ -1.00370e-05 | $C_{40} =$ | -3.67285e-05 | |

The construction of Numerical Example 6 will be described below in order from its object side. The first surface R1 is an aperture plane, and the first optical element B1 is a positive lens which has the second surface R2 and the third surface R3. The second optical element B2 has the fourth surface R4, the fifth surface R5, the sixth surface R6, the seventh surface R7 and the eighth surface R8, each of which is a surface mirror. The third optical element B3 is a positive lens which has the ninth surface R9 and the tenth surface R10.

The fourth optical element B4 has the eleventh surface R11 to the fifteenth surface R15 each of which is a surface mirror. The fifth optical element B5 is a negative lens which has the sixteenth surface R16 and the seventeenth surface R17. The sixth optical element B6 has the eighteenth surface R18 to the twenty-second surface R22 each of which is a surface mirror.

The twenty-third surface R23 to the twenty-sixth surface R26 are those of glass members such as a filter and a cover glass. The twenty-seventh surface R27 is a final image plane in which the image pickup surface of an image pickup medium such as a CCD is positioned.

Figure 69:
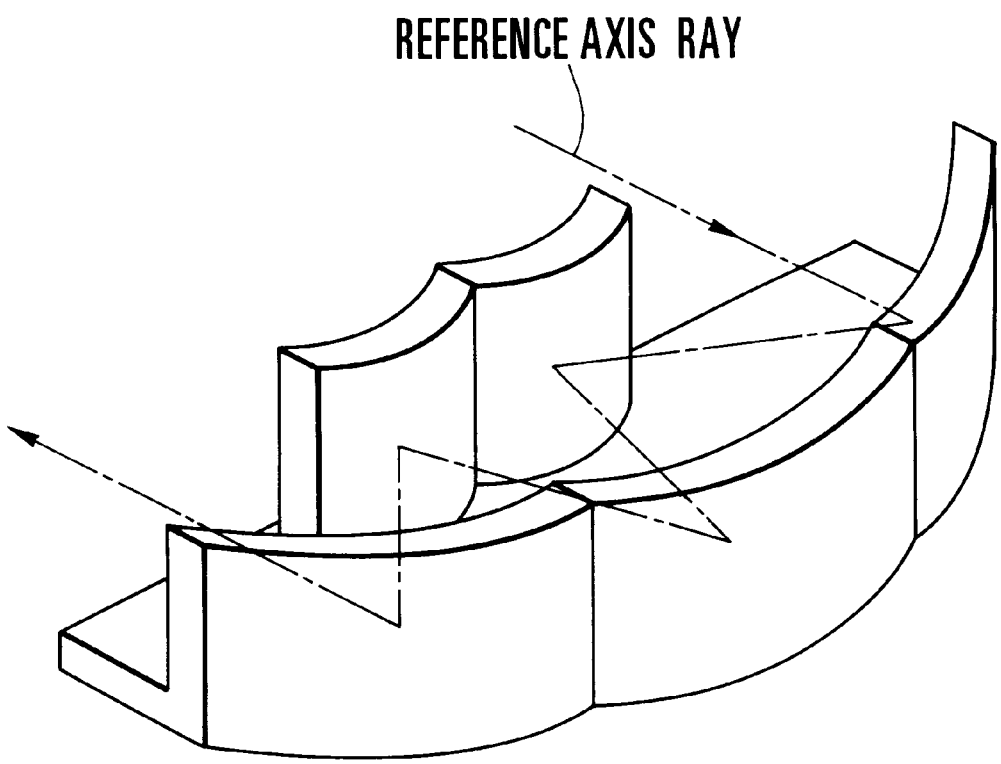
FIG. 69 is a perspective view of the magnification varying optical unit of Numerical Example 6.

In the above construction, since the reflecting surfaces R18 to R22 of the sixth optical element B6 need be arranged so that they can integrally move, the reflecting surfaces R18 to R22 are integrally formed as shown in FIG. 69 by way of example. The fourth optical element B4 and the second optical element B2 are also integrally formed products.

The optical elements of Numerical Example 6 are grouped into four optical units which constitute a variable magnification optical system. Specifically, the stop R1, the first optical element B1, the second optical element B2 and the third optical element B3 constitute the first optical unit, the fourth optical element B4 constitutes the second optical unit, the fifth optical element B5 constitutes the third optical unit, and the sixth optical element B6 constitutes the fourth optical unit. The second and fourth optical units are magnification varying optical units which vary the relative position therebetween to vary the magnification of the variable magnification optical system. The three optical unit is a fixed lens having a negative refractive power, which is disposed between the two magnification varying optical units. The concave reflecting surfaces R11, R13, R15, R18, R20 and R22 effectively act to relay the aforesaid intermediate images and pupil images in each of the magnification varying optical units.

An image forming operation for an object lying at infinity will be described below. First, a light beam passes through the first optical element B1 (a first positive lens) and enters second optical element B2. In the second optical element B2, the light beam is reflected from surface to surface by the fourth surface R4 to the eighth surface R8, and then exits from second optical element B2. During this time, a primary image is formed between the fourth surface R4 and the fifth surface R5, while a secondary image is formed between the eighth surface R8 and the ninth surface R9. A pupil is formed between the sixth surface R6 and the seventh surface R7.

Then, the light beam enters passes through the third optical element B3 (a second positive lens) and enters the fourth optical element B4. In the fourth optical element B4, the light beam is reflected from surface to surface by the eleventh surface R11 to the fifteenth surface R15, and then exits from fourth optical element B4. During this time, a tertiary image is formed between the twelfth surface R12 and the thirteenth surface R13 when the focal length is at the wide-angle end, or between the thirteenth surface R13 and the fourteenth surface R14 when the focal length is at the telephoto end.

Then, the light beam passes through the fifth optical element B5 (a negative lens) and enters the sixth optical element B6. In the sixth optical element B6, the light beam is reflected from surface to surface by the eighteenth surface R18 to the twenty-second surface R22, and then exits from the sixth optical element B6. During this time, a quaternary image is formed between the eighteenth surface R18 and the nineteenth surface R19 when the focal length is at the wide-angle end, or in the vicinity of the nineteenth surface R19 when the focal length is at the telephoto end. A pupil is formed between the twenty-first surface R21 and the twenty-second surface R22 when the focal length is at the wide-angle end, or between the twenty-second surface R22 and the twenty-third surface R23 when the focal length is at the telephoto end.

The light beam which has exited from the sixth optical element B6 passes through the twenty-third surface R23 to the twenty-sixth surface R26, and forms an object image on the twenty-seventh surface R27 which is a quinary image forming plane.

In Numerical Example 6, each of the second optical element B2, the fourth optical element B4 and the sixth optical element B6 has an entering reference axis and an exiting reference axis which differ from each other by 180° in direction.

A magnification varying operation effected by the movements of the respective optical elements will be described below. During the magnification varying operation, the stop R1, the first optical element B1, the second optical element B2 and the third optical element B3 which constitute the first optical unit are fixed. As the focal length varies from the wide-angle end toward the telephoto end, the fourth optical element B4 moves in the Z plus direction in parallel with the entering reference axis of the fourth optical element B4, whereas the fifth optical element B5 which is a negative lens does not move. As the focal length varies from the wide-angle end toward the telephoto end, the sixth optical element B6 moves in the Z plus direction in parallel with the entering reference axis of the sixth optical element B6. During the magnification varying operation, the filter, the cover glass and the final image plane do not move.

Thus, as the focal length varies from the wide-angle end toward the telephoto end, the distance between the third optical element B3 and the fourth optical element B4 is decreased, the distance between the fourth optical element B4 and the fifth optical element B5 is decreased, the distance between the fifth optical element B5 and the sixth optical element B6 is increased, and the distance between the sixth optical element B6 and the twenty-third surface R23 is increased.

In addition, as the focal length varies from the wide-angle end toward the telephoto end, the entire optical path length which extends from the first surface R1 to the twenty-seventh surface R27 becomes temporarily shorter and then longer.

Figure 70:
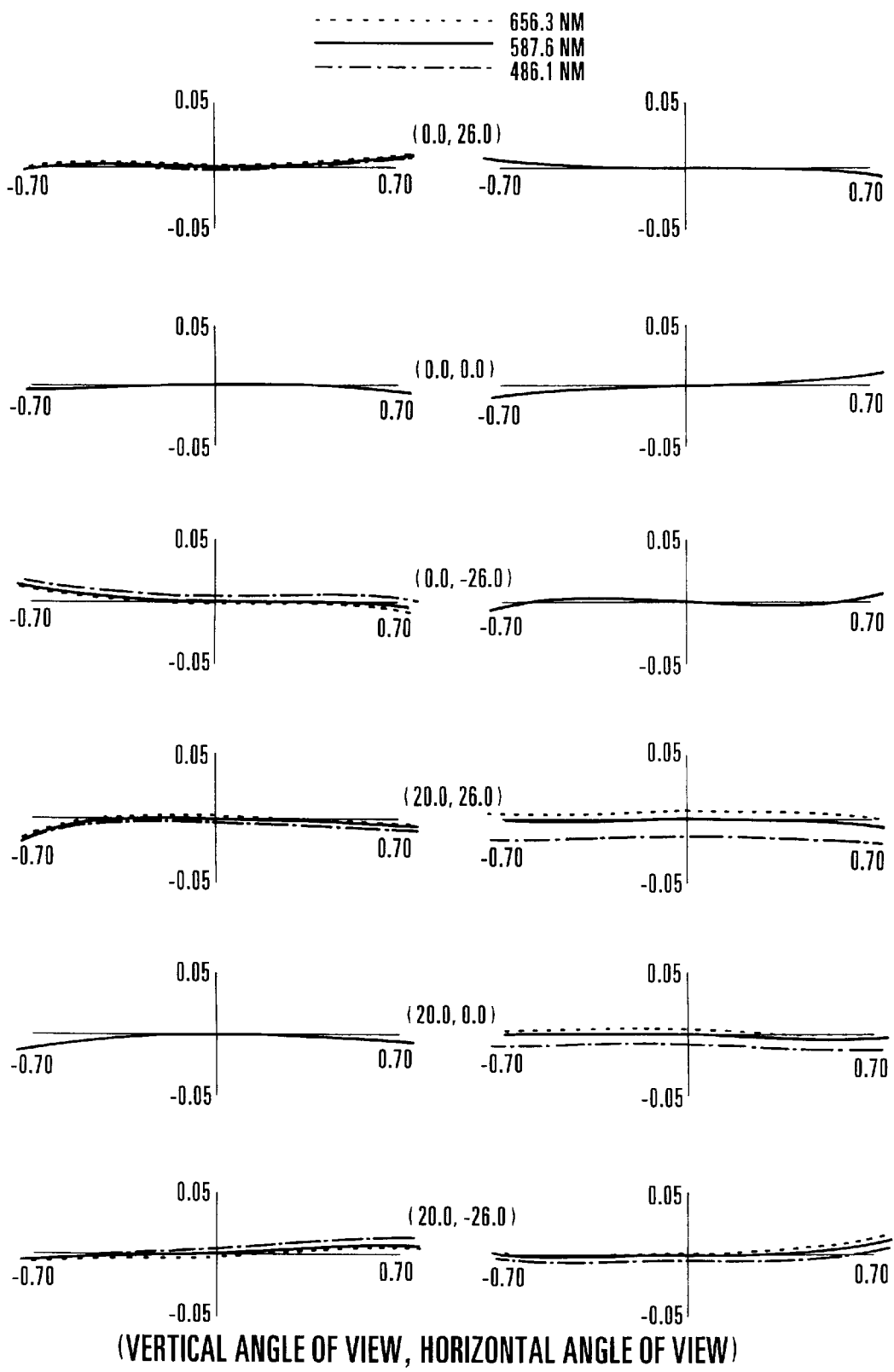
FIG. 70 is a lateral aberration chart of Numerical Example 6 relative to its wide-angle end.
Figure 71:
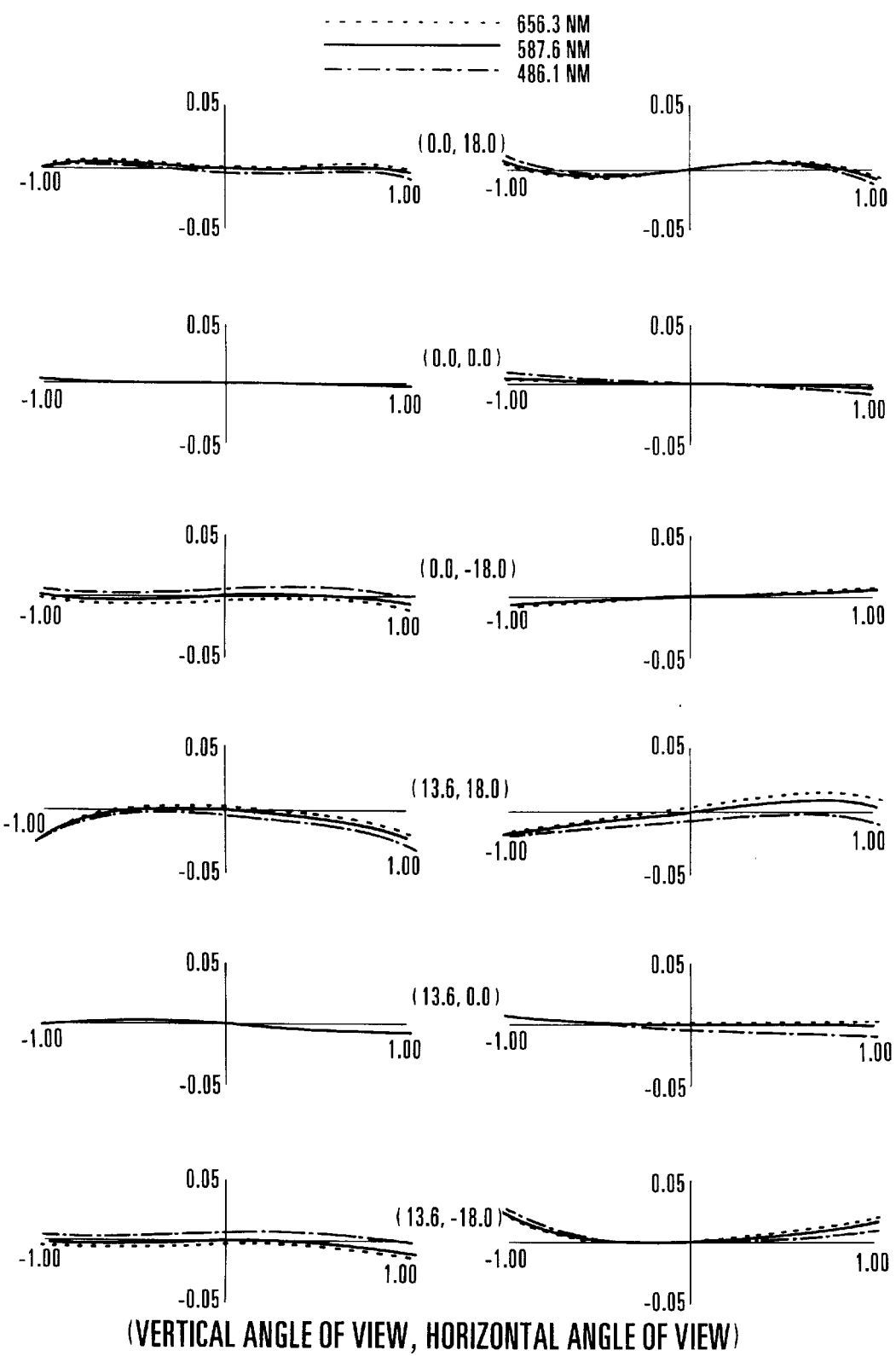
FIG. 71 is a lateral aberration chart of Numerical Example 6 relative to the middle position.
Figure 72:
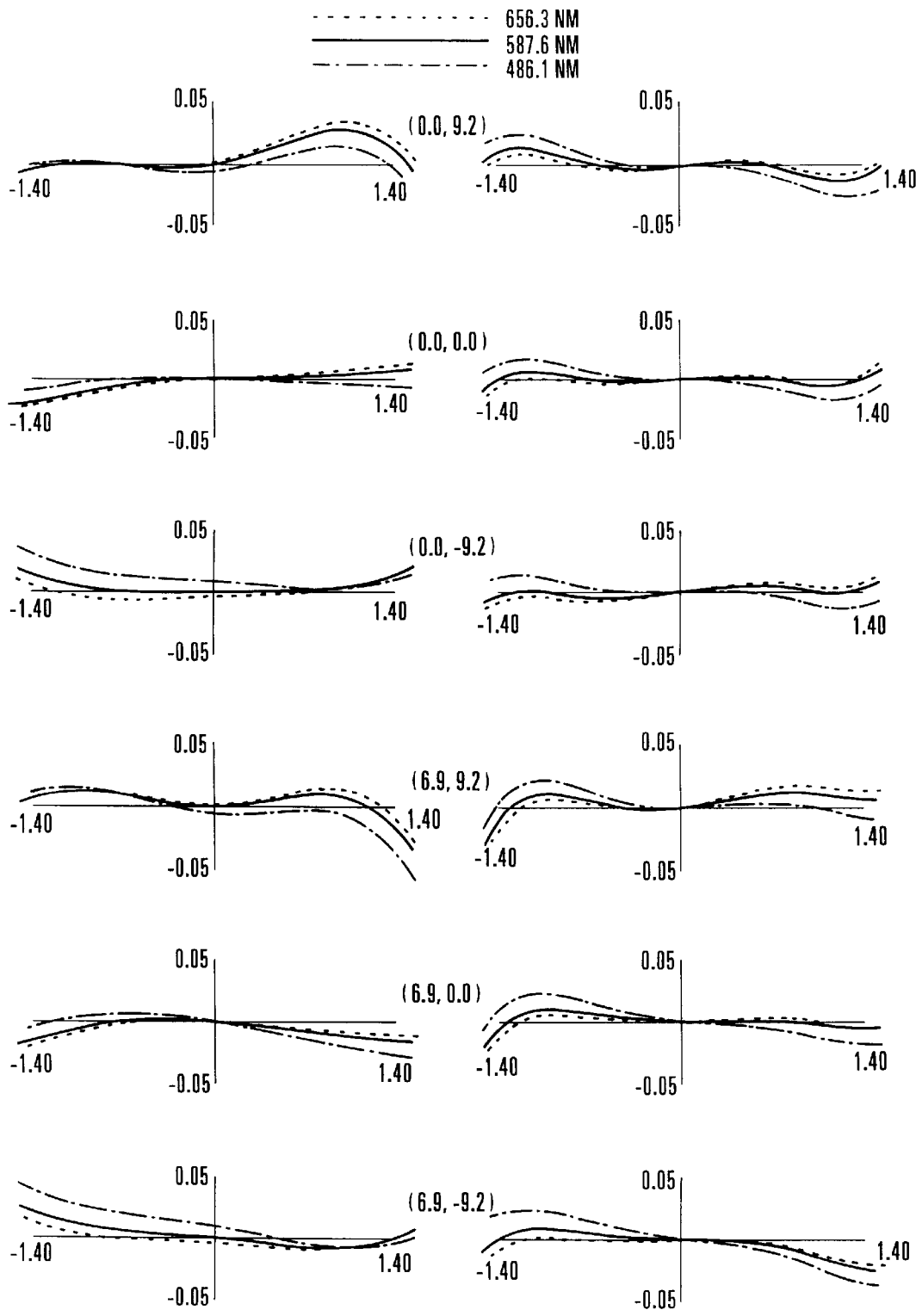
FIG. 72 is a lateral aberration chart of Numerical Example 6 relative to the telephoto end.

Each of FIGS. 70, 71 and 72 shows lateral aberration charts of Numerical Example 6 relative to the wide-angle end (W), the middle position (M) and the telephoto end (T). The respective lateral aberration charts show lateral aberrations in the Y and X directions, relative to six light beams which enter Numerical Example 6 at different angles of incidence of $(u_Y, u_X)$, $(0, u_X)$, $(-u_Y, u_X)$, $(u_Y, 0)$, $(0, 0)$ and $(-u_Y, 0)$, respectively. The horizontal axis of each of the lateral aberration charts represents the height of incidence in the Y or X direction of a light beam which is incident on each of the entrance pupils.

As can be seen from these figures, Numerical Example 6 is capable of achieving well-balanced correction of aberration at each zoom position.

In addition, since Numerical Example 6 mainly uses surface mirrors, no chromatic aberration occurs at any of the surface mirrors, and an axial chromatic aberration and a lateral chromatic aberration, both of which are chromatic aberrations occurring at the first optical element B1 (the first positive lens), are corrected by the fifth optical element B5 (negative lens) and the third optical element B3 (the second positive lens), respectively, so that the chromatic aberrations are corrected over the entire magnification variation range. The third optical element B3 (second positive lens) also serves as a field lens for forming a pupil at an appropriate position in the fourth optical element B4.

In addition, the optical system of Numerical Example 6 is approximately 12.8 mm thick for an image size of 4.8 mm×3.6 mm. In Numerical Example 6, particularly because each of the optical elements and the entire optical system has a small thickness and the reflecting surfaces of each of the optical elements are formed on one plate, it is possible to readily construct a variable magnification optical system which is thin as a whole, by adopting a mechanism which causes two optical elements, which are magnification varying optical units, to move along a surface of one base plate.

Numerical Example 6 is the variable magnification optical system in which, in the fifth embodiment shown in FIG. 49, the first optical unit is formed as an optical unit having an entering reference axis and an exiting reference axis which differ from each other by 180° in direction, and one fixed concave lens is provided between the second optical unit 14 and the third optical unit 15.

Incidentally, all the reference axes of Numerical Example 6 are present in the Y, Z plane, and if an oblique reflecting surface which appropriately reflects the reference axis ray is provided in the first optical unit which is a fixed optical unit, the direction of the reference axis which enters the variable magnification optical system can be set to an arbitrary direction other than the Y, Z plane, so that the degree of freedom of design of the construction of an image pickup apparatus can be increased.

Figure 73:
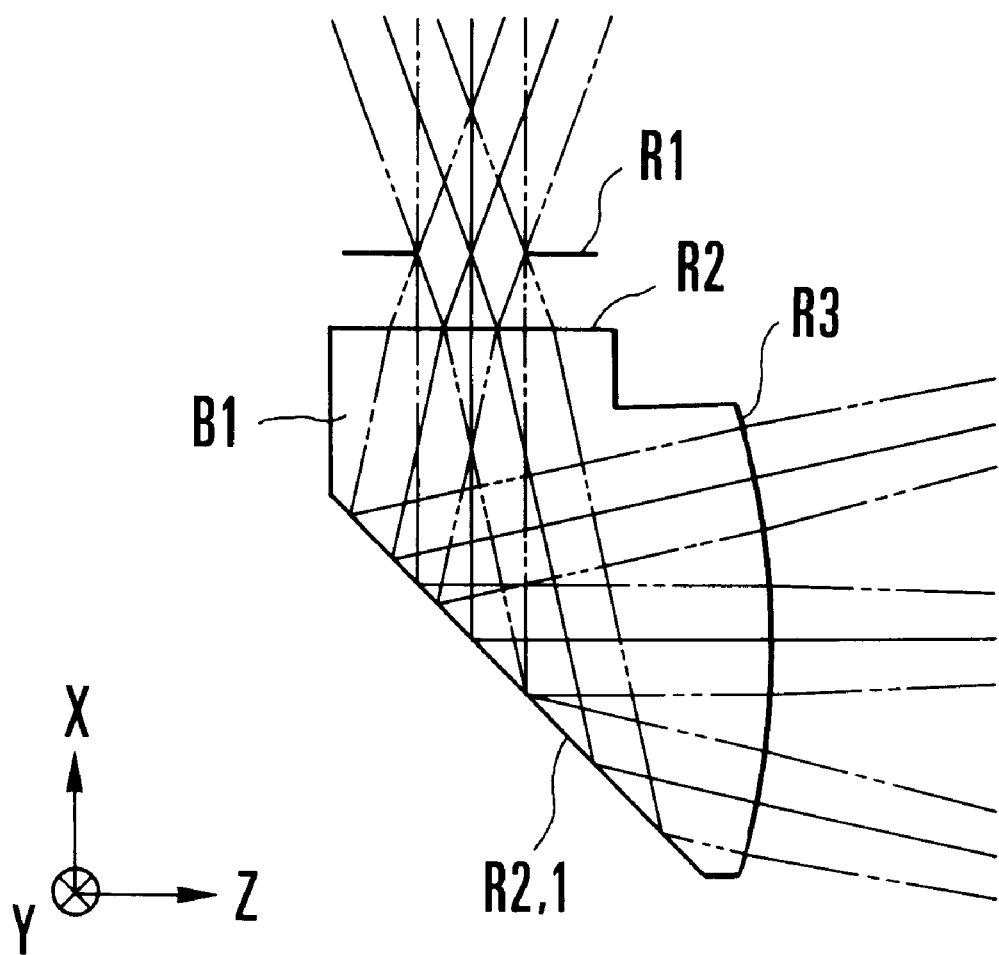
FIG. 73 is an explanatory view showing a method of changing the direction of the reference axis by using a prism as the first optical element of Numerical Example 6.

FIG. 73 is an explanatory view of a method of changing the direction of the reference axis by forming the first optical element B1 in Numerical Example 6 as a prism. As shown in FIG. 73, a reflecting surface R2,1 which reflects an entering reference axis ray parallel to the X axis in a direction parallel to the Z axis is provided immediately after the second surface R2 of the first optical element B1 of Numerical Example 6. By forming the first optical element B1 as the prism, the first optical unit which is a fixed optical unit can be constructed as an optical unit whose entering and exiting reference axes differ from each other 90° in direction. This construction makes it possible to reduce the thickness of the first optical element B1 in the direction in which a ray enters the first optical element B1, so that it is possible to realize an image pickup apparatus which is extremely thin in the direction in which a light beam from a subject enters the variable magnification optical system.

Values relative to each of the conditions for each of Numerical Examples 4 to 6 are shown below. Incidentally, Conditions 1 and 2 are completely valid in all Numerical Examples 4 to 6. However, the values of Condition 4 are 1.0 for all the suitable reflecting surfaces of Numerical Examples 4 to 6, and 1.0 is within the limits of Condition 4. Values relative to each of Conditions 3, 5 and 6 are shown below.

| NUMERICAL EXAMPLE 4 | NUMERAL EXAMPLE 5 | NUMERICAL EXAMPLE 6 |
|---|---|---|
| Condition 3 | | |
| R11 1.06 | R13 0.89 | R11 0.93 |
| R13 0.70 | R15 0.59 | R13 0.41 |
| R15 0.73 | R17 0.81 | R15 0.86 |
| R18 2.21 | R20 0.98 | R18 1.64 |
| R20 1.00 | R22 0.78 | R20 1.17 |
| R22 0.75 | R24 0.91 | R22 1.21 |
| Condition 5 | | |
| R11/R13 0.64 | R13/R15 0.69 | R11/R13 0.52 |
| R13/R15 1.13 | R15/R17 1.24 | R13/R15 1.39 |
| R18/R20 1.23 | R20/R22 1.14 | R18/R20 1.13 |
| R20/R22 0.63 | R22/R24 0.89 | R20/R22 0.89 |
| Condition 6 | | |
| R10–R23 1.04 | R12–R25 0.81 | R11–R22 0.68 |

Each of Numerical Examples 4 to 6 is arranged to form an object image at least once in each of the magnification varying optical units, and can be realized as a variable magnification optical system whose thickness is small in spite of its wide angle of view. In addition, since decentered convex reflecting surfaces each having a cross-sectional shape which is asymmetrical in a plane containing entering and exiting reference axes are provided in each of the magnification varying optical units, the optical path in the variable magnification optical system is bent into a desired shape so that the entire length of the variable magnification optical system is reduced in a predetermined direction. Accordingly, the variable magnification optical system can be realized as a small-sized high-performance variable magnification optical system which is fully corrected for decentering aberration over the entire magnification variation range.

In accordance with the present invention having the aforesaid arrangement and construction, a variable magnification optical system, in which a fixed optical unit and a plurality of magnification varying optical units are arranged in that order from an object side and the magnification of the variable magnification optical system is varied by the relative movement between the plurality of magnification varying optical units, can be realized as a high-performance variable magnification optical system which has a small thickness in spite of its wide angle of view, an entire length which is short in a predetermined direction, and decentering aberration which is fully corrected over the entire magnification variation range. In addition, an image pickup apparatus using such high-performance variable magnification optical system is achieved.

In addition, it is possible to achieve a variable magnification optical system having at least one of the following effects and advantages, and an image pickup apparatus employing such a variable magnification optical system.

Since a stop is arranged on the object side of the variable magnification optical system or in the vicinity of the first surface and an object image is formed at least once in the variable magnification optical system, the thickness of the variable magnification optical system can be made small in spite of its wide angle of view.

Since each optical unit employs an optical element having a plurality of reflecting surfaces having appropriate refractive powers and the reflecting surfaces are arranged in a decentered manner, the optical path in the variable magnification optical system can be bent into a desired shape to reduce the entire length of the variable magnification optical system in a predetermined direction.

Each optical element which constitutes part of the variable magnification optical system includes a plurality of reflecting surfaces which are integrally formed in such a manner that each of the reflecting surfaces is arranged in a decentered manner and is given an appropriate refractive power. Accordingly, the decentering aberration of the variable magnification optical system can be fully corrected over the entire magnification variation range.

Since each magnification varying optical unit employs an optical element in which a plurality of curved or plane reflecting surfaces are integrally formed, not only is it possible to reduce the entire size of the variable magnification optical system, but it is also possible to solve the problem of excessively strict arrangement accuracy (assembly accuracy) which would have often been experienced with reflecting surfaces.

We claim:

1. A variable magnification optical system comprising at least three optical units, said at least three optical units being a first moving optical unit, a fixed optical unit and a second moving optical unit which are arranged in that order in a propagation direction of light, a variation of magnification being effected by a relative movement between said first moving optical unit and said second moving optical unit, wherein if a ray which exits from an object and enters said variable magnification optical system, and passes through a center of a stop of said variable magnification optical system and reaches a center of a final image plane is represented as a reference axis ray; a reference axis ray which is incident on any surface of said variable magnification optical system or enters any of said optical units is represented as an entering reference axis of said any surface or said any optical unit; a reference axis ray which exits from said any surface or said any optical unit is represented as an exiting reference axis of said any surface or said any optical unit; a point at which the entering reference axis intersects with said any surface is represented as a reference point; a direction in which the reference axis ray travels from an object side toward an image plane along the entering reference axis is represented as a direction of the entering reference axis; and a direction in which the reference axis ray travels from the object side toward the image plane along the exiting reference axis is represented as a direction of the exiting reference axis, said second moving optical unit has a cross-sectional shape which is asymmetrical in a plane which contains the reference axis, and a curved reflecting surface which is inclined with respect to the reference axis, and the direction of the entering reference axis and the direction of the exiting reference axis of said second moving optical unit are parallel to each other and differ from each other by 180°, said variable magnification optical system being arranged in such a manner that a final image is formed after an intermediate image is formed at least twice.

2. A variable magnification optical system according to claim 1, wherein said fixed optical unit is an optical unit having the largest ratio of (a lateral magnification at a wide-angle end) to (a lateral magnification at a telephoto end) of all the optical units.

3. A variable magnification optical system according to claim 1, wherein said first moving optical unit moves toward said fixed optical unit during a variation of magnification from a wide-angle end toward a telephoto end.

4. A variable magnification optical system according to claim 1, wherein said second moving optical unit includes an optical element which is formed as one transparent body on which two refracting surfaces and a plurality of internal curved reflecting surfaces are formed.

5. A variable magnification optical system according to claim 1, wherein said first moving optical unit includes an optical element which is formed as one transparent body on which two refracting surfaces and a plurality of internal curved reflecting surfaces inclined with respect to the reference axis are formed, the direction of the entering reference axis and the direction of the exiting reference axis of said optical element being parallel to and the same as each other.

6. A variable magnification optical system according to claim 1, wherein said first moving optical unit includes an optical element which is formed as one transparent body on which two refracting surfaces and a plurality of internal curved reflecting surfaces inclined with respect to the reference axis are formed, the direction of the entering reference axis and the direction of the exiting reference axis of said optical element being parallel to each other and different from each other by 180°.

7. A variable magnification optical system according to claim 5, wherein said first moving optical unit forms an intermediate image in its inside.

8. A variable magnification optical system according to claim 1, wherein said fixed optical unit includes an optical element which is formed as one transparent body on which two refracting surfaces and a plurality of internal curved reflecting surfaces inclined with respect to the reference axis are formed, the direction of the entering reference axis and the direction of the exiting reference axis of said optical element being parallel to and the same as each other.

9. A variable magnification optical system according to claim 1, wherein said fixed optical unit includes an optical element which is formed as one transparent body on which two refracting surfaces and a plurality of internal curved reflecting surfaces inclined with respect to the reference axis are formed, the direction of the entering reference axis and the direction of the exiting reference axis of said optical element being parallel to each other and different from each other by 180°.

10. A variable magnification optical system according to claim 1, wherein said fixed optical unit includes an optical element which is formed as one transparent body on which two refracting surfaces and a plurality of internal curved reflecting surfaces inclined with respect to the reference axis are formed, the exiting reference axis of said optical element being inclined with respect to the entering reference axis thereof.

11. A variable magnification optical system according to claim 1, wherein said stop is located on the object side of said first moving optical unit, said stop being fixed during the variation of magnification.

12. A variable magnification optical system comprising at least three optical units, said at least three optical units being a first moving optical unit, a fixed optical unit, and a second moving optical unit which are arranged in that order in a propagation direction of light, a variation of magnification being effected by a relative movement between said first moving optical unit and said second moving optical unit, wherein if a ray which exits from an object and enters said variable magnification optical system, and passes through a center of a stop of said variable magnification optical system and reaches a center of a final image plane is represented as a reference axis ray; a reference axis ray which is incident on any surface of said variable magnification optical system or enters any of said optical units is represented as an entering reference axis of said any surface or said any optical unit; a reference axis ray which exits from said any surface or said any optical unit is represented as an exiting reference axis of said any surface or said any optical unit; a point at which the entering reference axis intersects with said any surface is represented as a reference point; a direction in which the reference axis ray travels from an object side toward an image plane along the entering reference axis is represented as a direction of the entering reference axis; and a direction in which the reference axis ray travels from the object side toward the image plane along the exiting reference axis is represented as a direction of the exiting reference axis, each of said first moving optical unit, said fixed optical unit, and said second moving optical unit includes an optical element which is formed as one transparent body on which two refracting surfaces and at least one internal curved reflecting surface inclined with respect to the reference axis are formed, said second moving optical unit having a cross-sectional shape which is asymmetrical in a plane which contains the reference axis, and the direction of the entering reference axis and the direction of the exiting reference axis of said second moving optical unit are parallel to each other and differ from each other by 180°, said variable magnification optical system being arranged in such a manner that a final image is formed after an intermediate image is formed at least twice.

13. A variable magnification optical system according to claim 12, wherein, during a variation of magnification from a wide-angle end toward a telephoto end, an optical path length between said first moving optical unit and said fixed optical unit becomes shorter, whereas an optical path length between said fixed optical unit and said second moving optical unit becomes longer.

14. A variable magnification optical system according to claim 12, wherein, during the variation of magnification, an optical path length which extends from the object to the final image forming plane is varied with the final image forming plane spatially fixed.

15. A variable magnification optical system according to claim 12, wherein said stop is located on the object side of said first moving optical unit, said stop being fixed during the variation of magnification.

16. An image pickup apparatus comprising said variable magnification optical system according to claim 1, said image pickup apparatus being arranged to form an image of an object to be photographed, on an image pickup surface of an image pickup medium.

* * * * *

UNITED STATES PATENT AND TRADEMARK OFFICE
CERTIFICATE OF CORRECTION

PATENT NO. : 5,999,311

DATED : December 7, 1999

INVENTOR(S) : NANBA, et al.

It is certified that error appears in the above-identified patent and that said Letters Patent is hereby corrected as shown below:

<u>IN THE DRAWINGS</u>:
<u>Sheet 35 of 50</u>:
    Fig. 52, "ENTERRING" should read --ENTERING--.

<u>COLUMN 4</u>:
Line 5, "incidence" should read --incident--.

<u>COLUMN 8</u>:
Line 13, "A" should be deleted.

<u>COLUMN 10</u>:
Line 59, "an" should read --a--.
Line 61, "an conceptual" should read --a conceptual--.
Line 64, "an conceptual" should read --a conceptual--.

<u>COLUMN 18</u>:
Line 5, "Guassian" should read --Gaussian--.

<u>COLUMN 21</u>:
Line 46, "FIG. 11)" should read --FIG. 1)-- .

<u>COLUMN 22</u>:
Line 39, "$L_T=L_{W+2}d3.$" should read --$L_T=L_W+2d3.$--.

<u>COLUMN 23</u>:
Line 51, "suffer" should read --suffers from--.

<u>COLUMN 25</u>:
Line 2, "varied" should read --varied from--.
Line 35, "1,magnification" should read --magnification--.

UNITED STATES PATENT AND TRADEMARK OFFICE
CERTIFICATE OF CORRECTION

PATENT NO. : 5,999,311

DATED : December 7, 1999

INVENTOR(S) : NANBA, et al.

Page 2 of 4

It is certified that error appears in the above-identified patent and that said Letters Patent is hereby corrected as shown below:

COLUMN 26:
 Line 13, "$L_T=L_{W-2}d1+2d3.$" should read --$L_T=L_W-2d1+2d3.$--.

COLUMN 27:
 Line 24, "differ" should read --different--.

COLUMN 28:
 Line 65, "z axis" should read --Z axis--.

COLUMN 30:
 Line 50, "y, z plane." should read --Y-Z plane.--.
 Line 52, "x-z plane" should read --X-Z plane--.

COLUMN 41:
 Line 3, "timer" should read --time,--.

COLUMN 44:
 Line 56, "$C_{20}$ = -2.12330e-04" should read
--$C_{22}$ = -2.12330e-04-- and "-6 79401e-04" should read
-- -6.79401e-04--.

COLUMN 48:
 Line 11, ".variable" should read --variable--.

COLUMN 49:
 Line 56, "moves" should read --move--.

COLUMN 52:
 Line 25, "34" should read --34.--.

UNITED STATES PATENT AND TRADEMARK OFFICE
CERTIFICATE OF CORRECTION

PATENT NO. : 5,999,311

DATED : December 7, 1999

INVENTOR(S) : NANBA, et al.

It is certified that error appears in the above-identified patent and that said Letters Patent is hereby corrected as shown below:

COLUMN 54:
Line 37, "are" should read --be--.

COLUMN 58:
Line 6, "closet" should read --closest--.
Line 7, "closet" should read --closest--.
Line 52, "refracting" should read --reflecting--.

COLUMN 60:
Line 24, "z axis" should read --Z axis--.

COLUMN 64:
Line 58, "$C_{21}=-2.94640e-03$" should read --$C_{21}=-2.94840e-03$--.

COLUMN 65:
Line 7, "$C_{20}=7\ 57535e-02$" should read --$C_{20}=7.57535e-02$--.

COLUMN 74:
Line 6, "end(w)," should read --end(W),--.

COLUMN 77:
Line 49, "three" should read --third--.

UNITED STATES PATENT AND TRADEMARK OFFICE
CERTIFICATE OF CORRECTION

PATENT NO. : 5,999,311

DATED : December 7, 1999

INVENTOR(S) : NANBA, et al.

It is certified that error appears in the above-identified patent and that said Letters Patent is hereby corrected as shown below:

<u>COLUMN 78</u>:
Line 10, "enters" should read --enters and--.
Line 15, "fourth" should read --the fourth--.

Signed and Sealed this

Twenty-second Day of May, 2001

Attest:

NICHOLAS P. GODICI

Attesting Officer        Acting Director of the United States Patent and Trademark Office